(12) United States Patent
Etou et al.

(10) Patent No.: US 7,493,890 B2
(45) Date of Patent: Feb. 24, 2009

(54) ENGINE CONTROL DEVICE AND CONTROL METHOD

(75) Inventors: Takeshi Etou, Chigasaki (JP); Hatsuo Nagaishi, Zushi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/819,597

(22) Filed: Jun. 28, 2007

(65) Prior Publication Data

US 2007/0255487 A1 Nov. 1, 2007

Related U.S. Application Data

(62) Division of application No. 11/137,787, filed on May 26, 2005, now Pat. No. 7,255,089.

(30) Foreign Application Priority Data

Jun. 4, 2004 (JP) ............... 2004-166986
Jun. 4, 2004 (JP) ............... 2004-167022

(51) Int. Cl.
   *F02P 5/00* (2006.01)
   *F02P 5/04* (2006.01)
(52) U.S. Cl. .............. 123/406.29; 123/406.34
(58) Field of Classification Search ............ 123/406.29, 123/406.34, 406.35, 406.41, 406.37; 73/35.01, 73/35.03, 35.04
   See application file for complete search history.

(56) References Cited

U.S. PATENT DOCUMENTS

| 4,976,241 A | * | 12/1990 | Ishida et al. ........... 123/406.37 |
| 5,845,620 A | | 12/1998 | Miyashita et al. |
| 5,979,406 A | * | 11/1999 | Aoki et al. ............. 123/406.37 |
| 6,328,007 B1 | | 12/2001 | Hirasawa et al. |
| 6,408,819 B1 | | 6/2002 | Mezger et al. |
| 6,851,411 B2 | * | 2/2005 | Nagaishi et al. ........ 123/406.34 |
| 2004/0159309 A1 | | 8/2004 | Nagaishi et al. |
| 2005/0056240 A1 | | 3/2005 | Sugiyama et al. |
| 2005/0188954 A1 | | 9/2005 | Yoshino et al. |
| 2005/0197762 A1 | | 9/2005 | Yoshino et al. |

FOREIGN PATENT DOCUMENTS

| JP | 63-176665 A | 7/1988 |
| JP | 5-280454 | 10/1993 |
| JP | 2001-050091 | 2/2001 |
| JP | 2003-148236 | 5/2003 |
| KR | 2001-0013465 A | 2/2001 |

* cited by examiner

*Primary Examiner*—Mahmoud Gimie
(74) *Attorney, Agent, or Firm*—Foley & Lardner LLP

(57) ABSTRACT

A determination is made as to whether or not knocking is actually occurring inside a combustion chamber (5), and on the basis of the knocking detection result, a knocking-correlated parameter (octane number, alcohol concentration, compression ratio of the engine), which is a parameter having a correlation with knocking, is estimated. A knocking occurrence timing in the combustion chamber (5) is then predicted on the basis of the estimated knocking-correlated parameter. A knocking limit ignition timing, which is the ignition timing furthest toward the advanced side at which knocking does not occur, is calculated on the basis of the predicted knocking occurrence timing, and an ignition device (11) is controlled to perform spark ignition at the knocking limit ignition timing.

15 Claims, 73 Drawing Sheets

Eq. (67) :BR=0
Eq. (68) :BR=SS1 × (θ +MBTCAL-IGNDEAD)
Eq. (69) :BR=0.02+SS2 × (θ +MBTCAL-IGNDEAD-BURN1)

ENGINE CONTROL DEVICE AND CONTROL METHOD

TECHNICAL FIELD OF THE INVENTION

The present application is a divisional of U.S. application Ser. No. 11/137,787, filed May 26, 2005, the entire contents of which are incorporated herein by reference.

This invention relates to control of an internal combustion engine, and more particularly to a technique for avoiding knocking.

BACKGROUND OF THE INVENTION

JP5-280454A, published by the Japan Patent Office in 1993, focuses on the fact that two types of fuel, namely high octane fuel (octane number 98) and low octane fuel (octane number 91), are commercially available. When a fuel cap is opened, an operation is performed initially at a base ignition timing for high octane fuel, and a determination is made as to whether or not knocking occurs. If knocking occurs in a predetermined setting region, the predetermined setting region being a region where knocking occurs when high octane fuel is used, it is determined that high octane fuel is being used. If knocking occurs in a region other than the predetermined setting region, it is determined that low octane fuel is being used. When it is determined that high octane fuel is being used, the operation is continued as is, and when it is determined that low octane fuel is being used, the operation is continued after switching to a base ignition timing for low octane fuel.

SUMMARY OF THE INVENTION

Fuel having various octane numbers is used in overseas markets, and in some markets, it is impossible to know the octane number in advance. If the base ignition timing for low octane fuel is set during application of the prior art described above in relation to the fuel that is sold in such markets, knocking occurs when the octane number of the local fuel is lower than the octane number of the fuel used to match the base ignition timing for low octane fuel.

In the prior art, knocking control is performed by a knocking sensor in such a case. When knocking is detected by the knocking sensor, an operation is performed to retard the base ignition timing in a single large step by a first predetermined value, and then gradually advance the base ignition timing in variations of a second predetermined value. When knocking is detected again by the knocking sensor as a result of advancement of the ignition timing in this operation, the operation is repeated.

Hence according to the prior art, when knocking occurs due to the octane number of local fuel being smaller than the octane number of the fuel used to match the base ignition timing for low octane fuel, an operation to prevent the knocking by retarding and then advancing the ignition timing is performed repeatedly, and although the knocking can be avoided by this operation, retardation of the ignition timing in order to avoid the knocking causes the fuel economy and output to deteriorate. To prevent the fuel economy and output from deteriorating, a base ignition timing calculation map must be prepared for each of a plurality of different octane numbers from a maximum octane number to a minimum octane number. However, this method leads to an increase in the capacity of a ROM required to store the base ignition timing calculation maps for each octane number.

The octane number is a parameter having a correlation with knocking when gasoline is used as a fuel, and in the case of a composite fuel of gasoline and alcohol, the alcohol concentration of the composite fuel is the knocking-correlated parameter. There are also some overseas markets in which it is impossible to know the alcohol concentration of such a composite fuel in advance, and hence, if a base ignition timing for composite fuel with a high alcohol concentration is set when the prior art described above is applied as is to the composite fuel that is sold in such markets, knocking occurs in cases where the alcohol concentration of the local composite fuel is higher than the alcohol concentration of the composite fuel used to match the base ignition timing for composite fuel with a high alcohol concentration. If the operation to retard and then advance the ignition timing is executed to prevent the knocking detected by the knocking sensor, the fuel economy and output deteriorate, and if base ignition timing calculation maps are prepared for each of a plurality of different alcohol concentrations from a minimum alcohol concentration to a maximum alcohol concentration in order to avoid the knocking, the capacity of the ROM required to store the base ignition timing calculation maps for each alcohol concentration increases.

Meanwhile, the compression ratio is also a knocking-correlated parameter. When fuel with a predetermined octane number is used, the compression ratio is determined according to the engine specifications, and therefore the base ignition timing is matched so that knocking does not occur at the compression ratio determined according to the engine specifications. However, knocking occurs when, for various reasons, the actual compression ratio increases beyond the compression ratio of the engine specifications. If an attempt is made at this time to prevent the knocking by performing an operation to retard and then advance the ignition timing repeatedly on the basis of the knocking sensor, the fuel economy and output deteriorate as expected.

It is therefore an object of this invention to prevent knocking without performing an operation to retard and then advance the ignition timing repeatedly in order to prevent the knocking.

In order to achieve above object, the present invention provides a control device for an engine having an ignition device, comprising: a sensor which detects a knocking in a combustion chamber of the engine; and a controller. The controller estimates a knocking-correlated parameter, which is a parameter having a correlation with the knocking, on the basis of a knocking detection result; predicts a knocking occurrence timing of the combustion chamber on the basis of the estimated knocking-correlated parameter; calculates a knocking limit ignition timing, which is an ignition timing furthest toward an advanced side at which the knocking does not occur on the basis of the predicted knocking occurrence timing; and controls the ignition device to perform a spark ignition at the calculated knocking limit ignition timing.

According to an aspect of the present invention, the present invention provides a control device for an engine having an ignition device, comprising: a sensor which detects a knocking in a combustion chamber of the engine; and a controller. The controller estimates a compression ratio of the engine on the basis of a knocking detection result; calculates a volume of the combustion chamber at a combustion start timing on the basis of the estimated compression ratio; calculates a combustion period from a combustion start to a predetermined crank angle on the basis of the volume at the combustion start timing; calculates a basic ignition timing for obtaining MBT (minimum advance for best torque) on the basis of the calculated combustion period; and controls the ignition device to perform a spark ignition at the calculated basic ignition timing.

The details as well as other features and advantages of this invention are set forth in the remainder of the specification and are shown in the accompanying drawings.

DESCRIPTION OF THE PREFERRED EMBODIMENTS

Figure 1:
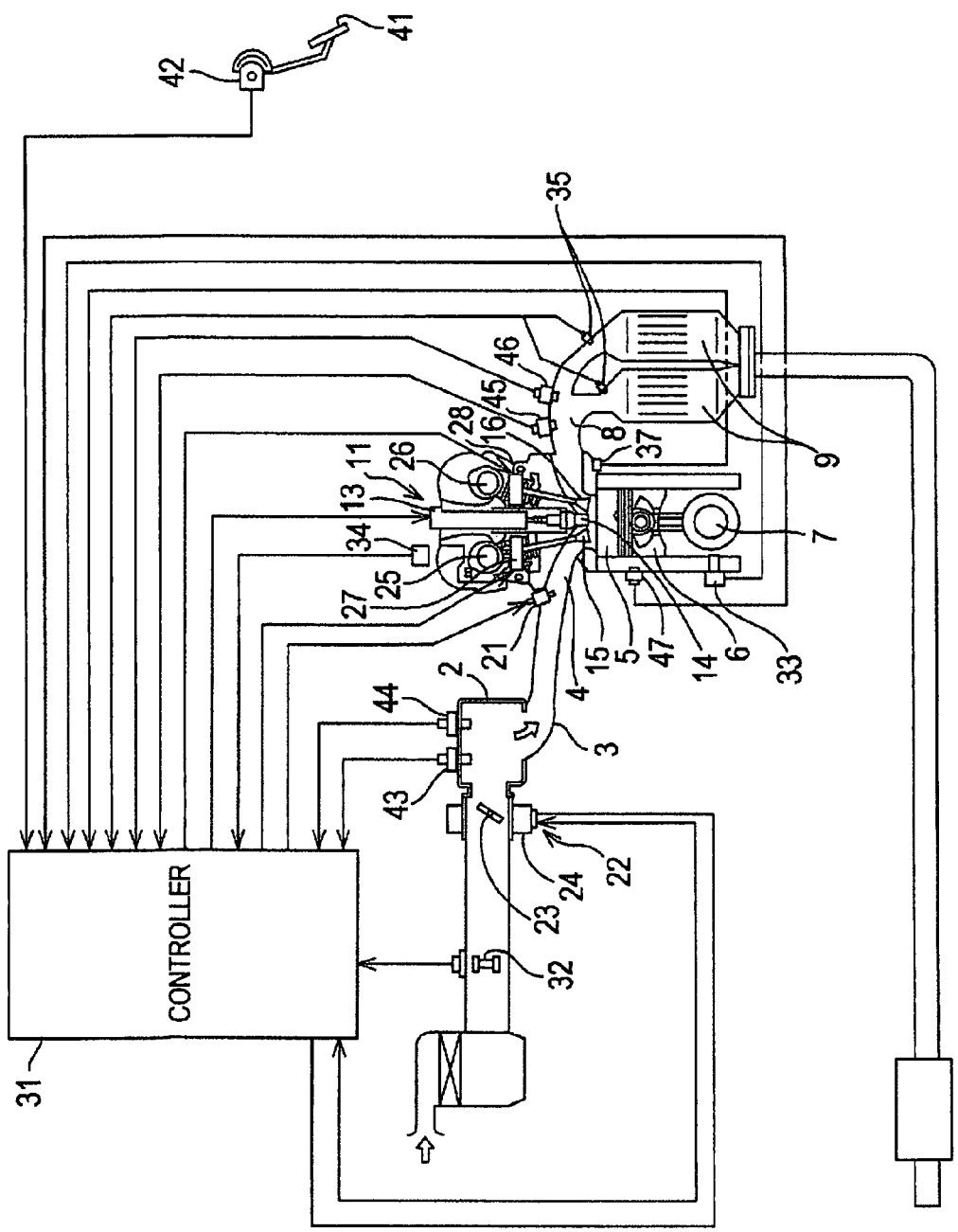
FIG. 1 is a system diagram illustrating control of an engine according to this invention.

FIG. 1 shows a control system of an engine according to this invention. Air is stored in an intake air collector 2, and then introduced into a combustion chamber 5 of each cylinder through an intake manifold 3. Fuel (gasoline) is ejected from a fuel injector 21 disposed in an intake port 4 of each cylinder. The fuel injected into the air mixes with the air while gradually evaporating, thereby creating an air-fuel mixture which flows into the combustion chamber 5. The air-fuel mixture is sealed inside the combustion chamber 5 when an intake valve 15 closes, and compressed when a piston 6 rises.

An ignition device 11 employing an electronic distribution system, in which an ignition coil with a built-in power transistor is disposed in each cylinder, is provided to ignite the compressed air-fuel mixture by means of a high-pressure spark. The ignition device 11 is constituted by an ignition coil 13 which stores electric energy from a battery, a power transistor which energizes and blocks a primary side of the ignition coil 13, and a spark plug 14 provided on the ceiling of the combustion chamber 5, which performs spark discharge upon reception of a high voltage generated on a secondary side of the ignition coil 13 when a primary current of the ignition coil 13 is blocked.

When a spark is produced by the spark plug 14 slightly before compression top dead center, thereby igniting the compressed air-fuel mixture, the resulting flame spreads and before long burns explosively. The gas pressure generated by this combustion acts to push the piston 6 downward. This action is extracted as the rotary force of a crankshaft 7. The gas (exhaust gas) following combustion is discharged to an exhaust passage 8 when an exhaust valve 16 is opened.

A three-way catalyst 9 is provided in the exhaust passage 8. When the air-fuel ratio of the exhaust gas is within a narrow range centering on the stoichiometric air-fuel ratio, the three-way catalyst 9 is capable of removing the three harmful components contained in the exhaust gas, i.e. HC, CO, and NOx, simultaneously and efficiently. The air-fuel ratio is the ratio between the intake air amount and the fuel amount, and therefore, to ensure that the ratio between the amount of intake air introduced into the combustion chamber 5 and the fuel injection amount from the fuel injector 21 per engine cycle (a crank angle of 720 degrees in a four-cycle engine) reaches the stoichiometric air-fuel ratio, an engine controller 31 determines the fuel injection amount to be injected from the fuel injector 21 on the basis of an intake air flow rate signal from an air flow meter 32 and a signal from a crank angle sensor 33, 34, and feedback-controls the air-fuel ratio on the basis of a signal from an $O_2$ sensor 35 provided upstream of the three-way catalyst 9.

A so-called electronic control throttle 22, in which a throttle valve 23 is driven by a throttle motor 24, is provided upstream of the intake air collector 2. The torque desired by the driver is expressed as the depression amount of an accelerator pedal 41, and hence the engine controller 31 determines a target torque on the basis of a signal from an accelerator sensor 42, determines a target air amount for realizing the target torque, and controls the opening of the throttle valve 23 via the throttle motor 24 to obtain the target air amount.

A cam sprocket and a crank sprocket are attached respectively to the respective front portions of an intake valve camshaft 25, an exhaust valve camshaft 26, and the crankshaft 7. By wrapping a timing chain (not shown) around these sprockets, the camshafts 25, 26 are driven by the crankshaft 7 of the engine. A variable intake valve timing control mechanism (intake VTC mechanism hereafter) 27 which is capable of controlling the phase of the intake valve cam continuously at a fixed operating angle, and a variable exhaust valve timing control mechanism (exhaust VTC mechanism hereafter) 28 which is capable of controlling the phase of the exhaust valve cam continuously at a fixed operating angle, are interposed between the cam sprocket and the intake valve camshaft 25, and between the cam sprocket and the exhaust valve camshaft 26, respectively. When the open/close timing of the intake valve 15 and the open/close timing of the exhaust valve 16 are changed, the amount of inert gas remaining in the combustion chamber 5 varies. As the amount of inert gas inside the combustion chamber 5 increases, pumping loss decreases and the fuel economy improves. The amount of inert gas to be left inside the combustion chamber 5 is determined in advance according to the operating conditions as a target intake valve closing timing and a target exhaust valve closing timing. The engine controller 31 determines the target intake valve closing timing and target exhaust valve closing timing in accordance with the current operating conditions (engine load and rotation speed), and controls the intake valve closing timing and exhaust valve closing timing via the respective actuators of the intake VTC mechanism 27 and exhaust VTC mechanism 28 to obtain the determined target values.

An intake air temperature signal from an intake air temperature sensor 43, an intake air pressure signal from an intake air pressure sensor 44, an exhaust gas temperature signal from an exhaust gas temperature sensor 45, and an exhaust gas pressure signal from an exhaust gas pressure sensor 46 are input into the engine controller 31 together with a cooling water temperature signal from a water temperature sensor 37. On the basis of these signals, the engine controller 31 controls the ignition timing, which is the timing at which the primary side current of the spark plug 14 is blocked, via the power transistor 13.

When knocking has not occurred, the ignition timing is set to a basic ignition timing MBTCAL corresponding to the operating conditions. In regions such as a high load, low rotation speed region of the engine, knocking may occur inside the combustion chamber 5, and when knocking occurs, the durability of the engine decreases. Hence the engine controller 31 performs knocking control.

During typical knocking control, when knocking is detected by a knocking sensor, an operation is performed to retard the base ignition timing in a single large step by a first predetermined value, and then advance the base ignition timing gradually in variations of a second predetermined value, and when knocking is detected again by the knocking sensor due to advancement of the ignition timing in this operation, the operation is repeated. In this embodiment, on the other hand, a knocking detection result generated by a knocking sensor 47 is fed back to an estimated value OCTEST of the octane number (knocking-correlated parameter) of the fuel rather than the ignition timing, and hence knocking is prevented by a different method to that employed by a conventional device, in which it is not necessary to perform an operation to retard and then advance the ignition timing repeatedly in order to prevent the knocking. More specifically, the estimated octane number value OCTEST is calculated on the basis of the knocking detection result generated by the knocking sensor 47, an auto-ignition timing $\theta knk$ (knocking occurrence timing) in the combustion chamber 5 is predicted on the basis of the estimated octane number value OCTEST, and a knocking limit ignition timing KNOCKcal, which is the ignition timing furthest toward the advanced side at which knocking does not occur, is calculated on the basis of the auto-ignition timing $\theta knk$. When knocking occurs, the knocking limit ignition timing KNOCKcal has a value further toward the retarded side than the aforementioned basic ignition timing MBTCAL, and therefore spark ignition is performed using the knocking limit ignition timing KNOCKcal as the ignition timing.

Figure 2:
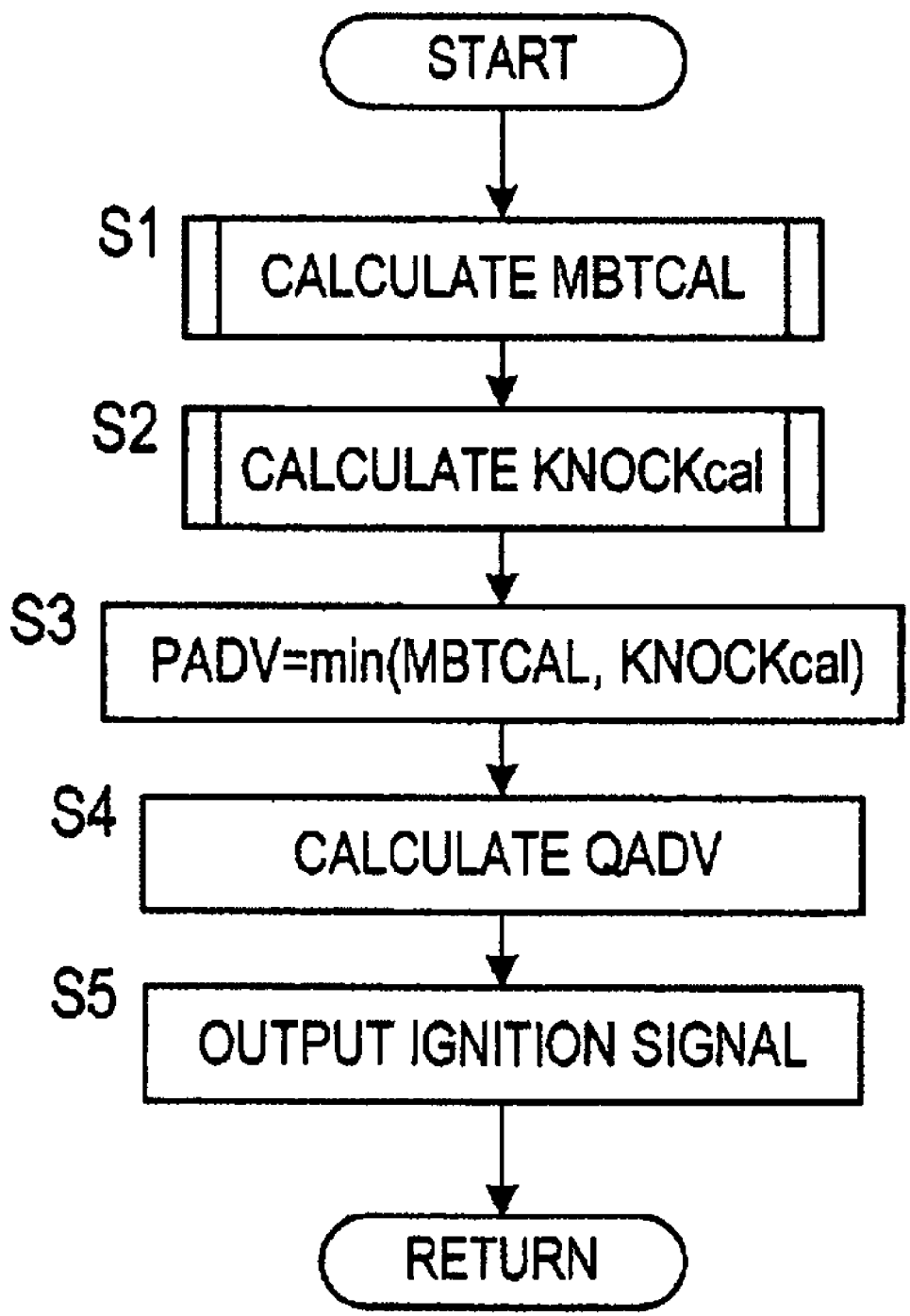
FIG. 2 is a flowchart of ignition timing control.

FIG. 2 is a flowchart showing the overall flow of ignition timing control. This flowchart shows the flow of an operation, and is not executed at fixed time intervals.

In steps S1 and S2, the basic ignition timing MBTCAL [deg BTDC] and knocking limit ignition timing KNOCKcal [deg BTDC] are calculated, respectively.

Here, calculation of the basic ignition timing MBTCAL will be described. First, an outline of ignition timing control based on combustion analysis will be provided (the basic concept is described in JP2003-148236A).

Figure 3:
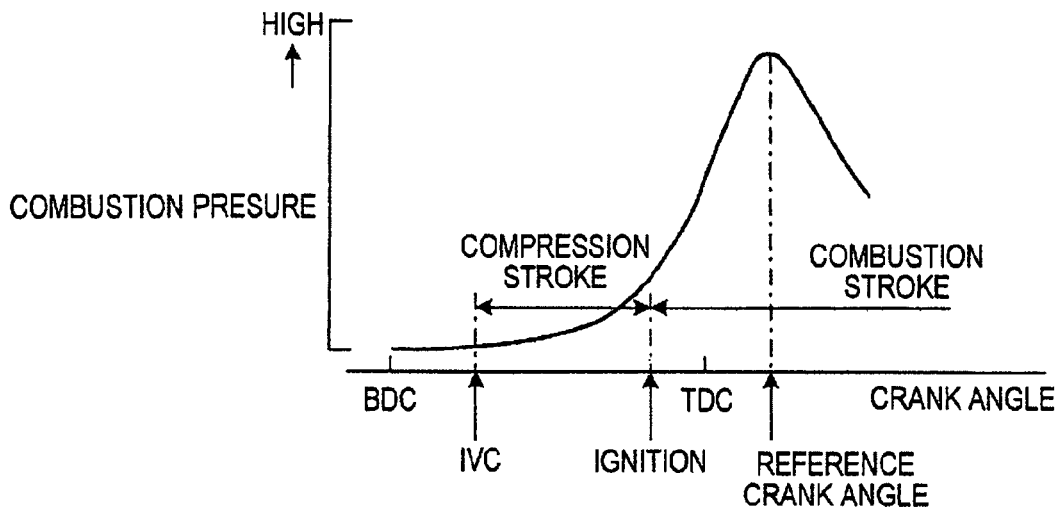
FIG. 3 is a view showing pressure change in a combustion chamber.

As shown in FIG. 3, a crank angle at which the combustion pressure of an air-fuel mixture reaches a maximum value Pmax when the air-fuel mixture is ignited at MBT (minimum advance for best torque) is set as a reference crank angle $\theta PMAX$ [deg ATDC]. The reference crank angle $\theta PMAX$ is substantially constant regardless of the combustion method, and is typically within a range of twelve to fifteen degrees after compression top dead center, or a maximum range of ten to twenty degrees after compression top dead center.

Figure 4:
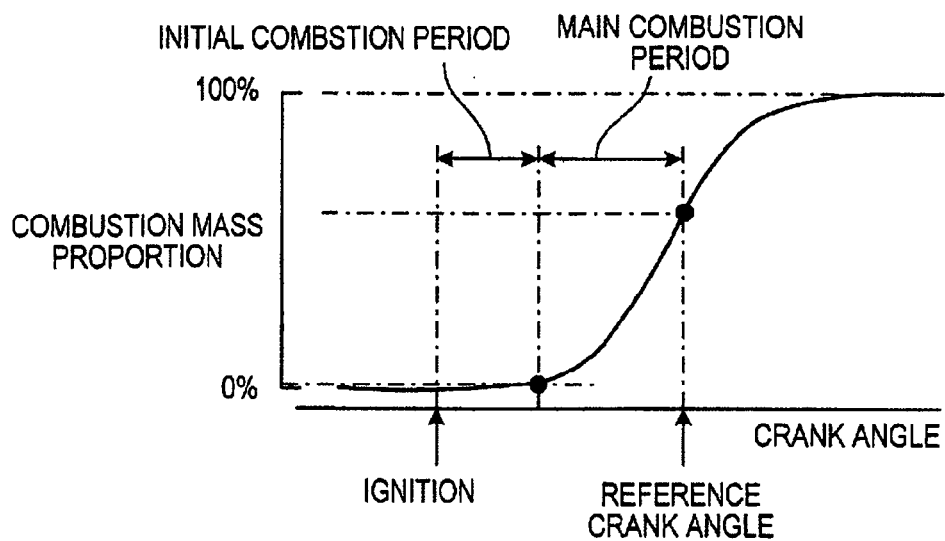
FIG. 4 is a characteristic diagram showing variation in a combustion mass proportion.

FIG. 4 shows variation in a combustion mass proportion BR (combustion gas mass proportion) obtained through analysis of the combustion inside the combustion chamber of a spark ignition engine. The combustion mass proportion BR, which denotes the ratio of the combustion mass to the fuel supplied to the combustion chamber, is zero percent at the time of ignition, and reaches one hundred percent upon complete combustion. It has been confirmed through experiment that the combustion mass proportion at the reference crank angle $\theta PMAX$ is fixed at approximately sixty percent.

The combustion period corresponding to variation in the combustion mass proportion BR from zero percent to approximately sixty percent, corresponding to the reference crank angle $\theta PMAX$, is divided into an initial combustion period immediately after the start of combustion, during which there is substantially no change in either the combustion mass proportion or the combustion pressure, and a main combustion period in which the combustion mass proportion and combustion pressure increase dramatically. The initial combustion period lasts from the beginning of combustion to the formation of a flame kernel. The flame kernel is formed when the combustion mass proportion changes from zero percent to between two and ten percent. During the initial combustion period, the increase speed of the combustion pressure and combustion temperature is low, and the initial combustion period is long in relation to change in the combustion mass proportion. The length of the initial combustion period is affected easily by variation in the temperature and pressure of the combustion chamber.

On the other hand, during the main combustion period a flame propagates outward from the flame kernel, and the speed of the flame (i.e. the combustion speed) increases rapidly. Accordingly, change in the combustion mass proportion during the main combustion period is greater than change in the combustion mass proportion during the initial combustion period.

In the engine controller 31, an initial combustion period BURN1 [deg] is set as a period lasting until the combustion mass proportion reaches (changes to) two percent, and a main combustion period BURN2 [deg] is set as a period lasting from the end of the initial combustion period BURN1 to the reference crank angle $\theta PMAX$ (in terms of the combustion mass proportion, from two percent to approximately sixty percent). A crank angle position obtained by calculating a combustion period BURN [deg], which is the sum total of the initial combustion period BURN1 and the main combustion period BURN2, subtracting the reference crank angle $\theta PMAX$ [deg ATDC] from the combustion period BURN, and then adding a crank angle IGNDEAD [deg] corresponding to an ignition dead time, to be described below, is set as the basic ignition timing MBTCAL [deg BTDC], which is the ignition timing at which MBT is obtained.

Figure 10:
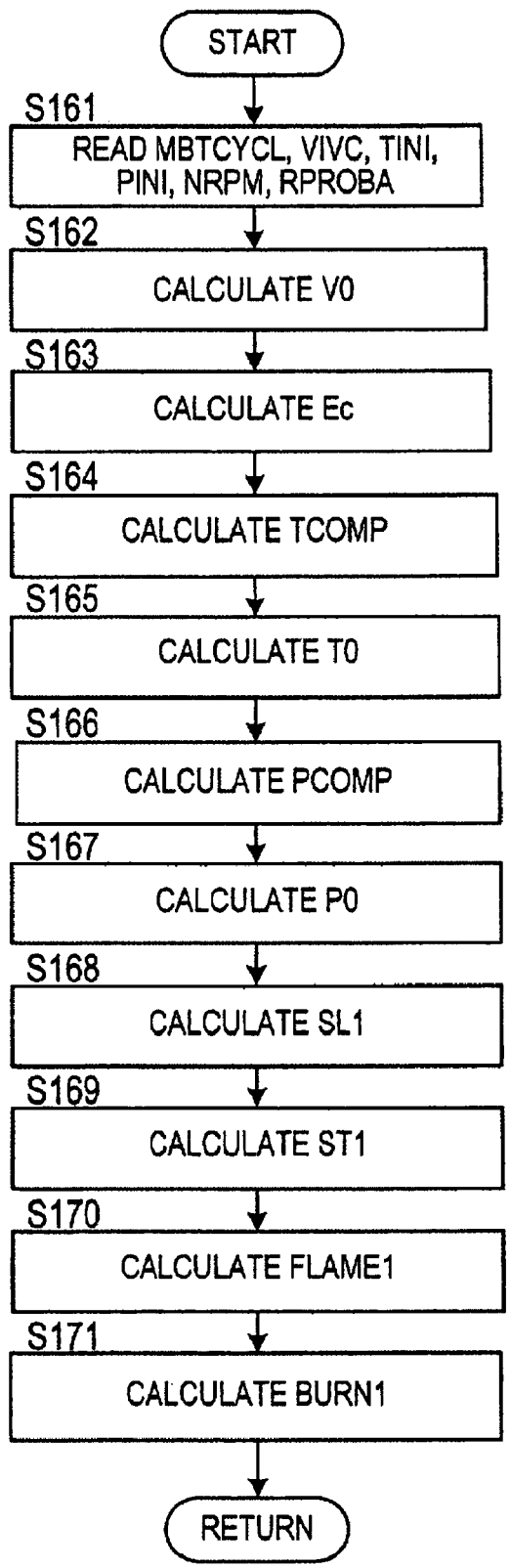
FIG. 10 is a flowchart for calculating an initial combustion period.
Figure 13:
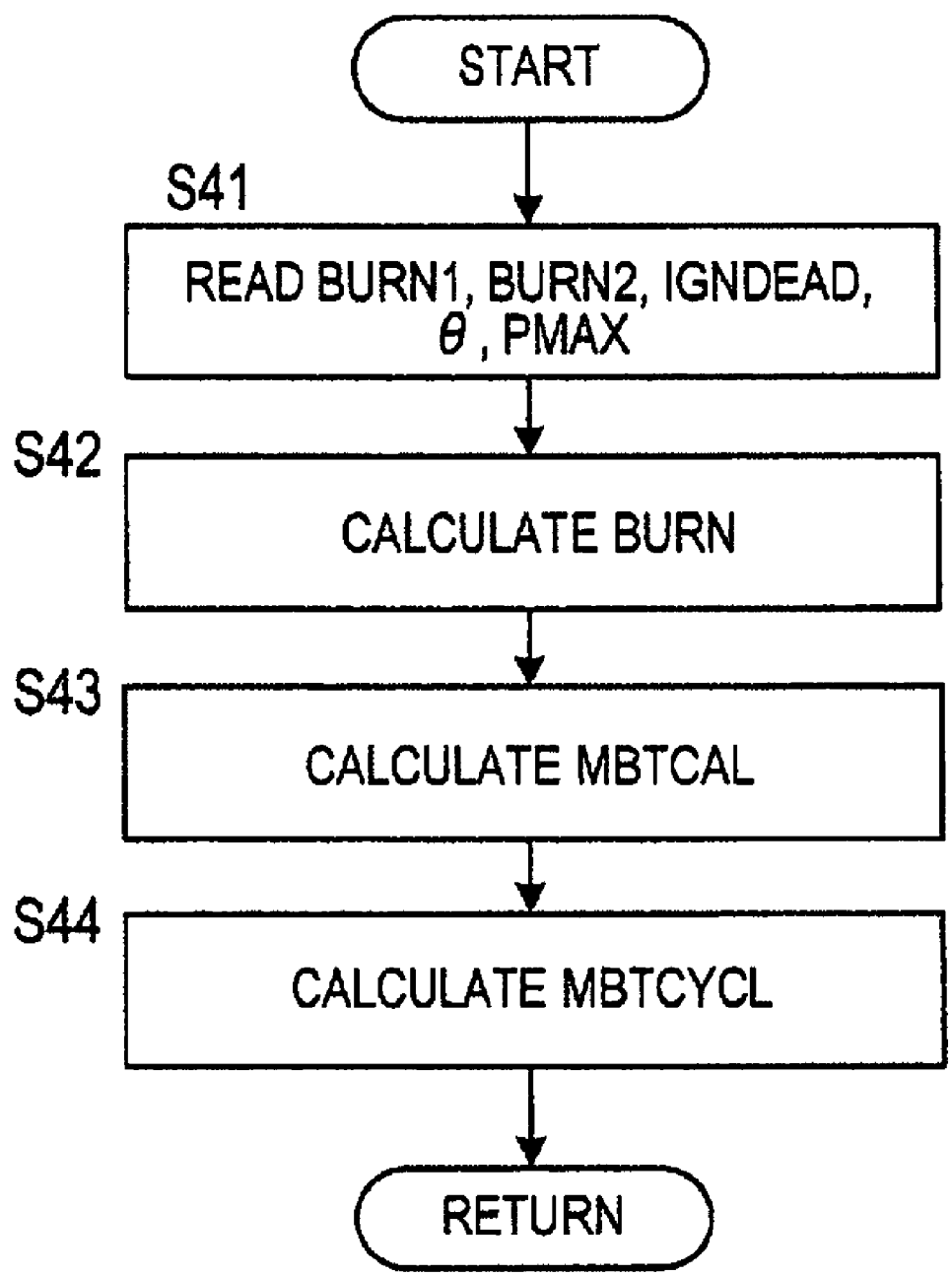
FIG. 13 is a flowchart for calculating a basic ignition timing.

The pressure and temperature inside the combustion chamber 5 during the initial combustion period in which the flame kernel is formed are substantially equal to the pressure and temperature at the time of ignition, but when the ignition timing is calculated subsequently, it is impossible to set an accurate ignition timing initially. Hence, as shown in FIG. 13, a previous basic ignition timing value is calculated as a previous combustion start timing MBTCYCL [deg BTDC] (step S44), and this value is used to calculate the initial combustion period as shown in FIG. 10 (step S162). By calculating the initial combustion period repeatedly, a highly precise result is produced with no time delay.

Next, calculation of the basic ignition timing MBTCAL, which is executed by the engine controller 31, will be described in detail with reference to the following flowchart.

Figure 5:
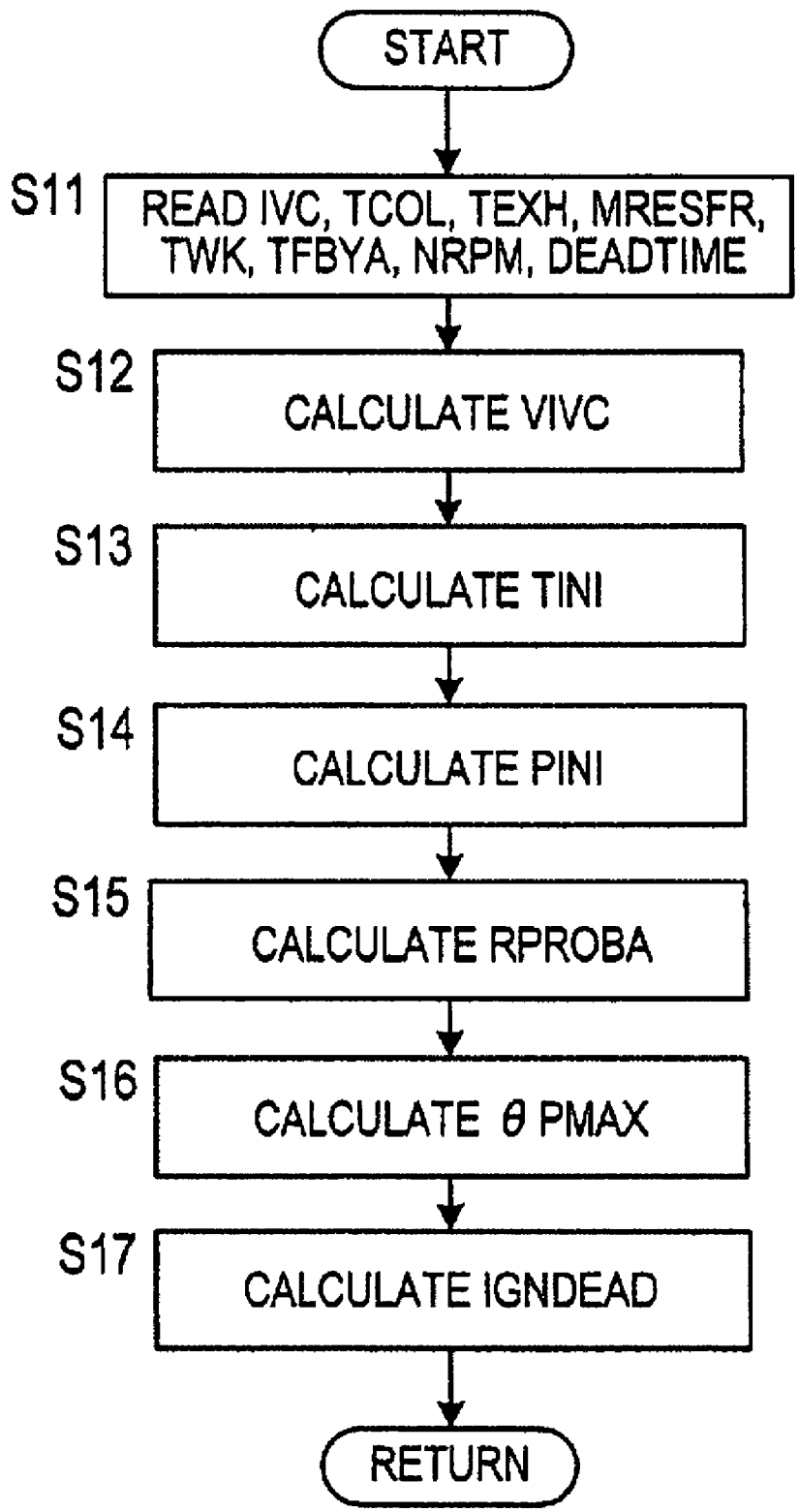
FIG. 5 is a flowchart for calculating physical quantities.

FIG. 5 shows a flow for calculating various physical quantities required to calculate the ignition timing, which is executed at fixed time intervals (every ten milliseconds, for example).

First, in a step S11, an intake valve closing timing IVC [deg BTDC], a temperature TCOL [K] inside the collector, detected by the temperature sensor 43, a pressure PCOL [Pa] inside the collector, detected by the pressure sensor 44, an exhaust gas temperature TEXH [K] detected by the temperature sensor 45, an internal inert gas ratio MRESFR [%], a cooling water temperature TWK [K] detected by the temperature sensor 37, a target equivalence ratio TFBYA, an engine rotation speed NRPM [rpm] detected by the crank angle sensor, and an ignition dead time DEADTIME [μsec] are read.

The crank angle sensor is constituted by a position sensor 33 which detects the position of the crankshaft 7, and a phase sensor 34 which detects the position of the intake camshaft 25. The engine rotation speed NRPM [rpm] is calculated on the basis of signals from these two sensors 33, 34.

The intake valve closing timing IVC is learned in advance from a command value applied to the intake VTC mechanism 27. Alternatively, the actual intake valve closing timing may be detected by the phase sensor 34.

The internal inert gas ratio MRESFR is a value obtained by dividing the amount of inert gas remaining in the combustion chamber by the total gas amount in the combustion chamber. Calculation of the internal inert gas ratio MRESFR will be described below. The ignition dead time DEADTIME is a fixed value.

The target equivalence ratio TFBYA is calculated during a fuel injection amount calculation flow not shown in the drawings. The target equivalence ratio TFBYA is an absolute number expressed by the following equation, assuming that the stoichiometric air-fuel ratio is 14.7.

$$TFBYA = 14.7/\text{target air-fuel ratio} \quad (1)$$

From the equation (1), when the target air-fuel ratio is the stoichiometric air-fuel ratio, for example, TFBYA=1.0, and when the target air-fuel ratio is a value on the lean side, for example 22.0, TFBYA is a positive value of less than 1.0.

In a step S12, a volume VIVC [m³] of the combustion chamber 5 at the intake valve closing timing IVC (that is, the volume at the compression start timing) is calculated. The volume VIVC of the combustion chamber 5 at the intake valve closing timing is determined by the stroke position of the piston 6. The stroke position of the piston 6 is determined by the crank angle position of the engine.

Figure 6:
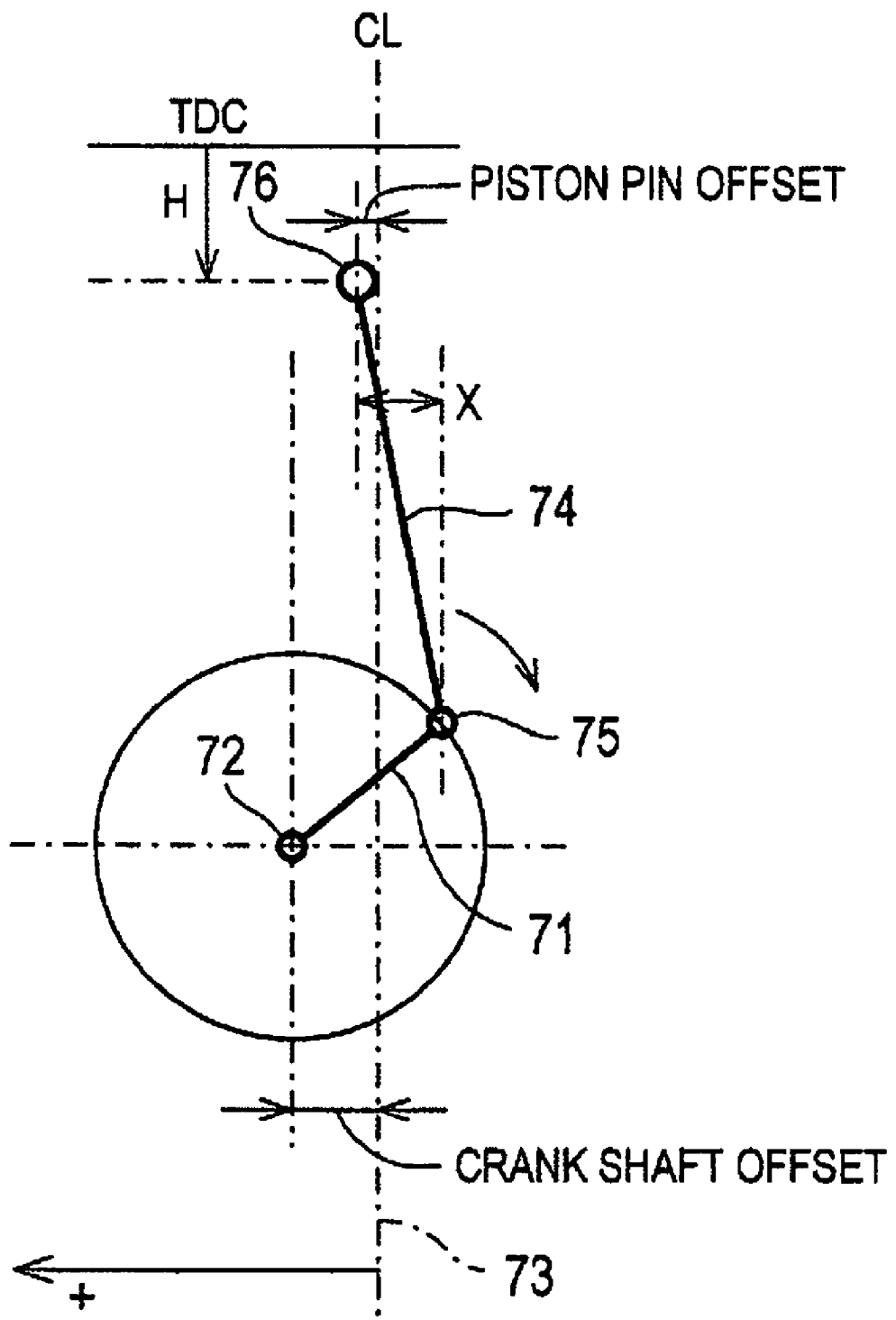
FIG. 6 is a view showing a positional relationship between a crankshaft and a connecting rod of the engine.

Referring to FIG. 6, a case in which a rotational center 72 of the engine crankshaft 71 is offset from a central axis 73 of the cylinder will be considered. A connecting rod 74, a node 75 connecting the connecting rod 74 and the crankshaft 71, and a piston pin 76 connecting the connecting rod 74 and the piston relate to each other as shown in the diagram. At this time, the volume VIVC of the combustion chamber 5 at the intake valve closing timing can be expressed by the following equations (2) through (6).

$$VIVC = f1(\theta ivc) = Vc + (\pi/4)D^2 \cdot Hivc \quad (2)$$

$$Vc = (\pi/4)D^2 Hx/(\epsilon - 1) \quad (3)$$

$$Hivc = \{(CND + ST^2/2) - (CRoff - PISoff)^2\}^{1/2} - \{(ST/2) \cdot \cos(\theta ivc + \theta off)\} + (CND^2 - X^2)^{1/2} \quad (4)$$

$$X = (ST/2) \cdot \sin(\theta ivc + \theta off) - CRoff + PISoff \quad (5)$$

$$\theta off = \arcsin\{(CRoff - PISoff)/(CND \cdot (ST/2))\} \quad (6)$$

where Vc: gap volume [m³],
ε: compression ratio,
D: diameter of cylinder bore [m],
ST: entire stroke of piston [m],
Hivc: distance of piston pin 76 from TDC at intake valve closing timing [m],
Hx: difference between maximum value and minimum value of distance of piston pin 76 from TDC [m],
CND: length of connecting rod 74 [m],
CRoff: offset distance of node 75 from cylinder central axis 73 [m],
PISoff: offset distance of crankshaft rotational center 72 from cylinder central axis 73 [m],
θivc: crank angle at intake valve closing timing [deg ATDC],
θoff: angle between line joining piston pin 76 and crankshaft rotational center 72 and vertical line at TDC [deg], and
X: horizontal distance between node 75 and piston pin 76 [m].

As described above, the crank angle θivc at the intake valve closing timing is determined by a command signal from the engine controller 31 to the intake VTC mechanism 27, and is therefore already known. If the crank angle θivc (=IVC) at this time is substituted into the equations (2) through (6), the volume VIVC of the combustion chamber 5 at the intake valve closing timing can be calculated. Hence for practical purposes, a value set in a table having the intake valve closing timing IVC as a parameter is used as the volume VIVC of the combustion chamber 5 at the intake valve closing timing. When the intake VTC mechanism 27 is not provided, the intake valve closing timing IVC may be provided as a constant.

In a step S13, a temperature TINI [K] of the combustion chamber 5 at the intake valve closing timing IVC (that is, the temperature at the compression start timing) is calculated. The temperature of the gas in the combustion chamber 5 corresponds to the temperature of a gas produced by a mixture of the fresh air flowing into the combustion chamber 5 and the inert gas remaining in the combustion chamber 5. The temperature of the fresh air introduced into the combustion chamber 5 is equal to the fresh air temperature TCOL inside the intake air collector 2. The temperature of the inert gas remaining inside the combustion chamber 5 may be approximated from the exhaust gas temperature TEXH in the vicinity of an exhaust port portion. Hence, the temperature TINI of the combustion chamber 5 at the intake valve closing timing IVC may be determined from the fresh air temperature TCOL inside the intake air collector 2, the exhaust gas temperature TEXH, and the internal inert gas ratio MRESFR, which is the proportion of inert gas remaining inside the combustion chamber 5, at the intake valve closing timing IVC, according to the following equation.

$$TINI = TEXH \times MRESFR + TCOL \times (1 - MRESFR) \quad (7)$$

In a step S14, a pressure PINI [Pa] of the combustion chamber 5 at the intake valve closing timing IVC (i.e. the compression start timing pressure) is calculated. In other words, the pressure PCOL in the collector at the intake valve closing timing IVC is extracted as the pressure PINI at the intake valve closing timing IVC.

In a step S15, a reaction probability RPROBA [%] which expresses the combustibility of the air-fuel mixture inside the combustion chamber 5 is calculated. The reaction probability RPROBA is a non-dimensional value dependent on three parameters, namely the residual inert gas ratio MRESFR, the cooling water temperature TWK [K], and the target equivalence ratio TFBYA, and hence can be expressed by the following equation.

$$RPROBA=f3(MRESFR, TWK, TFBYA) \quad (8)$$

To explain more specifically, a maximum value of the reaction probability obtained by combining the three parameters MRESFR, TWK, and TFBYA is set at 100%, the relationship between these parameters and the reaction probability RPROBA is determined experientially, and the determined reaction probability RPROBA is stored in advance in the memory of the engine controller 31 as tables corresponding to these parameters. In the step S15, the reaction probability RPROBA is determined by searching the table in accordance with the parameter.

Figure 7:
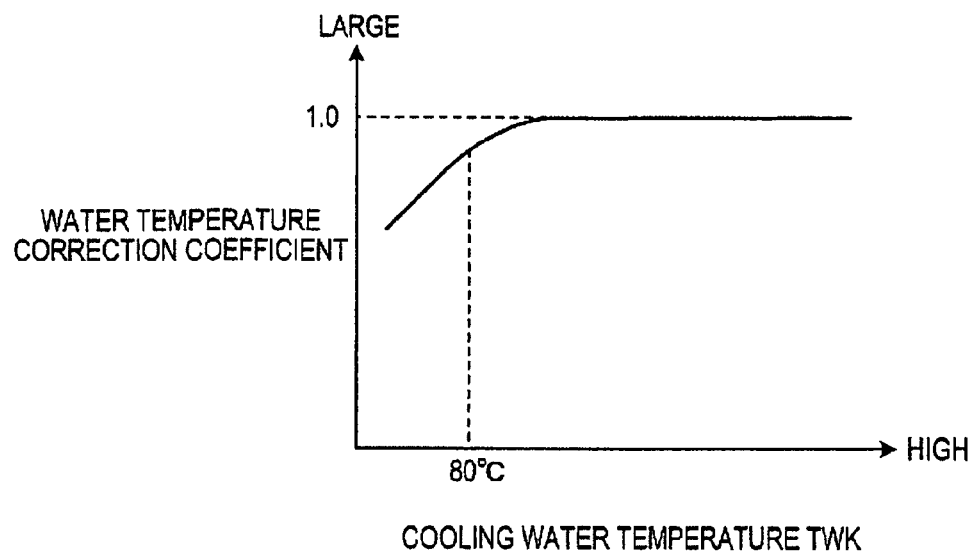
FIG. 7 is a characteristic diagram of a water temperature correction coefficient.
Figure 8:
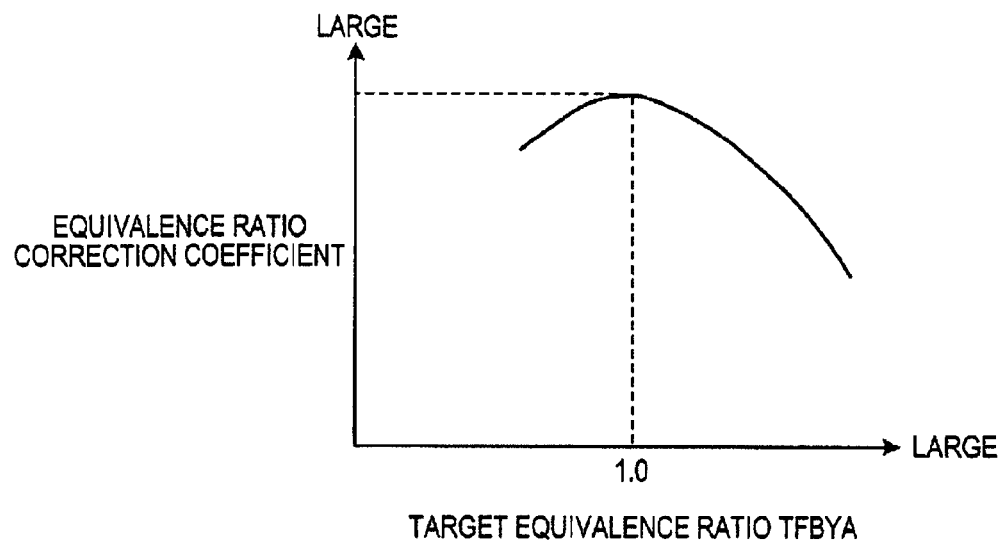
FIG. 8 is a characteristic diagram of an equivalence ratio correction coefficient.

More specifically, a water temperature correction coefficient table corresponding to the cooling water temperature TWK and having a characteristic as shown in FIG. 7, an internal inert gas ratio correction coefficient table (not shown) set in a similar manner, and an equivalence ratio correction coefficient table corresponding to the target equivalence ratio TFBYA and having a characteristic as shown in FIG. 8, are stored in the memory in advance. The maximum value of each correction coefficient is 1.0, and the reaction probability RPROBA is calculated by multiplying a maximum reaction probability value of one hundred percent by the product of the three correction coefficients.

To describe each table, the water temperature correction coefficient shown in FIG. 7 increases as the cooling water temperature TWK rises, and reaches 1.0 when the cooling water temperature TWK is eighty degrees centigrade or greater. The equivalence ratio correction coefficient shown in FIG. 8 reaches the maximum value of 1.0 when the target equivalence ratio TFBYA is 1.0, or in other words at the stoichiometric air-fuel ratio, and decreases when the target equivalence ratio is either greater or less than 1.0. The internal inert gas ratio correction coefficient is not shown in the drawings, but reaches 1.0 when the internal inert gas ratio MRESFR is zero.

In a step S16, the reference crank angle θPMAX [deg ATDC] is calculated. As noted above, the reference crank angle θPMAX rarely fluctuates, but nevertheless has a tendency to advance in accordance with an increase in the engine rotation speed NRPM. The reference crank angle θPMAX may be expressed as a function of the engine rotation speed NRPM according to the following equation.

$$\theta PMAX=f4(NRPM) \quad (9)$$

Figure 9:
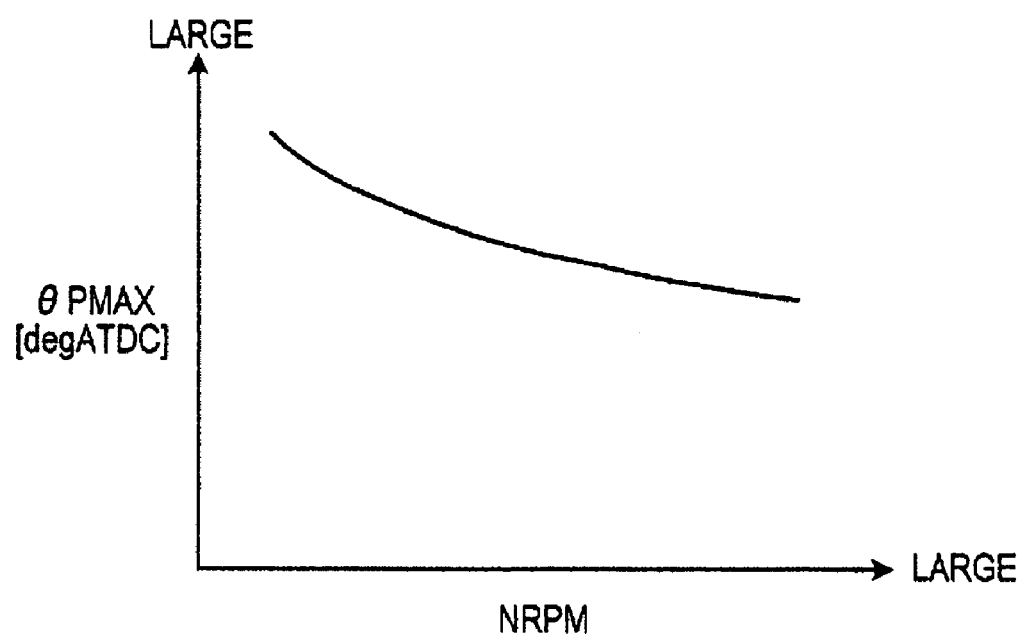
FIG. 9 is a characteristic diagram of a reference crank angle.

Specifically, the reference crank angle θPMAX is determined on the basis of the engine rotation speed NRPM by searching a table having the characteristic shown in FIG. 9, which is stored in the memory of the engine controller 31 in advance. For ease of calculation, the reference crank angle θPMAX may be considered constant.

Finally, in a step S17, the crank angle IGNDEAD [deg] corresponding to the ignition dead time is calculated. The crank angle IGNDEAD corresponding to the ignition dead time corresponds to the crank angle interval from the timing at which a signal is output from the engine controller 31 to block the primary current to the ignition coil 13 to the point at which the spark plug 14 actually ignites, and may be expressed by the following equation.

$$IGNDEAD=f5(DEADTIME, NRPM) \quad (10)$$

Here, the ignition dead time DEADTIME is set at 200 μsec. The equation (10) is for calculating the crank angle IGNDEAD corresponding to the ignition dead time, which is the crank angle that corresponds to the ignition dead time DEADTIME, from the engine rotation speed NRPM.

Figure 12:
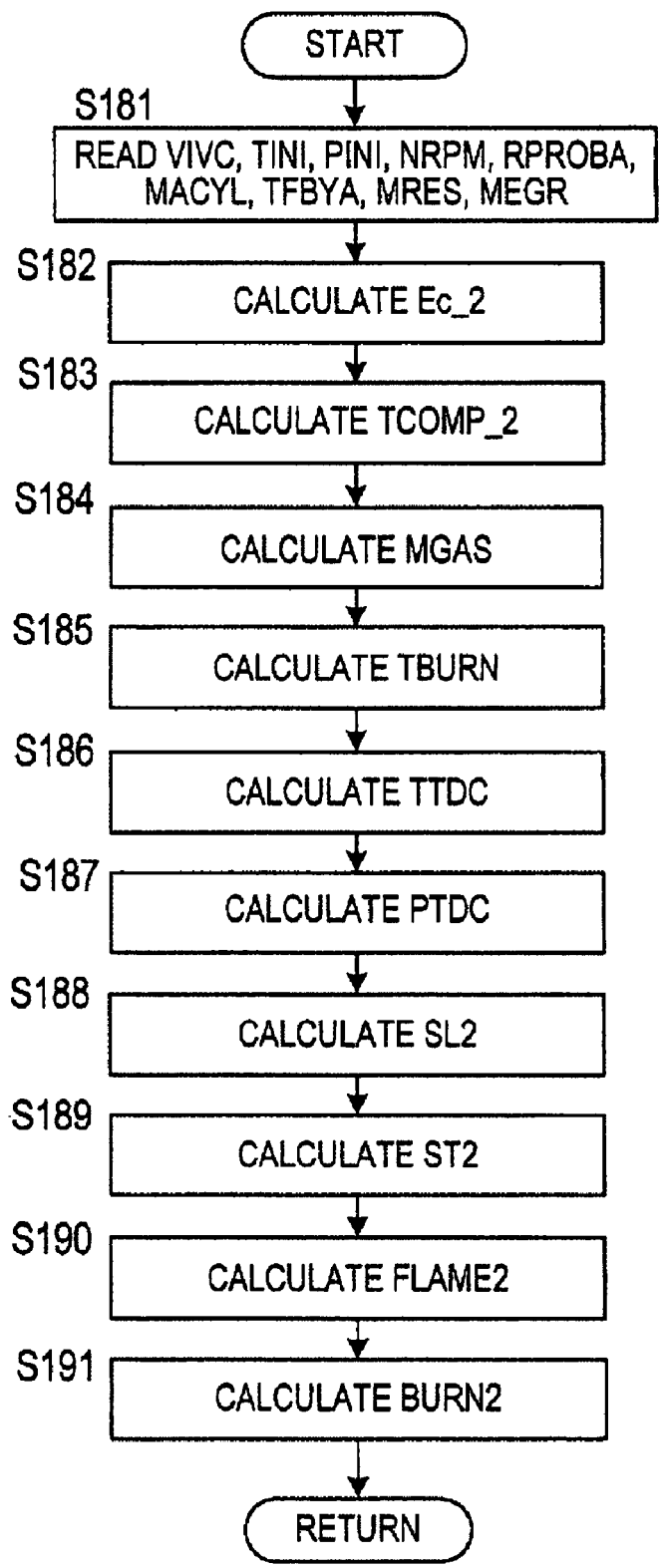
FIG. 12 is a flowchart for calculating a main combustion period.

FIG. 10 shows a flow for calculating the initial combustion period BURN1 [deg], and FIG. 12 shows a flow for calculating the main combustion period BURN2 [deg]. These flows are executed at fixed time intervals (for example, every ten milliseconds). FIGS. 10 and 12 are executed following FIG. 5. Either FIG. 10 or FIG. 12 may be executed first.

First, to describe FIG. 10, in a step S161, the previous combustion start timing MBTCYCL [deg BTDC], the volume VIVC [m³] of the combustion chamber 5 at the intake valve closing timing, calculated in the step S12 of FIG. 5, the temperature TINI [K] of the combustion chamber 5 at the intake valve closing timing, calculated in the step S13 of FIG. 5, the pressure PINI [Pa] of the combustion chamber 5 at the intake valve closing timing, calculated in the step S14 of FIG. 5, the engine rotation speed NRPM [rpm], and the reaction probability RPROBA [%], calculated in the step S15 of FIG. 5, are read.

The previous combustion start timing MBTCYCL is the value of the basic ignition timing MBTCAL [deg BTDC] in the previous cycle, and calculation thereof will now be described using FIG. 13.0

In a step S162, a volume V0 [m³] of the combustion chamber 5 at the combustion start timing is calculated. As described above, the ignition timing (combustion start timing) here is not the basic ignition timing MBTCAL calculated in the current cycle, but the value of the basic ignition timing in the previous cycle. In other words, the volume V0 of the combustion chamber 5 at the combustion start timing is calculated from MBTCYCL, which is the value of the basic ignition timing in the previous cycle, using the following equation.

$$V0=f6(MBTCYCL) \quad (11)$$

More specifically, the volume V0 of the combustion chamber 5 at MBTCYL is calculated from the stroke position of the piston 6 at the previous combustion start timing MBTCYL and the bore diameter of the combustion chamber 5. The volume VIVC of the combustion chamber 5 at the intake valve closing timing IVC was determined in the step S12 in FIG. 5 by searching a table of the volume at the intake valve closing timing having the intake valve closing timing as a parameter, but here, the volume V0 of the combustion chamber 5 at the previous combustion start timing MBTCYCL may be determined by searching a table of the volume at the previous combustion start timing having MBTCYCL as a parameter.

In a step S163, an effective compression ratio Ec at the combustion start timing is calculated. The effective compression ratio Ec is a non-dimensional value obtained by dividing the volume V0 of the combustion chamber 5 at the combustion start timing by the volume VIVC of the combustion chamber 5 at the intake valve closing timing, as shown in the following equation.

$$Ec=f7(V0-VDEP, VIVC)=V0/VIVC \quad (12)$$

In a step S164, a temperature increase rate TCOMP inside the combustion chamber 5 from the intake valve closing timing IVC to the combustion start timing is calculated on the basis of the effective compression ratio Ec as shown in the following equation.

$$TCOMP = f8(Ec) = Ec\char`\^(\kappa-1) \qquad (13)$$

where κ: specific heat ratio.

The equation (13) expresses the temperature increase rate of the adiabatically compressed gas. It should be noted that the symbol "^" on the right side of the equation (13) denotes a power calculation. This symbol is also used in subsequent equations.

The symbol κ is a value obtained by dividing the specific heat at constant pressure of the adiabatically compressed gas by the specific heat at constant volume. If the adiabatically compressed gas is air, then κ=1.4, and this value may be used straightforwardly. However, by determining the value of κ in relation to air-fuel mixture experientially, a further improvement in calculation precision is possible.

Figure 11:
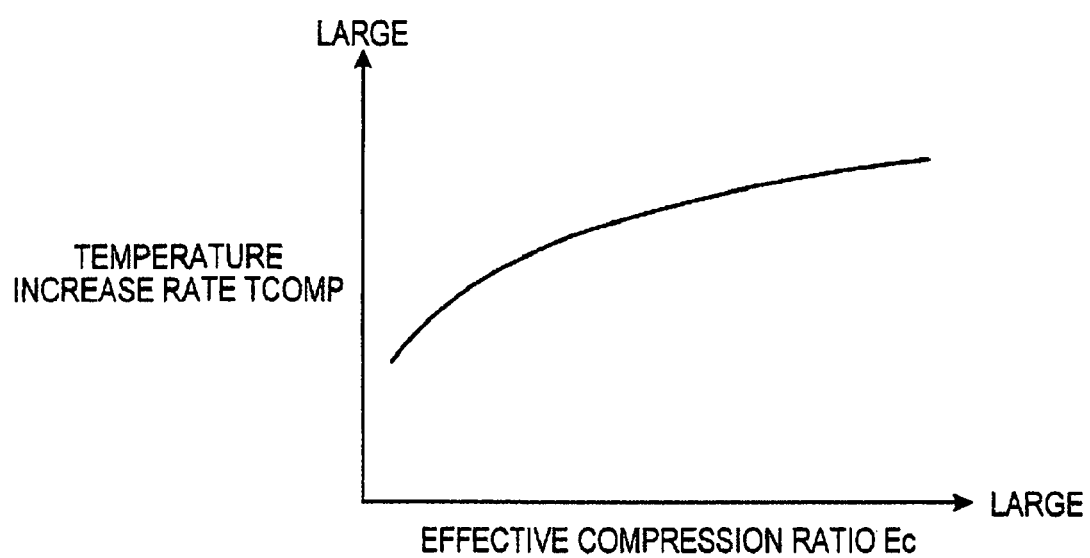
FIG. 11 is a characteristic diagram of a temperature increase rate.

FIG. 11 shows the equation (13) in the form of a diagram. A table having such a characteristic may be stored in advance in the memory of the engine controller 31, and the temperature increase rate TCOMP may be determined by searching this table on the basis of the effective compression ratio Ec.

In a step S165, a temperature T0 [K] of the combustion chamber 5 at the combustion start timing is calculated by multiplying the temperature increase rate TCOMP by the temperature TINI of the combustion chamber 5 at the intake valve closing timing, or in other words according to the following equation.

$$T0 = TINI \times TCOMP \qquad (14)$$

Steps S166, S167 are similar to the steps S164, S165. More specifically, in the step S166 a pressure increase rate PCOMP inside the combustion chamber 5 from the intake valve closing timing IVC to the combustion start timing is calculated on the basis of the effective compression ratio Ec as shown in the following equation.

$$PCOMP = f9(Ec) = Ec\char`\^\kappa \qquad (15)$$

where κ: specific heat ratio.

Similarly to the equation (13), the equation (15) expresses the pressure increase rate of the adiabatically compressed gas. Here also, the symbol "^" on the right side of the equation (15) denotes a power calculation.

The symbol κ takes the same value as that used in the equation (13). Hence, if the adiabatically compressed gas is air, κ=1.4, and this value may be used straightforwardly. However, by determining the value of κ from the composition and temperature of the air-fuel mixture, a further improvement in calculation precision is possible.

A table having a similar characteristic to that shown in FIG. 11 may be stored in advance in the memory of the engine controller 31, and the pressure increase rate PCOMP may be determined by searching this table on the basis of the effective compression ratio Ec.

In the step S167, a pressure P0 [Pa] of the combustion chamber 5 at the combustion start timing is calculated by multiplying the pressure increase rate PCOMP by the pressure PINI of the combustion chamber 5 at the intake valve closing timing, or in other words according to the following equation.

$$P0 = PINI \times PCOMP \qquad (16)$$

In a step S168, a stratified flow combustion speed SL1 [m/sec] during the initial combustion period is calculated using the following equation.

$$SL1 = f10(T0, P0) \qquad (17)$$
$$= SLstd \times (T0/Tstd)^{2.18} \times (P0/Pstd)^{-0.16}$$

where Tstd: reference temperature [K],
Pstd: reference pressure [Pa],
SLstd: reference stratified flow combustion speed [m/sec] at reference temperature Tstd and reference pressure Pstd,
T0: temperature [K] of combustion chamber 5 at combustion start timing, and
P0: pressure [Pa] of combustion chamber 5 at combustion start timing.

The stratified flow combustion speed (stratified flame speed) is the propagation speed of the flame when there is no gas flow. It is known that the stratified flow combustion speed is a function of the temperature and pressure of the combustion chamber 5, regardless of the compression speed in the combustion chamber 5 and the intake air flow speed in the combustion chamber 5. Therefore, the stratified flow combustion speed during the initial combustion period is set as a function of the combustion start timing temperature T0 and the combustion start timing pressure P0, and the stratified flow combustion speed during the main combustion period is set as a function of a compression top dead center temperature TTDC and a compression top dead center pressure PTDC, as will be described below. Typically, the stratified flow combustion speed varies according to the engine load, the inert gas ratio in the combustion chamber 5, the intake valve closing timing, the specific heat ratio, and the intake air temperature, but since these elements are affected by the temperature T and pressure P in the combustion chamber 5, the stratified flow combustion speed may be defined ultimately by the temperature T and pressure P in the combustion chamber 5.

In the equation (17), the reference temperature Tstd, reference pressure Pstd, and reference stratified flow combustion speed SLstd are values determined in advance through experiment.

Under pressure which is equal to or greater than the normal pressure in the combustion chamber 5 of two bars, the pressure term $(P0/Pstd)^{-0.16}$ in the equation (17) takes a small value. The reference stratified flow combustion speed SLstd may therefore be defined only by the reference temperature Tstd with the pressure term $(P0/Pstd)^{-0.16}$ as a fixed value.

Accordingly, the relationship between the temperature T0 at the combustion start timing and the stratified flow combustion speed SL1 when the reference temperature Tstd is 550 [K], the reference stratified flow combustion speed SLstd is 1.0 [m/sec], and the pressure term is 0.7 can be defined approximately by the following equation.

$$SL1 = f11(T0) = 1.0 \times 0.7 \times (T0/550)^{2.18} \qquad (18)$$

In a step S169, a gas flow turbulence intensity ST1 during the initial combustion period is calculated. The gas flow turbulence intensity ST1 is a non-dimensional value dependent on the flow rate of the fresh air which flows into the combustion chamber 5 and the penetration of the fuel injected by the fuel injector 21.

The flow rate of the fresh air which flows into the combustion chamber 5 is dependent on the form of the intake passage, the operating state of the intake valve 15, and the form of the intake port 4 in which the intake valve 15 is provided. The penetration of the injected fuel is dependent on the injection pressure of the fuel injector 21, the fuel injection period, and the fuel injection timing.

Ultimately, the gas flow turbulence intensity ST1 during the initial combustion period may be expressed as a function of the engine rotation speed NRPM by the following equation.

$$ST1 = f12(NRPM) = C1 \times NRPM \quad (19)$$

where C1: a constant.

The turbulence intensity ST1 may also be determined from a table having the rotation speed NRPM as a parameter.

In a step S170, a gas combustion speed FLAME1 [m/sec] during the initial combustion period is calculated from the stratified flow combustion speed SL1 and the turbulence intensity ST1 using the following equation.

$$FLAME1 = SL1 \times ST1 \quad (20)$$

When gas turbulence is present inside the combustion chamber 5, the gas combustion speed varies. The equation (20) takes into consideration the effect of this gas turbulence on the combustion speed.

In a step S171, the initial combustion period BURN1 [deg] is calculated using the following equation.

$$BURN1 = \{(NRPM \times 6) \times BR1 \times V0\}/(RPROBA \times AF1 \times FLAME1) \quad (21)$$

where AF1: reaction area of flame kernel (fixed value) [m²].

The equation (21) and a following equation (35) are implied from the following basic equation in which it is assumed that the combustion period is obtained by dividing the combustion gas mass by the combustion speed. However, the numerator and denominator on the right side of the equations (21) and (35) do not immediately express the combustion gas mass and combustion speed.

Combustion period [sec]=total mass in cylinder [g]/
(unburned gas density [g/m³]×flame surface area
[m²]×flame speed [m/sec]) (22)

The unburned gas density, which is the denominator on the right side of the equation (22), is a value obtained by dividing the unburned gas mass [g] by the unburned gas volume [m³], and therefore the unburned gas density cannot be calculated accurately using a function of only a charging efficiency ITAC corresponding to the mass, as in a conventional device. The empirical formulae shown in the equation (21) above and the following equation (35) are obtained for the first time when a predetermined approximation is substituted into the equation (22) while being compared with an experiment result.

The term BR1 on the right side of the equation (21) is the amount of change in the combustion mass proportion from the combustion start timing to the end timing of the initial combustion period BURN1. Here, BR1 is set at two percent. The term (NRPM×6) on the right side of the equation (21) indicates processing to switch the unit of measurement from rpm to crank angle degrees. The reaction area AF1 of the flame kernel is set by way of experiment.

The volume of the combustion chamber may be considered to be substantially unchanging during the initial combustion period. Hence, when calculating the initial combustion period BURN1, the combustion chamber volume V0 at the start of combustion, or in other words the initial combustion chamber volume, is employed.

Moving to the flow in FIG. 12, the volume VIVC [m³] of the combustion chamber 5 at the intake valve closing timing, calculated in the step S12 of FIG. 5, the temperature TINI [K] of the combustion chamber 5 at the intake valve closing timing, calculated in the step S13 in FIG. 5, the pressure PINI [Pa] of the combustion chamber 5 at the intake valve closing timing, calculated in the step S14 of FIG. 5, the engine rotation speed NRPM [rpm], and the reaction probability RPROBA [%], calculated in the step S15 of FIG. 5, are read in a step S181 similarly to the step S161 of FIG. 10. Further, a cylinder fresh air amount MACYL [g], the target equivalence ratio TFBYA, an internal intake gas amount MRES [g], and an external inert gas amount MEGR [g] are also read.

Here, an external EGR device is not shown in FIG. 1, but description will be provided in relation to FIG. 12 on the premise that the engine comprises an external EGR device. In this case, the external inert gas amount MEGR may be calculated using a well-known method, for example the method disclosed in JP10-141150A. It should be noted that when the subject engine does not comprise an external EGR device, as in the embodiment shown in FIG. 1, the external inert gas amount MEGR may be considered as zero. Calculation of the cylinder fresh air amount MACYL and the internal inert gas amount MRES will be described hereafter, from FIG. 14 onward.

Steps S182 and S183 are similar to the steps S163 and S164 in FIG. 10. In the step S182, an effective compression ratio Ec_2 at the timing of compression top dead center is calculated. Similarly to the effective compression ratio Ec in the equation (12), the effective compression ratio Ec_2 is a non-dimensional value obtained by dividing a volume VTDC of the combustion chamber 5 at compression top dead center by the volume VIVC of the combustion chamber 5 at the intake valve closing timing, as shown in the following equation.

$$EC\_2 = f13(VTDC, VIVC) = VTDC/VIVC \quad (23)$$

In the equation (23), the volume VTDC of the combustion chamber 5 at compression top dead center is fixed, regardless of the operating conditions, and may therefore be stored in the memory of the engine controller 31 in advance.

In the step S183, a temperature increase rate TCOMP_2 caused by adiabatic compression inside the combustion chamber 5 from the intake valve closing timing IVC to compression top dead center is calculated on the basis of the effective compression ratio Ec_2 as shown in the following equation.

$$TCOMP\_2 = f14(Ec\_2) = Ec\_2^{\wedge}(k-1) \quad (24)$$

where κ: specific heat ratio.

A table having a similar characteristic to that shown in FIG. 11 may be stored in the memory of the engine controller 31 in advance, and the temperature increase rate TCOMP_2 may be determined from the effective compression ratio Ec_2 by searching this table.

In a step S184, a total gas mass MGAS [g] in the combustion chamber 5 is calculated from the cylinder fresh air amount MACYL, the target equivalence ratio TFBYA, the internal inert gas amount MRES, and the external inert gas amount MEGR, according to the following equation.

$$MGAS = MACYL \times (1 + TFBYA/14.7) + MRES + MEGR \quad (25)$$

The symbol 1 in parentheses on the right side of the equation (25) is the fresh air portion, and the term TFBYA/14.7 is the fuel portion.

In a step S185, the total gas mass MGAS of the combustion chamber 5 is used together with the cylinder fresh air amount MACYL and the target equivalence ratio TFBYA to calculate a temperature increase (combustion increase temperature)

TBURN [K] generated by combustion of the air-fuel mixture, according to the following equation.

$$TBURN = \{MACYL \times TFBYA/14.7 \times BRk \times Q\}/(Cv \times MGAS) \quad (26)$$

where Q: constant calorific value of fuel,

BRk: combustion mass proportion of fuel in cylinder, and

Cv: specific heat at constant volume.

The numerator on the right side of the equation (26) denotes the total calorific value [J] generated by the fuel in the cylinder, and the denominator denotes the temperature increase rate [J/K] per unit calorific value. In other words, the equation (26) is an approximation applied to a thermodynamics formula.

The combustion mass proportion BRk of the fuel in the cylinder is determined in advance by experiment or the like. For ease, the combustion mass proportion BRk may be set to 60%/2=30%, for example. In this embodiment, the combustion period is set to last until the combustion mass proportion reaches approximately sixty percent, and therefore BRk is set to thirty percent, exactly halfway through the combustion period.

The constant calorific value Q of the fuel takes different values depending on the fuel type, and is therefore determined in advance according to the fuel type through experiment or the like. The specific heat at constant volume Cv takes a value between two and three, and a representative value thereof is determined in advance through experiment or the like. It should be noted, however, that by determining the value of the specific heat at constant volume Cv from the composition and temperature of the air-fuel mixture, a further improvement in the calculation precision can be achieved.

In a step S186, the temperature TTDC [K] of the combustion chamber 5 at compression top dead center is calculated by multiplying the temperature increase rate TCOMP_2 up to compression top dead center to the temperature TINI of the combustion chamber 5 at the intake valve closing timing, and adding the multiplied value to the above combustion increase temperature TBURN, using the following equation.

$$TTDC = TINI \times TCOMP\_2 + TBURN \quad (27)$$

In a step S187, the pressure PTDC [Pa] of the combustion chamber 5 at compression top dead center is calculated from the temperature TTDC and volume VTDC of the combustion chamber 5 at compression top dead center, and the pressure PINI, volume VIVC, and temperature TINI of the combustion chamber 5 at the intake valve closing timing, using the following equation.

$$PTDC = PINI \times VIVC \times TTDC/(VTDC \times TINI) \quad (28)$$

The equation (28) is obtained using an equation of state. In other words, the following equation of state is established using the pressure, volume, and temperature (PINI, VIVC, TINI) at the intake valve closing timing.

$$PINI \times VIVC = n \cdot R \cdot TINI \quad (29)$$

where n: number of moles, and

R: gas constant.

In the vicinity of compression top dead center, the volume is substantially constant, and therefore the following equation of state is established using the pressure, volume, and temperature (PTDC, VTDC, TTDC) at compression top dead center.

$$PTDC \times VTDC = n \cdot R \cdot TTDC \quad (30)$$

By erasing n×R from the two equations (30) and (29) and solving PTDC, the above equation (28) is obtained.

In a step S188, similarly to the step S168 in FIG. 10, a stratified flow combustion speed SL2 [m/sec] during the main combustion period is calculated using the following equation.

$$SL2 = f15(TTDC, PTDC) \quad (31)$$

$$= SLstd \times (TTDC/Tstd)^{2.18} \cdot (PTDC/Pstd)^{-0.16}$$

where Tstd: reference temperature [K],

Pstd: reference pressure [Pa],

SLstd: reference stratified flow combustion speed [m/sec] at reference temperature Tstd and reference pressure Pstd, TTDC: temperature [K] of combustion chamber 5 at compression top dead center, and PTDC: pressure [Pa] of combustion chamber 5 at compression top dead center.

The equation (31) is similar to the equation (18). More specifically, the reference temperature Tstd, reference pressure Pstd, and reference stratified flow combustion speed SLstd are values determined in advance through experiment. Under pressure which is equal to or greater than the normal pressure in the combustion chamber 5 of two bars, the pressure term $(PTDC/Pstd)^{-0.16}$ in the equation (31) takes a small value. The reference stratified flow combustion speed SLstd may therefore be defined only by the reference temperature Tstd with the pressure term $(PTDC/Pstd)^{-0.16}$ as a fixed value. Accordingly, the relationship between the temperature TTDC at compression top dead center and the stratified flow combustion speed SL2 when the reference temperature Tstd is 550 [K], the reference stratified flow combustion speed SLstd is 1.0 [m/sec], and the pressure term is 0.7 can be defined approximately by the following equation.

$$SL2 = f16(TTDC) \quad (32)$$

$$= 1.0 \times 0.7 \times (TTDC/550)^{2.18}$$

In a step S189, a gas flow turbulence intensity ST2 during the main combustion period is calculated. Similarly to the gas flow turbulence intensity ST1 during the initial combustion period, the gas flow turbulence intensity ST2 may be expressed as a function of the engine rotation speed NRPM using the following equation.

$$ST2 = f17(NRPM) = C2 \times NRPM \quad (33)$$

where C2: a constant.

The turbulence intensity ST2 may also be determined from a table having the rotation speed as a parameter.

In a step S190, a combustion speed FLAME2 [m/sec] during the main combustion period is calculated from the stratified flow combustion speed SL2 [m/sec] and the gas flow turbulence intensity ST2 during the main combustion period, using the following equation.

$$FLAME2 = SL2 \times ST2 \quad (34)$$

where SL2: stratified flow combustion speed [m/sec].

Similarly to the equation (20), the equation (34) takes into consideration the effect of gas turbulence on the combustion speed.

In a step S191, the main combustion period BURN2 [deg] is calculated by the following equation, which is similar to the equation (21).

$$BURN2=\{(NRPM\times6)\times(BR2\times VTDC)\}/(RPROBA\times AF2\times FLAME2) \quad (35)$$

where AF2: reaction area of flame kernel [m²].

Here, the term BR2 on the right side of the equation (35) is the amount of change in the combustion mass proportion from the start timing to the end timing of the main combustion period. At the end timing of the initial combustion period, the combustion mass proportion BR is at two percent, whereupon the main combustion period begins. The main combustion period is considered complete when the combustion mass proportion BR reaches sixty percent, and therefore BR2 is set to 60%−2%=58%. AF2 is the average reaction area of the flame kernel during its growth process, and similarly to AF1 in the equation (21), is set as a fixed value which is determined in advance through experiment.

During the main combustion period, the combustion chamber volume varies on either side of compression top dead center. In other words, compression top dead center may be considered as existing substantially centrally between the start timing of the main combustion period and the end timing of the main combustion period. Furthermore, in the vicinity of compression top dead center, there is little variation in the combustion chamber volume even if the crank angle changes. Hence the combustion chamber volume VTDC at compression top dead center is used to represent the combustion chamber volume during the main combustion period.

FIG. 13 is a flow for calculating the basic ignition timing MBTCAL [deg BTDC], and is executed at fixed time intervals (for example, every ten milliseconds). The flow of FIG. 13 is executed following the latterly executed flow from among FIGS. 10 and 12.

In a step S41, the initial combustion period BURN1, calculated in the step S171 in FIG. 10, the main combustion period BURN2, calculated in the step S191 in FIG. 12, the crank angle IGNDEAD corresponding to the ignition dead time, calculated in the step S17 in FIG. 5, and the reference crank angle θPMAX, calculated in the step S16 in FIG. 5, are read.

In a step S42, the sum total of the initial combustion period BURN1 and the main combustion period BURN2 is calculated as the combustion period BURN [deg].

In a step S43, the basic ignition timing MBTCAL [deg BTDC] is calculated using the following equation.

$$MBTCAL=BURN-\theta PMAX+IGNDEAD \quad (36)$$

In a step S44, a value obtained by subtracting the crank angle IGNDEAD corresponding to the ignition dead time from the basic ignition timing MBTCAL is calculated as the previous combustion start timing MBTCYCL [deg BTDC].

Assuming that the basic ignition timing MBTCAL calculated in the step S43 is used as the ignition timing command value of this cycle, the previous combustion start timing MBTCYCL calculated in the step S44 is used in the step S162 of FIG. 10 until the ignition timing of the next cycle.

Figure 14:
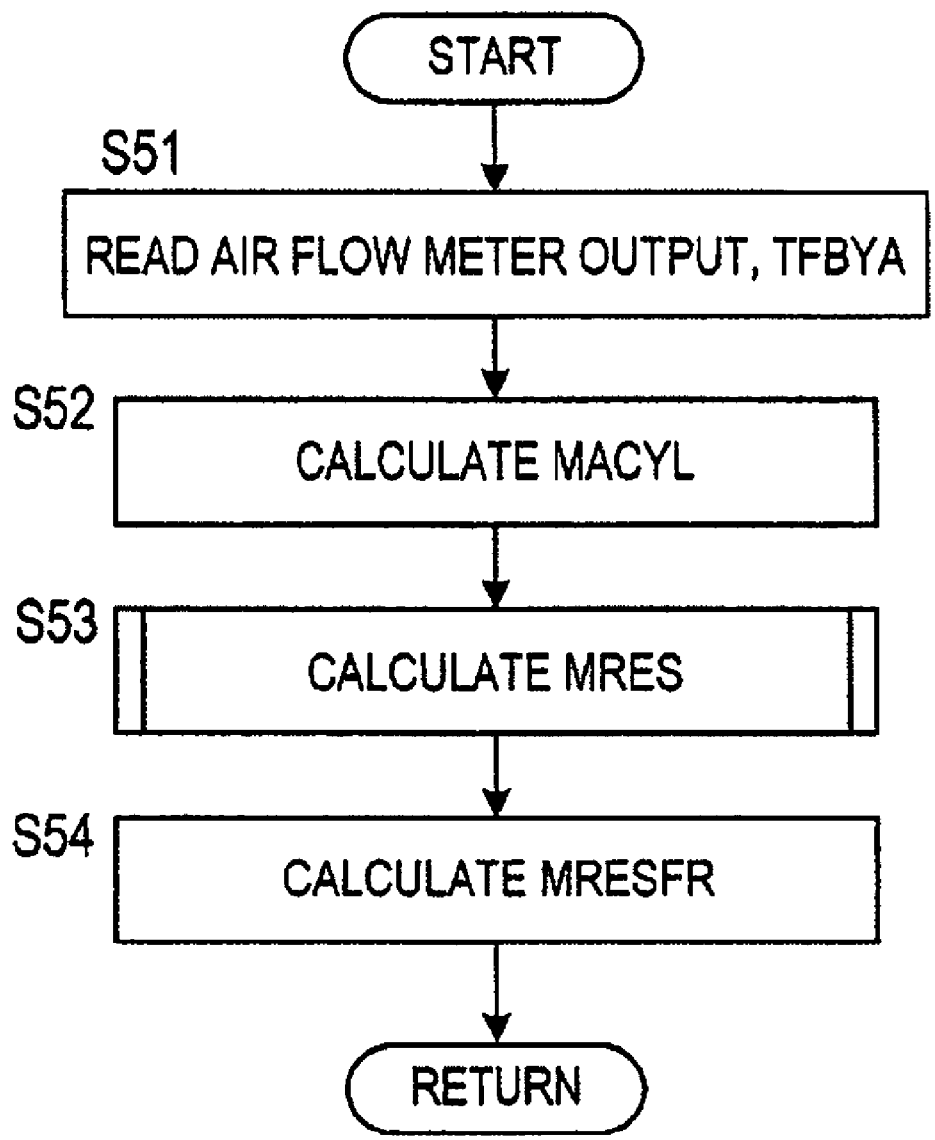
FIG. 14 is a flowchart for calculating an internal inert gas ratio.

FIG. 14 is a flowchart for calculating the internal inert gas ratio MRESFR in the combustion chamber 5, which is executed at fixed time intervals (of ten milliseconds, for example). This flow is executed prior to the flow in FIG. 5.

In a step S51, the output of the air flow meter 32 and the target equivalence ratio TFBYA are read. In a step S52, the fresh air amount (cylinder fresh air amount) MACYL flowing into the combustion chamber 5 is calculated on the basis of the output of the air flow meter 32. The cylinder fresh air amount MACYL may be calculated using a well-known method such as the method disclosed in JP2001-50091A, for example.

In a step S53, the internal inert gas amount MRES in the combustion chamber 5 is calculated. Calculation of the internal inert gas amount MRES will be described using the flow shown in FIG. 15.

Figure 15:
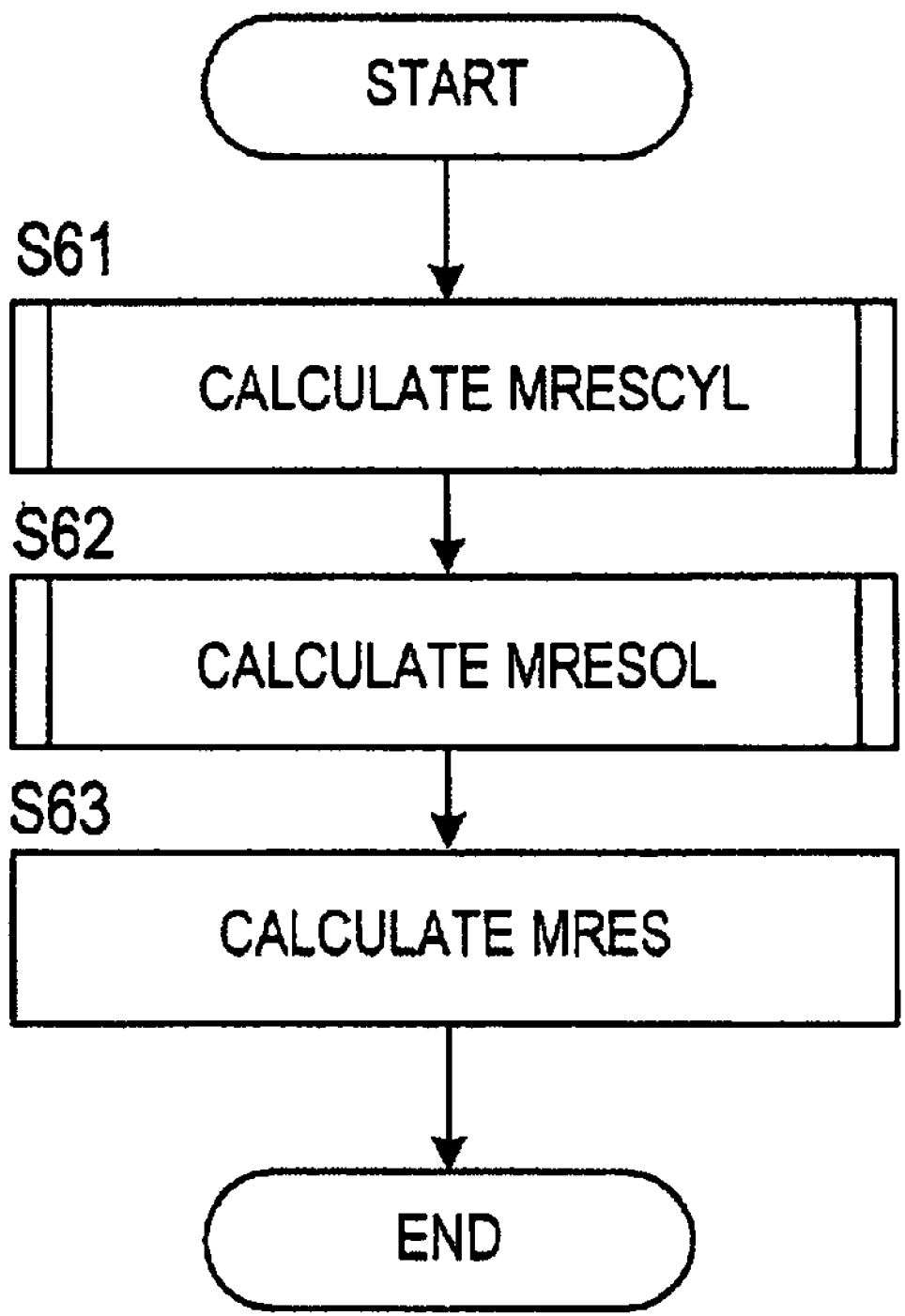
FIG. 15 is a flowchart for calculating an internal inert gas amount.

In a step S61 of FIG. 15 (a subroutine of the step S53 in FIG. 14), an inert gas amount MRESCYL in the combustion chamber 5 at the exhaust valve closing timing EVC is calculated. Calculation of the inert gas amount MRESCYL will be described using the flow shown in FIG. 16.

Figure 16:
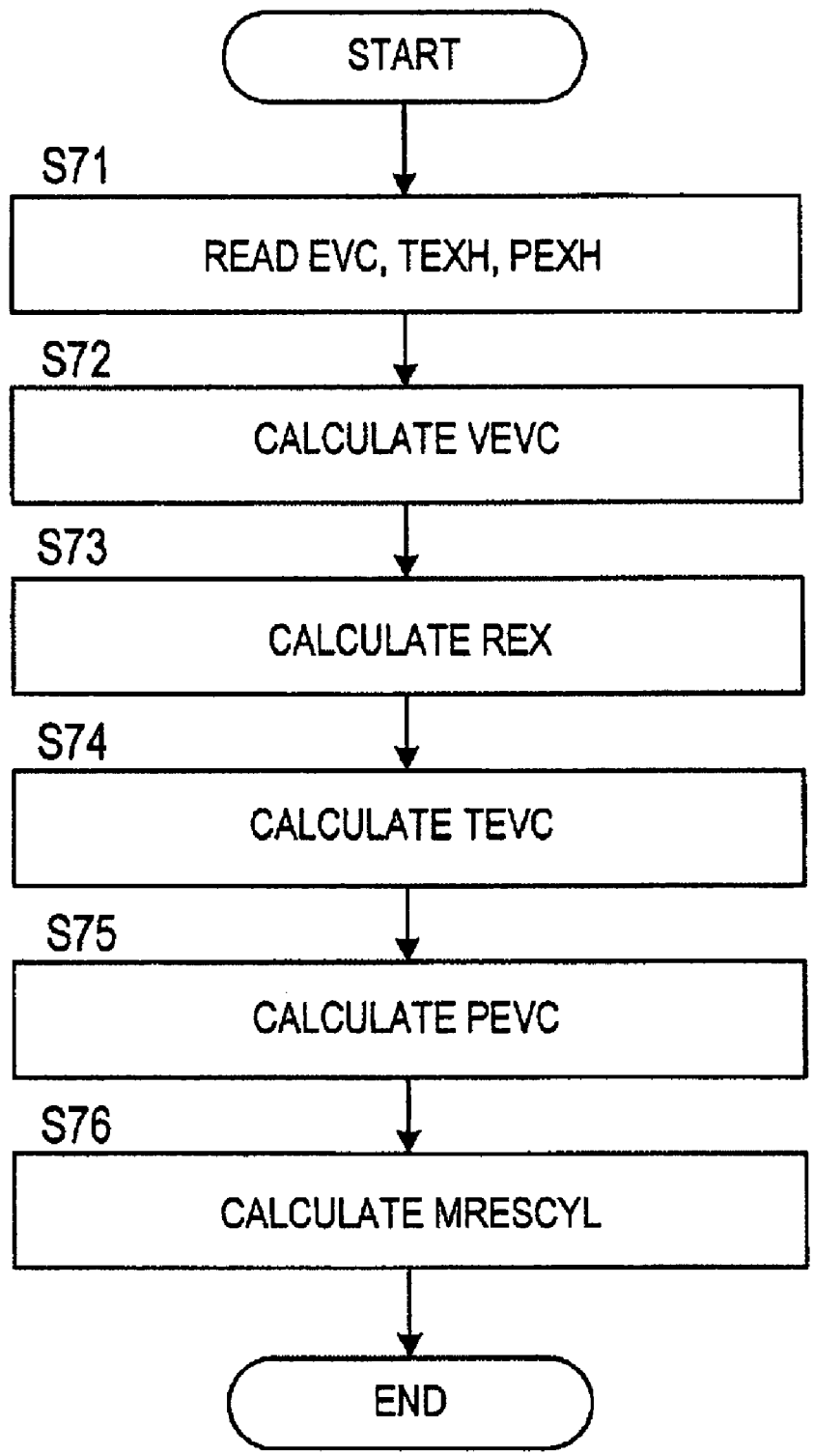
FIG. 16 is a flowchart for calculating an inert gas amount during EVC.

In a step S71 of FIG. 16 (a subroutine of the step S61 in FIG. 15), the exhaust valve closing timing EVC [deg BTDC], the exhaust gas temperature TEXH [K] detected by the temperature sensor 45, and an exhaust gas pressure PEXH [kPa] detected by the pressure sensor 46 are read.

Here, similarly to the intake valve closing timing IVC, which is learned in advance from a command value applied to the intake VTC mechanism 27, the exhaust valve closing timing EVC is also learned in advance from a command value applied to the exhaust VTC mechanism 28.

Figure 23:
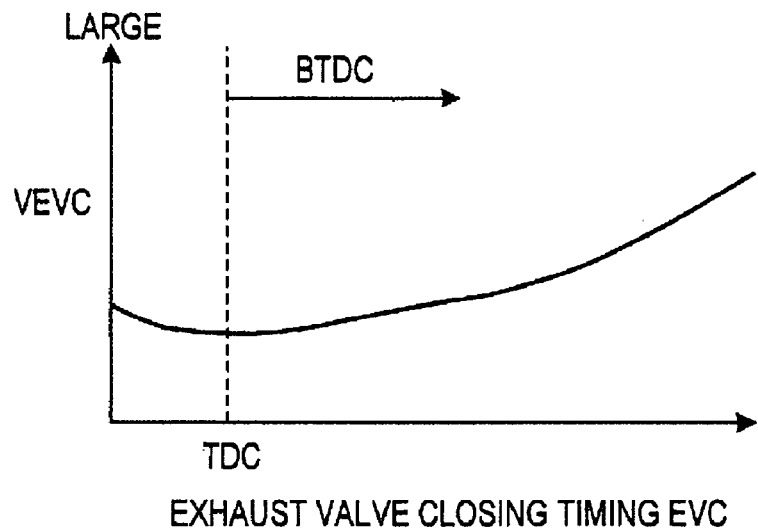
FIG. 23 is a characteristic diagram of a combustion chamber volume at an exhaust valve closing timing.

In a step S72, a volume VEVC of the combustion chamber 5 at the exhaust valve closing timing EVC is calculated. Similarly to the volume VIVC at the intake valve closing timing IVC, the volume VEVC may be determined by searching a table having the exhaust valve closing timing as a parameter. More specifically, when the exhaust VTC mechanism 28 is provided, the volume VEVC of the combustion chamber 5 at the exhaust valve closing timing EVC may be determined from the exhaust valve closing timing EVC by searching a table shown in FIG. 23. When the exhaust VTC mechanism 28 is not provided, a constant may be applied.

Furthermore, when a mechanism which varies the compression ratio (not shown) is provided, the combustion chamber volume VEVC at the exhaust valve closing timing is determined from a table in accordance with variation in the compression ratio. When the mechanism for varying the compression ratio is provided in addition to the exhaust VTC mechanism 28, the combustion chamber volume at the exhaust valve closing timing is determined by searching a map corresponding to both the exhaust valve closing timing and variation in the compression ratio.

Figure 24:
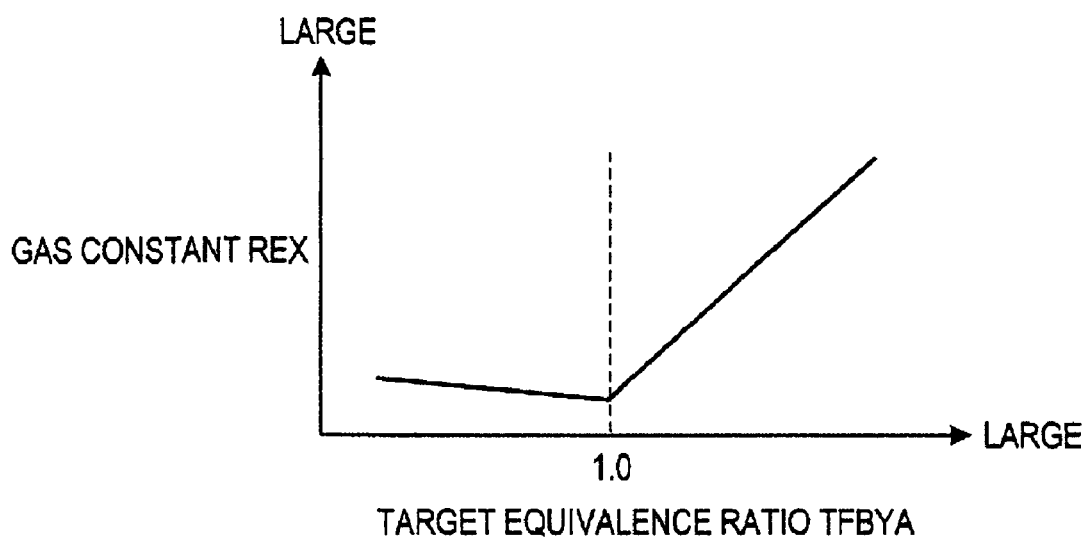
FIG. 24 is a characteristic diagram of a gas constant of an inert gas.

In a step S73, a gas constant REX of the inert gas in the combustion chamber 5 is determined from the target equivalence ratio TFBYA by searching a table shown in FIG. 24. As shown in FIG. 24, the gas constant REX of the inert gas is smallest when the target equivalence ratio TFBYA is 1.0, or in other words at the stoichiometric air-fuel ratio, and increases as the target equivalence ratio TFBYA increases or decreases.

In a step S74, a temperature TEVC of the combustion chamber 5 at the exhaust valve closing timing EVC is estimated on the basis of the exhaust gas temperature TEXH. For ease, the exhaust gas temperature TEXH may be used as TEVC. It should be noted that the temperature TEVC of the combustion chamber 5 at the exhaust valve closing timing varies according to the amount of heat corresponding to the fuel injection amount from the injector 21, and if this characteristic is taken into account, the calculation precision of TEVC improves.

In a step S75, a pressure PEVC of the combustion chamber 5 at the exhaust valve closing timing EVC is calculated on the basis of the exhaust gas pressure PEXH. For ease, the exhaust gas pressure PEXH may be used as PEVC.

In a step S76, the inert gas amount MRESCYL in the combustion chamber 5 at the exhaust valve closing timing EVC is calculated from the volume VEVC of the combustion chamber 5 at the exhaust valve closing timing EVC, the temperature TEVC at the exhaust valve closing timing EVC, the pressure PEVC at the exhaust valve closing timing EVC, and the gas constant REX of the inert gas, using the following equation.

$$MRESCYL=(PEVC \times VEVC)/(REX \times TEVC) \quad (37)$$

When calculation of the inert gas amount MRESCYL in the combustion chamber 5 at the exhaust valve closing timing EVC is complete, the routine returns to FIG. 15 where, in a step S62, an inert gas backflow amount MRESOL during overlap, or in other words the amount of inert gas that flows back to the intake side from the exhaust side during overlap of the intake and exhaust valves 15, 16, is calculated.

Calculation of this inert gas amount MRESOL will be described using the flow in FIG. 17.

Figure 17:
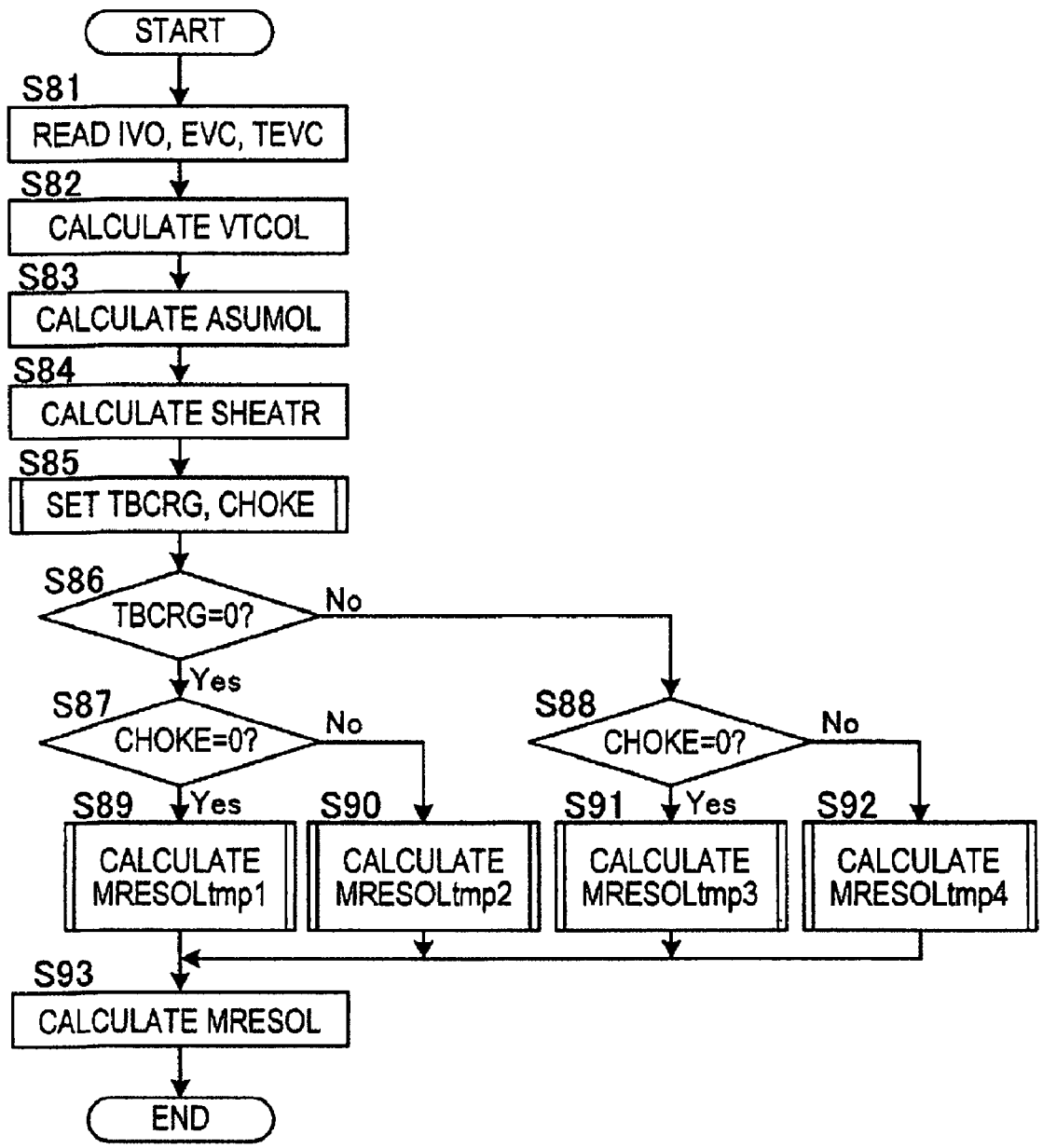
FIG. 17 is a flowchart for calculating an inert gas backflow amount during overlap.

In a step S81 of FIG. 17 (a subroutine of the step S62 in FIG. 15), an intake valve opening timing IVO [deg BTDC], the exhaust valve closing timing EVC [deg BTDC}, and the temperature TEVC of the combustion chamber 5 at the exhaust valve closing timing EVC, calculated in the step S74 of FIG. 16, are read.

Here, the intake valve opening timing IVO is earlier than the intake valve closing timing IVC by the opening angle of the intake valve 15, and can therefore be determined according to the intake valve closing timing IVC from the opening angle of the intake valve 15 (which is already known).

In a step S82, an overlap amount VTCOL [deg] between the intake and exhaust valves is calculated from the intake valve opening timing IVO and the exhaust valve closing timing EVC using the following equation.

$$VTCOL=IVO+EVC \quad (38)$$

For example, if the intake valve opening timing IVO is in the position of intake top dead center when the actuator of the intake VTC mechanism 27 is non-energized and advances beyond intake top dead center when the actuator of the intake VTC mechanism 27 is energized, and if the exhaust valve closing timing EVC is at exhaust top dead center when the actuator of the exhaust VTC mechanism 28 is non-energized and advances beyond exhaust top dead center when the actuator of the exhaust VTC mechanism 28 is energized, then the sum total of IVO and EVC corresponds to the overlap amount VTCOL of the intake and exhaust valves.

Figure 25:
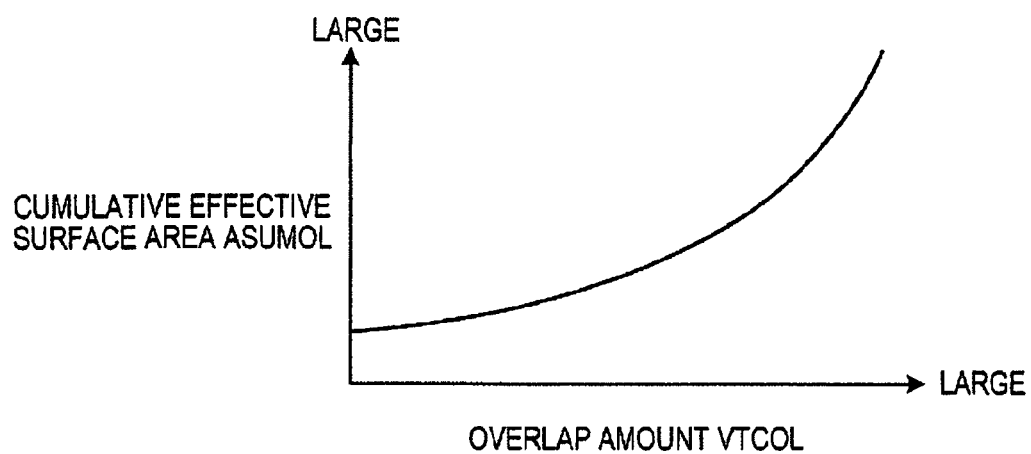
FIG. 25 is a characteristic diagram of a cumulative effective surface area during overlap.

In a step S83, a cumulative effective surface area ASUMOL during overlap is calculated from the overlap amount VTCOL of the intake and exhaust valves by searching a table shown in FIG. 25. As shown in FIG. 25, the cumulative effective surface area ASUMOL during overlap takes a steadily larger value as the overlap amount VTCOL of the intake and exhaust valves increases.

Figure 26:
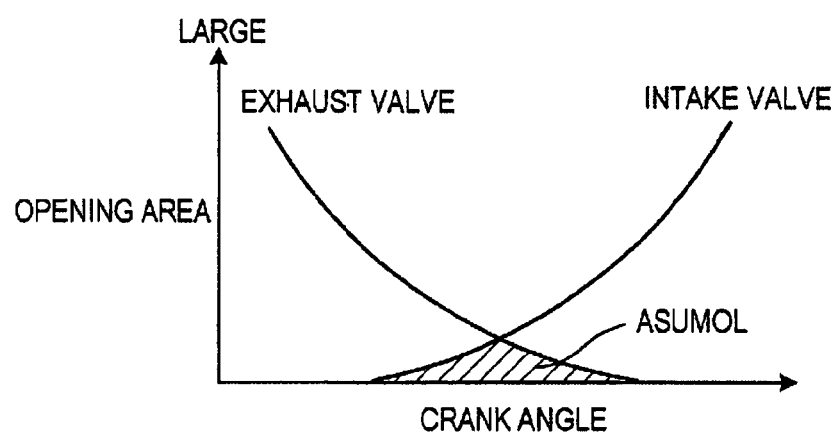
FIG. 26 is an illustrative diagram of the cumulative effective surface area during overlap.

FIG. 26 is an illustrative view of the cumulative effective surface area ASUMOL during overlap of the intake and exhaust valves. The abscissa shows the crank angle, and the ordinate shows the respective opening areas of the intake valve 15 and exhaust valve 16. The effective opening area at an arbitrary point in time during overlap is the smaller of the exhaust valve opening area and the intake valve opening area. The cumulative effective surface area ASUMOL of the entire overlap period (shown by diagonal shading in the drawing) is an integrated value of the periods during which the intake valve 15 and exhaust valve 16 are open.

By calculating the cumulative effective surface area ASUMOL during overlap in this manner, the overlap amount of the intake valve 15 and exhaust valve 16 can be approximated as a single orifice (emission hole), and hence the flow rate of the gas passing through this virtual orifice can be calculated easily from the condition of the exhaust system and the condition of the intake system.

Figure 27:
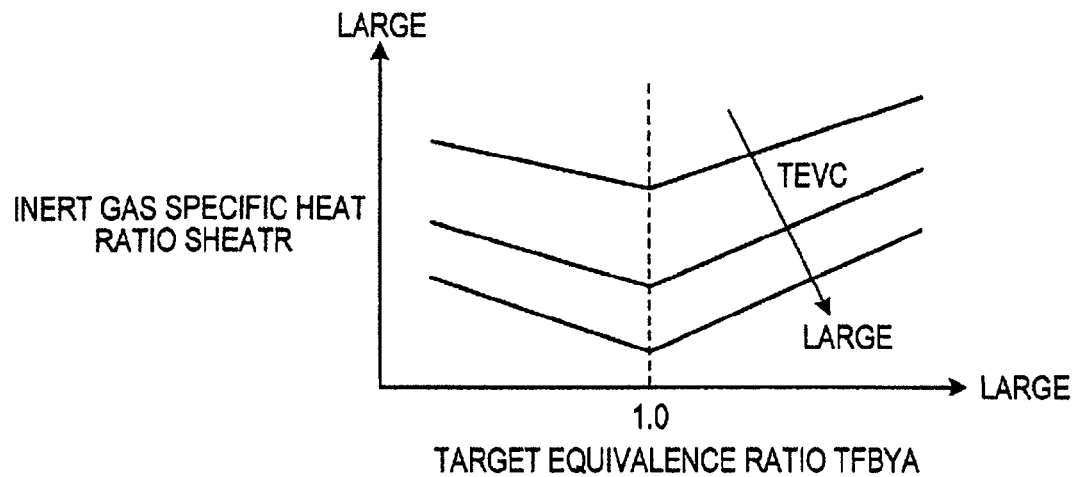
FIG. 27 is a characteristic diagram of a specific heat ratio of the inert gas.

In a step S84, a specific heat ratio SHEATR of the inert gas remaining in the combustion chamber 5 is calculated from the target equivalence ratio TFBYA and the temperature TEVC of the combustion chamber 5 at the exhaust valve closing timing EVC by searching a map shown in FIG. 27. As shown in FIG. 27, the specific heat ratio SHEATR of the inert gas remaining in the combustion chamber is smallest when the target equivalence ratio TFBYA is in the vicinity of 1.0, and increases as the target equivalence ratio TFBYA increases or decreases. Further, when the target equivalence ratio TFBYA is constant, the specific heat ratio SHEATR of the inert gas remaining in the combustion chamber decreases steadily as the temperature TEVC of the combustion chamber 5 at the exhaust valve closing timing EVC rises.

In a step S85, a supercharging determination flag TBCRG and a choking determination flag CHOKE are set. Setting of the supercharging determination flag TBCRG and choking determination flag CHOKE will be described using the flow in FIG. 18.

Figure 18:
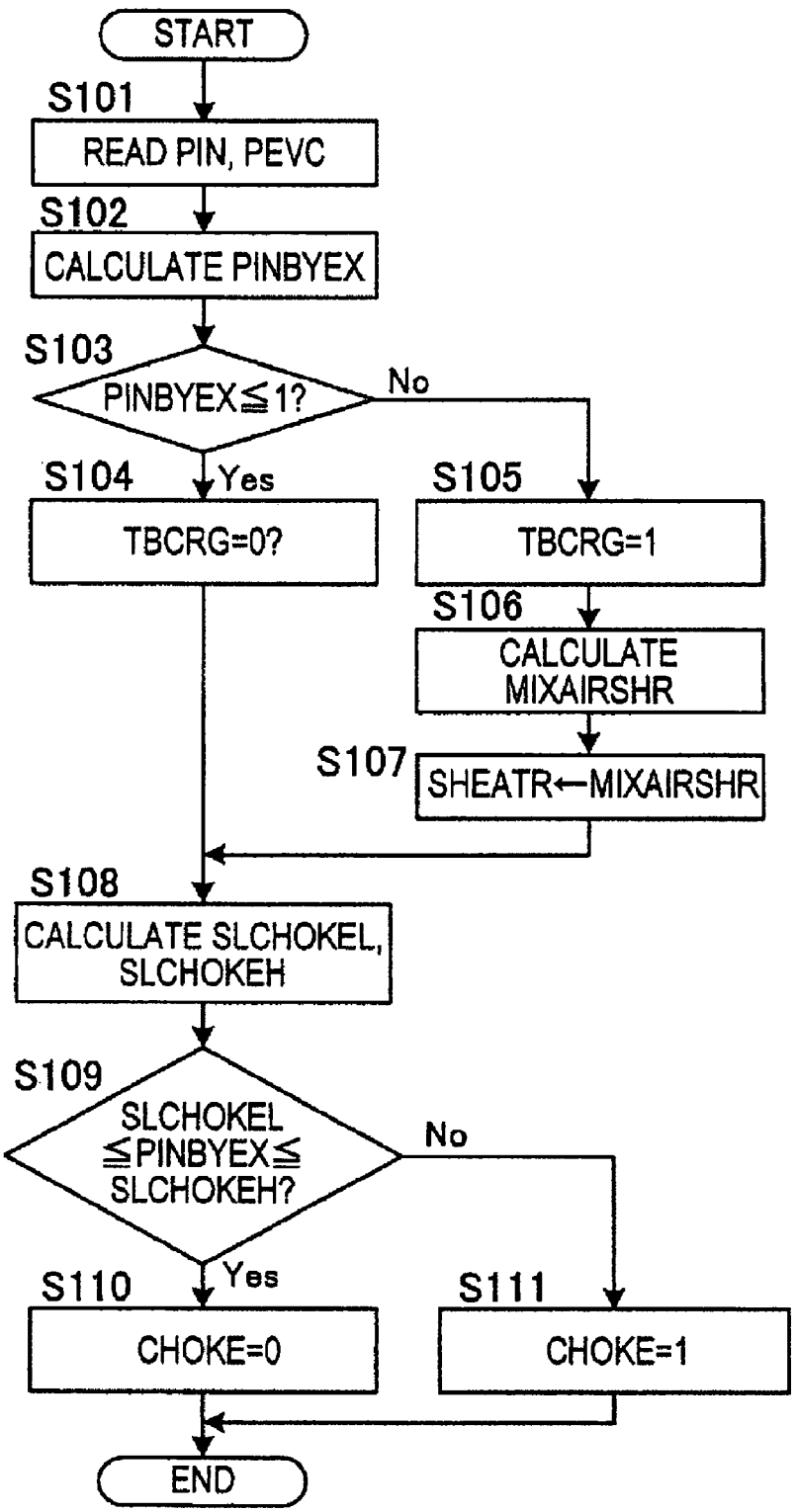
FIG. 18 is a flowchart for setting a supercharging determination flag and a choking determination flag.

In a step S101 of FIG. 18 (a subroutine of the step S85 in FIG. 17), an intake air pressure PIN detected by the intake air pressure sensor 44 and the pressure PEVC of the combustion chamber 5 at the exhaust valve closing timing EVC, calculated in the step S75 of FIG. 16, are read.

In a step S102, an intake air/exhaust gas pressure ratio PINBYEX is calculated from the intake air pressure PIN and the pressure PEVC of the combustion chamber 5 at the exhaust valve closing timing EVC, using the following equation.

$$PINBYEX=PIN \times PEVC \quad (39)$$

The intake air/exhaust gas pressure ratio PINBYEX is an absolute number which is compared with one in a step S103. When the intake air/exhaust gas pressure ratio PINBYEX is equal to or less than one, it is determined that supercharging is not taking place, and hence the routine advances to a step S104, where the supercharging determination flag TBCRG (set initially to zero) is set to zero.

When the intake air/exhaust gas pressure ratio PINBYEX is greater than one, it is determined that supercharging is taking place, and hence the routine advances to a step S105, where the supercharging determination flag TBCRG is set to unity.

Figure 28:
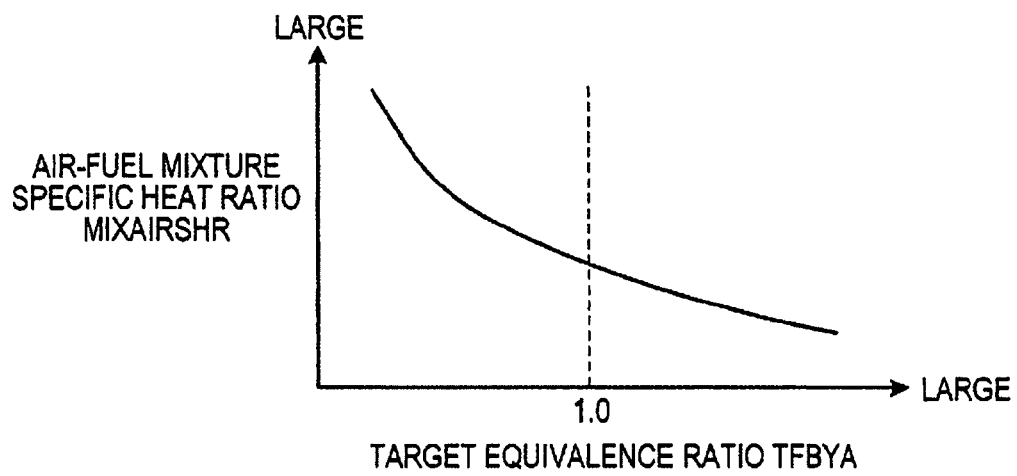
FIG. 28 is a characteristic diagram of the specific heat ratio of an air-fuel mixture.

In a step S106, a specific heat ratio MIXAIRSHR of the air-fuel mixture is determined from the target equivalence ratio TFBYA, read in the step S51 of FIG. 14, by searching a table shown in FIG. 28, and the inert gas specific heat ratio SHEATR is replaced by the air-fuel mixture specific heat ratio MIXAIRSHR in a step S107. As shown in FIG. 28, the air-fuel mixture specific heat ratio MIXAIRSHR takes a steadily larger value as the target equivalence ratio TFBYA decreases.

The reason for replacing the inert gas specific heat ratio SHEATR with the air-fuel mixture specific heat ratio MIXAIRSHR in the steps S106, S107 is to take into account supercharging periods such as turbocharging and inertia supercharging. More specifically, during supercharging, the gas flow during overlap of the intake and exhaust valves is directed from the intake system to the exhaust system, and hence in this case, by modifying the specific heat ratio of the gas that passes through the aforementioned virtual orifice from the inert gas specific heat ratio to the air-fuel mixture specific heat ratio, the gas flow amount can be estimated with good precision, and the internal inert gas amount can be calculated with good precision.

In a step S108, minimum and maximum choking determination thresholds SLCHOKEL, SLCHOKEH are calculated on the basis of the inert gas specific heat ratio SHEATR, calculated in the step S84 of FIG. 17 or the steps S106, S107 in FIG. 18, using the following equations.

$$SLCHOKEL=\{2/(SHEATR+1)\}^{\wedge}\{SHEATR/(SHEATR-1)\} \quad (40)$$

$$SLCHOKEH=\{-2/(SHEATR+1)\}^{\wedge}\{-SHEATR/(SHEATR-1)\} \quad (41)$$

The choking determination thresholds SLCHOKEL, SLCHOKEH calculate the critical values at which choking occurs.

When the power calculations on the right side of the equation (40) and the right side of the equation (41) in the step S108 are difficult, the calculation results of the equations (40) and (41) may be stored in the memory of the engine controller 31 in advance as a table of the minimum choking determination threshold SLCHOKEL and a table of the maximum choking determination threshold SLCHOKEH respectively, so that the choking determination thresholds SLCHOKEL, SLCHOKEH can be determined from the inert gas specific heat ratio SHEATR by searching the tables.

In a step S109, a determination is made as to whether or not the intake air/exhaust gas pressure ratio PINBYEX is within a range of no less than the minimum choking determination threshold SLCHOKEL and no more than the maximum choking determination threshold SLCHOKEH, or in other words whether or not choking is occurring. When the intake air/exhaust gas pressure ratio PINBYEX is within this range, it is determined that choking is not taking place, and hence the routine advances to a step S110, where the choking determination flag CHOKE (which is set initially to zero) is set to zero.

When the intake air/exhaust gas pressure ratio PINBYEX is not within this range, it is determined that choking is occurring, and hence the routine advances to a step S111, where the choking determination flag CHOKE is set to unity.

Once setting of the supercharging determination flag and choking determination flag is complete, the routine returns to FIG. 17, where the following four cases are divided in steps S86 to S88.

(1) Supercharging determination flag TBCRG is zero and choking determination flag CHOKE is zero.
(2) Supercharging determination flag TBCRG is zero and choking determination flag CHOKE is unity.
(3) Supercharging determination flag TBCRG is unity and choking determination flag CHOKE is zero.
(4) Supercharging determination flag TBCRG is unity and choking determination flag CHOKE is unity.

In the case of (1), the routine advances to a step S89, where an average inert gas backflow flow rate MRESOLtmp1 during overlap with no supercharging and no choking is calculated. In the case of (2), the routine advances to a step S90, where an inert gas backflow flow rate MRESOLtmp2 during overlap with no supercharging but with choking is calculated. In the case of (3), the routine advances to a step S91, where an average inert gas backflow flow rate MRESOLtmp3 during overlap with supercharging but no choking is calculated. In the case of (4), the routine advances to a step S92, where an inert gas backflow flow rate MRESOLtmp4 during overlap with both supercharging and choking is calculated. The calculation result is then set as an insert gas backflow flow rate MRESOLtmp during overlap.

Calculation of the inert gas backflow flow rate MRESOLtmp1 during overlap with no supercharging and no choking will now be described using the flow in FIG. 19.

Figure 19:
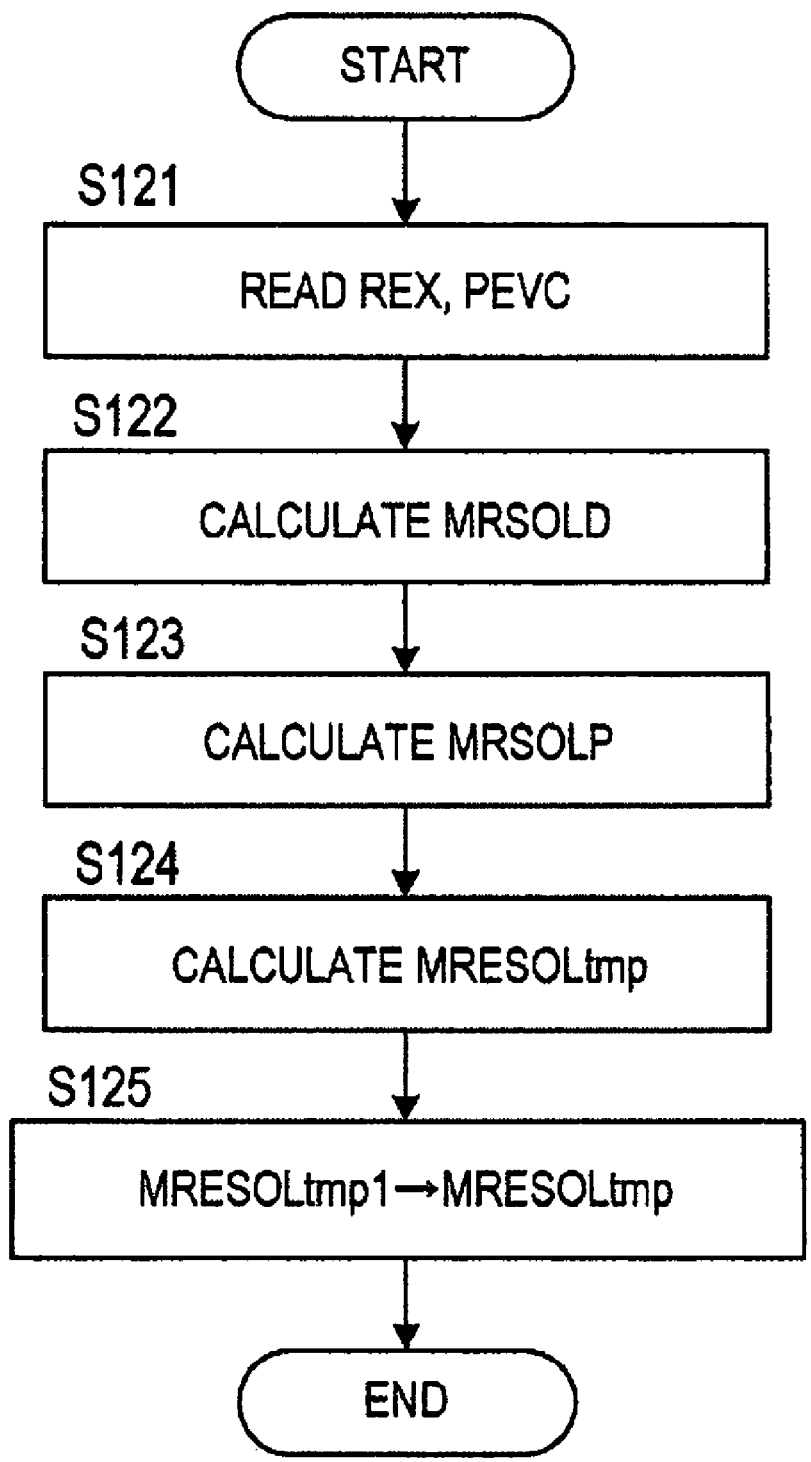
FIG. 19 is a flowchart for calculating an inert gas backflow flow rate during overlap when there is no supercharging and no choking.

In a step S121 of FIG. 19 (a subroutine of the step S89 in FIG. 17), the gas constant REX of the inert gas, calculated in the steps S73, S75 of FIG. 16, and the pressure PEVC of the combustion chamber 5 at the exhaust valve closing timing, are read.

In a step S122, a density value MRSOLD used in an equation to calculate the gas flow rate, to be described hereafter, is calculated on the basis of the gas constant REX of the inert gas and the temperature TEVC of the combustion chamber 5 at the exhaust valve closing timing, read in the step S81 of FIG. 17, using the following equation.

$$MRSOLD=SQRT\{1/(REX \times TEVC)\} \quad (42)$$

Here, the term SQRT on the right side of the equation (42) is a function for calculating the square root of the value in parentheses to the immediate right of SQRT.

It should be noted that when calculation of the square root of the density value MRSOLD is difficult, the calculation result of the equation (42) may be stored in advance in the memory of the engine controller 31 as a map so that the density value MRSOLD can be determined from the gas constant REX and the temperature TEVC in the combustion chamber 5 at the exhaust valve closing timing by searching this map.

In a step S123, a differential pressure value MRSLOP used in the equation to calculate the gas flow rate, to be described hereafter, is calculated on the basis of the inert gas specific heat ratio SHEATR, calculated in the step S84 of FIG. 17, and the intake air/exhaust gas pressure ratio PINBYEX, calculated in the step S102 of FIG. 18, using the following equation.

$$MRSOLP=SQRT[SHEATR/(SHEATR-1) \times \{PTN-BYEX^{\wedge}(2/SHEATR)-PTNBYEX^{\wedge}((SHEATR+1)/SHEATR)\}] \quad (43)$$

In a step S124, the inert gas backflow flow rate MRESOLtmp1 during overlap with no supercharging and no choking is calculated from the density value MRSOLD, the differential pressure value MRSOLP, and the pressure PEVC of the combustion chamber 5 at the exhaust valve closing timing, according to the following equation (the equation for calculating the gas flow rate). Then, in a step S125, the calculated valve is set as the inert gas backflow flow rate MRESOLtmp during overlap.

$$MRESOLtmp1=1.4 \times PEVC \times MRSOLD \times MRSOLP \quad (44)$$

Next, calculation of the inert gas backflow flow rate with no supercharging but with choking will be described using the flow in FIG. 20.

Figure 20:
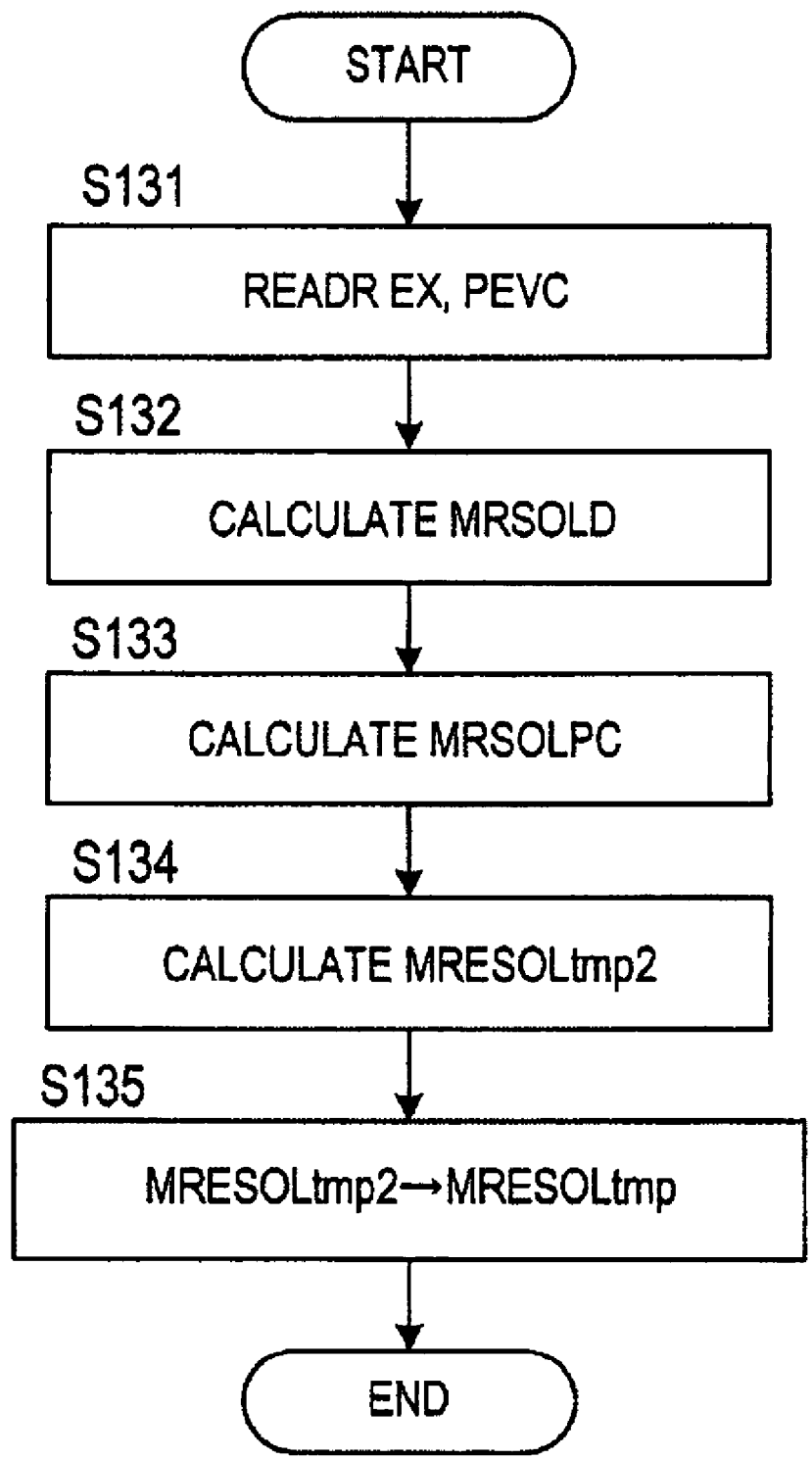
FIG. 20 is a flowchart for calculating an inert gas backflow flow rate during overlap when there is no supercharging but there is choking.

In steps S131, S132 of FIG. 20 (a subroutine of the step S90 in FIG. 17), similarly to the steps S121, S122 of FIG. 19, the gas constant REX of the inert gas and the pressure PEVC of the combustion chamber 5 at the exhaust valve closing timing are read, and the density value MRSOLD is calculated therefrom using the above equation (42).

In a step S133, a differential pressure value MRSLOPC during choking is calculated on the basis of the inert gas specific heat ratio SHEATR, calculated in the step S84 of FIG. 17, using the following equation.

$$MRSOLPC=SQRT[SHEATR \times \{2/(SHEATR+1)\}^{\wedge}\{(SHEATR+1)/(SHEATR-1)\}] \quad (45)$$

It should be noted that when calculation of the power and square root of the equation (45) is difficult, the calculation result of the equation (45) may be stored in advance in the memory of the engine controller 31 as a table of the differential pressure value MRSOLPC during choking so that the differential pressure value MRSOLPC during choking can be determined from the inert gas specific heat ratio SHEATR by searching this map.

In a step S134, the inert gas backflow flow rate MRESOLtmp2 during overlap with no supercharging but with choking is calculated from the density value MRSOLD, the differential pressure value MRSOLPC during choking, and the pressure PEVC of the combustion chamber 5 at the exhaust valve closing timing, according to the following equation. Then, in a step S135, the calculated valve is set as the inert gas backflow flow rate MRESOLtmp during overlap.

$$MRESOLtmp2 = PEVC \times MRSOLD \times MRSOLPC \quad (46)$$

Next, calculation of the inert gas backflow flow rate with supercharging but no choking will be described using the flow in FIG. 21.

Figure 21:
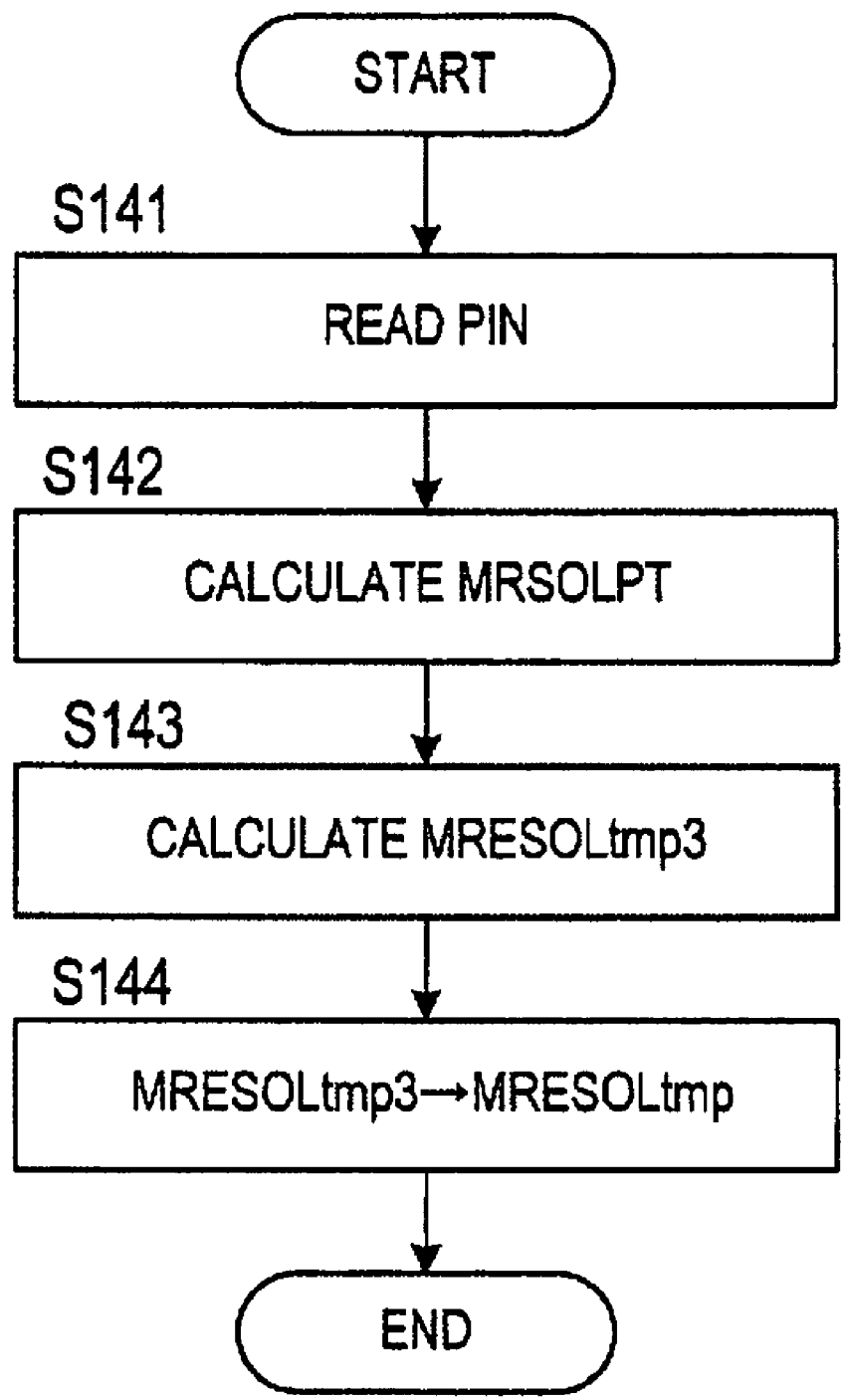
FIG. 21 is a flowchart for calculating an inert gas backflow flow rate during overlap when there is supercharging but no choking.

In a step S141 of FIG. 21 (a subroutine of the step S91 in FIG. 17), the intake air pressure PIN, detected by the intake air pressure sensor 44, is read.

In a step S142, a differential pressure value MRSOLPT during supercharging is calculated from the inert gas specific heat ratio SHEATR, calculated in the steps S106, S107 of FIG. 18, and the intake air/exhaust gas pressure ratio PINBYEX, calculated in the step S102 of FIG. 18, using the following equation.

$$MRSOLPT = SQRT[SHEATR/(SHEATR-1) \times \{PINBYEX^{\hat{}}(-2/SHEATR) - PINBYEX^{\hat{}}(-(SHEATR+1)/SHEATR)\}] \quad (47)$$

It should be noted that when calculation of the power and square root of the equation (47) is difficult, the calculation result of the equation (47) may be stored in advance in the memory of the engine controller 31 as a map of the differential pressure value MRSOLPT during supercharging so that the differential pressure value MRSOLPT during supercharging can be determined from the inert gas specific heat ratio SHEATR and the intake air/exhaust gas pressure ratio PINBYEX by searching this map.

In a step S143, the inert gas backflow flow rate MRESOLtmp3 during overlap with supercharging but no choking is calculated on the basis of the differential pressure value MRSOLPT during supercharging and the intake air pressure PIN using the following equation. Then, in a step S144, the calculated valve is set as the inert gas backflow flow rate MRESOLtmp during overlap.

$$MRESOLtmp3 = -0.152 \times PIN \times MRSOLPT \quad (48)$$

Here, by setting the inert gas backflow flow rate MRESOLtmp3 of the equation (48) to a negative value, the gas flow rate of the air-flow mixture that flows from the intake system to the exhaust system during overlap can be expressed.

Next, calculation of the inert gas backflow flow rate during overlap with both supercharging and choking will be described using the flow in FIG. 22.

Figure 22:
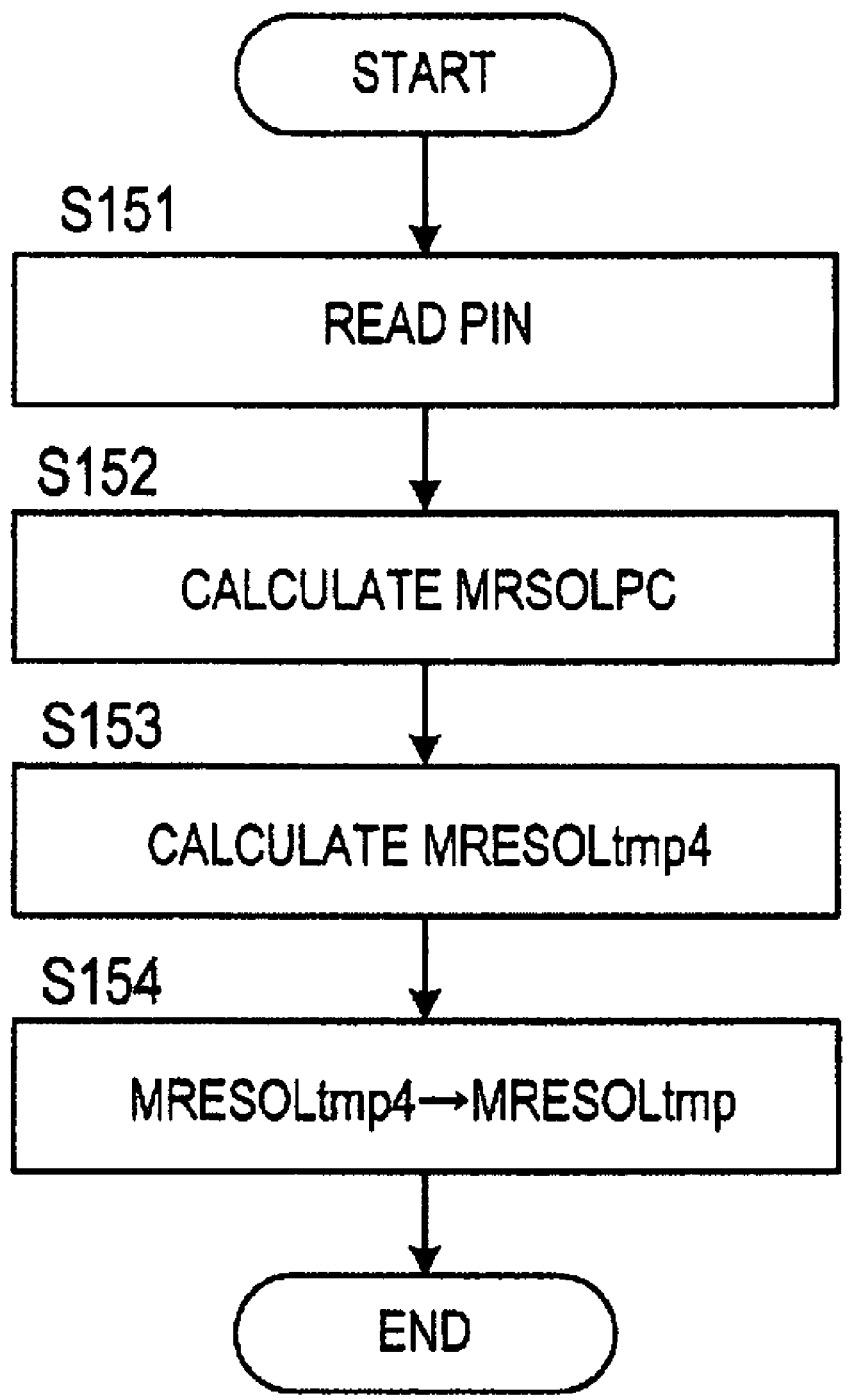
FIG. 22 is a flowchart for calculating an inert gas backflow flow rate during overlap when there is both supercharging and choking.

In steps S151, S152 of FIG. 22 (a subroutine of the step S92 in FIG. 17), the intake air pressure PIN detected by the intake air pressure sensor 44 is read in an identical manner to the step S141 of FIG. 21, and the differential pressure value MRSOLPC during choking is calculated using the above equation (45) in an identical manner to the step S132 of FIG. 20.

In a step S153, the inert gas backflow flow rate MRESOLtmp4 during overlap with both supercharging and choking is calculated on the basis of the differential pressure value MRSOLPC during choking and the intake air pressure PIN using the following equation. Then, in a step S154, the calculated valve is set as the inert gas backflow flow rate MRESOLtmp during overlap.

$$MRESOLtmp4 = -0.108 \times PIN \times MRSOLPC \quad (49)$$

Here, similarly to MRESOLtmp3, by setting the inert gas backflow flow rate MRESOLtmp4 of the equation (49) to a negative value, the gas flow rate of the air-flow mixture that flows from the intake side to the exhaust side during overlap can be expressed.

Once calculation of the inert gas backflow flow rate MRESOLtmp during overlap, divided according to combinations of supercharging and choking, has been calculated, the routine returns to FIG. 17 where, in a step S93, the inert gas backflow amount MRESOL during overlap is calculated from the inert gas backflow flow rate MRESOLtmp during overlap and the cumulative effective surface area ASUMOL during the overlap period, using the following equation.

$$MRESOL = (MRESOLtmp \times ASUMOL \times 60)/(NRPM \times 360) \quad (50)$$

Once calculation of the inert gas backflow amount MRESOL during overlap is complete, the routine returns to FIG. 15 where, in a step S63, the internal inert gas amount MRES is calculated by adding together the inert gas amount MRESCYL in the combustion chamber 5 at the exhaust valve closing timing EVC and the gas backflow amount MRESOL during overlap, or in other words according to the following equation.

$$MRES = MRESCYL + MRESOL \quad (51)$$

As described above, during supercharging, the inert gas backflow flow rate during overlap (MRESOLtmp3, MRESOLtmp4) becomes negative, and therefore the inert gas backflow amount MRESOL during overlap of the equation (50) also becomes negative. At this time, according to the equation (51), the internal inert gas amount is reduced by an amount corresponding to the inert gas backflow amount MRESOL during overlap.

Once calculation of the internal inert gas amount MRES is complete, the routine returns to FIG. 14 where, in a step S54, the internal inert gas amount MRES and the target equivalence ratio TFBYA are used to calculate the internal inert gas ratio MRESFR (the ratio of the internal inert gas amount to the total gas amount in the combustion chamber 5) according to the following equation.

$$MRESFR = MRES/\{MRES + MACYL \times (1 + TFBYA/14.7)\} \quad (52)$$

According to this embodiment, the internal inert gas amount MRES is constituted by the inert gas amount MRESCYL in the combustion chamber 5 at the exhaust valve closing timing and the gas backflow amount MRESOL during overlap of the intake and exhaust valves (step S63 of FIG. 15). The temperature TEVC and pressure PEVC of the combustion chamber 5 at the exhaust valve closing timing are calculated (steps S74, S75 of FIG. 16), and the inert gas amount MRESCYL in the combustion chamber 5 at the exhaust valve closing timing is calculated (step S76 of FIG. 16) on the basis of the temperature TEVC, the pressure PEVC, and the gas constant REX of the inert gas using an equation of state (the equation (37) above). As a result, the inert gas amount MRESCYL in the combustion chamber 5 at the exhaust valve closing timing can be calculated (estimated) with good precision, regardless of the operating conditions, even during a transitional operation in which the quantities of state in the interior of the combustion chamber 5 (PEVC, VEVC, TEVC) change constantly.

Further, the inert gas backflow flow rate during overlap (MRESOLtmp1, MRESOLtmp2) is calculated on the basis of the temperature TEVC and pressure PEVC of the combustion chamber 5 at the exhaust valve closing timing, the gas constant REX and specific heat ratio SHEATR of the inert gas, and the intake air pressure PIN (FIGS. 19, 20), and the gas backflow amount MRESOL during overlap is calculated (step S93 of FIG. 17) by multiplying this gas flow rate by the cumulative effective surface area ASUMOL during overlap. As a result, the gas backflow amount MRESOL during overlap can be calculated (estimated) with good precision.

Since the inert gas amount MRESCYL of the combustion chamber 5 at the exhaust valve closing timing and the gas backflow amount MRESOL during overlap can both be calculated (estimated) with good precision in this manner, the internal inert gas amount MRES, which is the sum thereof, can also be calculated (estimated) with good precision. By using the internal inert gas ratio MRESFR, which is calculated on the basis of the precise estimation of the internal inert gas amount MRES, in the calculation of the temperature TINI of the combustion chamber 5 at the intake valve closing timing IVC (step S13 in FIG. 5), which is used to calculate the ignition timing, the temperature TINI of the combustion chamber 5 at the intake valve closing timing IVC can also be calculated with good precision. Furthermore, by using the precise estimation of the internal inert gas amount MRES in the fuel injection amount control, valve open/close timing (overlap amount) control, and so on, the engine can be controlled appropriately.

Further, the gas constant REX and specific heat ratio SHEATR of the inert gas takes values corresponding to the target equivalence ratio TFBYA (FIGS. 24, 27), and therefore the inert gas amount MRESCYL in the combustion chamber 5 at the exhaust valve closing timing, the gas backflow amount MRESOL during overlap, the internal inert gas amount MRES which is the sum thereof, and the internal inert gas ratio MRESFR based on the internal inert gas amount MRES, can be calculated with good precision even during an operation in which the air-fuel ratio deviates from the stoichiometric air-fuel ratio (for example, a lean operation at a leaner air-fuel ratio than the stoichiometric air-fuel ratio, a cold start-up operation immediately after engine start-up in which the air-fuel ratio is set further to the rich side than the stoichiometric air-fuel ratio in order to stabilize an unstable engine condition, or a full load operation in which the air-fuel ratio is set to the rich side than the stoichiometric air-fuel ratio in response to demands for a large output).

Further, the cumulative effective surface area ASUMOL during the overlap period is set as the surface area of a virtual orifice, and this virtual orifice is envisaged as an orifice through which the exhaust gas flows back from the combustion chamber 5 to the intake system. Hence calculation of the inert gas backflow amount MRESOL during overlap is simplified.

Next, calculation of the knocking limit ignition timing KNOCKcal will be described.

Figure 29:
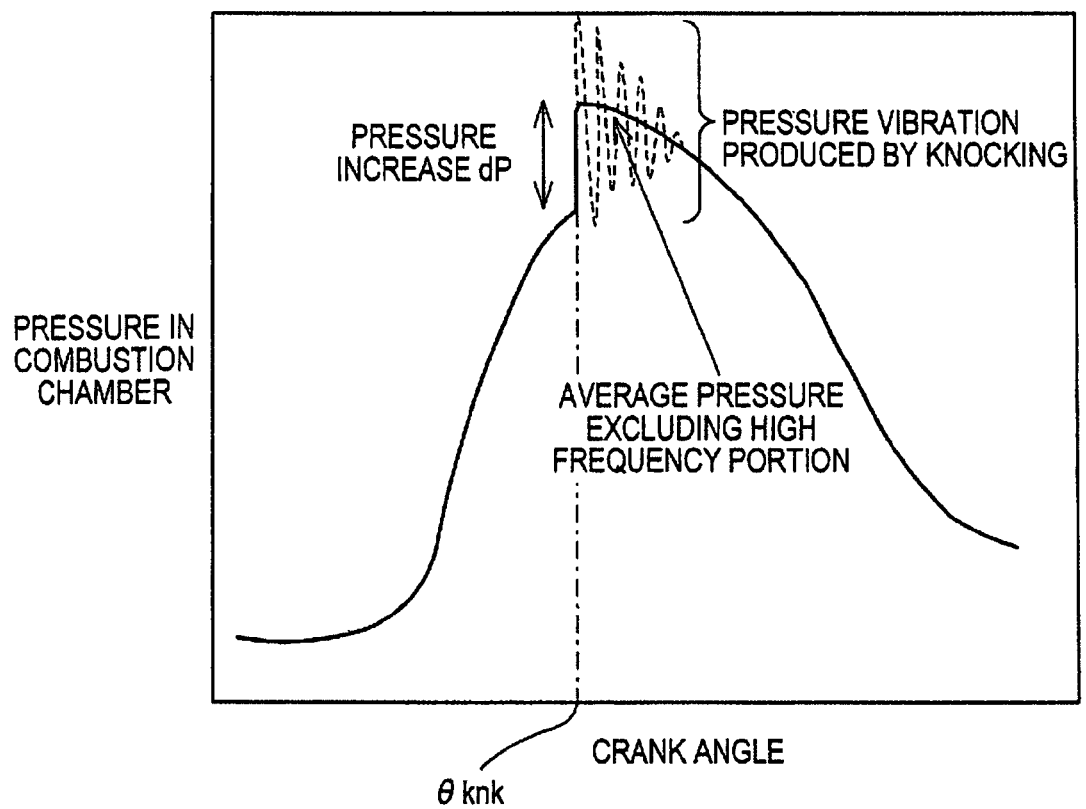
FIG. 29 is a characteristic diagram showing a history of the internal pressure of the combustion chamber during knocking.

First, a newly constructed theory of knocking control will be described. FIG. 29 shows a history of the internal pressure of the combustion chamber 5 during knocking. When an average pressure excluding the high frequency portion is redrawn, the pressure in the combustion chamber 5 rises suddenly at the auto-ignition timing θknk (knocking occurrence timing). This rise in pressure accompanying the occurrence of knocking is believed to come about as a result of constant volume combustion of the unburned air-fuel mixture in the combustion chamber 5, and hence a pressure increase dP is calculated using a thermodynamics formula such as the following.

Assuming that unburned gas of an unburned fuel amount MUB is burned completely through constant volume combustion, the calorific value Q is provided by thermodynamics using the following equation.

$$Q = CF\# \times MUB \tag{53}$$

where CF#: lower calorific value of fuel.

Meanwhile, the temperature of the gas in the combustion chamber 5 rises in accordance with the calorific value Q, and hence by setting the temperature increase as ΔT, the following equation is established.

$$Q = Cv \times M \times \Delta T \tag{54}$$

where M: mass of all gas in combustion chamber 5, and
Cv: specific heat at constant volume of burned gas.

Assuming that the equations (53) and (54) are equal, when the temperature increase ΔT is solved, the following equation is obtained.

$$\Delta T = (CF\# \times MUB)/(Cv \times M) \tag{55}$$

The two sides of the gas equation of state PV=nRT are differentiated (it should be noted, however, that V is constant since this is constant volume change).

$$V \times dP = dn \times R \times T + n \times R \times dT \tag{56}$$

Variation in the mole number n is small during knocking, and hence the following equation is obtained with dn=0 on the right side of the equation (56).

$$dP = (n \times R/V) \times dT \tag{57}$$

By erasing the temperature increase portion dT(=ΔT) from the two equations (57) and (55) and solving the pressure increase dP, the following final equation is obtained.

$$dP = n \times R \times CF\# \times MUB/(V \times Cv \times M) \tag{58}$$

The equation (58) shows that if the unburned fuel amount MUB, the volume V of the combustion chamber 5 at the auto-ignition timing, the specific heat at constant volume Cv of the burned gas, the mass M of all of the gas in the combustion chamber 5, and the total mole number n of all of the gas in the combustion chamber 5 are known, the pressure increase dP can be determined by an equation.

Figure 30A:
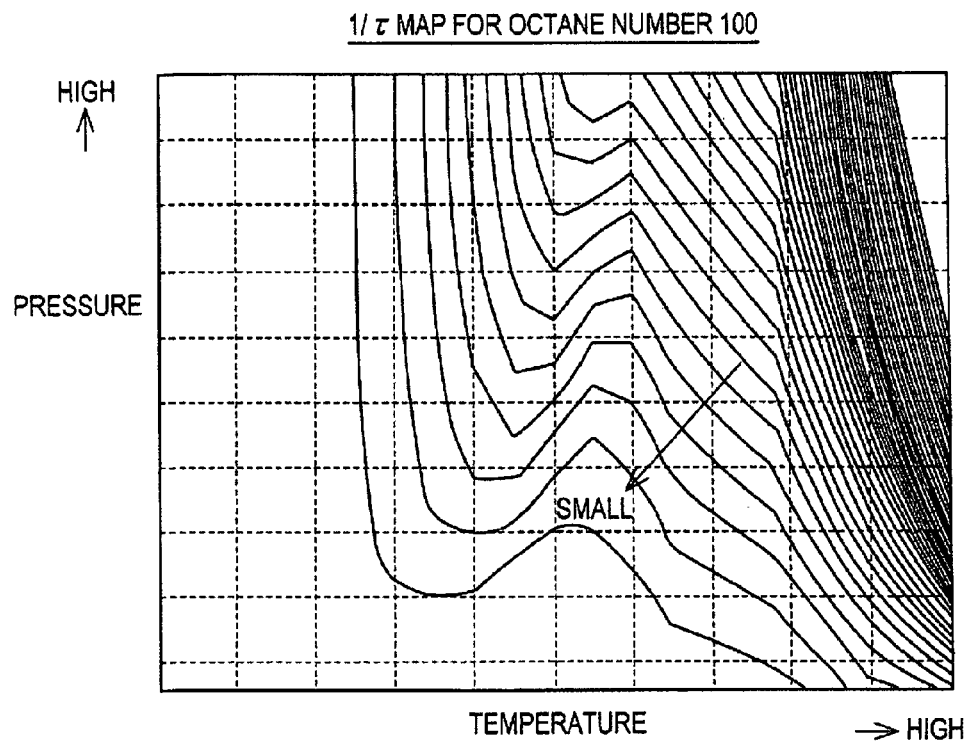
FIG. 30A is a characteristic diagram of $1/\tau$ for fuel having an octane number of 100.
Figure 30B:
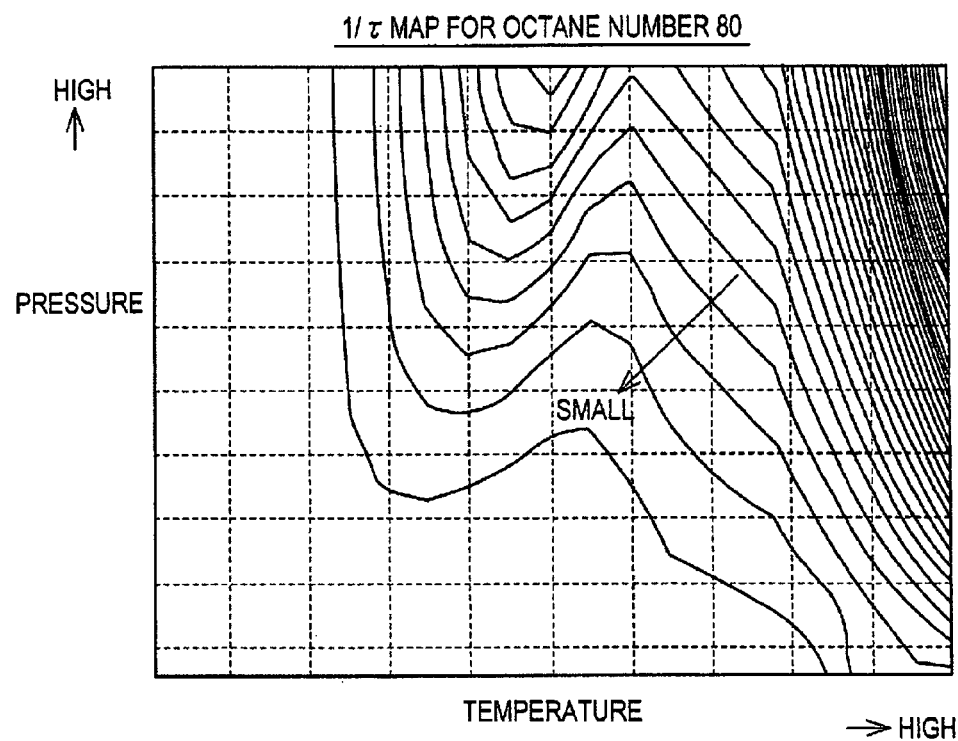
FIG. 30B is a characteristic diagram of $1/\tau$ for fuel having an octane number of 80.

The auto-ignition timing of the combustion chamber 5 can be determined using a well-known method. This well-known method involves calculating the temperature and pressure inside the combustion chamber 5 for each unit crank angle in order to determine the value of 1/τ in relation to the temperature and pressure from FIG. 30A or FIG. 30B, and setting the crank angle at which a cumulative value of 1/τ equals one as the auto-ignition timing θknk. Here, the symbol τ in FIG. 30A or FIG. 30B is the time required for the fuel in the combustion chamber 5 to auto-ignite. By determining the auto-ignition timing θknk, a volume Vknk of the combustion chamber 5 at the auto-ignition timing can be determined from the auto-ignition timing θknk.

In the first embodiment, gasoline is used as the fuel in the first embodiment and the estimated octane number value OCTEST of the fuel is calculated, so the value of 1/τ when using fuel having the estimated octane number value OCTEST must be calculated. For this purpose, the value of 1/τ for fuel having the estimated octane number value OCTEST is calculated on the basis of the value of 1/τ for fuel having an octane number of 100 (maximum octane number), shown in FIG. 30A, and the value of 1/τ for fuel having an octane number of 80 (minimum octane number), shown in FIG. 30B (to be described hereafter).

Figure 31:
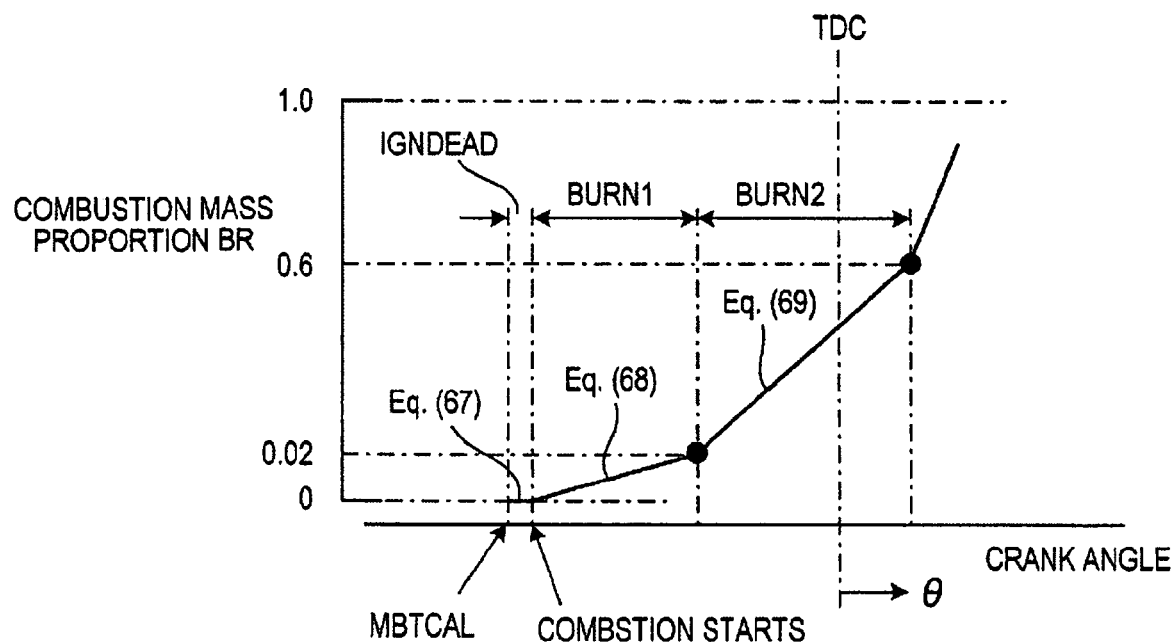
FIG. 31 is a characteristic diagram showing variation in the combustion mass proportion when approximated by a straight line.

Meanwhile, when the auto-ignition timing θknk is known, a combustion mass proportion BRknk at the auto-ignition timing can be determined from FIG. 31. The unburned fuel amount MUB can be determined from the combustion mass proportion BRknk at the auto-ignition timing and a fuel amount QINJ using the following equation. In other words, BRknk is the burned proportion of the fuel amount QINJ, and hence the remaining 1−BRknk is the unburned proportion.

$$MUB = QINJ \times (1 - BRknk) \tag{59}$$

It should be noted that in order to simplify the calculation, FIG. 31 is divided into a combustion start delay period, the initial combustion period, and the main combustion period, and the characteristics of each period are approximated by a straight line. The characteristic of FIG. 31 does not change even when the engine load or rotation speed changes.

Next, the specific heat at constant volume Cv of the burned gas can be calculated in the following manner also using a thermodynamics formula. More specifically, the definition of specific heat at constant pressure Cp is Cp=(δE/δT)p, and by integrating this equation, the following equation is obtained.

$$\int dE = Cp \times \int dT \tag{60}$$

$$\therefore E = Cp \times T \tag{61}$$

The specific heat at constant pressure Cp is obtained from the equation (61) using the following equation.

$$Cp = E/T \tag{62}$$

During isobaric change in an ideal gas, Cp−Cv=R is established, and hence, by erasing the specific heat at constant pressure Cp from this equation and the equation (62) and solving the specific heat at constant volume Cv, the following final equation is obtained.

$$Cv = E/T - R \tag{63}$$

where E: enthalpy, and
T: average temperature in combustion chamber 5 at auto-ignition timing.

The mass M of all of the gas in the combustion chamber 5 in the equation (58) may be calculated using the following equation.

$$M = MRES + MACYL + QINJ \tag{64}$$

where MRES: internal inert gas amount,
MACYL: cylinder fresh air amount, and
QINJ: fuel amount.

Hence the unburned fuel amount MUB, the specific heat at constant volume Cv of the burned gas, and the mass M of all of the gas in the combustion chamber 5 can also be determined respectively using the equations (59), (63), (64). The remaining unknown quantities are the total mole number n of all of the gas in the combustion chamber 5 from the equation (58), and the enthalpy E and average temperature T of the combustion chamber 5 at the auto-ignition timing(=TE) from the equation (63).

Here, the total mole number n of all of the gas in the combustion chamber 5 from the equation (58) and the mole number of each component gas can be determined by calculation using a base equation of the combustion, and the enthalpy E of the equation (63) can be calculated using the mole number of each component gas and an empirical formula. The average temperature TE of the combustion chamber 5 at the auto-ignition timing can also be determined using a thermodynamics formula.

Hence the pressure increase dP produced by knocking is determined almost completely by means of equations in the manner described above, without recourse to tables or maps, and as a result, the experimental processes and time required to create the tables and maps can be reduced greatly.

The pressure increase dP obtained in this manner is then related to the knocking, and dP is converted into an estimated knocking intensity value.

Next, calculation of the knocking limit ignition timing KNOCKcal will be described in detail with reference to the following flowcharts.

Figure 32:
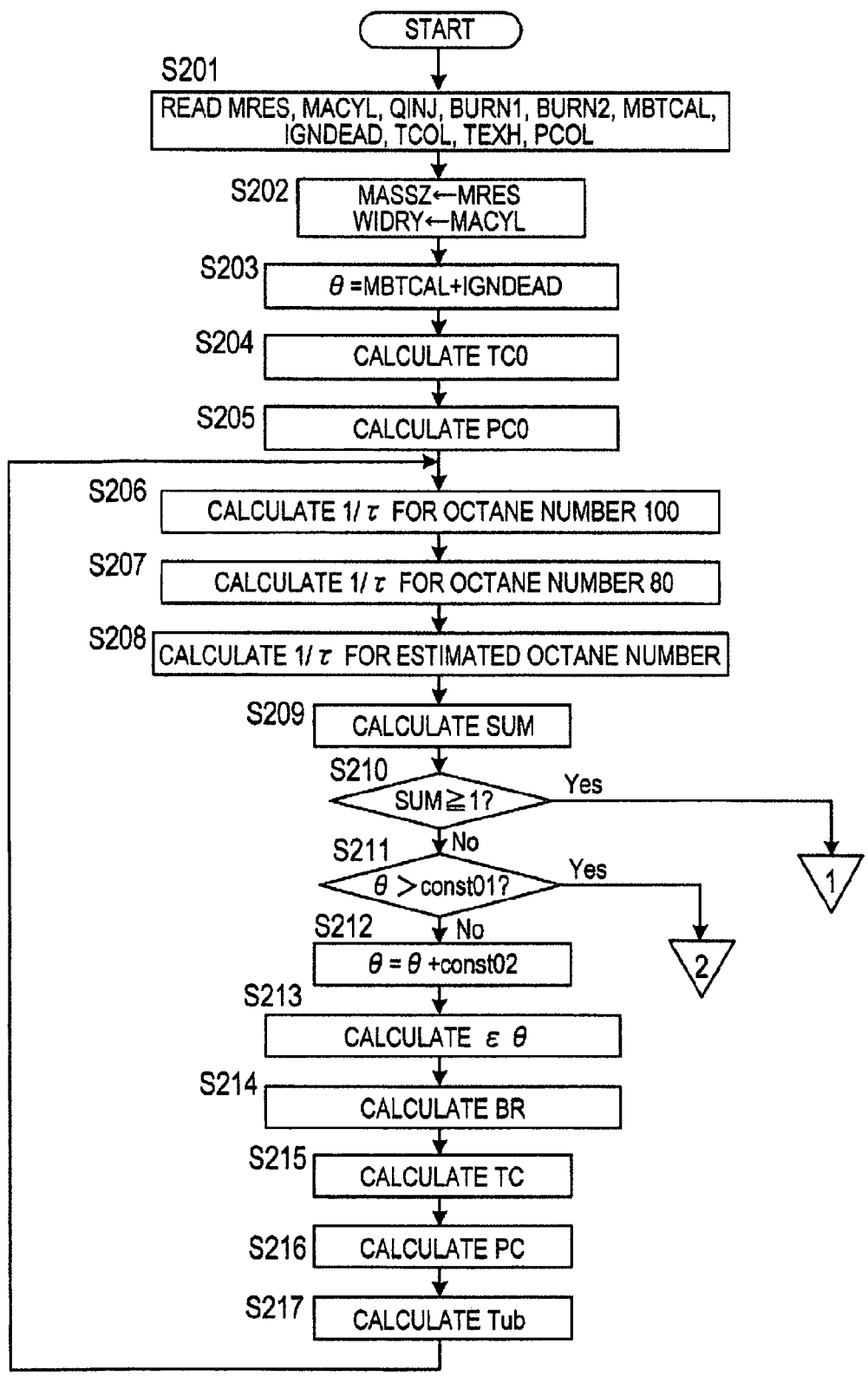
FIGS. 32 and 33 are flowcharts for calculating a knocking limit ignition timing.
Figure 33:
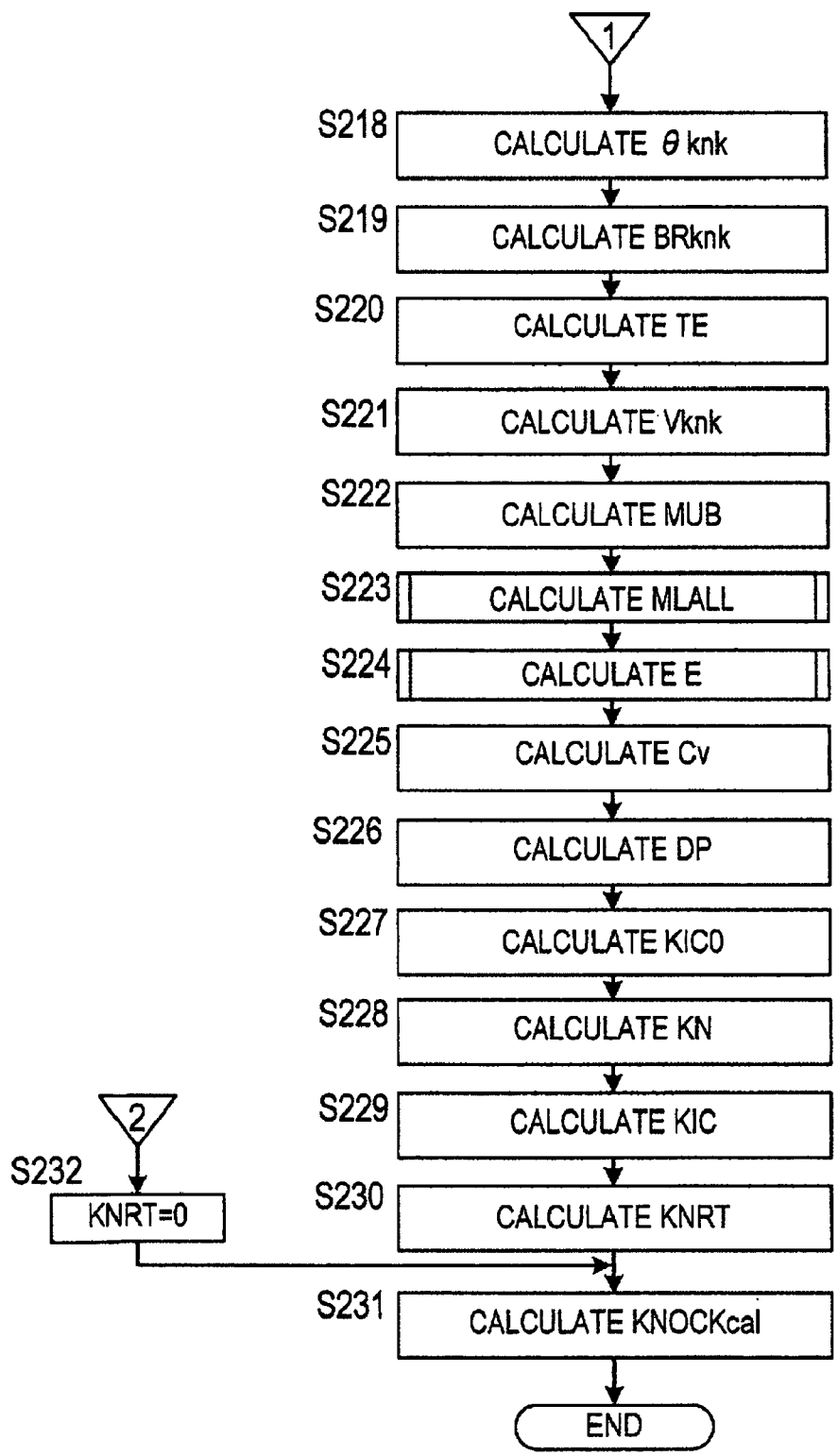

FIGS. 32, 33 (subroutines of the step S2 in FIG. 2) are flows for calculating the knocking limit ignition timing KNOCKcal, executed when the crank angle reaches a predetermined timing (MBTCAL, for example). In parts of the following description, physical quantities already determined in previous flows are again determined, but description thereof has not been omitted.

In a step S201 of FIG. 32, the cylinder fresh air amount MACYL [g] and internal inert gas amount MRES [g] calculated in the steps S52, S53 of FIG. 14, the fuel amount QINJ [g], the initial combustion period BURN1 [deg] calculated in the step S171 of FIG. 10, the main combustion period BURN2 [deg] calculated in the step S191 of FIG. 12, the basic ignition timing MBTCAL [deg BTDC] calculated in the step S43 of FIG. 13, the ignition dead time value IGNDEAD [deg] calculated in the step S17 of FIG. 5, the collector internal temperature TCOL [K] detected by the temperature sensor 43, the exhaust gas temperature TEXH [K] detected by the temperature sensor 45, and the collector internal pressure PCOL [Pa] detected by the pressure sensor 44, are read. The fuel amount QINJ [g] may be determined in proportion to a fuel injection pulse width TI [ms].

In a step S202, the cylinder fresh air amount MACYL [g] is set as WIDRY [g], and the internal inert gas amount MRES [g] is set as MASSZ [g]. WIDRY and MASSZ are adopted for use only in the calculation of a knocking intensity index KNKI, WIDRY denoting the cylinder fresh air amount, and MASSZ denoting the internal inert gas amount.

In a step S203, a value obtained by adding the basic ignition timing MBTCAL [deg BTDC] and the ignition dead time crank angle IGNDEAD [deg] together (in other words, the crank angle at the start of combustion) is set as a crank angle θ [deg BTDC].

In a step S204, a temperature TC0 [K] of the combustion chamber 5 at the start of compression is calculated using the following equation.

$$TC0 = \{(WIDRY + QINJ) \times TCOL + MASSZ \times TEXH\} / (WIDRY + QINJ + MASSZ) \tag{65}$$

Here, the equation has been simplified by equalizing the specific heat of the inert gas and fresh air.

In a step S205, a pressure PC0 [Pa] of the combustion chamber 5 at the start of compression is calculated. The collector internal pressure PCOL at the intake valve closing timing IVC, detected by the pressure sensor 44, may be used as PC0.

In steps S206 to S208, the value of 1/τ for fuel having the estimated octane number value OCTEST is calculated. If a map of 1/τ is provided for each of a plurality of different octane numbers from the maximum octane number to the minimum octane number, the ROM capacity becomes too large, and hence in this case, only a map of 1/τ for fuel having the maximum octane number (100, for example) and a map of 1/τ for fuel having the minimum octane number (80, for example) are provided such that the value of 1/τ for fuel having an octane number (the estimated octane number value OCTEST) between the maximum octane number and minimum octane number is calculated by means of interpolation from the value of $1/\tau$ for fuel having the octane number 100 and the value of $1/\tau$ for fuel having the octane number 80.

More specifically, the value of $1/\tau$ for fuel with the octane number 100 and the value of $1/\tau$ for fuel with the octane number 80 are calculated in the steps S206, S207 from the compression start temperature TC0 and compression start pressure PC0 by searching the maps shown in FIGS. 30A and 30B respectively. As shown in FIGS. 30A and 30B, each value of $1/\tau$ increases as the temperature and pressure increase. Further, when the temperature and pressure are equal, the value of $1/\tau$ for fuel with the octane number 100 tends to be greater than the value of $1/\tau$ for fuel with the octane number 80. Hence, in the step S208, the value of $1/\tau$ for fuel having the estimated octane number value OCTEST is calculated using the following equation (interpolation equation).

$$1/\tau EST = 1/\tau 80 + (OCTEST-80) \times (1/\tau 100 - 1/\tau 80)/(100-80) \quad (66)$$

where $1/\tau$ EST: $1/\tau$ of fuel having estimated octane number value OCTEST, $1/\tau$ 100: $1/\tau$ of fuel with octane number 100, and $1/\tau$ 80: $1/\tau$ of fuel with octane number 80.

Calculation of the estimated octane number value OCTEST will be described below using FIG. 38.

In a step S209, the value of $1/\tau$ for fuel having the estimated octane number value OCTEST is added to SUM. SUM expresses the integrated value of $1/\tau$. The initial value of the integrated value SUM is zero.

In a step S210, the integrated value SUM is compared with one. If the integrated value SUM does not satisfy one, the auto-ignition timing has not been reached, and therefore the routine advance to a step S211, where the current crank angle θ is compared to a predetermined value const01. A crank angle position (90 deg ATDC, for example) at which knocking no longer occurs after ignition is set as the predetermined value const01. When the current crank angle θ does not exceed the predetermined value const01, the routine advances to a step S212, where the crank angle is advanced by a predetermined angle const02 (1 deg, for example).

In a step S213, a momentary compression ratio $\epsilon\theta$ in the combustion chamber 5 is calculated. The momentary compression ratio $\epsilon\theta$ is the inverse of a value obtained by dividing the gap volume Vc of the combustion chamber 5 by the volume of the combustion chamber 5 at the current crank angle θ. The volume of the combustion chamber 5 at the current crank angle θ is determined by the stroke position of the piston 6, or in other words the crank angle of the engine, and therefore a table having the crank angle θ as a parameter may be created in advance so that the volume of the combustion chamber 5 at the current crank angle θ can be determined from the current crank angle θ by searching this table.

In a step S214, the combustion mass proportion BR at the current crank angle θ is calculated. For this purpose, first a crank angle Θ [deg ATDC] for determining the combustion mass proportion is calculated from the current crank angle θ.

In this case, the crank angle Θ is a variable using compression top dead center TDC as a reference value of zero, taking a positive value on the advanced side, and a negative value on the retarded side. When the crank angle Θ [deg ATDC] is used, the combustion mass proportion BR takes the following linear expression.

Combustion delay period;

$$BR=0 \quad (67)$$

Initial combustion period;

$$BR=SS1 \times (\Theta + MBTCAL - IGNDEAD) \quad (68)$$

Main combustion period;

$$BR=0.02 + SS2 \times (\Theta + MBTCAL - IGNDEAD - BURN1) \quad (69)$$

where SS1: 0.02/BURN1, and
SS2: 0.58/BURN2.

Hence the combustion mass proportion is calculated according to the equation (67) when the calculated crank angle Θ is in the combustion delay period, according to the equation (68) when in the initial combustion period, and according to the equation (69) when in the main combustion period.

In steps S215 and S216, an average temperature TC [K] and average pressure PC [Pa] when the fuel in the combustion chamber 5 burns are calculated using the following equation.

$$TC = TC0 \times \epsilon\theta^{\wedge}0.35 + CF\# \times QINJ \times BR/(MASSZ + WIDRY + QINJ) \quad (70)$$

$$PC = PC0 \times \epsilon\theta^{\wedge}1.35 \times TC/TC0/\epsilon\theta^{\wedge}0.35 \quad (71)$$

where $\epsilon\theta$: momentary compression ratio, and
CF#: lower calorific value of fuel.

The equations (70), (71) assume that the gas inside the combustion chamber 5 is adiabatically compressed, and burns at constant volume change. More specifically, the first item on the right side of the equation (70) expresses the temperature following adiabatic compression and the term $PC0 \times \epsilon\theta^{\wedge}1.35$ on the right side of the equation (71) expresses the pressure following adiabatic compression, whereas the second item on the right side of the equation (70) expresses the temperature increase produced by combustion at constant volume change and the term $TC/TC0/\epsilon\theta^{\wedge}0.35$ on the right side of the equation (71) expresses the pressure increase rate produced by combustion at constant volume change.

In a step S217, a temperature Tub of the unburned air-fuel mixture in the combustion chamber 5 is calculated using the following equation.

$$Tub = TC0 \times \epsilon\theta^{\wedge}0.35 \times (PC/PC0/\epsilon\theta^{\wedge}1.35)^{\wedge}(0.35/1.35) \quad (72)$$

The equation (72) assumes a case in which the gas is adiabatically compressed in the combustion chamber 5, and in contrast to the equation (70), that the gas burns at reversible adiabatic change. In other words, the term $TC0 \times \epsilon\theta^{\wedge}0.35$ on the right side of the equation (72) expresses the temperature following adiabatic compression, and the term $(PC/PC0/\epsilon\theta^{\wedge}1.35)^{\wedge}(0.35/1.35)$ on the right side of the equation (72) expresses the temperature increase rate produced by combustion at reversible adiabatic change. It should be noted that the pressure of the unburned air-fuel mixture is assumed to be equal to the average pressure PC in the equation (71).

The difference here between the average temperature TC in the equation (70) and the temperature Tub of the unburned air-fuel mixture in the equation (72) is as follows. The average temperature TC in the equation (70) is a temperature assuming that the heat generated inside the combustion chamber 5 causes the temperature of all of the gas in the combustion chamber 5 to rise. In contrast, the temperature Tub of the unburned air-fuel mixture in the equation (72) is a temperature assuming that the gas in the combustion chamber 5 is divided into burned gas and unburned gas, and the heat generated inside the combustion chamber 5 causes the temperature of only the burned gas to rise. A rapid pressure increase is then produced by auto-ignition of the unburned air-fuel mixture, which leads to knocking.

The routine then returns to the step S206, and in the steps S206, S207, the value of $1/\tau$ for fuel having the octane number 100 and the value of $1/\tau$ for fuel having the octane number 80 is calculated from the unburned air-fuel mixture temperature Tub and the unburned air-fuel mixture pressure(=PC) obtained in the steps S216, S217, instead of the combustion start temperature TC0 and combustion start pressure PC0 used initially, by searching the maps shown in FIGS. 30A, 30B. Then, in the step S208, the value of $1/\tau$ for fuel having the estimated octane number value OCTEST is calculated on the basis of these two $1/\tau$ values using the above equation (66), whereupon the integrated value SUM of $1/\tau$ for fuel having the calculated estimated octane number value OCTEST is integrated in the step S209. The integrated SUM is then compared to one in the step S210, whereupon the current crank angle θ is compared to the predetermined value const01 in the step S211. If the integrated value SUM does not satisfy one and the crank angle θ does not exceed the predetermined value const01, the operation of the steps S212 to S217 is performed to calculate the combustion chamber average pressure PC and the unburned air-fuel mixture temperature Tub, whereupon the operation of the steps S206 to S217 is repeated.

By recalculating the combustion chamber average pressure PC and unburned air-fuel mixture temperature Tub to calculate the value of $1/\tau$ for fuel having the estimated octane number value OCTEST, and integrating this value into the integrated value SUM every time the crank angle θ advances by the predetermined value const02, the integrated value SUM gradually increases toward one in the step S209.

When the integrated value SUM eventually reaches one or more, it is determined that the auto-ignition timing (knocking occurrence timing) has been reached, and the routine advances from the step S210 to a step S218 of FIG. 33, where the crank angle θ at that time is set as the auto-ignition timing θknk.

In a step S219 in FIG. 33, the combustion mass proportion BRknk at the auto-ignition timing is calculated. This calculation may be performed in the following manner: when the auto-ignition timing θknk is within the initial combustion period, the auto-ignition timing θknk is converted into the aforementioned crank angle Θ using compression top dead center TDC as a reference, and the converted crank angle Θ is substituted into the equation (68); and when the auto-ignition timing θknk is within the main combustion period, the auto-ignition timing θknk is converted into the aforementioned crank angle Θ using compression top dead center TDC as a reference, and the converted crank angle Θ is substituted into the equation (69).

In a step S220, an average temperature TE of the combustion chamber 5 at the auto-ignition timing θknk is calculated. Here, the average temperature TC of the combustion chamber 5 obtained by inserting 1.0 as the combustion mass proportion BR on the right side of the equation (70) may be used as the auto-ignition average temperature TE.

In a step S221, a volume Vknk of the combustion chamber 5 at the auto-ignition timing θknk is calculated. Since the volume Vknk of the combustion chamber 5 at the auto-ignition timing θknk is determined by the stroke position of the piston 6 or the crank angle of the engine, similarly to the volume of the combustion chamber 5 at the current crank angle θ, the volume Vknk of the combustion chamber 5 at the auto-ignition timing θknk may be determined from the auto-ignition timing θknk by creating a table having the crank angle θ as a parameter in advance and searching the table.

In a step S222, an unburned fuel amount MUB [g] at the auto-ignition timing is calculated from the fuel amount QINJ [g] and the combustion mass proportion BRknk at the auto-ignition timing using the following equation.

$$MUB = QINJ \times (1-BRknk) \tag{73}$$

The equation (73) is identical to the equation (59).

In a step S223, a total gas mole number MLALL is calculated. This will now be described using the flowchart in FIG. 34.

Figure 34:
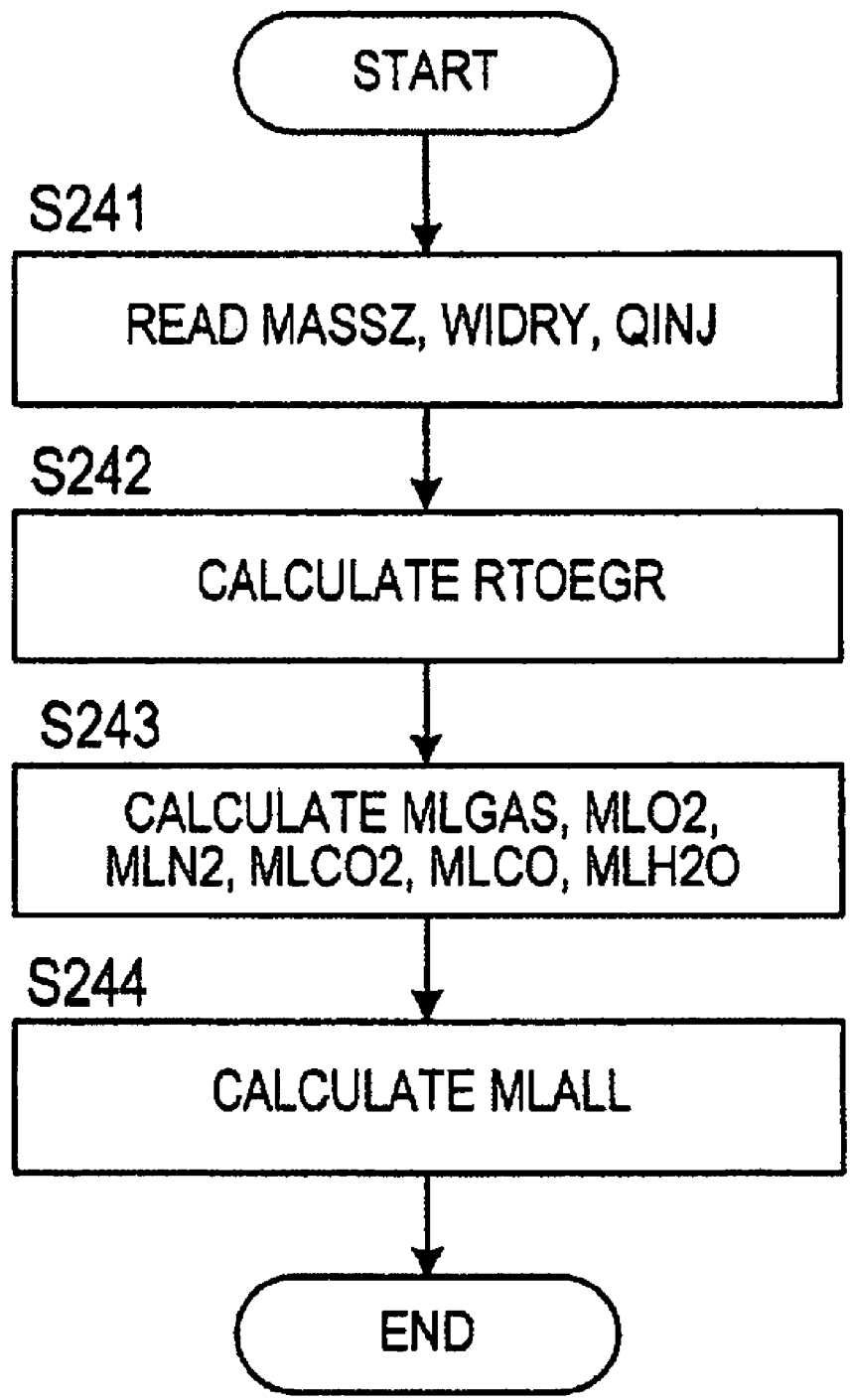
FIG. 34 is a flowchart for calculating a total gas mole number.

In a step S241 of FIG. 34 (a subroutine of the step S223 of FIG. 33), the internal inert gas amount MASSZ [g] and cylinder fresh air amount WIDRY [g], calculated in the step S202 of FIG. 32, are read together with the fuel amount QINJ [g]. In a step S242, an internal inert gas ratio RTOEGR in the combustion chamber 5 is calculated using the following equation.

$$RTOEGR = MASSZ/(MASSZ+WIDRY+QINJ) \tag{74}$$

In a step S243, the mole number of each gas component when the fuel in the combustion chamber 5 has all burned (in other words, when BR=1) is calculated. It should be noted, however, that the gas components other than fuel are limited to $O_2$, $N_2$, $CO_2$, CO, and $H_2O$. The fuel composition of gasoline is approximated by $C_7H_{14}$.

First, a mole number WEDRY [mol] of the total exhaust gas generated upon combustion of the fuel amount QINJ [g] of fuel, and mole numbers XEO2 [mol], XEN2 [mol], XECO2 [mol], XECO [mol], and XEH2O [mol] of the respective gas components $O_2$, $N_2$, $CO_2$, CO, and $H_2O$ in the exhaust gas, are calculated using the following equations.

Total exhaust gas: $WEDRY = MIDRY\# \times WIDRY - QINJ/(B\# \times AC\# + A\# \times AH\#) \times (A\#/4)$ (75)

Oxygen: $XEO2 = \{MIDRY\# \times WIDRY \times 0.21 - QINJ/(B\# \times AC\# + A\# \times AH\#) \times (B\# + A\#/4)\}/WEDRY$ (76)

Carbon dioxide: $XECO2 = \{QINJ/(B\# \times AC\# + A\# \times AH\#) \times B\#\}/WEDRY$ (77)

Carbon monoxide: $XECO = 0$ (78)

Nitrogen: $XEN2 = 1 - XEO2 - XECO2 - XECO$ (79)

Water: $XEH2O = \{MIDRY\# \times WIDRY \times 15/745 + QINJ/(B\# \times AC\# + A\# \times AH\#) \times A\#/2\}/WEDRY$ (80)

where MIDRY#: mole number of fresh air gas per gram,
AH#: molar mass of hydrogen,
AC#: molar mass of carbon, and
A#, B#: constants.

Here, the composition of gasoline is approximated by $C_7H_{14}$, and therefore the constant A# is 14 and the constant B# is 7.

Next, mole numbers WGAS [mol], WEGR [mol], WO2 [mol], WN2 [mol], WCO2 [mol], WCO [mol], and WH2O [mol] of each gas component at the start of the combustion cycle are calculated using the following equations.

Fuel: $WGAS = QINJ/(B\# \times AC\# + A\# \times AH\#)$ (81)

Inert gas: $WEGR = MIDRY\# \times WIDRY \times RTOEGR$ (82)

Oxygen: $WO2 = MIDRY\# \times WIDRY \times 0.21 + WEGR \times XEO2$ (83)

Nitrogen: $WN2 = MIDRY\# \times WIDRY \times 0.89 + WEGR \times XEN2$ (84)

Carbon dioxide: $WCO2 = WEGR \times XECO2$ (85)

Carbon monoxide: $WCO = WEGR \times XECO$ (86)

Water: $WH2O = MIDRY\# \times WIDRY \times 15/745 + WEGR \times XEH2O$ (87)

Next, mole numbers MLGAS [mol], MLO2 [mol], MLN2 [mol], MLCO2 [mol], MLCO [mol], and MLH2O [mol] of each gas component when all of the gas has burned (in other words when BR=1) are calculated using the following equations.

Fuel: $MLGAS = WGAS - QINJ/(B\# \times AC\# + A\# \times AH\#)$ (88)

Oxygen: $MLO2 = WO2 - (B\# + A\#/4) \times QINJ/(B\# \times AC\# + A\# \times AH\#)$ (89)

Nitrogen: $MLN2 = WN2$ (90)

Carbon dioxide: $MLCO2 = WCO2 + B\# \times QINJ/(B\# \times AC\# + A\# \times AH\#)$ (91)

Carbon monoxide: $MLCO = WCO$ (92)

Water: $MLH2O = WH2O + A\#/2 \times QINJ/(B\# \times AC\# + A\# \times AH\#)$ (93)

Thus calculation of the mole number of each gas component when all of the fuel in the combustion chamber 5 has burned (in other words when BR=1) is complete. The routine then advances to a step S244, where the sum total of the mol numbers of each gas component is calculated as the total gas mole number MLALL when all of the fuel in the combustion chamber 5 has burned. In other words, the total gas mole number MLALL is calculated using the following equation.

$MLALL = MLGAS + MLO2 + MLN2 + MLCO2 + MLCO + MLH2O$ (94)

Once calculation of the total gas mole number MLALL is complete, the routine returns to the step S224 of FIG. 33, where a gas enthalpy (the enthalpy of the auto-ignited fuel gas) E [cal/mol] is calculated. Calculation of the enthalpy will now be described using the flowchart in FIG. 35. In a step S251 of FIG. 35 (a subroutine of the step S224 in FIG. 33), the auto-ignition average temperature TE of the combustion chamber 5, calculated in the step S220 of FIG. 33, and the mole numbers MLGAS, MLO2, MLN2, MLCO2, MLCO, and MLH2O of each gas component and the total gas mole number MLALL, calculated in the steps S243 and S244 of FIG. 34, are read.

In a step S252, enthalpy values EO2, EN2, ECO2, ECO, EH2O of each gas component are calculated from the auto-ignition average temperature TE. The enthalpy of each gas component may be calculated using the following Mizutani empirical formula (see Internal Combustion Engines vol. 11 No. 125, p 79).

(1) When TE<1200K $E = A0\# + 1000 \times (A1\# \times (TE/1000) + A2\#/2 \times (TE/1000)^2 + A3\#/3 \times (TE/1000)^3 + A4\#/4 \times (TE/1000)^4 + A5\#/5 \times (TE/1000)^5) + HDL\#$ (95)

(2) When TE>1200K $E = B0\# + 1000 \times (B1\# \times (TE/1000) + B2\# \times LN(TE/1000) - B3\#/(TE/1000) - B4\#/2/(TE/1000)^2 - B5\#/3/(TE/1000)^3) + HDL\#$ (96)

where A0# to A5#, B0# to B5#, and HDL# are compatible values determined through experiment.

In a step S253, an enthalpy EG of the fuel is calculated using the following equation.

$EG = B\#/AC\# \times ECO2 + A\#/AH\# \times EH2O/2 + (B\#/AC\# + A\#/AH\#/4) \times EO2$ (97)

Figure 35:
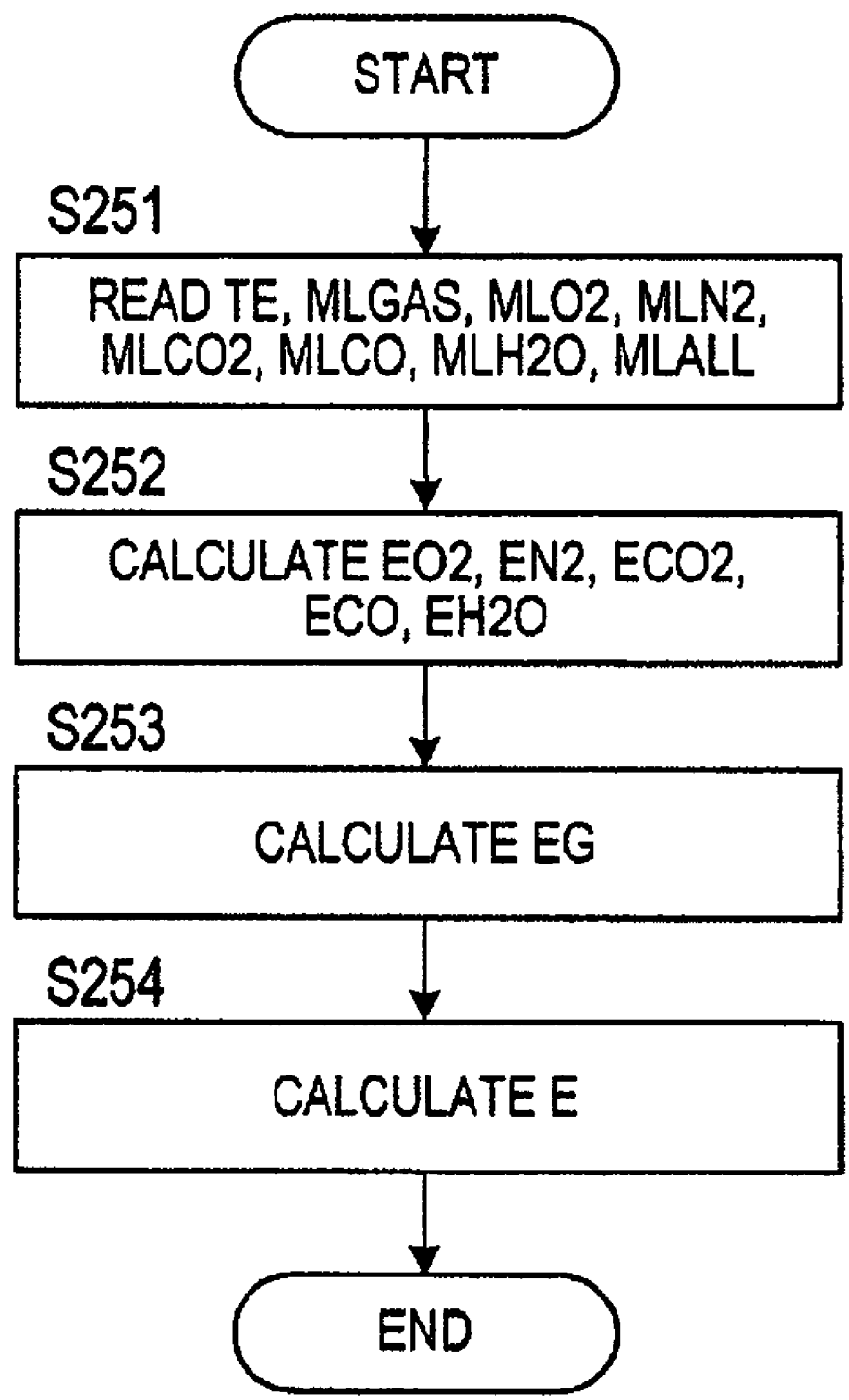
FIG. 35 is a flowchart for calculating a gas enthalpy.

In a step S254, an average enthalpy E of each gas component is calculated using the following equation, whereupon the processing of FIG. 35 ends. The routine then returns to a step S225 of FIG. 33.

$E = (MLGAS \times EG + MLO2 \times EO2 + MLN2 \times EN2 + MLCO2 \times ECO2 + MLCO \times ECO + MLH2O \times EH2O)/MLALL$ (98)

In the step S225 in FIG. 33, the specific heat at constant volume Cv [J/K·g] of the burned gas is calculated from the following equation using the gas enthalpy E and the average temperature TE of the combustion chamber 5 at the auto-ignition timing.

$Cv = E/TE - R\#$ (99)

where R#: universal gas constant.

The equation (99) is obtained by replacing T with TE and R with R# in the equation (63).

In a step S226, a pressure increase produced by auto-ignition, or in other words a pressure increase DP [Pa] produced by knocking, is calculated using the following equation.

$DP = (WALL \times MUB \times R\# \times CF\#)/\{Cv \times Vknk \times (MASSZ + QINJ + WIDRY)\}$ (100)

where CF#: lower calorific value of fuel.

As shown in FIG. 29, the pressure inside the combustion chamber 5 increases in a step when knocking occurs, and the pressure increase DP at this time can be calculated by the equation (100).

The equation (100) is obtained by replacing dP with DP, n with MLALL, R with R#, V with Vknk, and M with MASSZ+WIDRY+QINJ in the equation (58).

In a step S227, a basic estimated knocking intensity value KIC0 is calculated using the following equation.

$KIC0 = \text{correlation coefficient } 1 \times DP$ (101)

Here, the correlation coefficient 1 on the right side of the equation (101) is a coefficient expressing the correlation with the knocking intensity. In this case, the basic estimated knocking intensity value KIC0 increases steadily as the pressure increase DP produced by knocking increases.

Figure 36:
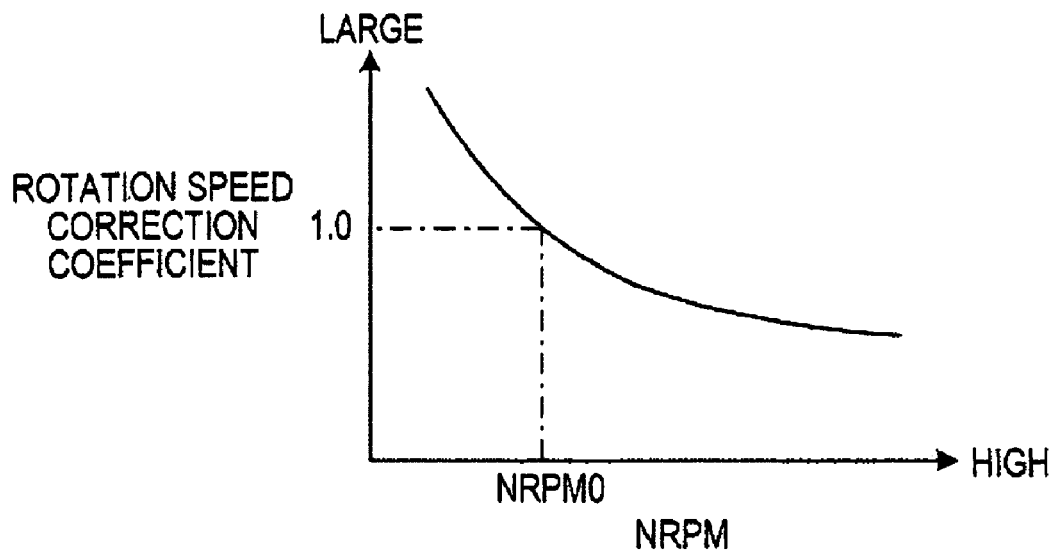
FIG. 36 is a characteristic diagram of a rotation speed correction coefficient.

In a step S228, a rotation speed correction coefficient KN is calculated from the engine rotation speed NRPM by searching a table shown in FIG. 36. In a step S229, an estimated knocking intensity value KIC is calculated by multiplying the rotation speed correction coefficient KN by the basic estimated knocking intensity value KIC0, or in other words according to the following equation.

$KIC = KIC0 \times KN$ (102)

The driver senses the pressure vibration produced by knocking more intensely when the engine rotation speed NRPM is low than when the engine rotation speed NRPM is high, and therefore the rotation speed correction coefficient KN is set to reflect this difference in the estimated knocking intensity value. More specifically, as shown in FIG. 36, the value of KN is set to 1.0 at a reference rotation speed NRPM0, to a value exceeding 1.0 in lower rotation speed regions, and to a value of less than 1.0 in higher rotation speed regions than the reference rotation speed NRPM0. The actual value is obtained through experiment.

In a step S230, a knocking retardation amount KNRT [deg] is calculated using the following equation.

$KNRT = KIC - \text{trace knocking intensity}$ (103)

Figure 37:
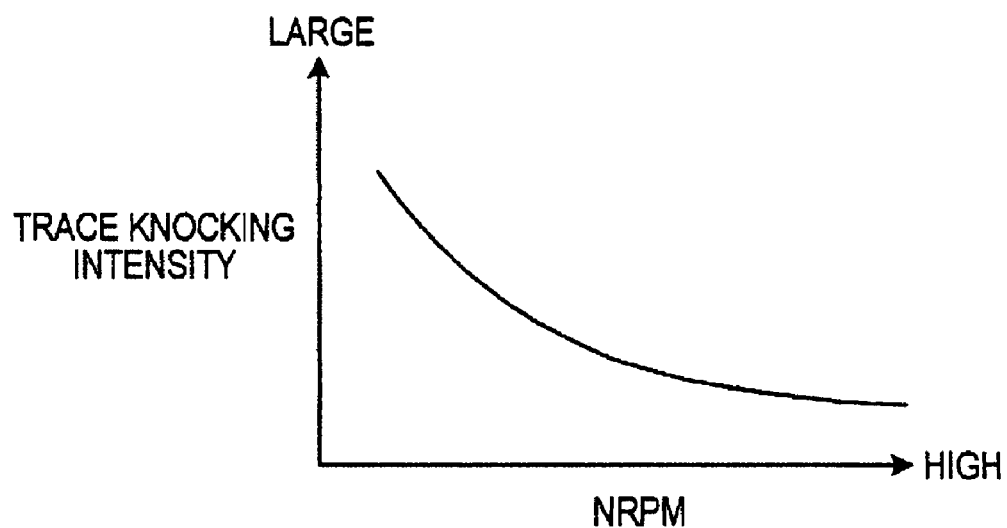
FIG. 37 is a characteristic diagram of a trace knocking intensity.

Here, as is well-known, the trace knocking intensity of the equation (103) is the knocking intensity when slight knocking occurs. The trace knocking intensity is determined from the engine rotation speed NRPM by searching a table shown in FIG. 37.

In a step S231, the knocking limit ignition timing KNOCKcal [deg BTDC] is calculated as a value obtained by subtracting the knocking retardation amount KNRT from the basic ignition timing MBTCAL, or in other words using the following equation.

$$KNOCKcal = MBTCAL - KNRT \quad (104)$$

On the other hand, the integrated value SUM sometimes does not reach one, and at this time, the current crank angle θ eventually exceeds the predetermined value const01 in the step S211 of FIG. 32. In this case, the routine advances from the step S211 of FIG. 32 to a step S232 of FIG. 33, where the knocking retardation amount KNRT is set to zero, and then the operation of the step S231 is executed.

The routine then waits for the crank angle to arrive at the basic ignition timing MBTCAL of the following combustion cycle, whereupon the processing of FIGS. 32 and 33 is executed again. Thus the knocking limit ignition timing KNOCKcal is determined for each combustion cycle.

Once calculation of the knocking limit ignition timing KNOCKcal is complete, the routine returns to a step S3 of FIG. 2, where the smaller of the basic ignition timing MBTCAL [deg BTDC] and the knocking limit ignition timing KNOCKcal [deg BTDC], or in other words the value furthest toward the retarded side, is selected as the minimum ignition timing value PADV. Then, in a step S4, a value obtained by correcting this value according to the water temperature and so on is set as an ignition timing command value QADV [deg BTDC]. If the engine warm-up operation is complete, no corrections according to the water temperature and so on are made, and therefore the ignition timing command value QADV is equal to the minimum ignition timing value PADV.

The ignition timing command value QADV set in this manner is placed in an ignition register in a step S5, and when the actual crank angle matches the ignition timing command value QADV, an ignition signal blocking the primary current is output to the ignition coil 13 by the engine controller 31.

Next, calculation of the estimated octane number value OCTEST of the fuel during an operation will be described using the flowchart in FIG. 38. Estimation of the octane number is performed while determining whether or not knocking is occurring on the basis of a signal from the knocking sensor 47, and therefore the flow of FIG. 38 is executed immediately after every ignition. Here, estimation of the octane number may be executed upon every ignition operation when a predetermined crank angle elapses following input of a reference position signal created from a signal from the crank angle sensor 33, 34.

Figure 38:
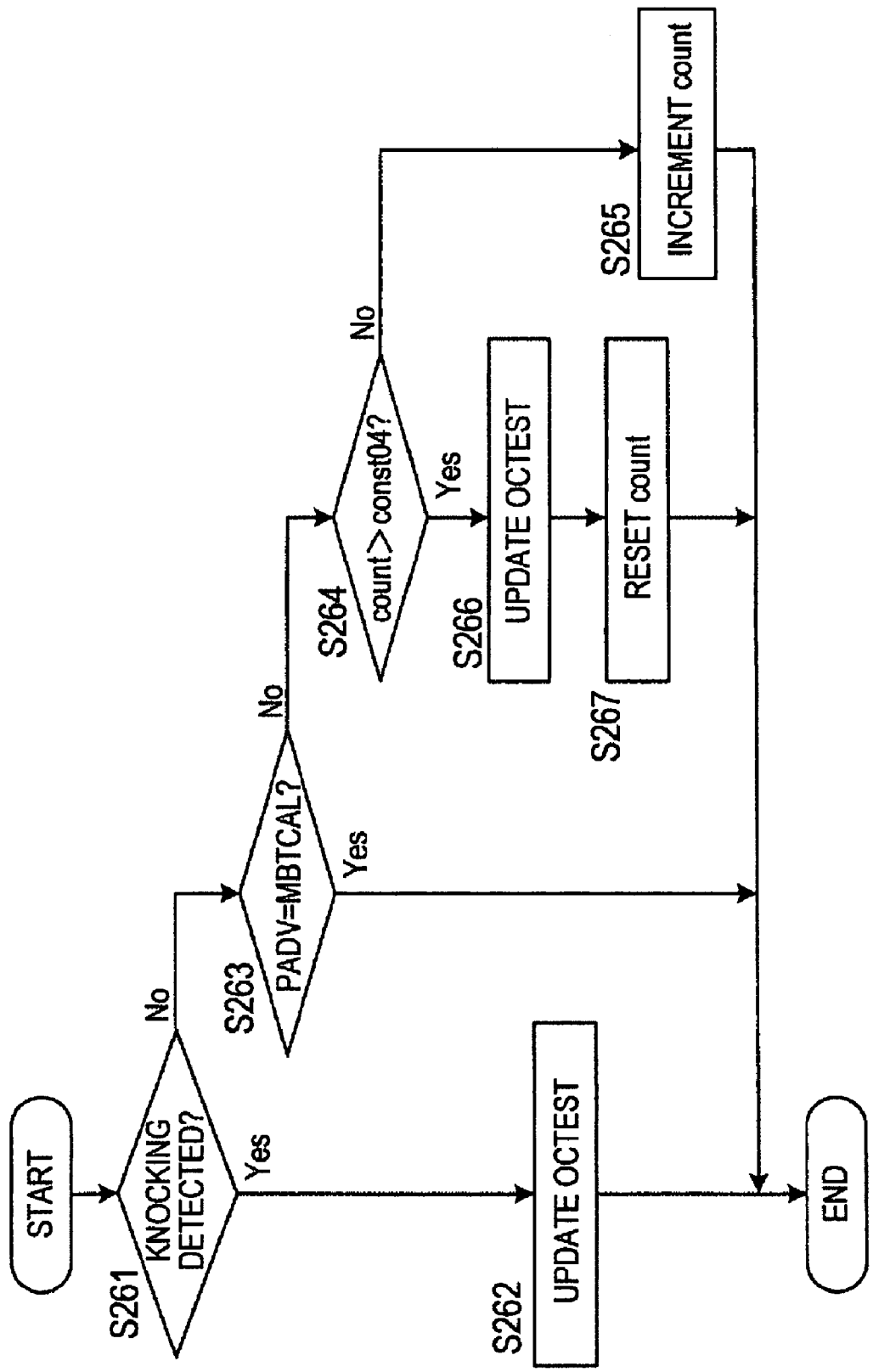
FIG. 38 is a flowchart for calculating an estimated octane number value.

In a step S261 of FIG. 38, a determination is made as to whether or not knocking is occurring using the knocking sensor 47. For example, a voltage value detected by the knocking sensor 47 is compared to a predetermined value, and if the voltage value exceeds the predetermined value, it is determined that knocking is occurring, or in other words that the estimated octane number value OCTEST is greater than the actual octane number. In this case, the routine advances to a step S262, where the estimated octane number value OCTEST is reduced by a first predetermined value const03. In other words, the estimated octane number value OCTEST is updated according to the following equation.

$$OCTEST(\text{new}) = OCTEST(\text{old}) - const03 \quad (105)$$

where OCTEST(new): updated estimated octane number value,

OCTEST(old): pre-update estimated octane number value, and const03: update amount to smaller side.

When knocking is not detected, the routine advances from the step S261 to a step S263, where the minimum ignition timing value PADV [deg BTDC] calculated in the step S3 of FIG. 2 is compared to the basic ignition timing MBTCAL [deg BTDC] calculated in the step S1 of FIG. 2. When the minimum ignition timing value PADV matches the basic ignition timing MBTCAL, the estimated octane number value OCTEST matches the actual octane number. Hence, there is no need to update the estimated octane number value, and therefore the current processing ends as is.

On the other hand, when the minimum ignition timing value PADV does not match the basic ignition timing MBTCAL, the estimated octane number value OCTEST does not match the actual octane number, and as a result it is determined that the ignition timing is retarded. The routine then advances from the step S263 to a step S264, where a counter value count is compared to a predetermined value const04. The initial value of the counter value count is zero, and therefore the first time the routine advances to the step S264, the counter value count is less than the predetermined value const04. At this time, the routine advances to a step S265, where the counter value count is incremented by one. In other words, the counter value count is increased by one every time the flow of FIG. 38 is executed, and hence the counter value count eventually reaches and exceeds the predetermined value const04. At this time, the routine advances from the step S264 to a step S266, where the estimated octane number value OCTEST is increased by a second predetermined value const05. In other words, the estimated octane number value OCTEST is updated according to the following equation.

$$OCTEST(\text{new}) = OCTEST(\text{old}) + const05 \quad (106)$$

where OCTEST(new): updated estimated octane number value,

OCTEST(old): pre-update estimated octane number value, and const05: update amount to larger side.

The estimated octane number value OCTEST is updated every time the counter value count reaches the predetermined value const04, and therefore the counter value count is reset to zero in a step S267.

Figure 39:
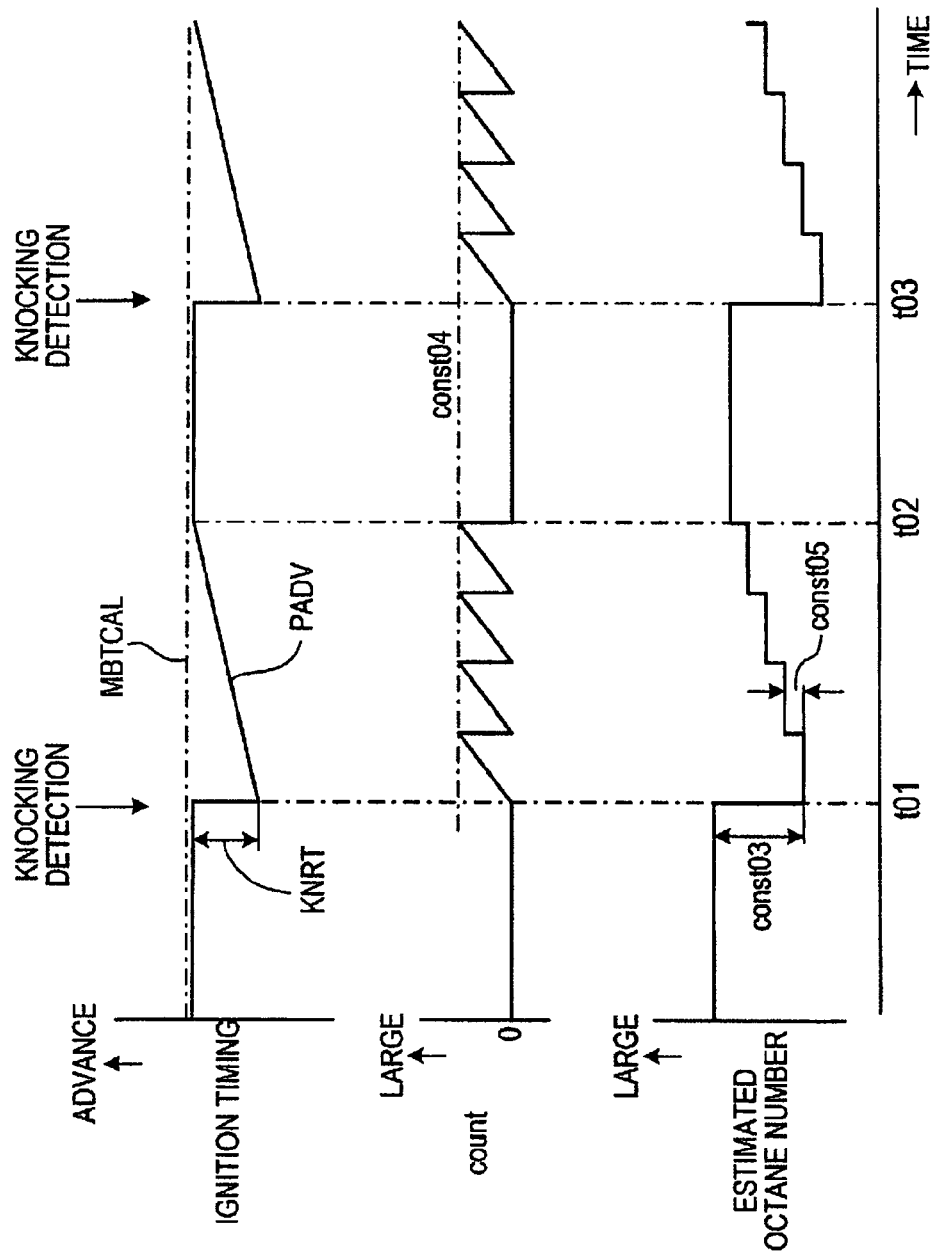
FIG. 39 is a waveform chart showing movement of the estimated octane number value during knocking detection.

FIG. 39 shows movement of the ignition timing, the counter value count, and the estimated octane number value OCTEST. As shown in the drawing, when knocking is detected by the knocking sensor 47 at a timing t01, it is determined that the estimated octane number value OCTEST is greater than the actual octane number, and hence the estimated octane number value OCTEST is reduced in a step by the first predetermined value const03. If, as a result, knocking no longer occurs, the estimated octane number value OCTEST is increased gradually in variations of the second predetermined value const05 every time the counter value count reaches the predetermined value const04. Then, once the minimum ignition timing value PADV has matched MBTCAL at a timing t02, updating of the estimated octane number value OCTEST is halted, and the value at that time is retained. If knocking occurs thereafter at a timing t03, the operation described above is repeated.

The estimated octane number value OCTEST calculated in this manner is used to calculate the value of 1/τ for fuel having the estimated octane number value OCTEST in the step S208 of FIG. 32.

The actions and effects of this embodiment will now be described.

According to this embodiment, when gasoline is used as a fuel, the knocking detection result of the knocking sensor 47 is fed back to the octane number of the fuel rather than the ignition timing (FIG. 38). In other words, as shown in the bottom section of FIG. 39, the estimated octane number value OCTEST is reduced in a step by the first predetermined value const03 when knocking is detected, and then increased gradually, according to a predetermined cycle, in variations of the second predetermined value const05. This movement is identical to the movement of the ignition timing retardation amount in the knocking control of a conventional device.

Thus according to this embodiment, the estimated octane number value OCTEST is calculated on the basis of the knocking detection result produced by the knocking sensor 47 (steps S261, S262, S266 of FIG. 38), the auto-ignition timing θknk (the knocking occurrence timing) in the combustion chamber 5 is predicted on the basis of the estimated octane number value OCTEST (steps S206 to S210 in FIG. 32, step S218 in FIG. 33), and the knocking limit ignition timing KNOCKcal is calculated on the basis of the auto-ignition timing θknk (steps S219 to S231 of FIG. 33). As a result, an operation to retard and then advance the ignition timing in order to avoid knocking, such as that performed in a conventional device in which the knocking detection result of the knocking sensor 47 is fed back to the ignition timing, need not be performed repeatedly, regardless of the operating conditions and even when a commercially available fuel whose octane number cannot be learned in advance is used. The knocking limit ignition timing can be followed even during transitions such as acceleration and deceleration, and hence the fuel economy and output can be prevented from deteriorating.

In the first embodiment, a case was described in which the combustion period (BURN1, BURN2) from the beginning of combustion to a predetermined crank angle is calculated on the basis of the stratified flow combustion speed (SL1, SL2), the volume (V0, VTDC) corresponding to the combustion gas volume, the combustion mass proportion (BR1, BR2), and the reaction probability RPROBA, and the basic ignition timing MBTCAL is calculated on the basis of the combustion period (BURN1, BURN2), as shown in FIGS. 5, 10, 12, 13. However, a base ignition timing map may be provided instead of calculating the basic ignition timing MBTCAL. In this case, the pressure increase amount DP produced by knocking in the combustion chamber 5 is estimated on the basis of the auto-ignition timing θknk (knocking occurrence timing) and the operating conditions (steps S219 to S226 in FIG. 33), the estimated knocking intensity value KIC is calculated on the basis of the pressure increase amount DP (steps S227 to S229 in FIG. 33), the knocking retardation amount KNRT is calculated on the basis of the estimated knocking intensity value KIC (step S230 in FIG. 33), and a value obtained by correcting the basic ignition timing MBTCAL to the retarded side by the knocking retardation amount KNRT is set as the knocking limit ignition timing KNOCKcal (step S231 in FIG. 33). In so doing, although a base ignition timing serving as the basic ignition timing should be provided as a map, the ROM capacity need not be increased, since there is no need to provide base ignition timing maps for each of a plurality of difference octane numbers from the maximum octane number to the minimum octane number.

According to this embodiment, the estimated octane number value OCTEST is calculated on the basis of the knocking detection result (steps S261, S262, S266 in FIG. 38) in response to the fact that the octane number has the greatest influence on knocking when gasoline is used as a fuel. Therefore, even when gasoline with an initially unknown octane number is used as the fuel, the auto-ignition timing θknk (knocking occurrence timing) can be predicted with a high degree of precision.

According to this embodiment, the estimated octane number value OCTEST is updated to the larger side (the side at which knocking occurs) in variations of the second predetermined value const05 (step S266 of FIG. 38) only under conditions in which knocking occurs at the basic ignition timing MBTCAL, or in other words only when the minimum ignition timing value PADV is further retarded than the basic ignition timing MBTCAL (step S263 of FIG. 38). In so doing, the estimated octane number value OCTEST is not updated mistakenly.

According to this embodiment, the stratified flow combustion speed (SL1, SL2), which is the combustion speed of combustion gas in a stratified flow state, is calculated (step S168 in FIG. 10 and step S188 in FIG. 12), the volume (V0, VTDC) of the combustion chamber 5 corresponding to the combustion gas volume is calculated (step S162 in FIG. 10 and step S182 in FIG. 12), the combustion mass proportion (BR1, BR2) of the gas that burns in the combustion chamber 5 up to a predetermined crank angle is calculated (step S171 in FIG. 10, step S191 in FIG. 12), the reaction probability RPROBA, indicating the combustibility of the combustion gas under predetermined operating conditions, is calculated (step S15 in FIG. 5), the combustion period (BURN1, BURN2) from the beginning of combustion to a predetermined crank angle is calculated on the basis of the stratified flow combustion speed (SL1, SL2), the volume (V0, VTDC) corresponding to the combustion gas volume, the combustion mass proportion (BR1, BR2), and the reaction probability RPROBA (step S171 in FIG. 10 and step S191 in FIG. 12), and the basic ignition timing MBTCAL for obtaining MBT is calculated on the basis of the combustion period (BURN1, BURN2) (steps S41 to S43 in FIG. 13). Hence, the knocking limit ignition timing KNOCKcal, which is a value obtained by correcting the basic ignition timing MBTCAL to the retarded side, is calculated on the basis of combustion analysis, and therefore an optimum knocking limit ignition timing KNOCKcal can be calculated regardless of the operating conditions.

Second Embodiment

Figure 40:
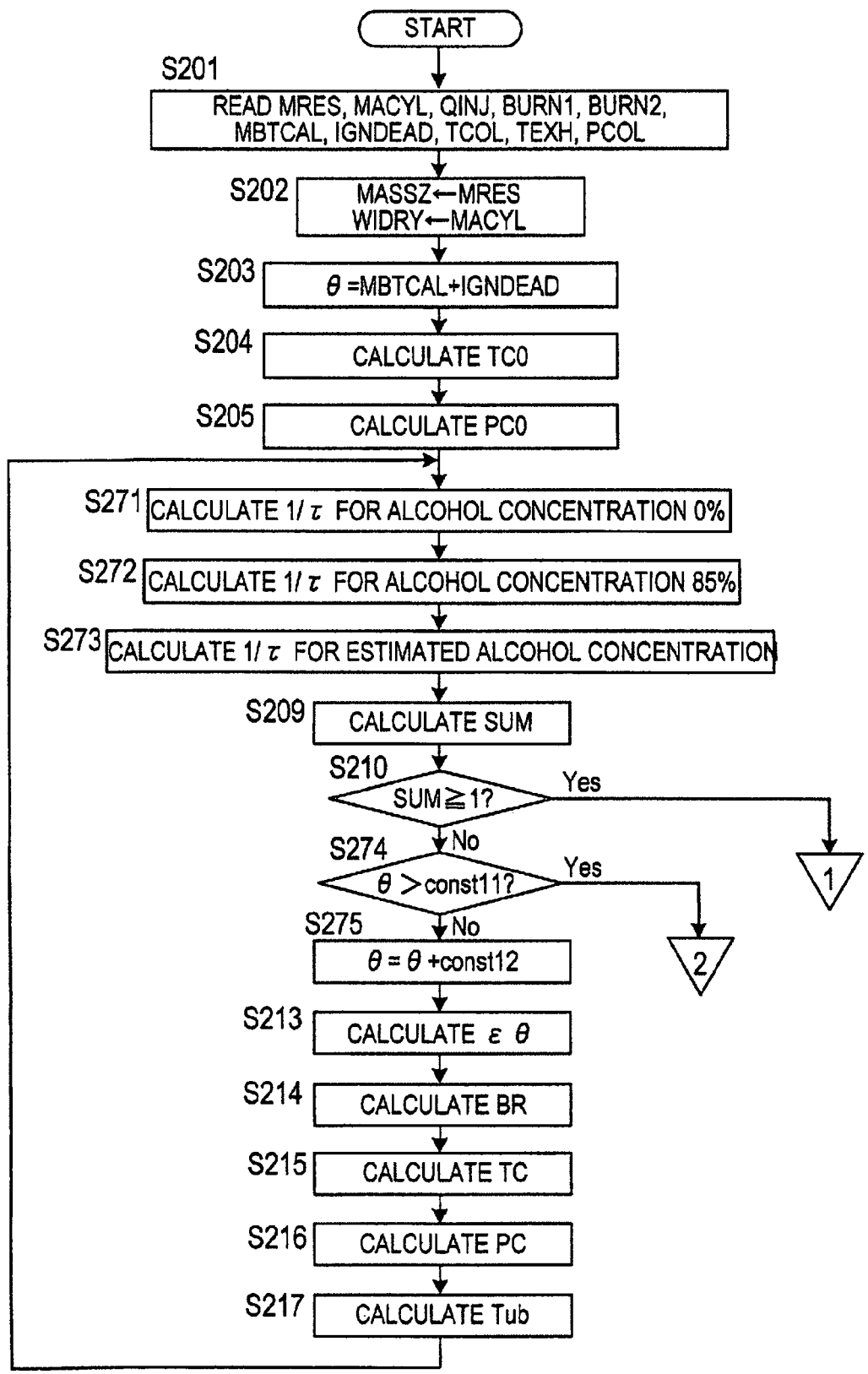
FIG. 40 is a flowchart for calculating the knocking limit ignition timing in a second embodiment.
Figure 42:
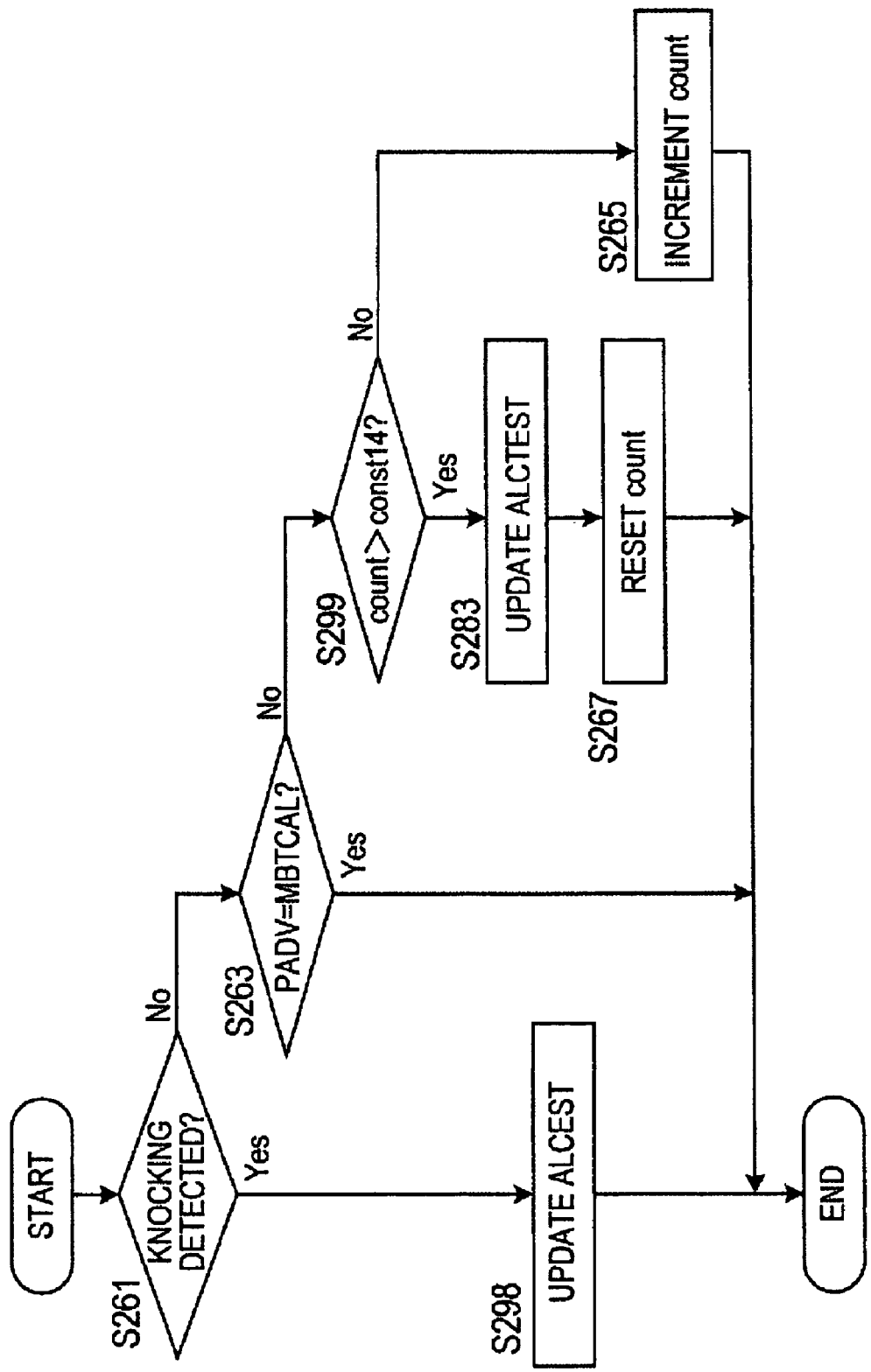
FIG. 42 is a flowchart for calculating an estimated alcohol concentration value in the second embodiment.

The flowcharts in FIGS. 40 and 42 illustrate a second embodiment. FIG. 40 replaces FIG. 32 of the first embodiment, and FIG. 42 replaces FIG. 38 of the first embodiment. In FIG. 40, identical parts to FIG. 32 are allocated identical step numbers, and in FIG. 42, identical parts to FIG. 38 are allocated identical step numbers.

A composite fuel of gasoline and alcohol (fuel containing alcohol) is sometimes used. In this case, the alcohol concentration of the composite fuel is determined during setting of the base ignition timing, and the base ignition timing is matched such that knocking does not occur when a composite fuel having the determined alcohol concentration is used.

However, by performing an operation to retard and then advance the ignition timing repeatedly to avoid knocking which occurs when the alcohol concentration of the composite fuel is different to that of the composite fuel used to match the base ignition timing in overseas markets or the like, for example when the alcohol concentration of the composite fuel is lower than the alcohol concentration of the composite fuel used during the matching, the knocking can be avoided by retarding the ignition timing, but the fuel economy and output deteriorate.

The second embodiment is applied when a composite fuel of alcohol and gasoline is used as a fuel. Accordingly, an estimated alcohol concentration value ALCEST (a knocking-correlated parameter) of the composite fuel is calculated on the basis of the knocking detection result produced by the knocking sensor 47, the auto-ignition timing θknk (knocking occurrence timing) in the combustion chamber 5 is predicted on the basis of the estimated alcohol concentration value ALCEST, and the knocking limit ignition timing KNOCKcal is calculated on the basis of the auto-ignition timing θknk.

To describe the main differences with the first embodiment, in steps S271 to S273 of FIG. 40, the value of 1/τ in relation to a composite fuel having the estimated alcohol concentration value ALCEST is calculated. If maps of the value of 1/τ for a plurality of different alcohol concentrations from a minimum alcohol concentration to a maximum alcohol concentration are prepared, the ROM capacity becomes too large, and therefore here, only a map of 1/τ for fuel having the minimum alcohol concentration (zero percent, for example) and a map of 1/τ for fuel having the maximum alcohol concentration (eighty-five percent, for example) are prepared, whereby the value of 1/τ for a composite fuel having an alcohol concentration (the estimated alcohol concentration value ALCEST) between the minimum alcohol concentration and maximum alcohol concentration is calculated by means of interpolation from the value of 1/τ for fuel with an alcohol concentration of zero percent and the value of 1/τ for fuel with an alcohol concentration of eighty-five percent.

Figure 41A:
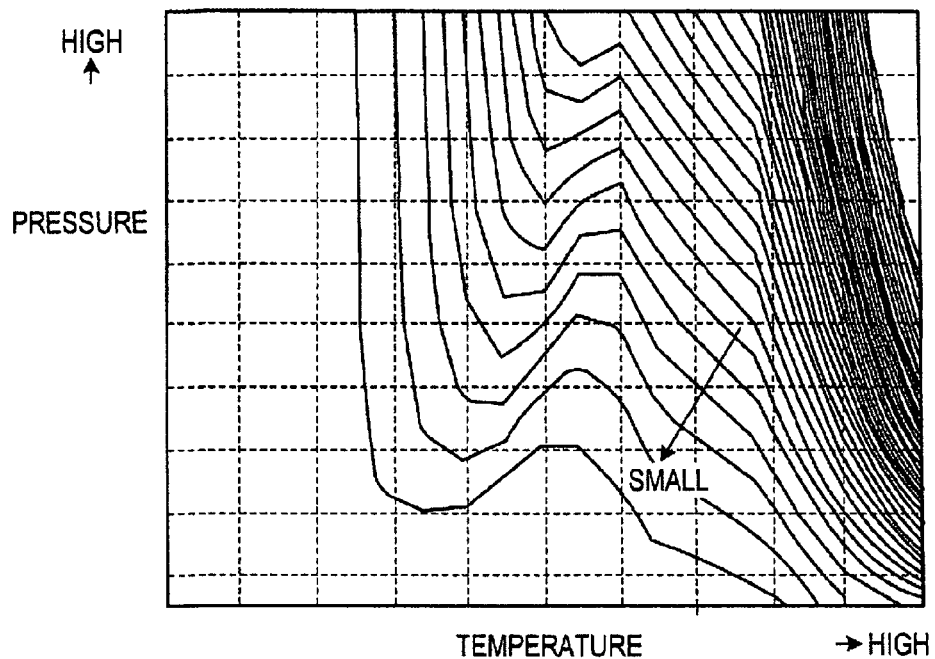
FIG. 41A is a characteristic diagram of $1/\tau$ for a composite fuel having an alcohol concentration of zero percent in the second embodiment.
Figure 41B:
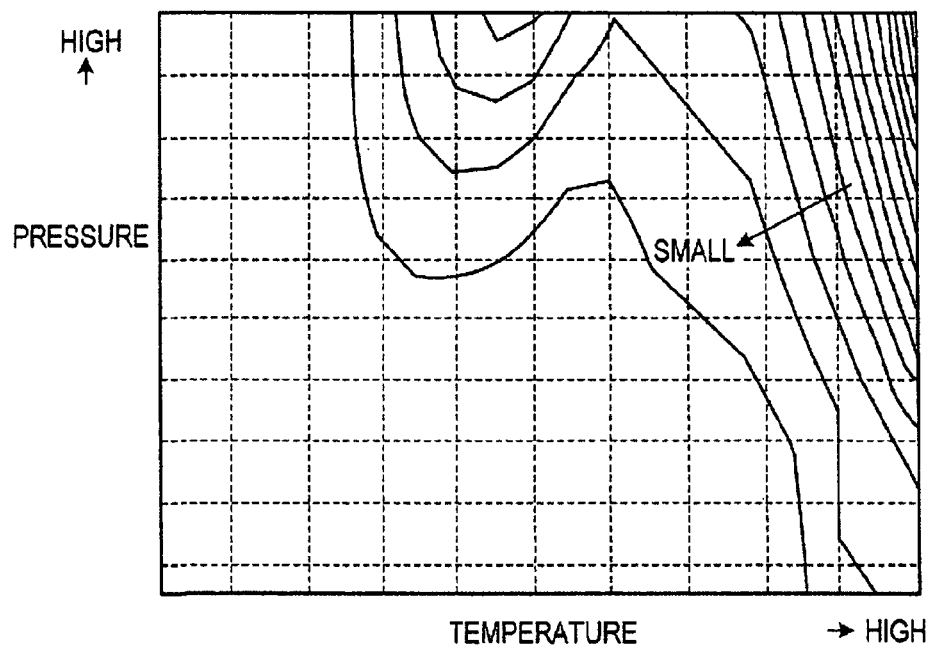
FIG. 41B is a characteristic diagram of $1/\tau$ for a composite fuel having an alcohol concentration of eighty-five percent in the second embodiment.

More specifically, at first the value of 1/τ for composite fuel with an alcohol concentration of zero percent and the value of 1/τ for composite fuel with an alcohol concentration of eighty-five percent are calculated in steps S271, S272 from the compression start temperature TC0 and compression start pressure PC0 by searching maps shown in FIGS. 41A and 41B respectively. As shown in FIGS. 41A and 41B, each value of 1/τ increases as the temperature and pressure increase. Further, when the temperature and pressure are equal, the value of 1/τ for fuel with an alcohol concentration of zero percent tends to be greater than the value of 1/τ for fuel with an alcohol concentration of eighty-five percent. Hence, in a step S273, the value of 1/τ for composite fuel having the estimated alcohol concentration value ALCEST is calculated using the following equation (interpolation equation).

$$1/\tau EST = 1/\tau 85 + (85 - ALCTEST) \times (1/\tau 0 - 1/\tau 85)/(85 - 0) \quad (107)$$

where 1/τEST: 1/τ of composite fuel having estimated alcohol concentration value ALCEST.

1/τ0: 1/τ of composite fuel with alcohol concentration of zero percent, and

1/τ85: 1/τ of composite fuel with alcohol concentration of eighty-five percent.

Calculation of the estimated alcohol concentration value ALCEST will be described hereafter.

In the step S209, the value of 1/τ for composite fuel having the estimated alcohol concentration value ALCEST is added to the integrated value SUM.

Next, when the knocking sensor 47 detects knocking in the step S261 of FIG. 42, it is determined that the estimated alcohol concentration value ALCEST is lower than the actual alcohol concentration. The routine then advances to a step S281, where the estimated alcohol concentration value ALCEST is increased by a first predetermined value const13. In other words, the estimated alcohol concentration value ALCEST is updated according to the following equation.

$$ALCEST(\text{new}) = ALCEST(\text{old}) + const13 \quad (108)$$

where ALCEST(new): updated estimated alcohol concentration value,

ALCEST(old): pre-update estimated alcohol concentration value, and const13: update amount to higher side.

When the minimum ignition timing value PADV does not match the basic ignition timing MBTCAL and the counter value count is equal to or greater than a predetermined value const14 but knocking is not detected, the routine advances from the steps S261, S263, S299 to a step S283, where the estimated alcohol concentration value ALCEST is reduced by a second predetermined value const15. In other words, the estimated alcohol concentration value ALCEST is updated according to the following equation.

$$ALCEST(\text{new}) = ALCEST(\text{old}) - const15 \quad (109)$$

where ALCEST(new): updated estimated alcohol concentration value,

ALCEST(old): pre-update estimated alcohol concentration value, and const15: update amount to lower side.

In steps S274, S275 of FIG. 40 and the step S299 of FIG. 42, predetermined values const11, const12, and const14 take different values to the first embodiment. These predetermined values are matched in advance by a preparatory experiment or the like. It should be noted, however, that the predetermined values const11 and const12 may be identical to the predetermined values const01 and const02 of the first embodiment.

Figure 43:
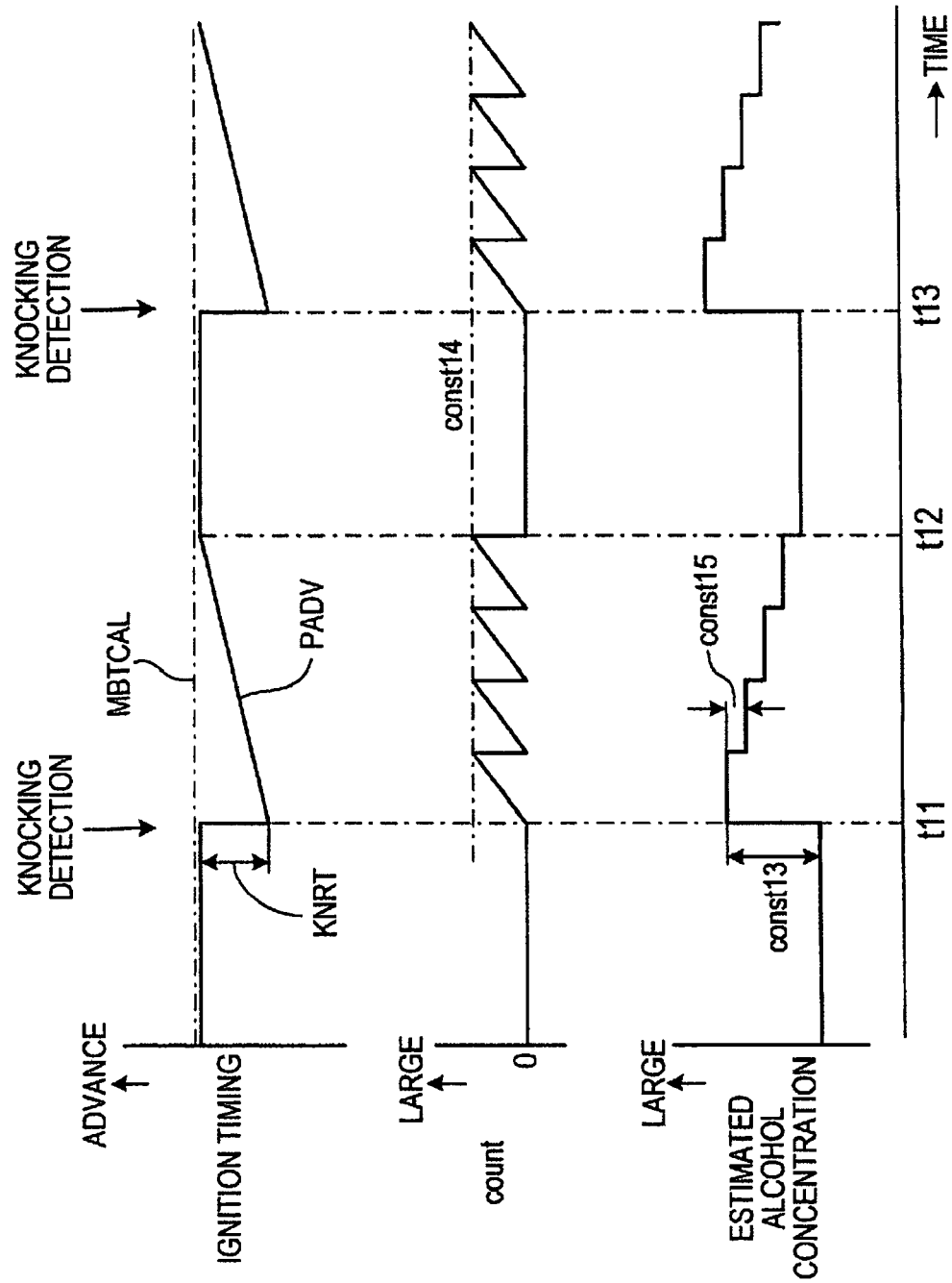
FIG. 43 is a waveform chart showing movement of the estimated alcohol concentration value during knocking detection in the second embodiment.

FIG. 43 shows movement of the ignition timing, the counter value count, and the estimated alcohol concentration value ALCEST. As shown in the drawing, when knocking is detected at a timing t11, it is determined that the estimated alcohol concentration value ALCEST is lower than the actual alcohol concentration, and hence the estimated alcohol concentration value ALCEST is increased in a step by the first predetermined value const13. If, as a result, knocking no longer occurs, the estimated alcohol concentration value ALCEST is reduced gradually in variations of the second predetermined value const15 every time the counter value count reaches the predetermined value const14. Then, once the minimum ignition timing value PADV has matched MBTCAL at a timing t12, updating of the estimated alcohol concentration value ALCEST is halted, and the value at that time is retained. If knocking occurs thereafter at a timing t13, the operation described above is repeated.

The estimated alcohol concentration value ALCEST calculated in this manner is used to calculate the value of 1/τ for fuel having the estimated alcohol concentration value ALCEST in the step S273 of FIG. 40.

According to the second embodiment, when a composite fuel of gasoline and alcohol is used, the knocking detection result of the knocking sensor 47 is fed back to the alcohol concentration of the composite fuel rather than the ignition timing (FIG. 42). In other words, as shown in the bottom section of FIG. 43, the estimated alcohol concentration value ALCEST is increased in a step by the first predetermined value const13 when knocking is detected, and then reduced gradually, according to a predetermined cycle, in variations of the second predetermined value const15. This movement is identical to the movement of the ignition timing retardation amount in the knocking control of a conventional device.

Thus according to the second embodiment, the estimated alcohol concentration value ALCEST is calculated on the basis of the knocking detection result produced by the knocking sensor 47 (steps S261, S298, S283 of FIG. 42), the auto-ignition timing θknk (the knocking occurrence timing) in the combustion chamber 5 is predicted on the basis of the estimated alcohol concentration value ALCEST (steps S271 to S273, S209, and S210 in FIG. 40, step S218 in FIG. 33), and the knocking limit ignition timing KNOCKcal is calculated on the basis of the auto-ignition timing θknk (steps S219 to S231 of FIG. 33). As a result, an operation to retard and then advance the ignition timing in order to avoid knocking, such as that performed in a conventional device in which the knocking detection result is fed back to the ignition timing, need not be performed repeatedly, regardless of the operating conditions and even when a commercially available composite fuel whose alcohol concentration cannot be learned in advance is used. The knocking limit ignition timing can be followed even during transitions, and hence the fuel economy and output can be prevented from deteriorating.

According to the second embodiment, the estimated alcohol concentration value ALCEST is calculated on the basis of the knocking detection result (steps S261, S298, S283 in FIG. 42) in response to the fact that the alcohol concentration of a composite fuel of gasoline and alcohol affects knocking when such a composite fuel is used. Therefore, even when a fuel containing alcohol with an initially unknown alcohol concentration is used as the fuel, the auto-ignition timing θknk (knocking occurrence timing) can be predicted with a high degree of precision.

According to the second embodiment, the estimated alcohol concentration value ALCEST is updated to the lower side (the side at which knocking occurs) in variations of the second predetermined value const15 (step S283 of FIG. 42) only under conditions in which knocking occurs at the basic ignition timing MBTCAL (step S263 of FIG. 42). In so doing, the estimated alcohol concentration value ALCEST is not updated mistakenly.

Third Embodiment

Figure 44:
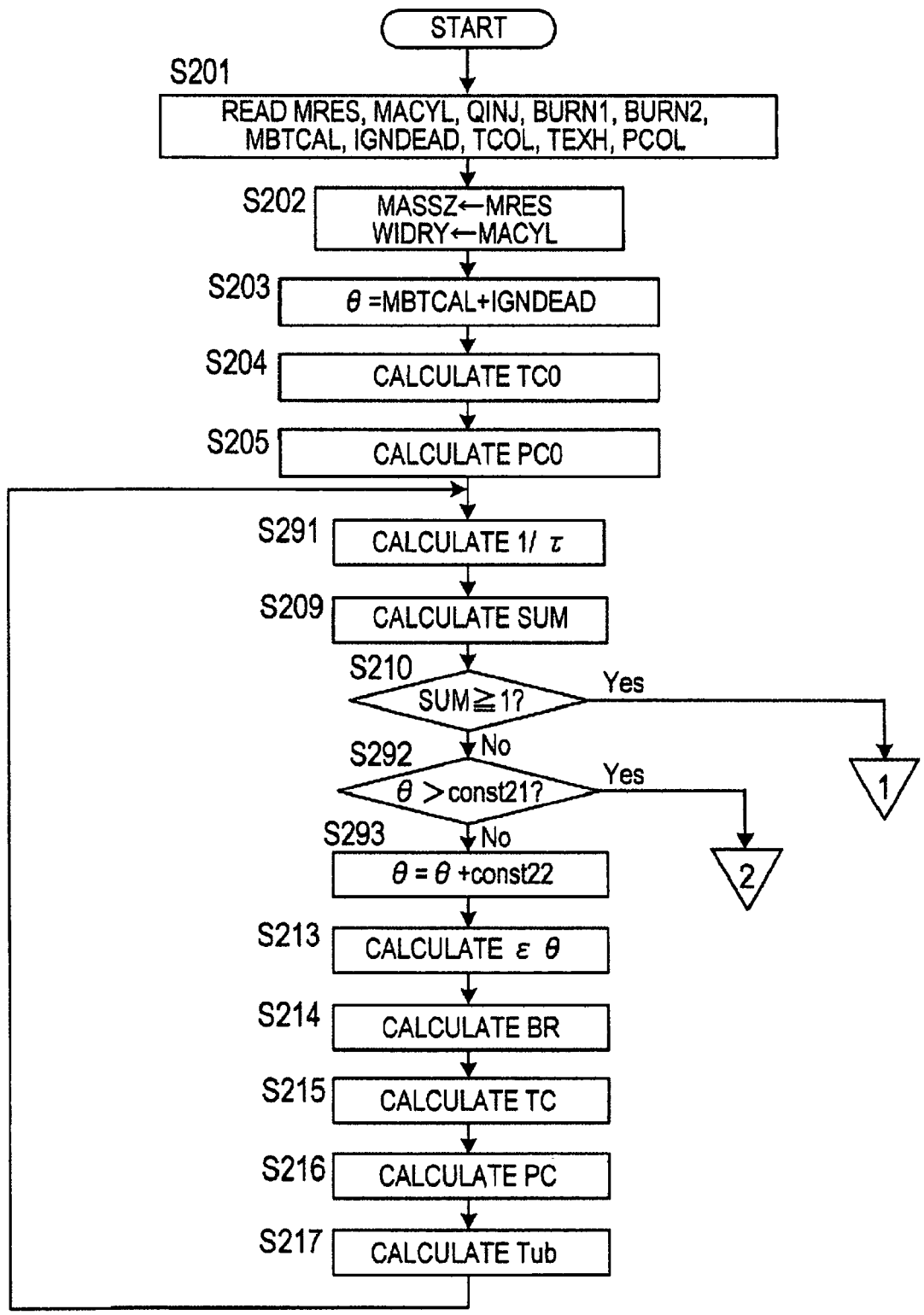
FIG. 44 is a flowchart for calculating the knocking limit ignition timing in a third embodiment.
Figure 45:
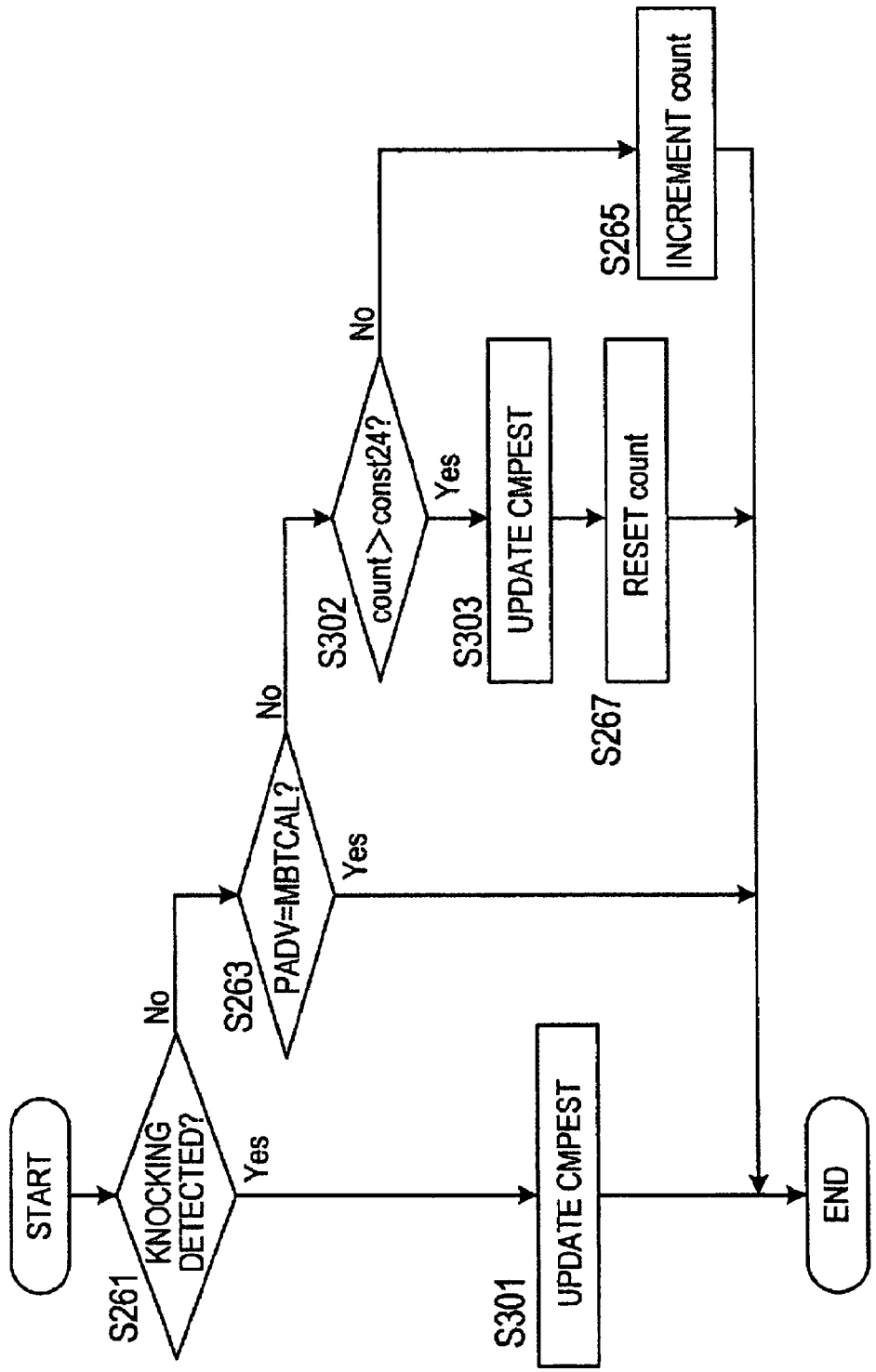
FIG. 45 is a flowchart illustrating calculation of an estimated compression ratio value in the third embodiment.

The flowcharts in FIGS. 44 and 45 illustrate a third embodiment. FIG. 44 replaces FIG. 32 of the first embodiment, and FIG. 45 replaces FIG. 38 of the first embodiment. In FIG. 44, identical parts to FIG. 32 are allocated identical step numbers, and in FIG. 45, identical parts to FIG. 38 are allocated identical step numbers.

The octane number of fuel described in the first embodiment and the alcohol concentration of composite fuel described in the second embodiment are both parameters having a correlation to knocking. However, parameters having a correlation to knocking are not limited thereto, and the compression ratio is also a parameter having a correlation to knocking. When fuel with a predetermined octane number is used, the compression ratio is determined in advance according to the engine specifications, and therefore the base ignition timing is matched to prevent knocking at the compression ratio determined in accordance with the engine specifications. When knocking occurs due to the actual compression ratio being higher than the compression ratio of the engine specifications for some reason, and an operation to retard and then advance the ignition timing is performed repeatedly to prevent this knocking, the fuel economy and output deteriorate.

In the third embodiment, as shown in FIGS. 5, 10, 12, and 13, the combustion period (BURN1, BURN2) from the beginning of combustion to a predetermined crank angle is calculated on the basis of the stratified flow combustion speed (SL1, SL2), the volume (V0, VTDC) corresponding to the combustion gas volume, the combustion mass proportion (BR1, BR2), and the reaction probability RPROBA, the basic ignition timing MBTCAL for obtaining MBT is calculated on the basis of the combustion period (BURN1, BURN2), the combustion period is then divided into the initial combustion period BURN1 and the main combustion period BURN2, and the initial combustion period BURN1 is calculated using the volume V0 of the combustion chamber at the combustion start timing as a volume corresponding to the volume of combustion gas in the combustion chamber. When gasoline having a predetermined octane number (80, for example) is used as the fuel, an estimated value CMPEST of the compression ratio, which serves as a knocking-correlated parameter, is calculated on the basis of the knocking detection result from the knocking sensor 47, and the volume V0 of the combustion chamber 5 at the combustion start timing is calculated on the basis of the estimated compression ratio value CMPEST.

To describe the main differences with the first embodiment, in a steps S291 of FIG. 44, first the value of 1/τ for fuel with the octane number 80 is calculated from the compression start temperature TC0 and compression start pressure PC0 by searching the map shown in FIG. 30B, regardless of the estimated compression ratio value CMPEST to be described below. The calculated value of 1/τ for fuel having the octane number 80 is then added to the integrated value SUM in a step S209.

Next, when the knocking sensor 47 detects knocking in the step S261 of FIG. 45, it is determined that the estimated compression ratio value CMPEST is smaller than the actual compression ratio. The routine then advances to a step S301, where the estimated compression ratio value CMPEST is increased by a first predetermined value const23. In other words, the estimated compression ratio value CMPEST is updated according to the following equation.

$$CMPEST(\text{new}) = CMPEST(\text{old}) + const23 \quad (110)$$

where CMPEST(new): updated estimated compression ratio value,
CMPEST(old): pre-update estimated compression ratio value, and
const23: update amount to larger side.

When the minimum ignition timing value PADV does not match the basic ignition timing MBTCAL and the counter value count is equal to or greater than a predetermined value const24 but knocking is not detected, the routine advances from the steps S261, S263, S302 to a step S303, where the estimated compression ratio value CMPEST is reduced by a second predetermined value const25. In other words, the estimated compression ratio value CMPEST is updated according to the following equation.

$$CMPEST(\text{new}) = CMPEST(\text{old}) - const25 \quad (111)$$

where CMPEST(new): updated estimated compression ratio value,
CMPEST(old): pre-update estimated compression ratio value, and
const25: update amount to smaller side.

In steps S292, S293 of FIG. 44 and the step S302 of FIG. 45, predetermined values const21, const22, and const24 take different values to the first embodiment. These predetermined values are matched in advance by a preparatory experiment or the like. However, the predetermined values const21 and const22 may be identical to the predetermined values const01 and const02 of the first embodiment.

In the third embodiment, the volume VIVC of the combustion chamber 5 at the intake valve closing timing and the volume V0 of the combustion chamber 5 at the combustion start timing (MBTCYCL) are calculated on the basis of the estimated compression ratio value CMPEST calculated in the manner described above. This will be now be described using the flowcharts in FIGS. 46 and 47.

Figure 46:
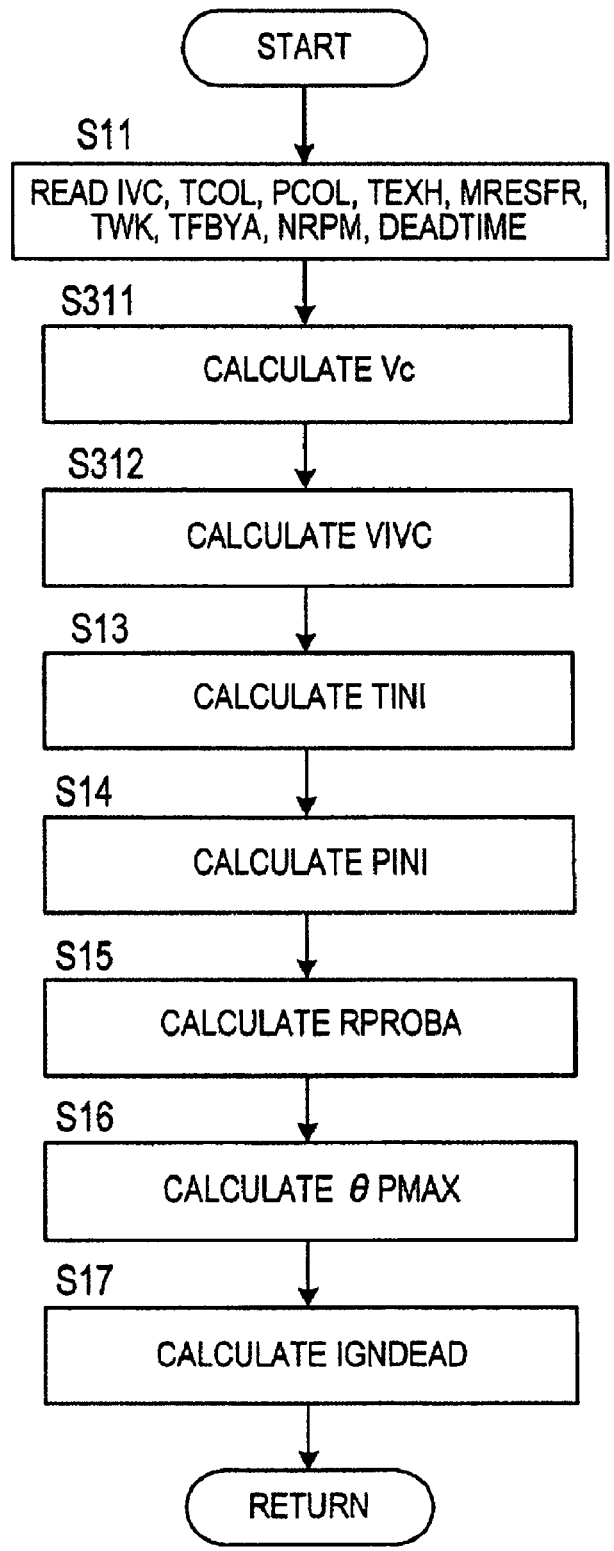
FIG. 46 is a flowchart for calculating physical quantities in the third embodiment.
Figure 47:
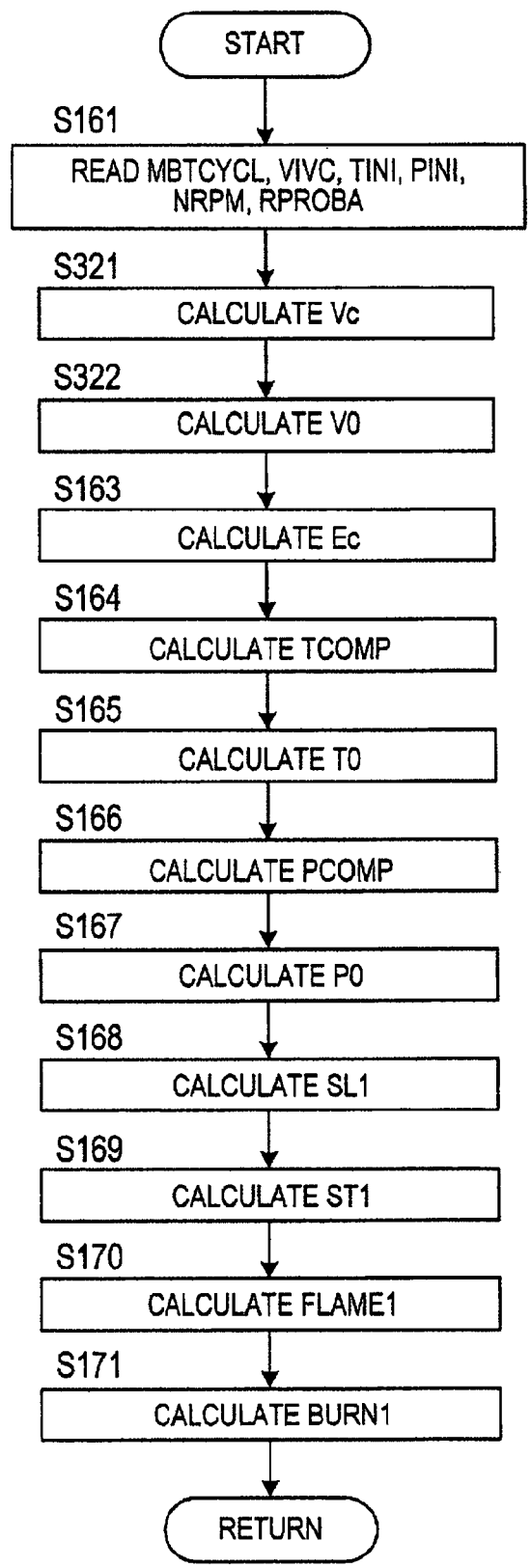
FIG. 47 is a flowchart for calculating the initial combustion period in the third embodiment.

The flowcharts of FIGS. 46 and 47 replace FIGS. 5 and 10 of the first embodiment. In FIG. 46, identical parts to FIG. 5 are allocated identical step numbers, and in FIG. 47, identical parts to FIG. 10 are allocated identical step numbers.

To describe the main differences with the first embodiment, in a step S311 of FIG. 46, the gap volume Vc [m$^3$] is calculated using the following equation.

$$Vc=\{1/(CMPEST-1)\}\times(\pi/4)D^2\cdot Hx \tag{112}$$

where CMPEST: estimated compression ratio value,
D: cylinder bore diameter [m], and
Hx: difference between maximum value and minimum value of distance of piston pin 76 from TDC [m].

The equation (112) replaces the equation (3) of the first embodiment. In the first embodiment, the compression ratio ϵ of the equation (3) is assumed to be constant, whereas in the third embodiment, the compression ratio is set as the variable estimated compression ratio value CMPEST.

In a step S312, the volume VIVC of the combustion chamber 5 at the intake valve closing timing is calculated using the determined gap volume Vc, according to the following equation.

$$VIVC=Vc+(\pi/4)D^2\cdot Hivc \tag{113}$$

where D: cylinder bore diameter, and
Hivc: distance of piston pin 76 from TDC at intake valve closing timing [m].

This equation (113) is identical to the equation (2) of the first embodiment.

Next, in a step S321 of FIG. 47, the gap volume Vc [m$^3$] is calculated using the above equation (112), and in a step S322, the volume V0 of the combustion chamber 5 at the combustion start timing (MBTCYCL) is calculated using the gap volume Vc, according to the following equation.

$$V0=Vc+(\pi/4)D^2\cdot Hmbtcycl \tag{114}$$

where D: cylinder bore diameter, and
Hmbtcycl: distance of piston pin 76 from TDC at combustion start timing (MBTCYCL) [m].

According to the third embodiment, when fuel with a predetermined octane number, the octane number 80 here, is used, the knocking detection result of the knocking sensor 47 is fed back to the compression ratio rather than the ignition timing (FIG. 45). Accordingly, the movement of the estimated compression ratio value CMPEST is similar to the movement of the estimated alcohol concentration value ALCTEST shown in the bottom section of FIG. 43. More specifically, when knocking occurs, it is determined that the estimated compression ratio value CMPEST is lower than the actual compression ratio, and hence the estimated compression ratio value CMPEST is increased in a step by the first predetermined value const23. If, as a result, knocking no longer occurs, the estimated compression ratio value CMPEST is then reduced gradually in variations of the second predetermined value const25 every time the counter value count reaches the predetermined value const24. Then, once the minimum ignition timing value PADV has matched MBTCAL, updating of the estimated compression ratio value CMPEST is halted, and the value at that time is retained. If knocking reoccurs thereafter, the operation described above is repeated. The volume VIVC of the combustion chamber 5 at the intake value closing timing and the volume V0 of the combustion chamber 5 at the combustion start timing (MBT-CYCL) are calculated on the basis of the fluctuating estimated compression ratio value CMPEST.

Hence, according to the third embodiment, the estimated compression ratio value CMPEST is calculated on the basis of the knocking detection result produced by the knocking sensor 47 (steps S261, S301, S303 of FIG. 45), and the volume V0 of the combustion chamber 5 at the combustion start timing, which is used to calculate the initial combustion period BURN1, is calculated on the basis of the estimated compression ratio value CMPEST (steps S321, S322 of FIG. 47). As a result, an operation to retard and then advance the ignition timing in order to avoid knocking, such as that performed in a conventional device in which the knocking detection result is fed back to the ignition timing, need not be performed repeatedly, regardless of the operating conditions and even when fuel having the octane number 80 (fuel having a predetermined octane number) is used and, for some reason, the actual compression ratio increases beyond the compression ratio of the engine specifications. The knocking limit ignition timing can be followed even during transitions such as acceleration and deceleration, and hence the fuel economy and output can be prevented from deteriorating.

Moreover, according to the third embodiment, a determination is made as to whether or not knocking is actually occurring in the combustion chamber 5, the estimated compression ratio value CMPEST is calculated on the basis of this knocking detection result, the volume V0 of the combustion chamber 5 at the combustion start timing is calculated on the basis of the estimated compression ratio value CMPEST (steps S321, S322 in FIG. 47), the combustion period (BURN1, BURN2) from the beginning of combustion to a predetermined crank angle is calculated on the basis of the volume V0 at the combustion start timing, and the basic ignition timing MBTCAL for obtaining MBT is calculated on the basis of the combustion period (BURN1, BURN2). In so doing, the initial combustion period BURN1, and accordingly the basic ignition timing MBTCAL, can be calculated with a high degree of precision even when fuel having the octane number 80 (fuel having a predetermined octane number) is used and, for some reason, the actual compression ratio is higher than the compression ratio of the engine specifications.

According to the third embodiment, the estimated compression ratio value CMPEST is updated to the smaller side (the side at which knocking occurs) in variations of the second predetermined value const25 (step S303 of FIG. 45) only under conditions in which knocking occurs at the basic ignition timing MBTCAL (step S263 of FIG. 45). In so doing, the estimated compression ratio value CMPEST is not updated mistakenly.

According to the third embodiment, as shown in FIG. 47, when the effective compression ratio Ec from the intake valve closing timing IVC to the combustion start timing is calculated on the basis of the volume VIVC of the combustion chamber 5 at the intake value closing timing and the volume V0 of the combustion chamber 5 at the combustion start timing (S163 of FIG. 47), the temperature T0 of the combustion chamber 5 at the combustion start timing and the pressure P0 of the combustion chamber 5 at the combustion start timing are calculated from the temperature TINI of the combustion chamber 5 at the intake valve closing timing and the effective compression ratio Ec, and the pressure PINI of the combustion chamber 5 at the intake valve closing timing and the effective compression ratio Ec, respectively (steps S164 to S167 in FIG. 47), and the stratified flow combustion speed SL1, used to calculate the initial combustion period BURN1, is calculated on the basis of the temperature T0 and pressure P0 of the combustion chamber 5 at the combustion start timing (step S168 of FIG. 47), the volume VIVC of the combustion chamber 5 at the intake valve closing timing is calculated on the basis of the estimated compression ratio value CMPEST (steps S311, S312 of FIG. 46). In so doing, the volume VIVC of the combustion chamber 5 at the intake valve closing timing can be calculated with a high degree of precision even when fuel having a predetermined octane number is used and, for some reason, the actual compression ratio is higher than the expected compression ratio.

In the third embodiment, a case was described in which the auto-ignition timing θknk (knocking occurrence timing) is predicted on the basis of a characteristic expressing the distribution of an inverse of the time required for the fuel in the combustion chamber to auto-ignite. However, the knocking occurrence timing may be detected by the knocking sensor.

In the third embodiment, a case was described in which a fuel having a predetermined octane number is used, but the third embodiment may also be applied to a case in which a composite fuel having a predetermined alcohol concentration is used.

Fourth Embodiment

Figure 48:
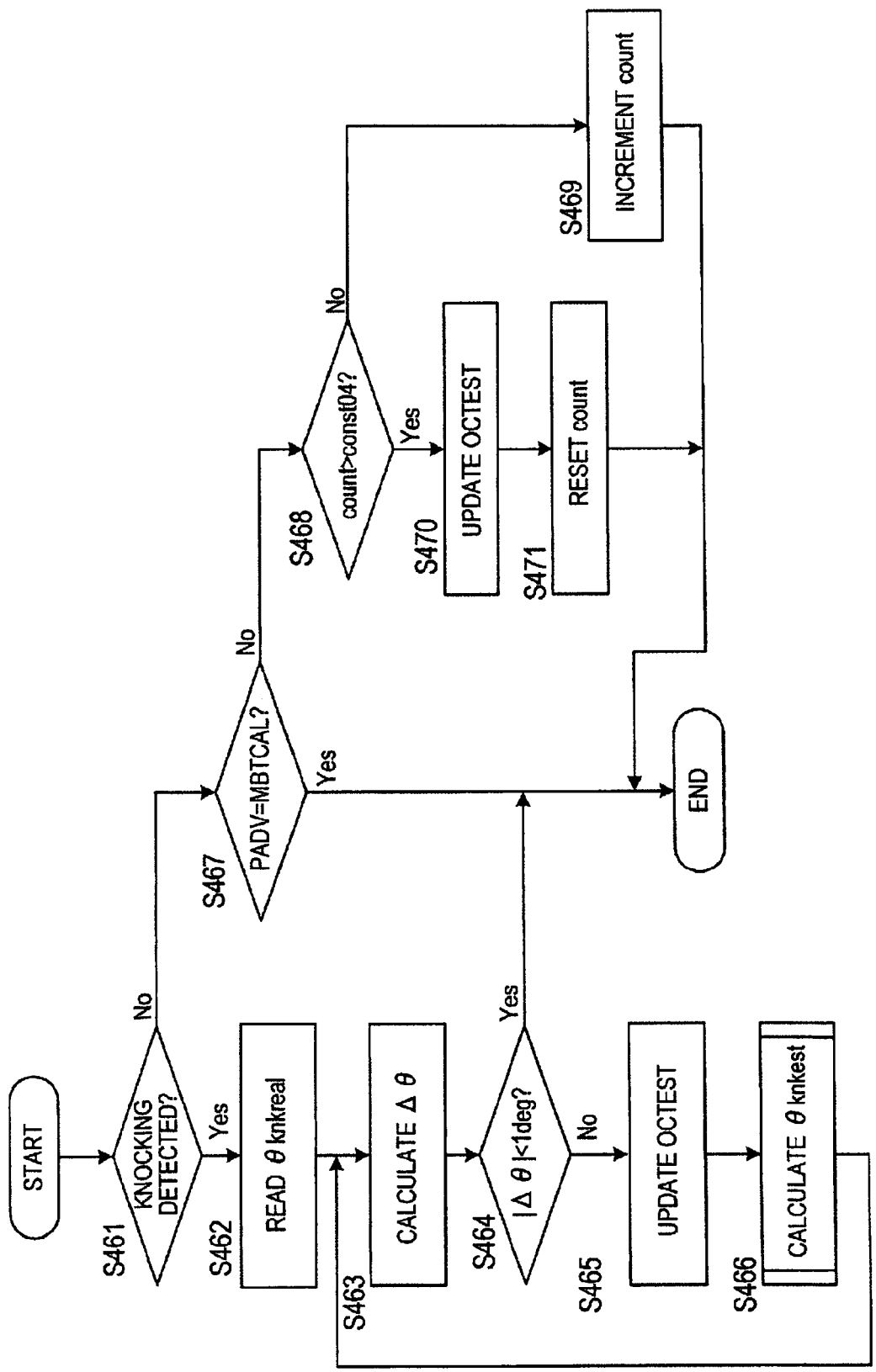
FIG. 48 is a flowchart for calculating the estimated octane number value in a fourth embodiment.

In a fourth embodiment, the estimated octane number value OCTEST of the fuel during an operation is estimated using the flowchart in FIG. 48 rather than the flowchart in FIG. 38. Estimation of the octane number is performed while determining whether or not knocking is occurring on the basis of a signal from the knocking sensor 47, and therefore the flow of FIG. 48 is executed immediately after every ignition. Here, estimation of the octane number may be executed upon every ignition operation when a predetermined crank angle elapses following input of a reference position signal created from a signal from the crank angle sensor 33, 34.

Figure 49:
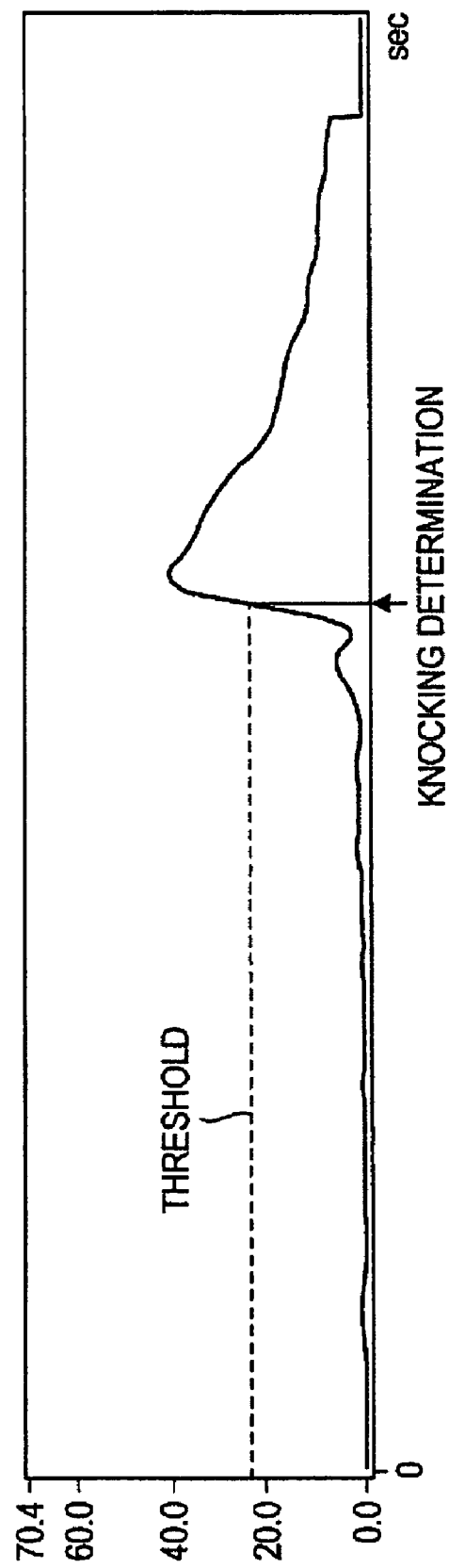
FIG. 49 is a characteristic diagram of a frequency component of knocking in fourth, fifth, sixth, tenth, and eleventh embodiments.

In a step S461 of FIG. 48, a determination is made as to whether or not knocking is occurring using the knocking sensor 47. For example, the frequency component of the knocking detected by the knocking sensor 47 varies as shown in FIG. 49, and therefore by setting a predetermined threshold in advance through adaptation, it can be determined that knocking is occurring when the threshold is intersected. When it is determined that knocking is occurring, the routine advances to a step S462, where a detected value of the actual auto-ignition timing is read. To obtain the detected value of the actual auto-ignition timing, the timing at which the threshold is intersected in the FIG. 49 may be measured as the actual auto-ignition timing. In FIG. 49, the abscissa shows time from a predetermined crank angle position, and the ordinate shows the absolute value of the amplitude of the knocking frequency component. Here, the measured timing [s] is multiplied by a conversion coefficient and thereby converted into crank angle units, whereupon the converted value is read as an auto-ignition timing detected value θknkreal [deg BTDC] (knocking occurrence timing detected value).

In steps S463 to S466 of FIG. 48, the estimated octane number value OCTEST is converged without generating knocking such that an ignition timing differential Δθ, which is the difference between the auto-ignition timing detected value and an auto-ignition timing predicted value, falls within an allowable range. First, in the step S463, the ignition timing differential Δθ is calculated from an auto-ignition timing predicted value θknkest, calculated in the step S218 of FIG. 33, and the auto-ignition timing detected value θknkreal, read in the step S462 of FIG. 48, using the following equation.

$$\Delta\theta = \theta knkreal - \theta knkest \quad (115)$$

Here, when the ignition timing differential Δθ is positive, the auto-ignition timing predicted value θknkest is further toward the retarded side than the auto-ignition timing detected value θknkreal. A situation in which the auto-ignition timing detected value θknkreal is further toward the retarded side than the auto-ignition timing predicted value θknkest cannot occur. However, since there is no need to differentiate between the two situations for the purpose of calculation, processing is performed without differentiating between the two, thereby avoiding complicated calculations.

In the step S464, the absolute value of the ignition timing differential Δθ is compared to a predetermined value (one deg, for example). The predetermined value defines the allowable range, and hence if the absolute value of the ignition timing differential Δθ is less than the predetermined value, the ignition timing differential Δθ is within the allowable range. In this case, it is determined that the knocking has been caused by something other than an error in the estimated octane number value, and therefore the current processing ends as is.

When the absolute value of the ignition timing differential Δθ is equal to or greater than the predetermined value, the routine advances to the step S465. When the auto-ignition timing predicted value θknkest is further toward the retarded side than the auto-ignition timing detected value θknkreal (Δθ is positive) as described above, it is determined that the estimated octane number value OCTEST is excessively greater than the actual octane number, and therefore the estimated octane number value OCTEST is reduced by a value obtained by multiplying the ignition timing differential Δθ by the first predetermined value const03. In other words, the estimated octane number value OCTEST is updated using the following equation.

$$OCTEST(\text{new}) = OCTEST(\text{old}) - const03 \times \Delta\theta \quad (116)$$

where OCTEST(new): updated estimated octane number value,

OCTEST(old): pre-update estimated octane number value, and const03: update proportion to smaller side (positive absolute number).

Here, the second item on the right side of the equation (116) determines the amount by which the estimated octane number value is updated each time. By introducing the ignition timing differential Δθ into the update amount each time, convergence of the estimated octane number value OCTEST can be performed more quickly. In other words, when the estimated octane number value OCTEST is larger than the actual octane number but in the vicinity of the actual octane number, the auto-ignition timing predicted value θknkest does not deviate greatly to the retarded side of the auto-ignition timing detected value θknkreal, but when the estimated octane number value OCTEST is larger than the actual octane number and deviates greatly from the actual octane number, the auto-ignition timing predicted value θknkest deviates greatly to the retarded side of the auto-ignition timing detected value θknkreal. When the auto-ignition timing predicted value θknkest deviates greatly to the retarded side of the auto-ignition timing detected value θknkreal (that is, when Δθ is large), the update amount each time is increased correspondingly, and in so doing, convergence of the estimated octane number value OCTEST is performed more quickly.

In the step S466 of FIG. 48, the auto-ignition timing predicted value θknkest is recalculated using the updated estimated octane number value OCTEST. This is the second calculation of the auto-ignition timing predicted value θknkest (the step S218 of FIG. 33 being the first calculation of the auto-ignition timing predicted value θknkest), and the resulting second auto-ignition timing predicted value θknkest is written over the first auto-ignition timing predicted value θknkest.

Calculation of the second auto-ignition timing predicted value θknkest onward will now be described using the flowcharts in FIGS. 50 and 51. The calculation processing of the second auto-ignition timing predicted value θknkest onward adopts the calculation processing of the auto-ignition timing predicted value in FIGS. 32 and 33, and hence in FIGS. 50 and 51, identical parts to FIGS. 32 and 33 are allocated identical step numbers.

Figure 50:
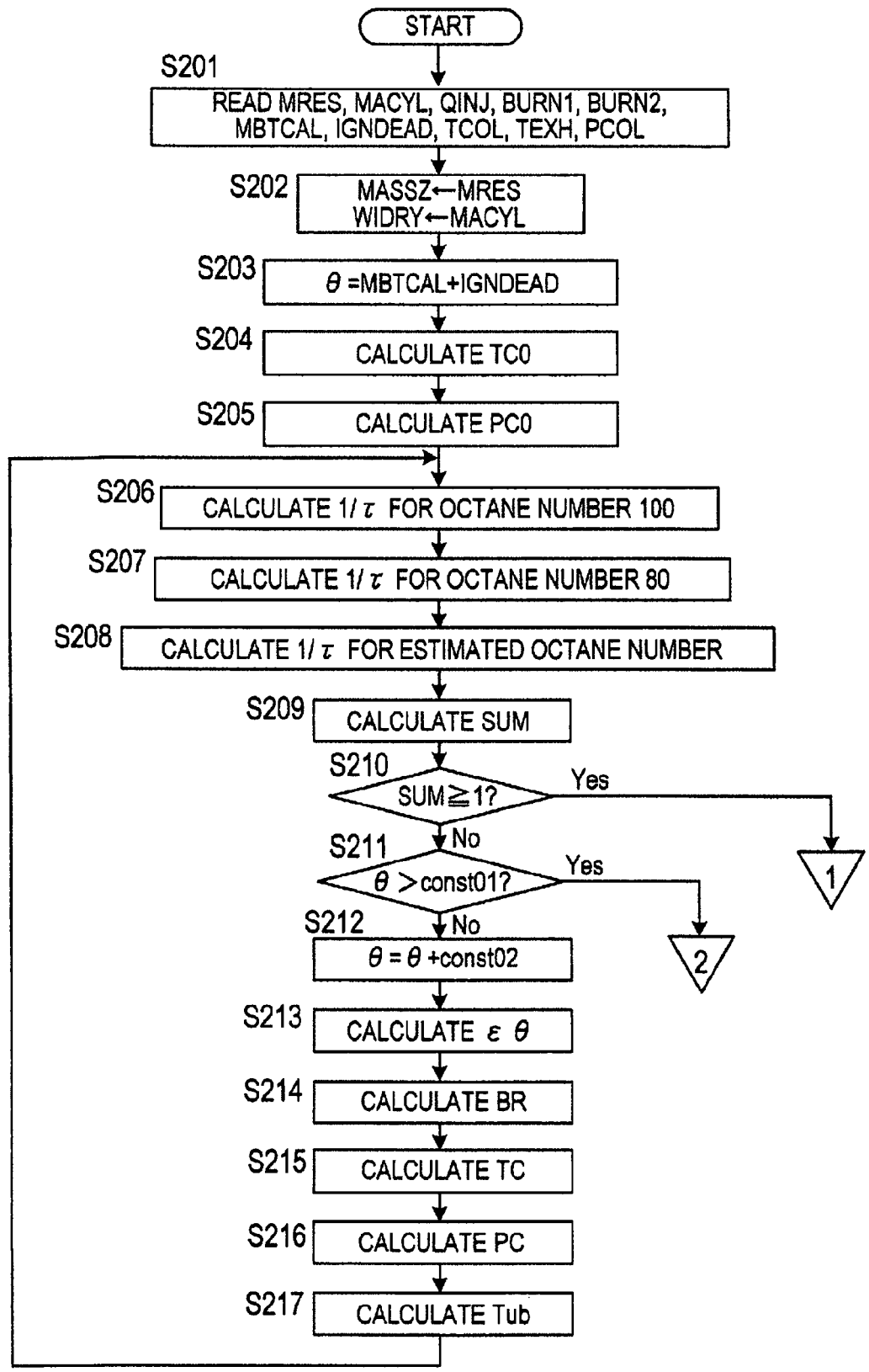
FIGS. 50 and 51 are flowcharts for calculating an auto-ignition timing predicted value in the fourth embodiment.
Figure 51:
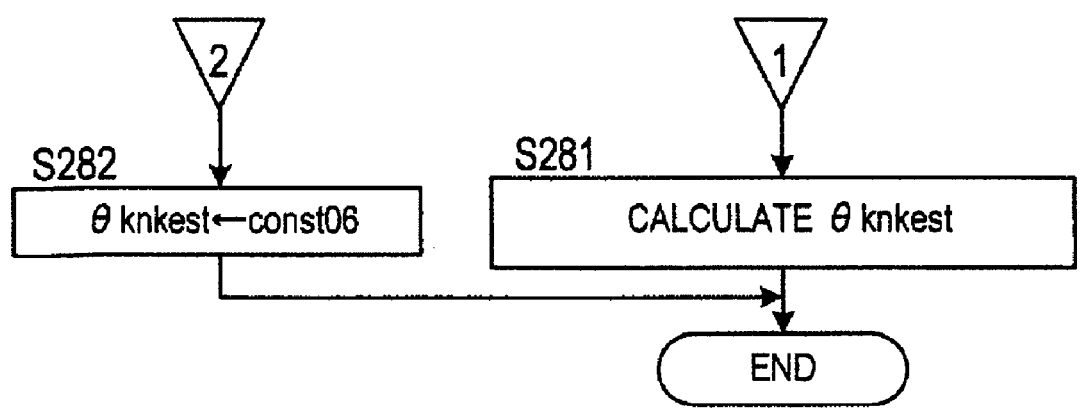

Only steps S281 and S282 of FIG. 51 differ from FIGS. 32 and 33. In other words, when the integrated value SUM of 1/τ is equal to or greater than one in the step S210 of FIG. 50 in a case where the estimated octane number value OCTEST, updated in the step S465 of FIG. 48, is used in the step S208 of FIG. 50, the routine advances to the step S281 of FIG. 51, where the second auto-ignition timing predicted value θknkest is calculated by inserting the crank angle θ at that time into the auto-ignition timing predicted value θknkest [deg BTDC].

The second auto-ignition timing predicted value θknkest calculated in FIGS. 50, 51 in this manner is closer to the auto-ignition timing detected value θknkreal than the first auto-ignition timing predicted value θknkest, calculated in the step S218 of FIG. 33, and hence the routine returns to the step S463 of FIG. 48, where the second auto-ignition timing predicted value θknkest is used to recalculate the ignition timing differential Δθ. In the step S464, the ignition timing differential Δθ is compared to a predetermined value, and when the ignition timing differential Δθ is equal to or greater than the predetermined value, the steps S465, S466, S463, and S464 are repeated. As a result of this repetition, the ignition timing differential Δθ, calculated using the auto-ignition timing predicted value θknkest that has been calculated several times, is eventually held below the predetermined value, and at this time, the routine jumps from the step S464 of FIG. 48 to END, thus terminating the current processing.

This operation (the loop operation of the steps S463 to S466 in FIG. 48) to update the estimated octane number value OCTEST repeatedly when knocking is detected until the ignition timing differential Δθ is held below the predetermined value, ends well in advance of the beginning of the next combustion cycle, and hence, when the combustion cycle in which knocking occurs is complete, the estimated octane number value OCTEST has been converged.

On the other hand, when the crank angle θ exceeds the predetermined value const01 without the integrated value SUM of 1/τ having reached one in FIG. 50, the routine advances from the step S211 of FIG. 50 to the step S282 of FIG. 51, where a predetermined value const06 is set as the auto-ignition timing predicted value θknkest. The current processing is then terminated. The predetermined value const06 takes a value that is equal to or larger than (further toward the retarded side of) the predetermined value const01 in the step S211 of FIG. 32.

When knocking is detected in the fourth embodiment, the estimated octane number value OCTEST is reduced during the combustion cycle in which the knocking is detected until the ignition timing differential Δθ is held within the allowable range.

If knocking is not detected in FIG. 48, the routine advances from the step S461 to a step S467, where the minimum ignition timing value PADV [deg BTDC], calculated in the step S3 of FIG. 2, is compared with the basic ignition timing MBTCAL [deg BTDC], calculated in the step S1 of FIG. 2. When the minimum ignition timing value PADV matches the basic ignition timing MBTCAL, the estimated octane number value OCTEST matches the actual octane number, and hence there is no need to modify the estimated octane number value. Therefore, the current processing ends as is.

On the other hand, when the minimum ignition timing value PADV does not match the basic ignition timing MBTCAL, the estimated octane number value OCTEST does not match the actual octane number, and as a result it is determined that the ignition timing is retarded. The routine then advances from the step S467 to a step S468, where the counter value count is compared to the predetermined value const04. The initial value of the counter value count is zero, and therefore the first time the routine advances to the step S468, the counter value count is less than the predetermined value const04. At this time, the routine advances to a step S469, where the counter value count is incremented by one. In other words, when knocking is not detected, the counter value count is increased by one every time the flow of FIG. 48 is executed, and hence the counter value count eventually equals or exceeds the predetermined value const04. At this time, the routine advances from the step S468 to a step S470, where the estimated octane number value OCTEST is increased by the second predetermined value const05. In other words, the estimated octane number value OCTEST is updated according to the following equation.

$$OCTEST(\text{new})=OCTEST(\text{old})+const05 \quad (117)$$

where OCTEST(new): updated estimated octane number value,
OCTEST(old): pre-update estimated octane number value, and
const05: update amount to larger side.

The estimated octane number value OCTEST is updated every time the counter value count reaches the predetermined value const04, and therefore the counter value count is reset to zero in a step S471.

Figure 52:
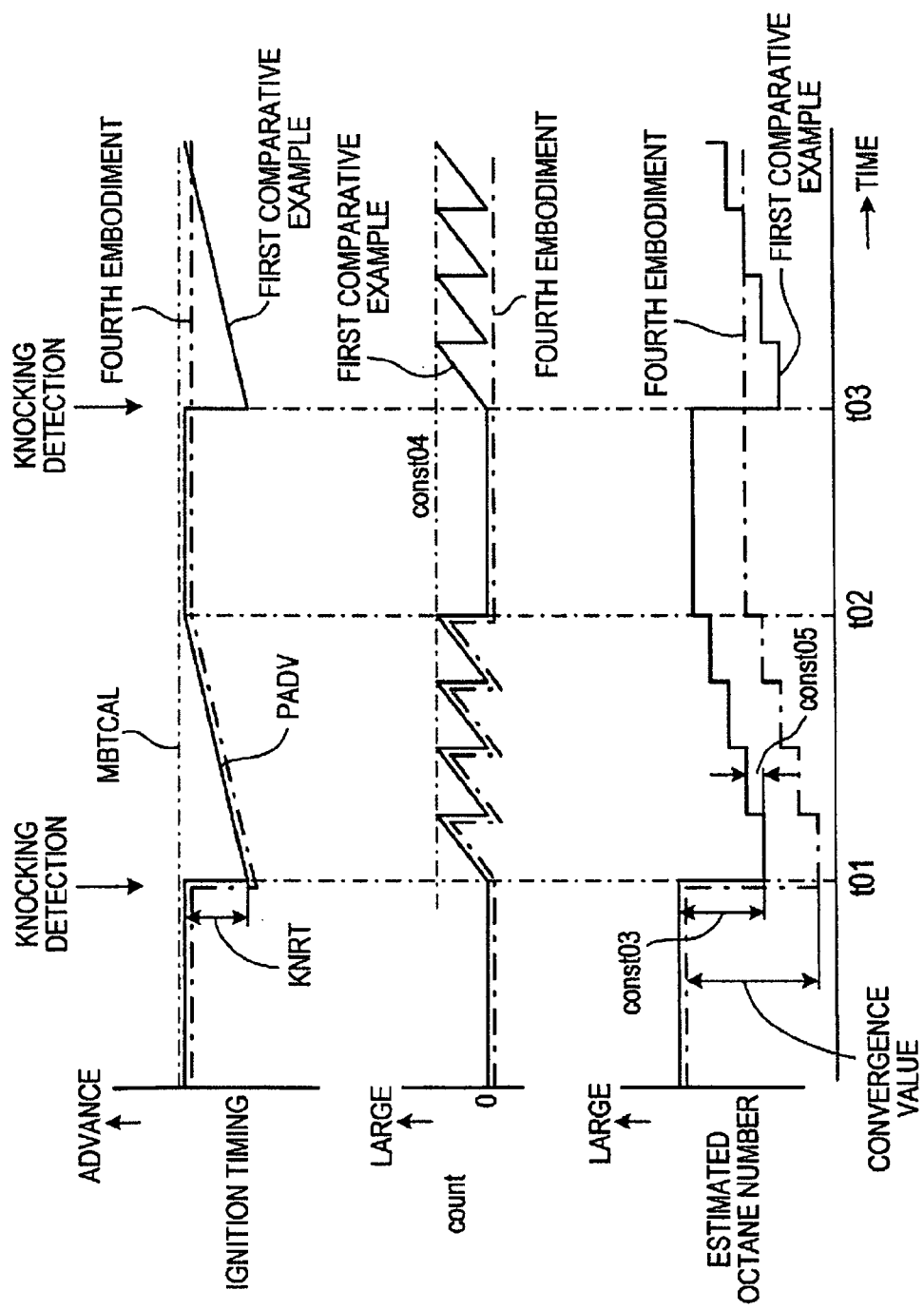
FIG. 52 is a waveform chart showing movement of the estimated octane number value during knocking detection in the fourth embodiment.

FIG. 52 shows movement of the ignition timing, the counter value count, and the estimated octane number value OCTEST. In FIG. 52, the dot/dash line indicates the fourth embodiment, and the solid line indicates a first comparative example.

In the first comparative example, the steps S262, S463, S464, S466 of FIG. 48 are omitted, and the estimated octane number value OCTEST is updated in the step S265 using the following equation $$OCTEST(\text{new})=OCTEST(\text{old})-const03$$

where OCTEST(new): updated estimated octane number value,
OCTEST(old): pre-update estimated octane number value, and
const03: update amount to smaller side instead of the above equation (116). Following this operation, the routine may move to END, where the current processing is terminated.

In the case of the first comparative example, as shown in FIG. 52, when knocking is detected by the knocking sensor 47 at a timing t01, it is determined that the estimated octane number value OCTEST is greater than the actual octane number, and hence the estimated octane number value OCTEST is reduced in a step by the predetermined value const03. If, as a result, knocking no longer occurs, the estimated octane number value OCTEST is increased gradually in variations of the second predetermined value const05 every time the counter value count reaches the predetermined value const04. Then, once the minimum ignition timing value PADV has matched MBTCAL at a timing t02, updating of the estimated octane number value OCTEST is halted, and the value at that time is retained. If knocking reoccurs thereafter at a timing t03, the operation described above is repeated.

Thus according to the first comparative example, the estimated octane number value OCTEST is updated in variations of the predetermined value const03 every time knocking is actually detected, and therefore the estimated octane number value OCTEST is converged when knocking is no longer detected.

Also according to the first comparative example, no differentiation is made between a case in which the auto-ignition timing predicted value θknkest deviates to the retarded side of the actual auto-ignition timing only slightly, and a case in which the auto-ignition timing predicted value θknkest deviates greatly to the retarded side of the actual auto-ignition timing, and therefore the update amount(=const03) of the estimated octane number value OCTEST each time is the same in both cases. As a result, convergence of the estimated octane number value OCTEST is slow when the auto-ignition timing predicted value θknkest deviates greatly to the retarded side of the actual auto-ignition timing.

In contrast, according to the fourth embodiment, when knocking is detected at the timing t01, the auto-ignition timing at that time is detected, and a value obtained by multiplying the ignition timing differential $\Delta\theta$, which is the difference between the auto-ignition timing detected value θknkreal and the auto-ignition timing predicted value θknkest, by the first predetermined value const03 is set as the amount by which the estimated octane number value is updated each time. Hence, in a case where the estimated octane number value OCTEST is greater than the actual octane number by a large amount such that the auto-ignition timing predicted value θknkest deviates greatly to the retarded side of the auto-ignition timing detected value θknkreal, the update amount of the estimated octane number value each time is greater than the update amount in a case where the estimated octane number value OCTEST is greater than the actual octane number by a small amount such that the auto-ignition timing predicted value θknkest deviates to the retarded side of the auto-ignition timing detected value θknkreal only slightly.

Moreover, the estimated octane number value OCTEST is updated many times until the ignition timing differential $\Delta\theta$ is held within the allowable range, and therefore the estimated octane number value OCTEST is converged during the combustion cycle in which the knocking is detected. As a result, the convergence value of the estimated octane number value OCTEST is greater than that of the first comparative example (dot-dash line in the bottom section of FIG. 52).

Hence according to the fourth embodiment, when knocking is detected, the estimated octane number value OCTEST is converged more quickly as the estimated octane number value OCTEST becomes greater than the actual octane number and deviates further from the actual octane number. Moreover, the estimated octane number value OCTEST is converged during the combustion cycle in which the knocking is detected, and therefore knocking is not detected for a second time after the minimum ignition timing value PADV matches the basic ignition timing MBTCAL (from t02 onward).

The estimated octane number value OCTEST calculated in FIG. 48 is used to calculate the value of 1/τ for fuel having the estimated octane number value OCTEST in the step S208 of FIG. 32.

According to the fourth embodiment, when gasoline is used as a fuel, the knocking detection result of the knocking sensor 47 is fed back to the octane number of the fuel rather than the ignition timing (FIG. 48). In other words, as shown by the dot/dash line in the bottom section of FIG. 52, the estimated octane number value OCTEST is reduced in a step when knocking is detected, and then increased gradually, according to a predetermined cycle, in variations of the second predetermined value const05.

Thus according to the fourth embodiment, the estimated octane number value OCTEST is calculated on the basis of the knocking detection result produced by the knocking sensor 47 (steps S461, S465, S470 of FIG. 48), the auto-ignition timing predicted value θknkest (the knocking occurrence timing predicted value) in the combustion chamber 5 is calculated on the basis of the estimated octane number value OCTEST (steps S206 to S210 in FIG. 32, step S218 in FIG. 33), and the knocking limit ignition timing KNOCKcal is calculated on the basis of the auto-ignition timing predicted value θknkest (steps S219 to S231 of FIG. 33). As a result, an operation to retard and then advance the ignition timing in order to avoid knocking, such as that performed in a conventional device in which the knocking detection result of the knocking sensor 47 is fed back to the ignition timing, need not be performed repeatedly, regardless of the operating conditions and even when a commercially available fuel whose octane number cannot be learned in advance is used. The knocking limit ignition timing can be followed even during transitions such as acceleration and deceleration, and hence the fuel economy and output can be prevented from deteriorating.

Further, as indicated by the equation (116) above, when updating (calculating) the estimated octane number value OCTEST, the ignition timing differential $\Delta\theta(=\theta knkreal-\theta knkest)$ between the auto-ignition timing detected value θknkreal (the knocking occurrence timing detected value) and the auto-ignition timing predicted value θknkest (the knocking occurrence timing predicted value) is also taken into account. More specifically, when the estimated octane number value OCTEST is greater than the actual octane number and deviates greatly from the actual octane number (i.e. when the auto-ignition timing predicted value θknkest deviates greatly to the retarded side of the auto-ignition timing detected value θknkreal), the update amount of the estimated octane number value each time is greater than when the estimated octane number value OCTEST is greater than the actual octane number but in the vicinity of the actual octane number (i.e. the auto-ignition timing predicted value θknkest deviates to the retarded side of the auto-ignition timing detected value θknkreal only slightly). Hence the estimated octane number value OCTEST converges more quickly when the estimated octane number value OCTEST is greater than the actual octane number and deviates greatly from the actual octane number than when the estimated octane number value OCTEST is greater than the actual octane number but in the vicinity of the actual octane number.

Thus according to the fourth embodiment, the estimated octane number value OCTEST (the estimated value of the knocking-correlated parameter) is also calculated on the basis of the ignition timing differential $\Delta\theta$ (the result of a comparison of the auto-ignition timing detected value θknkreal and the auto-ignition timing predicted value θknkest) (step S465 in FIG. 48). As a result, convergence of the estimated octane number value OCTEST can be performed more quickly, thereby improving the operability of the engine correspondingly.

In the fourth embodiment, the combustion period (BURN1, BURN2) from the beginning of combustion to a predetermined crank angle is calculated on the basis of the stratified flow combustion speed (SL1, SL2), the volume (V0, VTDC) corresponding to the combustion gas volume, the combustion mass proportion (BR1, BR2), and the reaction probability RPROBA, and the basic ignition timing MBTCAL is calculated on the basis of the combustion period (BURN1, BURN2), as shown in FIGS. 5, 10, 12, 13. However, a base ignition timing map may be provided instead of calculating the basic ignition timing MBTCAL. In this case, a pressure increase amount DP1 produced by knocking in the combustion chamber 5 is estimated on the basis of the auto-ignition timing predicted value θknkest (knocking occurrence timing predicted value) and the operating conditions (steps S219 to S226 in FIG. 33), the estimated knocking intensity value KIC is calculated on the basis of the pressure increase amount DP1 (steps S227 to S229 in FIG. 33), the knocking retardation amount KNRT is calculated on the basis of the estimated knocking intensity value KIC (step S230 in FIG. 33), and a value obtained by correcting the basic ignition timing MBTCAL to the retarded side by the knocking retardation amount KNRT is set as the knocking limit ignition timing KNOCKcal (step S231 in FIG. 33). In so doing, although a base ignition timing serving as the basic ignition timing should be provided as a map, the ROM capacity need not be increased, since there is no need to provide base ignition timing maps for each of a plurality of difference octane numbers from the maximum octane number to the minimum octane number.

According to the fourth embodiment, the estimated octane number value OCTEST is calculated on the basis of the knocking detection result and the ignition timing differential Δθ (the result of a comparison of the knocking occurrence timing detected value and the knocking occurrence timing predicted value) (steps S461, S462, S463, S465 in FIG. 48) in response to the fact that the octane number has the greatest influence on knocking when gasoline is used as a fuel. Therefore, even when gasoline with an initially unknown octane number is used as the fuel, the auto-ignition timing predicted value θknkest (knocking occurrence timing predicted value) can be predicted with a high degree of precision.

According to the fourth embodiment, when knocking is detected, the estimated octane number value OCTEST is updated to the smaller side during the combustion cycle in which the knocking occurs until the ignition timing differential Δθ (occurrence timing differential) between the auto-ignition timing detected value θknkreal (knocking occurrence timing detected value) and the auto-ignition timing predicted value θknkest (knocking occurrence timing predicted value) is held within the allowable range (the loop operation of the steps S463 to S466 in FIG. 48). The estimated octane number value OCTEST is then updated, according to a fixed cycle, toward the larger side in variations of the second predetermined value const05 (step S461 and steps S467 to S471 of FIG. 48). In so doing, the estimated octane number value OCTEST can be converged during the combustion cycle in which the knocking occurs.

According to the fourth embodiment, the estimated octane number value OCTEST is updated to the larger side (the side at which knocking occurs) in variations of the second predetermined value const05 (step S470 of FIG. 48) only under conditions in which knocking occurs at the basic ignition timing MBTCAL, or in other words only when the minimum ignition timing value PADV is further retarded than the basic ignition timing MBTCAL (step S467 of FIG. 48). In so doing, the estimated octane number value OCTEST is not updated mistakenly.

According to the fourth embodiment, the stratified flow combustion speed (SL1, SL2), which is the combustion speed of combustion gas in a stratified flow state, is calculated (step S168 in FIG. 10 and step S188 in FIG. 12), the volume (V0, VTDC) of the combustion chamber 5 corresponding to the combustion gas volume is calculated (step S162 in FIG. 10 and step S182 in FIG. 12), the combustion mass proportion (BR1, BR2) of the gas that burns in the combustion chamber 5 up to a predetermined crank angle is calculated (step S171 in FIG. 10, step S191 in FIG. 12), the reaction probability RPROBA, indicating the combustibility of the combustion gas under predetermined operating conditions, is calculated (step S15 in FIG. 5), the combustion period (BURN1, BURN2) from the beginning of combustion to a predetermined crank angle is calculated on the basis of the stratified flow combustion speed (SL1, SL2), the volume (V0, VTDC) corresponding to the combustion gas volume, the combustion mass proportion (BR1, BR2), and the reaction probability RPROBA (step S171 in FIG. 10 and step S191 in FIG. 12), and the basic ignition timing MBTCAL for obtaining MBT is calculated on the basis of the combustion period (BURN1, BURN2) (steps S41 to S43 in FIG. 13). Hence, the knocking limit ignition timing KNOCKcal, which is a value obtained by correcting the basic ignition timing MBTCAL to the retarded side, is calculated on the basis of combustion analysis, and therefore an optimum knocking limit ignition timing KNOCKcal can be calculated regardless of the operating conditions.

Fifth Embodiment

Figure 53:
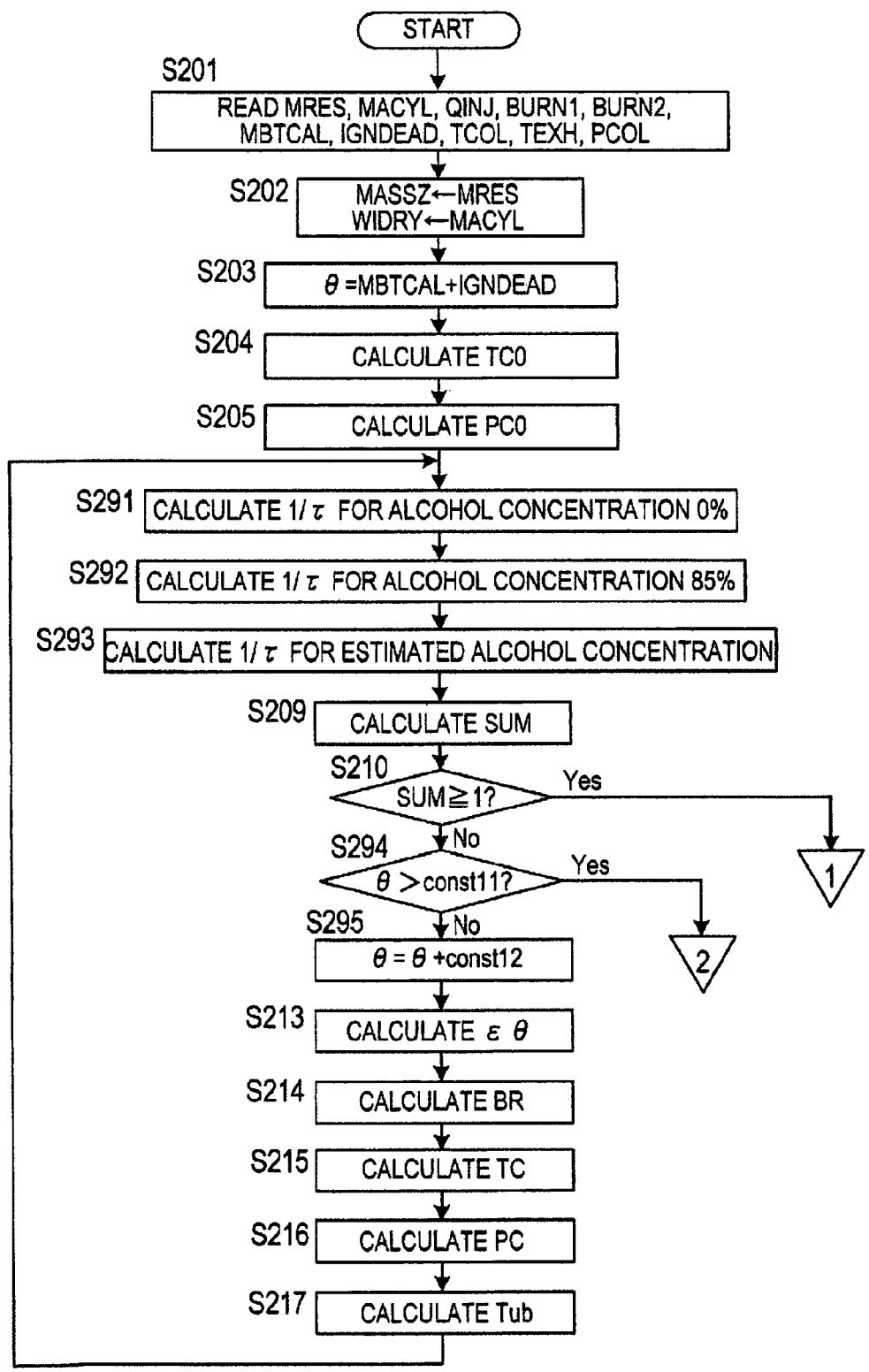
FIG. 53 is a flowchart for calculating the knocking limit ignition timing in fifth, eighth, and eleventh embodiments.
Figure 55:
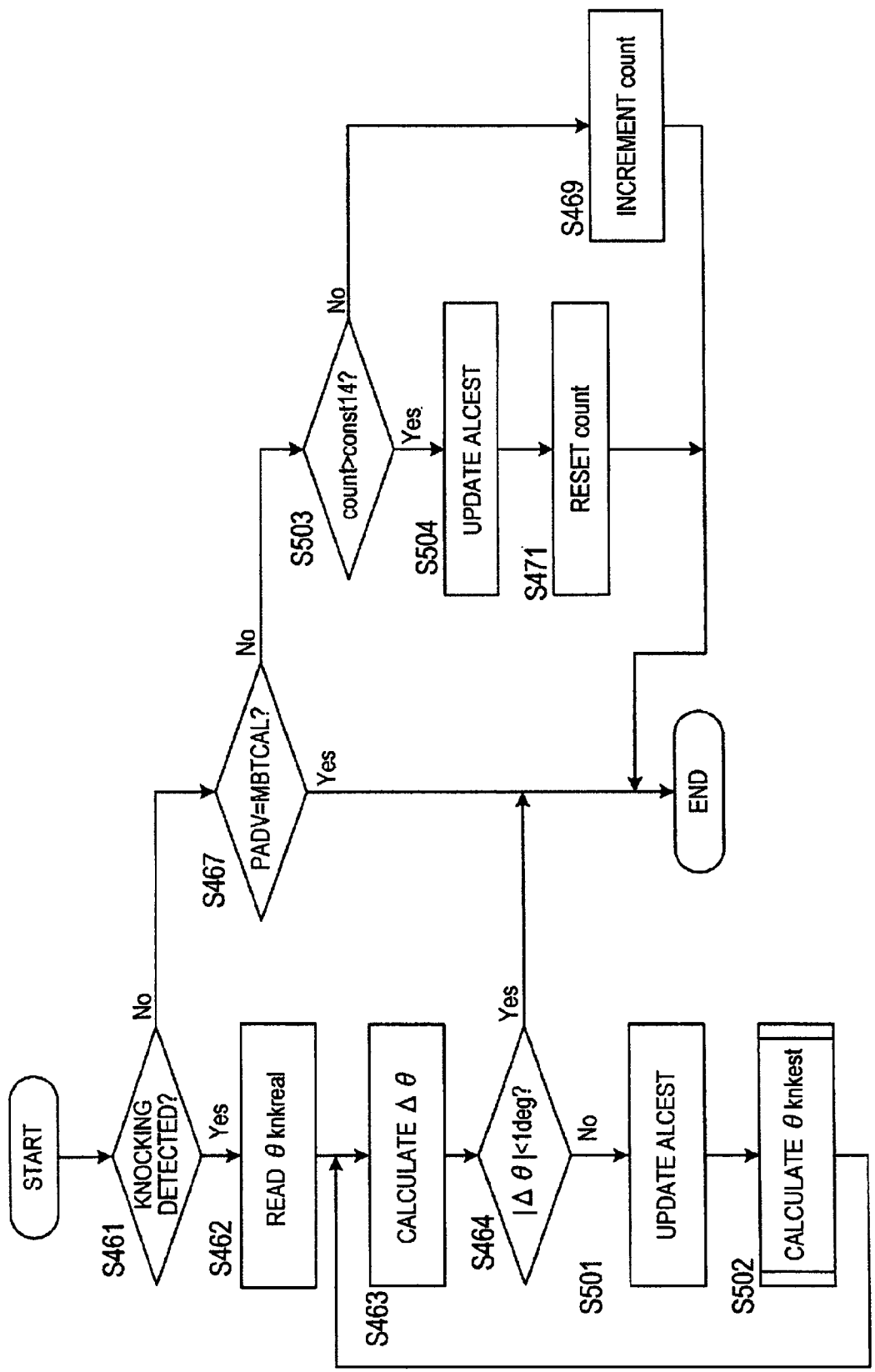
FIG. 55 is a flowchart for calculating the estimated alcohol concentration value in the fifth, eighth, and eleventh embodiments.

The flowcharts in FIGS. 53 and 55 illustrate a fifth embodiment. FIG. 53 replaces FIG. 32 of the fourth embodiment, and FIG. 55 replaces FIG. 48 of the fourth embodiment. In FIG. 53, identical parts to FIG. 32 are allocated identical step numbers, and in FIG. 55, identical parts to FIG. 48 are allocated identical step numbers. FIG. 33 is common to the fourth and fifth embodiments.

A composite fuel of gasoline and alcohol (fuel containing alcohol) is sometimes used. In this case, the alcohol concentration of the composite fuel is determined during setting of the base ignition timing, and the base ignition timing is matched such that knocking does not occur when a composite fuel having the determined alcohol concentration is used.

However, by performing an operation to retard and then advance the ignition timing repeatedly to avoid knocking which occurs when the alcohol concentration of the composite fuel differs from that of the composite fuel used to match the base ignition timing in overseas markets or the like, for example when the alcohol concentration of the composite fuel is lower than the alcohol concentration of the composite fuel used in the matching process, the knocking can be avoided by retarding the ignition timing, but the fuel economy and output deteriorate.

The fifth embodiment is applied when a composite fuel of alcohol and gasoline is used as a fuel. An estimated alcohol concentration value ALCEST (a knocking-correlated parameter) of the composite fuel is calculated on the basis of the knocking detection result produced by the knocking sensor 47, the auto-ignition timing predicted value (knocking occurrence timing predicted value) in the combustion chamber 5 is calculated on the basis of the estimated alcohol concentration value ALCEST, and the knocking limit ignition timing KNOCKcal is calculated on the basis of the auto-ignition timing predicted value θknkest.

To describe the main differences with the fourth embodiment, in steps S291 to S293 of FIG. 53, the value of 1/τ in relation to a composite fuel having the estimated alcohol concentration value ALCEST is calculated. If maps of the value of 1/τ for a plurality of different alcohol concentrations from a minimum alcohol concentration to a maximum alcohol concentration are prepared, the ROM capacity becomes too large, and therefore here, only a map of 1/τ for fuel having the minimum alcohol concentration (zero percent, for example) and a map of 1/τ for fuel having the maximum alcohol concentration (eighty-five percent, for example) are prepared, whereby the value of 1/τ for a composite fuel having an alcohol concentration (the estimated alcohol concentration value ALCEST) between the minimum alcohol concentration and maximum alcohol concentration is calculated by means of interpolation from the value of 1/τ for fuel with an alcohol concentration of zero percent and the value of 1/τ for fuel with an alcohol concentration of eighty-five percent.

Figure 54A:
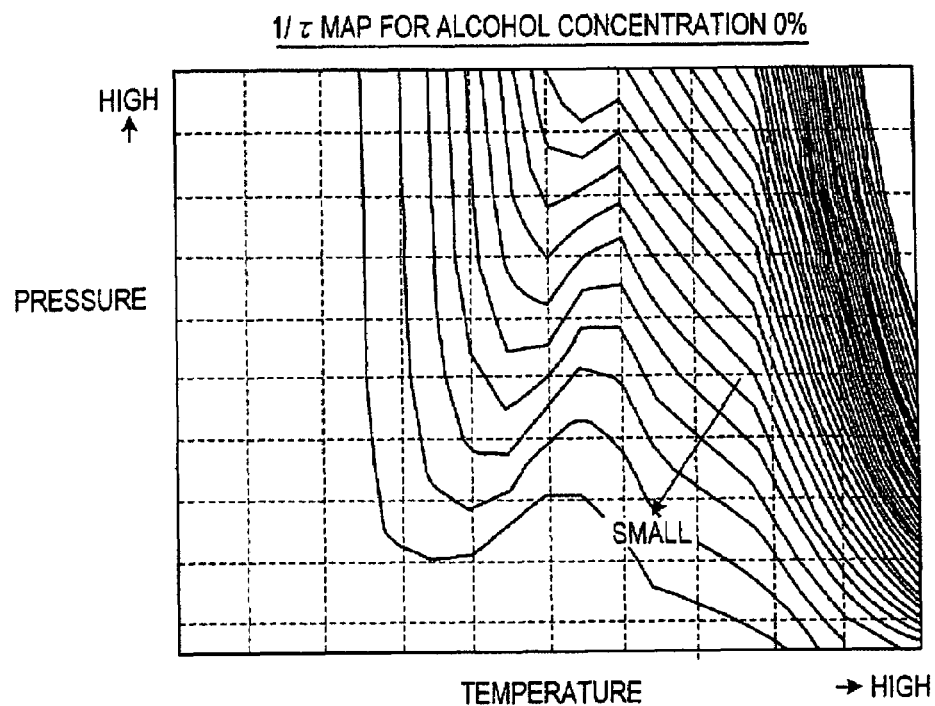
FIG. 54A is a characteristic diagram of $1/\tau$ for a composite fuel having an alcohol concentration of zero percent in the fifth, eighth, and eleventh embodiments.
Figure 54B:
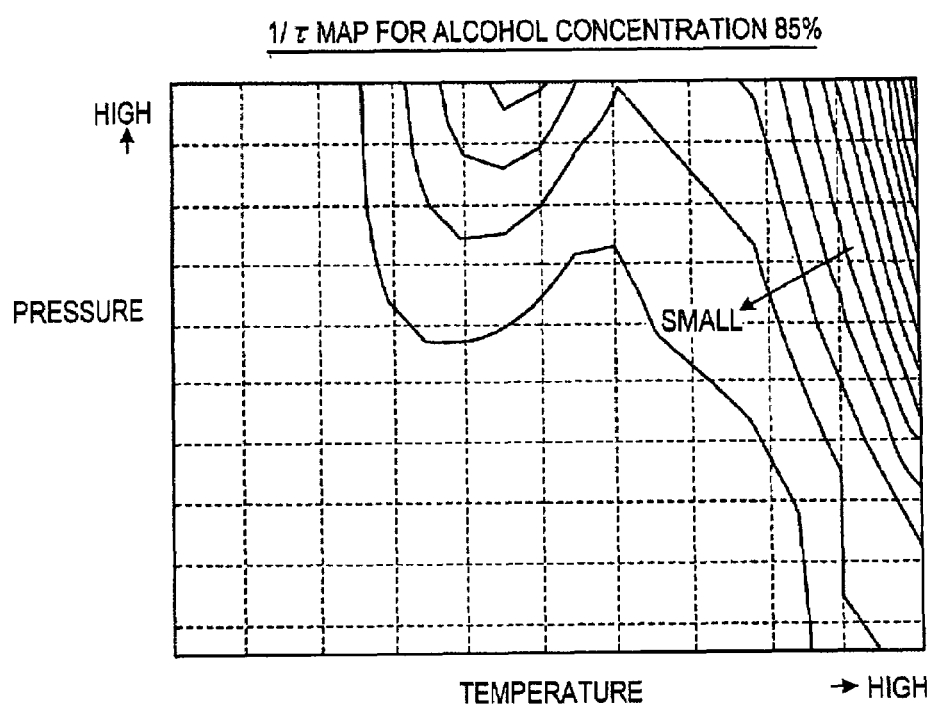
FIG. 54B is a characteristic diagram of $1/\tau$ for a composite fuel having an alcohol concentration of eighty-five percent in the fifth, eighth, and eleventh embodiments.

More specifically, at first the value of 1/τ for composite fuel with an alcohol concentration of zero percent and the value of 1/τ for composite fuel with an alcohol concentration of eighty-five percent are calculated in steps S291, S292 from the compression start temperature TC0 and compression start pressure PC0 by searching maps shown in FIGS. 54A and 54B respectively. As shown in FIGS. 54A and 54B, each value of 1/τ increases as the temperature and pressure increase. Further, when the temperature and pressure are equal, the value of 1/τ for composite fuel with an alcohol concentration of zero percent tends to be greater than the value of 1/τ for composite fuel with an alcohol concentration of eighty-five percent. Hence, in a step S293, the value of 1/τ for composite fuel having the estimated alcohol concentration value ALCEST is calculated using the following equation (interpolation equation).

$$1/\tau EST = 1/\tau 85 + (85 - ALCTEST) \times (1/\tau 0 - 1/\tau 85)/(85 - 0) \quad (118)$$

where 1/τEST: 1/τ of composite fuel having estimated alcohol concentration value ALCEST.

1/τ0: 1/τ of composite fuel with alcohol concentration of zero percent, and

1/τ85: 1/τ of composite fuel with alcohol concentration of eighty-five percent.

Calculation of the estimated alcohol concentration value ALCEST will be described hereafter.

In the step S209 of FIG. 53, the value of 1/τ for composite fuel having the estimated alcohol concentration value ALCEST is added to the integrated value SUM.

Next, when the knocking sensor 47 detects knocking in the step S461 of FIG. 55, it is determined that the estimated alcohol concentration value ALCEST is lower than the actual alcohol concentration. The operations of the steps S462, S463 are then performed, whereupon the routine advances to a step S464, where the absolute value of the ignition timing differential Δθ is compared to a predetermined value. When the absolute value of the ignition timing differential Δθ is equal to or greater than the predetermined value, the routine advances to a step S501, where the estimated alcohol concentration value ALCEST is increased by a value obtained by multiplying the first predetermined value const13 by the ignition timing differential Δθ. In other words, the estimated alcohol concentration value ALCEST is updated according to the following equation.

$$ALCEST(new) = ALCEST(old) + const13 \times \Delta\theta \quad (119)$$

where ALCEST(new): updated estimated alcohol concentration value,

ALCEST(old): pre-update estimated alcohol concentration value, and const13: update proportion to higher side (positive absolute number).

Here, the second item of the equation (119) determines the amount by which the estimated alcohol concentration value is updated each time. By introducing the ignition timing differential Δθ into the update amount each time, convergence of the estimated alcohol concentration value ALCEST can be performed more quickly. In other words, when the estimated alcohol concentration value ALCEST is lower than the actual alcohol concentration but in the vicinity of the actual alcohol concentration, the auto-ignition timing predicted value θknkest does not deviate greatly to the retarded side of the auto-ignition timing detected value θknkreal, but when the estimated alcohol concentration value ALCEST is lower than the actual alcohol concentration and deviates greatly from the actual alcohol concentration, the auto-ignition timing predicted value θknkest deviates greatly to the retarded side of the auto-ignition timing detected value θknkreal. When the auto-ignition timing predicted value θknkest deviates greatly to the retarded side of the auto-ignition timing detected value θknkreal (that is, when Δθ is large), the update amount of the estimated alcohol concentration value each time is increased correspondingly, and in so doing, convergence of the estimated alcohol concentration value ALCEST is performed more quickly.

In the step S502, the auto-ignition timing predicted value θknkest is recalculated using the estimated alcohol concentration value ALCEST updated in the step S501. This is the second calculation of the auto-ignition timing predicted value θknkest (the step S218 of FIG. 33 being the first calculation of the auto-ignition timing predicted value θknkest), and the resulting second auto-ignition timing predicted value θknkest is written over the first auto-ignition timing predicted value θknkest.

Calculation of the second auto-ignition timing predicted value θknkest onward will now be described using the flowcharts in FIGS. 56 and 57. The calculation processing of the second auto-ignition timing predicted value θknkest onward adopts the calculation processing of the auto-ignition timing predicted value in FIGS. 53, 33, and hence in FIGS. 56 and 57, identical parts to FIGS. 53 and 33 are allocated identical step numbers.

Figure 56:
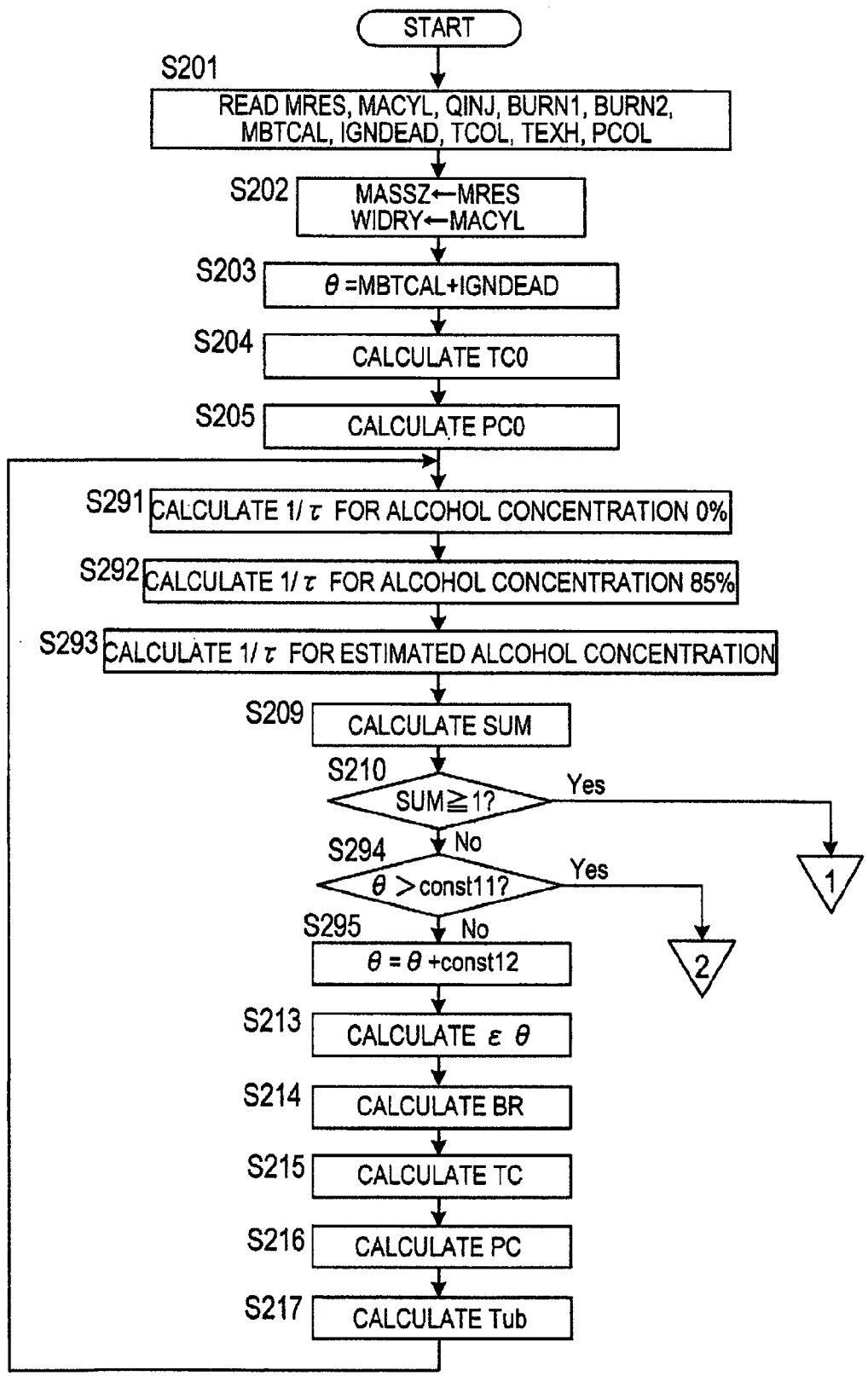
FIG. 56 is a flowchart for calculating the auto-ignition timing predicted value in the fifth embodiment.
Figure 57:
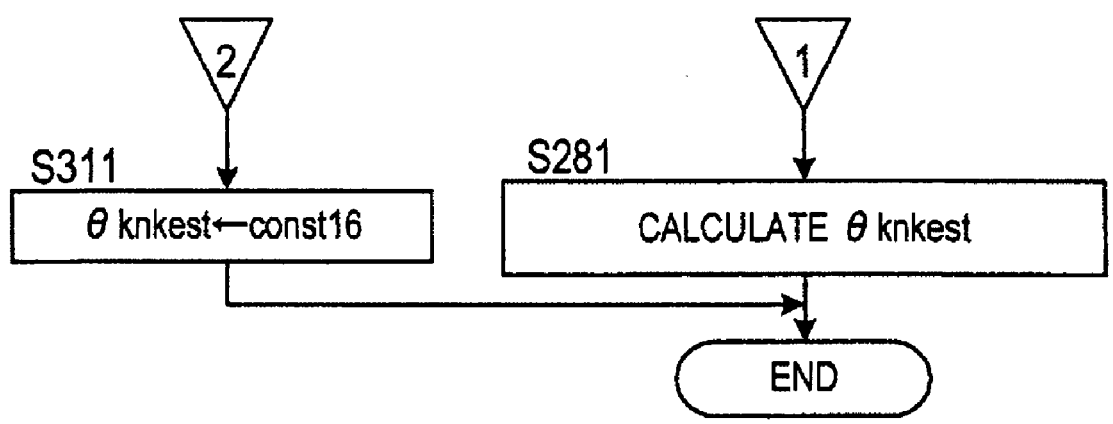
FIG. 57 is a flowchart for calculating the auto-ignition timing predicted value in the fifth embodiment.

Only steps S281 and S311 of FIG. 57 differ from FIGS. 53 and 33. In other words, when the integrated value SUM of 1/τ is equal to or greater than one in the step S210 of FIG. 56 in a case where the estimated alcohol concentration value ALCEST, updated in the step S501 of FIG. 55, is used in the step S293 of FIG. 56, the routine advances to the step S281 of FIG. 57, where the second auto-ignition timing predicted value θknkest is calculated by inserting the crank angle θ at that time into the auto-ignition timing predicted value θknkest [deg BTDC].

The second auto-ignition timing predicted value θknkest calculated in this manner is closer to the auto-ignition timing detected value θknkreal than the first auto-ignition timing predicted value θknkest, calculated in the step S218 of FIG. 33, and hence the routine returns to the step S463 of FIG. 55, where the second auto-ignition timing predicted value θknkest is used to recalculate the ignition timing differential Δθ. In the step S464, the ignition timing differential Δθ is compared to a predetermined value, and when the ignition timing differential Δθ is equal to or greater than the predetermined value, the steps S501, S502, S463, and S464 are repeated. As a result of this repetition, the ignition timing differential Δθ, calculated using the auto-ignition timing predicted value θknkest that has been calculated several times, is eventually held below the predetermined value, and at this time, the routine jumps from the step S464 of FIG. 55 to END, thus terminating the current processing.

This operation (the loop operation of the steps S463, S464, S501, S502 in FIG. 55) to update the estimated alcohol concentration value ALCEST repeatedly when knocking is detected until the ignition timing differential Δθ is held below the predetermined value, ends well in advance of the beginning of the next combustion cycle. Hence, when the combustion cycle in which the knocking occurs is complete, the estimated alcohol concentration value ALCEST has been converged.

On the other hand, when the crank angle θ exceeds the predetermined value const11 without the integrated value SUM of 1/τ having reached one in FIG. 56, the routine advances from the step S294 of FIG. 56 to the step S311 of FIG. 57, where a predetermined value const16 is set as the auto-ignition timing predicted value θknkest. The current processing is then terminated. The predetermined value const16 takes a value that is equal to or larger than (further toward the retarded side of) the predetermined value const11 in the step S294 of FIG. 53.

When knocking is detected in the fifth embodiment, the estimated alcohol concentration value ALCEST is increased during the combustion cycle in which the knocking is detected until the ignition timing differential Δθ is held within the allowable range.

When, in FIG. 55, the minimum ignition timing value PADV does not match the basic ignition timing MBTCAL and the counter value count is equal to or greater than the predetermined value const14 but knocking is not detected, the routine advances from the steps S461, S467, S503 to a step S504, where the estimated alcohol concentration value ALCEST is reduced by the second predetermined value const15. In other words, the estimated alcohol concentration value ALCEST is updated according to the following equation.

$$ALCEST(\text{new}) = ALCEST(\text{old}) - const15 \qquad (120)$$

where ALCEST(new): updated estimated alcohol concentration value,
ALCEST(old): pre-update estimated alcohol concentration value, and
const15: update amount to lower side.

In steps S294, S295 of FIG. 53 and the step S503 of FIG. 55, the predetermined values const11, const12, and const14 take different values to the fourth embodiment. These predetermined values const11, const12, const14 are matched in advance by a preparatory experiment or the like. However, the predetermined values const11 and const12 may be identical to the predetermined values const01 and const02 of the fourth embodiment.

Figure 58:
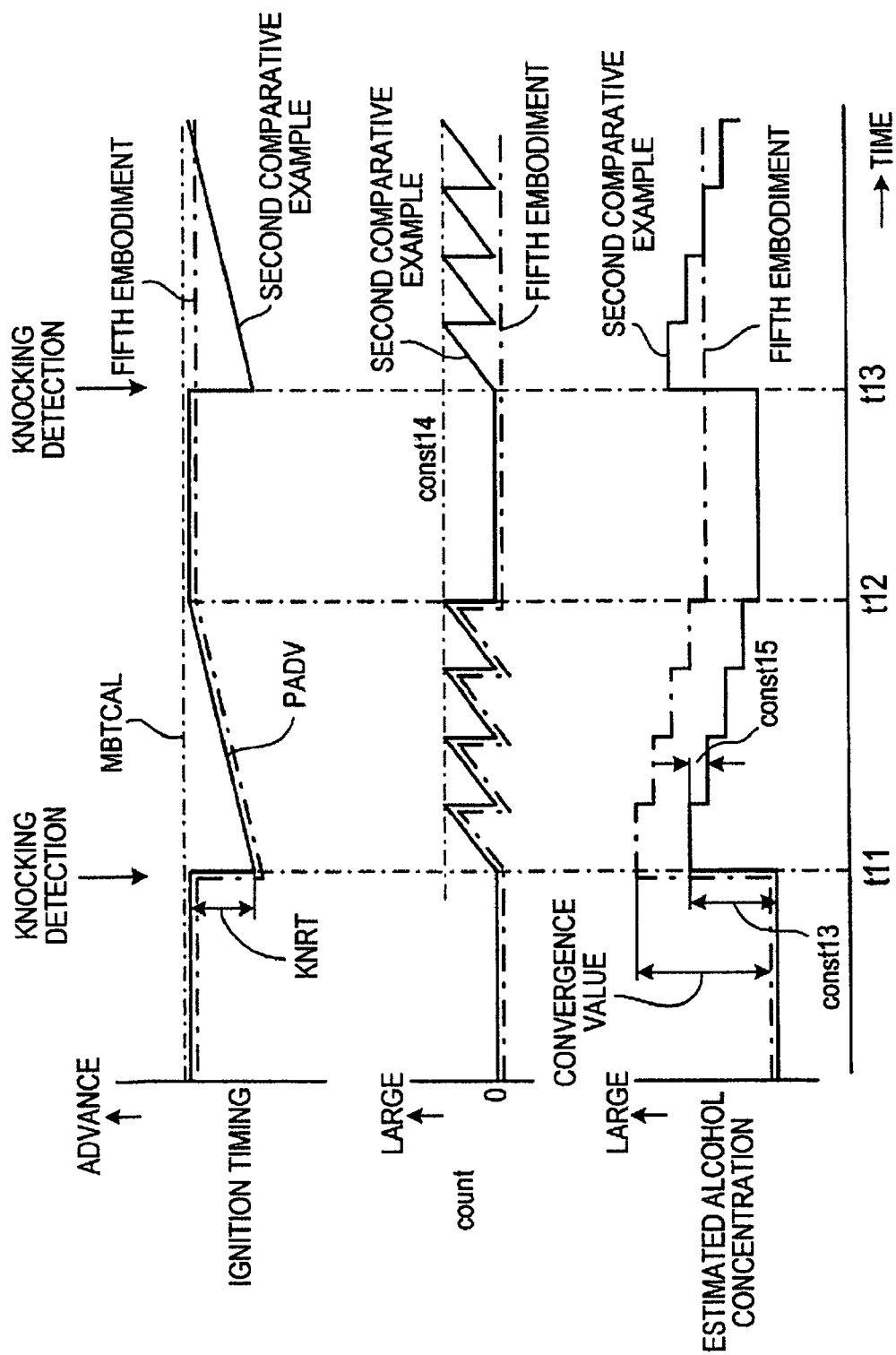
FIG. 58 is a waveform chart showing movement of the estimated alcohol concentration value during knocking detection in the fifth embodiment.

FIG. 58 shows a model of the movement of the ignition timing, the counter value count, and the estimated alcohol concentration value ALCEST in the fifth embodiment. In FIG. 58, the dot/dash line indicates the fifth embodiment, and the solid line indicates a second comparative example.

In the second comparative example, the steps S462, S463, S464, S502 of FIG. 55 are omitted, and the estimated alcohol concentration value ALCEST is updated in the step S501 using the following equation $$ALCEST(\text{new}) = ALCEST(\text{old}) + const13$$

where ALCEST(new): updated estimated alcohol concentration value,
ALCEST(old): pre-update estimated alcohol concentration value, and
const13: update amount to larger side
instead of the above equation (119). Following this operation, the routine may move to END, where the current processing is terminated. In the case of the second comparative example, as shown in FIG. 58, when knocking occurs at a timing t11, it is determined that the estimated alcohol concentration value ALCEST is lower than the actual alcohol concentration, and hence the estimated alcohol concentration value ALCEST is increased in a step by the first predetermined value const13. If, as a result, knocking no longer occurs, the estimated alcohol concentration value ALCEST is reduced gradually in variations of the second predetermined value const15 every time the counter value count reaches the predetermined value const14. Then, once the minimum ignition timing value PADV has matched MBTCAL at a timing t12, updating of the estimated alcohol concentration value ALCEST is halted, and the value at that time is retained. If knocking reoccurs thereafter at a timing t13, the operation described above is repeated.

Thus according to the second comparative example, the estimated alcohol concentration value ALCEST is updated in variations of the predetermined value const13 every time knocking is detected, and therefore the estimated alcohol concentration value ALCEST is converged when knocking is no longer detected.

Also according to the second comparative example, no differentiation is made between a case in which the auto-ignition timing predicted value θknkest deviates to the retarded side of the actual auto-ignition timing only slightly, and a case in which the auto-ignition timing predicted value θknkest deviates greatly to the retarded side of the actual auto-ignition timing, and therefore the update amount (=const13) of the estimated alcohol concentration value ALCEST each time is the same in both cases. As a result, convergence of the estimated alcohol concentration value ALCEST is slow when the auto-ignition timing predicted value θknkest deviates greatly to the retarded side of the actual auto-ignition timing.

In contrast, according to the fifth embodiment, when knocking is detected at the timing t11, the auto-ignition timing at that time is detected, and a value obtained by multiplying the ignition timing differential Δθ, which is the difference between the auto-ignition timing detected value θknkreal and the auto-ignition timing predicted value θknkest, by the first predetermined value const13 is set as the amount by which the estimated alcohol concentration value is updated each time. Hence, in a case where the estimated alcohol concentration value ALCEST is lower than the actual alcohol concentration and deviates greatly from the actual alcohol concentration such that the auto-ignition timing predicted value θknkest deviates greatly to the retarded side of the auto-ignition timing detected value θknkreal, the update amount of the estimated alcohol concentration value each time is greater than the update amount in a case where the estimated alcohol concentration value ALCEST is lower than the actual alcohol concentration but deviates only slightly from the actual alcohol concentration such that the auto-ignition timing predicted value θknkest deviates to the retarded side of the auto-ignition timing detected value θknkreal only slightly.

Moreover, the estimated alcohol concentration value ALCEST is updated many times until the ignition timing differential Δθ is held within the allowable range, and therefore the estimated alcohol concentration value ALCEST is converged during the combustion cycle in which the knocking is detected. As a result, the convergence value of the estimated alcohol concentration value ALCEST is greater than that of the second comparative example (dot-dash line in the bottom section of FIG. 58).

Hence according to the fifth embodiment, when knocking is detected, the estimated alcohol concentration value ALCEST is converged more quickly as the estimated alcohol concentration value ALCEST becomes lower than the actual alcohol concentration and deviates further from the actual alcohol concentration. Moreover, the estimated alcohol concentration value ALCEST is converged during the combustion cycle in which the knocking is detected, and therefore knocking is not detected for a second time after the minimum ignition timing value PADV matches the basic ignition timing MBTCAL (from t12 onward).

The estimated alcohol concentration value ALCEST calculated in FIG. 55 is used to calculate the value of $1/\tau$ for a composite fuel having the estimated alcohol concentration value ALCEST in the step S293 of FIG. 53.

According to the fifth embodiment, when a composite fuel of gasoline and alcohol is used, the knocking detection result of the knocking sensor 47 is fed back to the alcohol concentration of the composite fuel rather than the ignition timing (FIG. 55). In other words, as shown by the dot/dash line in the bottom section of FIG. 58, the estimated alcohol concentration value ALCEST is increased in a step when knocking is detected, and then decreased gradually, according to a predetermined cycle, in variations of the second predetermined value const15.

Thus according to the fifth embodiment, the estimated alcohol concentration value ALCEST is calculated on the basis of the knocking detection result produced by the knocking sensor 47 (steps S461, S501, S504 of FIG. 55), the auto-ignition timing predicted value θknkest (the knocking occurrence timing predicted value) in the combustion chamber 5 is calculated on the basis of the estimated alcohol concentration value ALCEST (steps S291 to S293, S209, and S210 in FIG. 53, step S218 in FIG. 33), and the knocking limit ignition timing KNOCKcal is calculated on the basis of the auto-ignition timing predicted value θknkest (steps S219 to S231 of FIG. 33). As a result, an operation to retard and then advance the ignition timing in order to avoid knocking, such as that performed in a conventional device in which the knocking detection result is fed back to the ignition timing, need not be performed repeatedly, regardless of the operating conditions and even when a commercially available composite fuel whose alcohol concentration cannot be learned in advance is used. The knocking limit ignition timing can be followed even during transitions such as acceleration and deceleration, and hence the fuel economy and output can be prevented from deteriorating.

Further, as indicated by the equation (119) above, when updating (calculating) the estimated alcohol concentration value ALCEST, the ignition timing differential $\Delta\theta(=\theta\text{knkreal}-\theta\text{knkest})$ between the auto-ignition timing detected value θknkreal (the knocking occurrence timing detected value) and the auto-ignition timing predicted value θknkest (the knocking occurrence timing predicted value) is also taken into account. More specifically, when the estimated alcohol concentration value ALCEST is lower than the actual alcohol concentration and deviates greatly from the actual alcohol concentration (i.e. when the auto-ignition timing predicted value θknkest deviates greatly to the retarded side of the auto-ignition timing detected value θknkreal), the update amount of the estimated alcohol concentration value each time is greater than when the estimated alcohol concentration value ALCEST is lower than the actual alcohol concentration but in the vicinity of the actual alcohol concentration (i.e. the auto-ignition timing predicted value θknkest deviates to the retarded side of the auto-ignition timing detected value θknkreal only slightly). Hence the estimated alcohol concentration value ALCEST converges more quickly when the estimated alcohol concentration value ALCEST is lower than the actual alcohol concentration and deviates greatly from the actual alcohol concentration than when the estimated alcohol concentration value ALCEST is lower than the actual alcohol concentration but in the vicinity of the actual alcohol concentration.

Thus according to the fifth embodiment, the estimated alcohol concentration value ALCEST (the estimated value of the knocking-correlated parameter) is also calculated on the basis of the ignition timing differential $\Delta\theta$ (the result of a comparison of the auto-ignition timing detected value θknkreal and the auto-ignition timing predicted value θknkest) (step S501 in FIG. 55). As a result, convergence of the estimated alcohol concentration value ALCEST can be performed more quickly, thereby improving the operability of the engine correspondingly.

According to the fifth embodiment, the estimated alcohol concentration value ALCEST is calculated on the basis of the knocking detection result and the ignition timing differential $\Delta\theta$ (the result of a comparison of the knocking occurrence timing detected value and the knocking occurrence timing predicted value) (steps S461, S462, S463, S501 in FIG. 55) in response to the fact that when a composite fuel of gasoline and alcohol is used, the alcohol concentration of the composite fuel influences knocking. Hence, even when fuel containing alcohol with an initially unknown alcohol concentration is used as the fuel, the auto-ignition timing predicted value θknkest (knocking occurrence timing predicted value) can be predicted with a high degree of precision.

According to the fifth embodiment, when knocking is detected, the estimated alcohol concentration value ALCEST is updated to the higher side during the combustion cycle in which the knocking occurs until the ignition timing differential $\Delta\theta$ (occurrence timing differential) between the auto-ignition timing detected value θknkreal (knocking occurrence timing detected value) and the auto-ignition timing predicted value θknkest (knocking occurrence timing predicted value) is held within the allowable range (the loop operation of the steps S463, S464, S501, S502 in FIG. 55). The estimated alcohol concentration value ALCEST is then updated, according to a fixed cycle, toward the lower side in variations of the second predetermined value const15 (step S461, S467, S503, S469, S504, S471 of FIG. 55). In so doing, the estimated alcohol concentration value ALCEST can be converged during the combustion cycle in which the knocking is detected.

According to the fifth embodiment, the estimated alcohol concentration value ALCEST is updated to the lower side (the side at which knocking occurs) in variations of the second predetermined value const15 (step S504 of FIG. 55) under conditions in which knocking occurs at the basic ignition timing MBTCAL (step S467 of FIG. 55). In so doing, the estimated alcohol concentration value ALCEST is not updated mistakenly.

Sixth Embodiment

Figure 59:
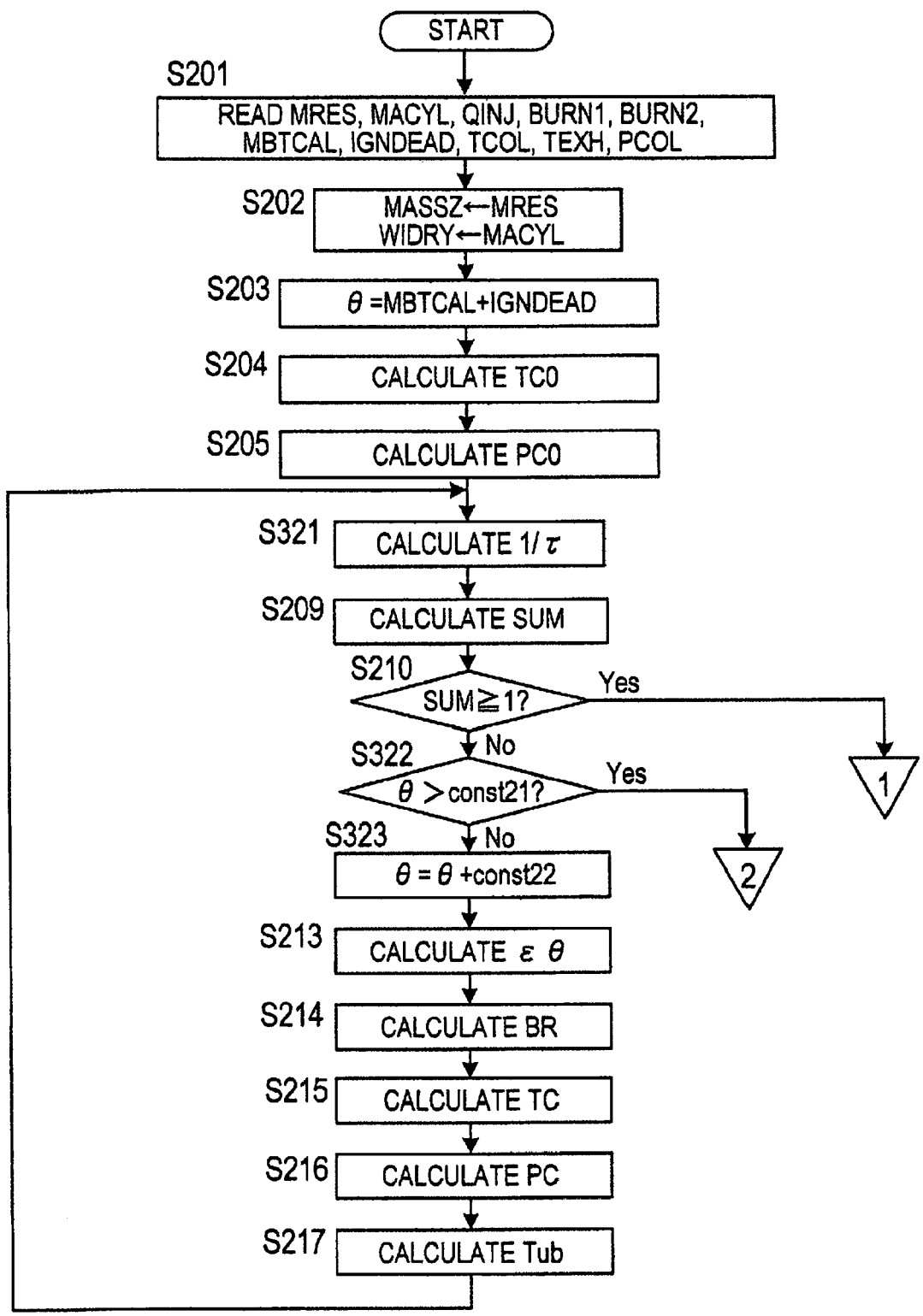
FIG. 59 is a flowchart for calculating the knocking limit ignition timing in sixth and ninth embodiments.
Figure 60:
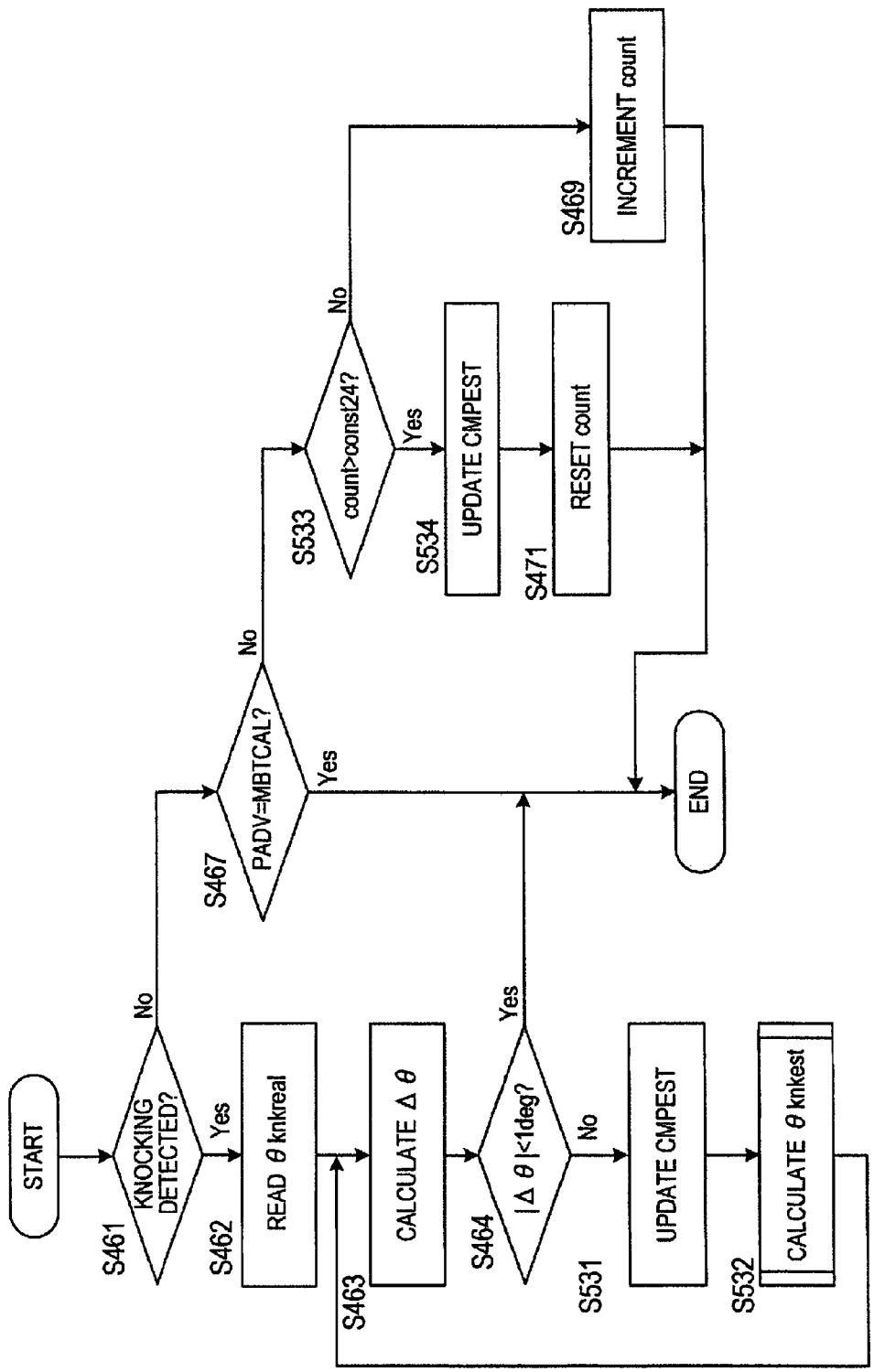
FIG. 60 is a flowchart for calculating the estimated compression ratio value in the sixth embodiment.

The flowcharts in FIGS. 59 and 60 illustrate a third embodiment. FIG. 59 replaces FIG. 32 of the fourth embodiment, and FIG. 60 replaces FIG. 48 of the fourth embodiment. In FIG. 59, identical parts to FIG. 32 are allocated identical step numbers, and in FIG. 60, identical parts to FIG. 48 are allocated identical step numbers. FIG. 33 is common to the fourth through sixth embodiments.

The octane number of fuel described in the fourth embodiment and the alcohol concentration of composite fuel described in the fifth embodiment are both parameters having a correlation to knocking. However, parameters having a correlation to knocking are not limited thereto, and the compression ratio is also a parameter having a correlation to knocking. When fuel with a predetermined octane number is used, the compression ratio is determined according to the engine specifications, and therefore the base ignition timing is matched to prevent knocking at the compression ratio determined in accordance with the engine specifications. When knocking occurs due to the actual compression ratio being higher than the compression ratio of the engine specifications for some reason, and an operation to retard and then advance the ignition timing is performed repeatedly to prevent this knocking, the fuel economy and output deteriorate.

In the sixth embodiment, as shown in FIGS. 5, 10, 12, 13, the combustion period (BURN1, BURN2) from the beginning of combustion to a predetermined crank angle is calculated on the basis of the stratified flow combustion speed (SL1, SL2), the volume (V0, VTDC) corresponding to the combustion gas volume, the combustion mass proportion (BR1, BR2), and the reaction probability RPROBA, the basic ignition timing MBTCAL for obtaining MBT is calculated on the basis of the combustion period (BURN1, BURN2), the combustion period is then divided into the initial combustion period BURN1 and the main combustion period BURN2, and the initial combustion period BURN1 is calculated using the volume V0 of the combustion chamber 5 at the compression start timing as a volume corresponding to the volume of combustion gas in the combustion chamber 5. When gasoline having a predetermined octane number (80, for example) is used as the fuel, the estimated value CMPEST of the compression ratio, which serves as the knocking-correlated parameter, is calculated on the basis of the knocking detection result from the knocking sensor 47, and the volume V0 of the combustion chamber 5 at the compression start timing is calculated on the basis of the estimated compression ratio value CMPEST.

To describe the main differences with the fourth embodiment, in a steps S321 of FIG. 59, first the value of $1/\tau$ for fuel with the octane number 80 is calculated from the compression start temperature TC0 and compression start pressure PC0 by searching the map shown in FIG. 30B, regardless of the estimated compression ratio value CMPEST to be described below. The calculated value of $1/\tau$ for fuel having the octane number 80 is then added to the integrated value SUM in a step S209.

Next, when the knocking sensor 47 detects knocking in the step S461 of FIG. 60, it is determined that the estimated compression ratio value CMPEST is smaller than the actual compression ratio. The operations of the steps S462, S463 are then performed, whereupon the routine advances to a step S464, where the absolute value of the ignition timing differential $\Delta\theta$ is compared to a predetermined value. When the absolute value of the ignition timing differential $\Delta\theta$ is equal to or greater than the predetermined value, the routine advances to a step S531, where the estimated compression ratio value CMPEST is increased by a value obtained by multiplying the first predetermined value const23 by the ignition timing differential $\Delta\theta$. In other words, the estimated compression ratio value CMPEST is updated according to the following equation.

$$CMPEST(\text{new}) = CMPEST(\text{old}) + const23 \times \Delta\theta \qquad (122)$$

where CMPEST(new): updated estimated compression ratio value,
CMPEST(old): pre-update estimated compression ratio value, and
const23: update proportion to larger side (positive absolute number).

Here, the second item of the equation (122) determines the amount by which the estimated compression ratio value is updated each time. By introducing the ignition timing differential $\Delta\theta$ into the update amount each time, convergence of the estimated compression ratio value CMPEST can be performed more quickly. In other words, when the estimated compression ratio value CMPEST is smaller than the actual compression ratio but in the vicinity of the actual compression ratio, the auto-ignition timing predicted value $\theta$knkest does not deviate greatly to the retarded side of the auto-ignition timing detected value $\theta$knkreal, but when the estimated compression ratio value CMPEST is smaller than the actual compression ratio and deviates greatly from the actual compression ratio, the auto-ignition timing predicted value $\theta$knkest deviates greatly to the retarded side of the auto-ignition timing detected value $\theta$knkreal. When the auto-ignition timing predicted value $\theta$knkest deviates greatly to the retarded side of the auto-ignition timing detected value $\theta$knkreal (that is, when $\Delta\theta$ is large), the update amount of the estimated compression ratio value each time is increased correspondingly, and in so doing, convergence of the estimated compression ratio value CMPEST is performed more quickly.

In the step S532, the auto-ignition timing predicted value $\theta$knkest is recalculated using the updated estimated compression ratio value CMPEST. This is the second calculation of the auto-ignition timing predicted value $\theta$knkest (the step S218 of FIG. 33 being the first calculation of the auto-ignition timing predicted value $\theta$knkest), and the resulting second auto-ignition timing predicted value $\theta$knkest is written over the first auto-ignition timing predicted value $\theta$knkest.

Calculation of the second auto-ignition timing predicted value $\theta$knkest onward will now be described using the flowcharts in FIGS. 61 and 62. The calculation processing of the second auto-ignition timing predicted value $\theta$knkest onward adopts the calculation processing of the auto-ignition timing predicted value in FIGS. 59, 33, and hence in FIGS. 61 and 62, identical parts to FIGS. 59 and 33 are allocated identical step numbers.

Figure 61:
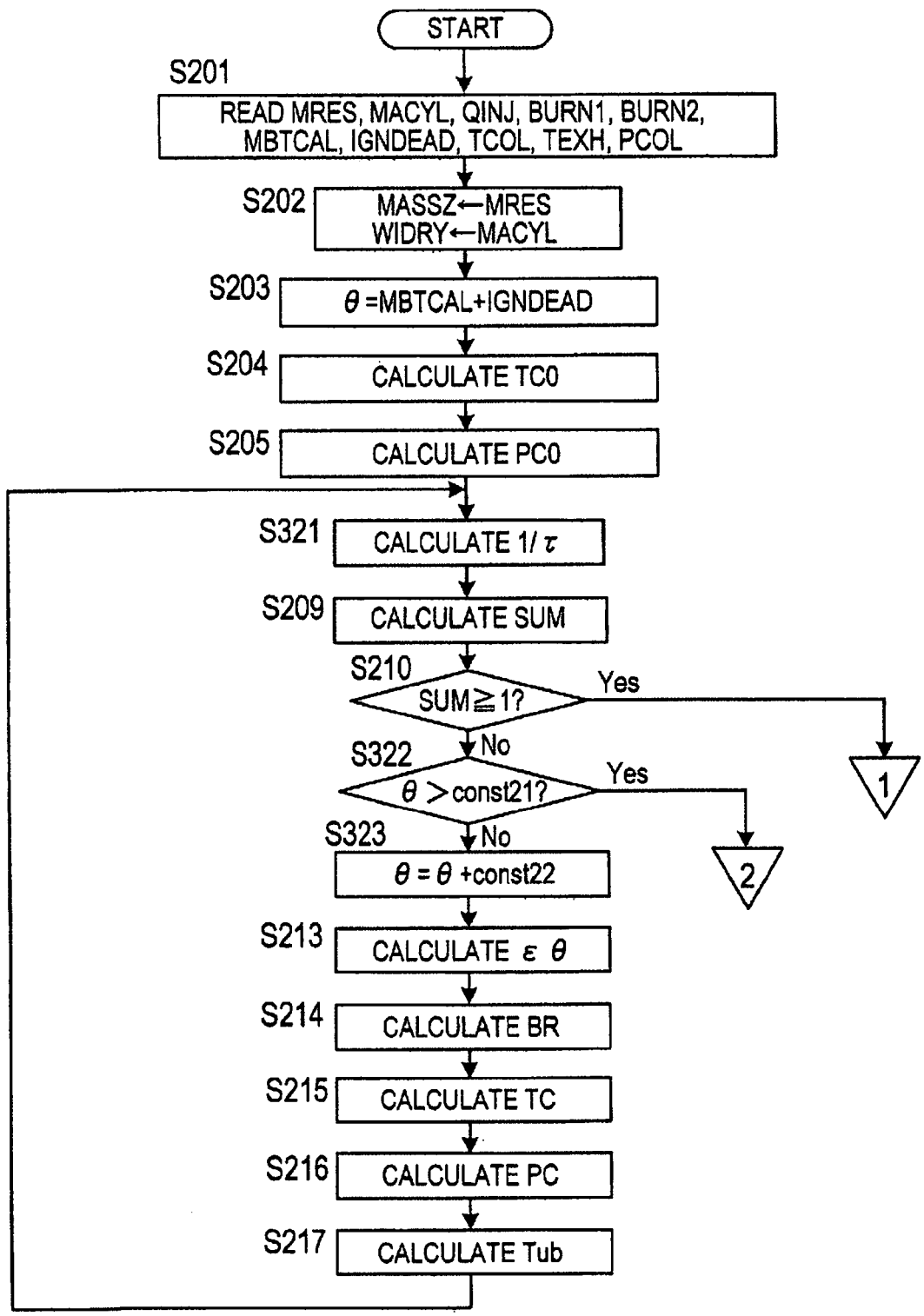
FIG. 61 is a flowchart for calculating the auto-ignition timing predicted value in the sixth embodiment.
Figure 62:
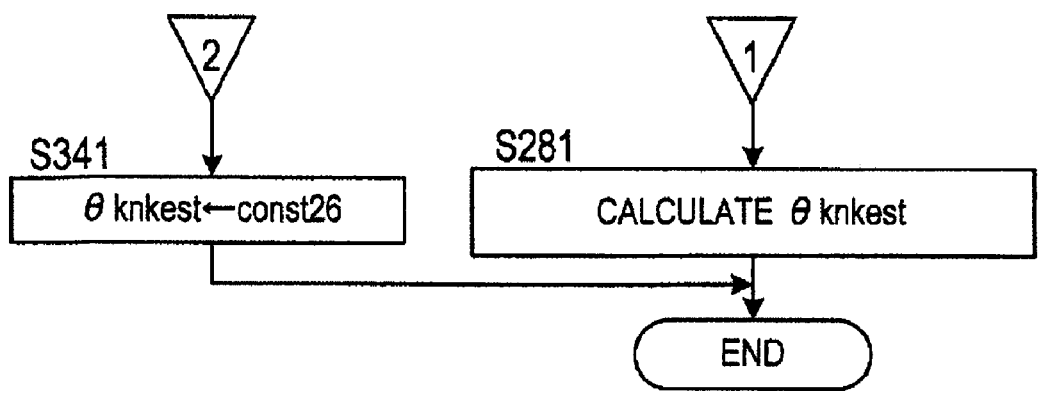
FIG. 62 is a flowchart for calculating the auto-ignition timing predicted value in the sixth embodiment.

Only steps S281 and S341 of FIG. 62 differ from FIGS. 59 and 33. In other words, when the integrated value SUM of $1/\tau$ is equal to or greater than one in the step S210 of FIG. 61, the routine advances to the step S281 of FIG. 62, where the second auto-ignition timing predicted value $\theta$knkest is calculated by inserting the crank angle $\theta$ at that time into the auto-ignition timing predicted value $\theta$knkest [deg BTDC].

The second auto-ignition timing predicted value $\theta$knkest calculated in this manner is closer to the auto-ignition timing detected value $\theta$knkreal than the first auto-ignition timing predicted value $\theta$knkest, calculated in the step S218 of FIG. 33, and hence the routine returns to the step S463 of FIG. 60, where the second auto-ignition timing predicted value $\theta$knkest is used to recalculate the ignition timing differential $\Delta\theta$. In the step S464, the ignition timing differential $\Delta\theta$ is compared to the predetermined value, and when the ignition timing differential $\Delta\theta$ is equal to or greater than the predetermined value, the steps S531, S532, S463, and S464 are repeated. As a result of this repetition, the ignition timing differential $\Delta\theta$, calculated using the auto-ignition timing predicted value $\theta$knkest that has been calculated several times, is eventually held below the predetermined value, and at this time, the routine jumps from the step S464 of FIG. 60 to END, thus terminating the current processing.

This operation (the loop operation of the steps S463, S464, S531, S532 in FIG. 60) to update the estimated compression ratio value CMPEST repeatedly when knocking is detected until the ignition timing differential $\Delta\theta$ is held below the predetermined value, ends well in advance of the beginning of the next combustion cycle, and hence, when the combustion cycle in which the knocking occurs is complete, the estimated compression ratio value CMPEST has been converged.

On the other hand, when the crank angle θ exceeds the predetermined value const21 without the integrated value SUM of 1/τ having reached one in FIG. 61, the routine advances from the step S322 of FIG. 61 to the step S341 of FIG. 62, where a predetermined value const26 is set as the auto-ignition timing predicted value θknkest. The current processing is then terminated. The predetermined value const26 takes a value that is equal to or larger than (further toward the retarded side of) a predetermined value const21 in the step S322 of FIG. 61.

When knocking is detected in the sixth embodiment, the estimated compression ratio value CMPEST is increased during the combustion cycle in which the knocking is detected until the ignition timing differential Δθ is held within the allowable range.

When, in FIG. 60, the minimum ignition timing value PADV does not match the basic ignition timing MBTCAL and the counter value count is equal to or greater than the predetermined value const24, but knocking is not detected, the routine advances from the steps S461, S467, S533 to a step S534, where the estimated compression ratio value CMPEST is reduced by the second predetermined value const25. In other words, the estimated compression ratio value CMPEST is updated according to the following equation.

$$CMPEST(\text{new}) = CMPEST(\text{old}) - const25 \quad (123)$$

where CMPEST(new): updated estimated compression ratio value,

CMPEST(old): pre-update estimated compression ratio value, and const25: update amount to smaller side.

In steps S322, S323 of FIG. 59 and the step S533 of FIG. 60, the predetermined values const21, const22, and const24 take different values to the fourth embodiment. These predetermined values const21, const22, const24 are matched in advance by a preparatory experiment or the like. The predetermined values const21 and const22 may be identical to the predetermined values const01 and const02 of the fourth embodiment.

In the sixth embodiment, the volume VIVC of the combustion chamber 5 at the intake valve closing timing and the volume V0 of the combustion chamber 5 at the combustion start timing (MBTCYCL) are calculated on the basis of the estimated compression ratio value CMPEST calculated in the manner described above. This will now be described using the flowcharts in FIGS. 63 and 64.

Figure 63:
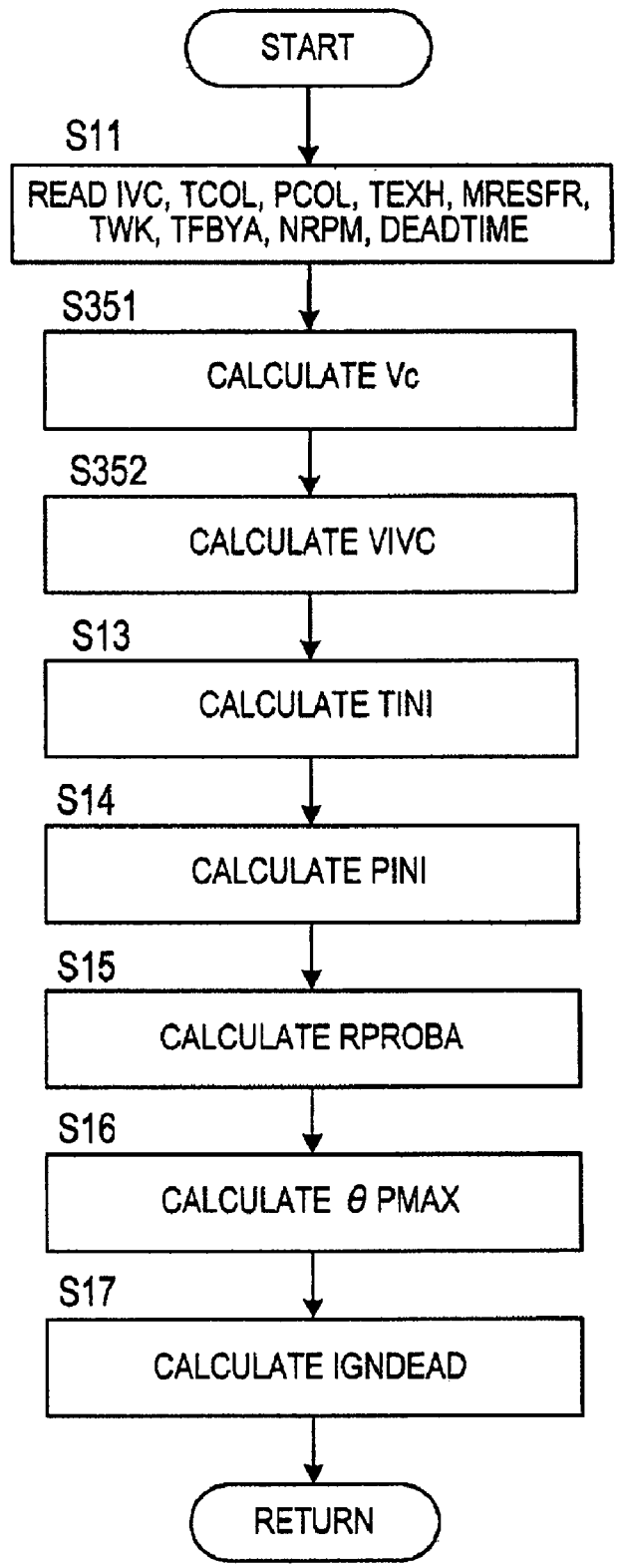
FIG. 63 is a flowchart for calculating physical quantities in the sixth and ninth embodiments.
Figure 64:
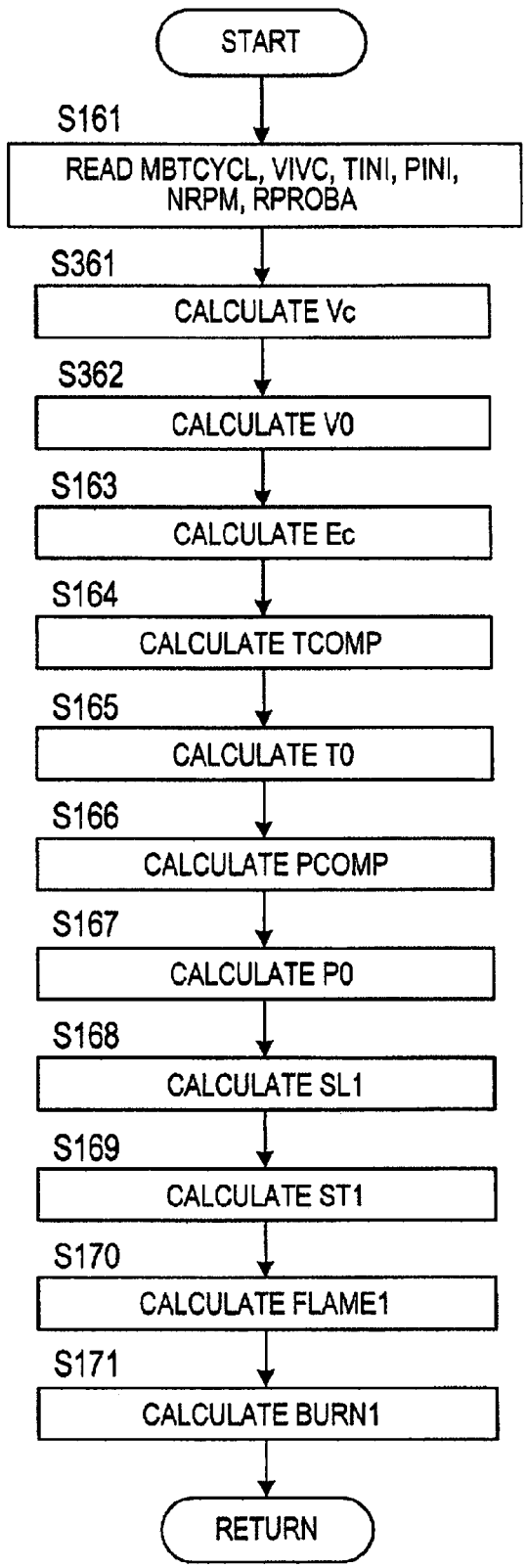
FIG. 64 is a flowchart for calculating the initial combustion period in the sixth and ninth embodiments.

The flowcharts of FIGS. 63 and 64 replace FIGS. 5 and 10 of the first embodiment. In FIG. 63, identical parts to FIG. 5 are allocated identical step numbers, and in FIG. 64, identical parts to FIG. 10 are allocated identical step numbers.

To describe the main differences with the first embodiment, in a step S351 of FIG. 63, the gap volume Vc [m³] is calculated using the following equation.

$$Vc = \{1/(CMPEST-1)\} \times (\pi/4) D^2 \times Hx \quad (124)$$

where CMPEST: estimated compression ratio value,

D: cylinder bore diameter [m], and

Hx: difference between maximum value and minimum value of distance of piston pin 76 from TDC [m].

Here, the equation (124) replaces the equation (3) of the first embodiment. In the first embodiment, the compression ratio ε of the equation (3) is assumed to be constant, whereas in the sixth embodiment, the compression ratio is set as the variable estimated compression ratio value CMPEST.

In a step S352, the volume VIVC of the combustion chamber 5 at the intake valve closing timing is calculated using the determined gap volume Vc, according to the following equation.

$$VIVC = Vc + (\pi/4) D^2 \cdot Hivc \quad (125)$$

where D: cylinder bore diameter, and

Hivc: distance of piston pin 76 from TDC at intake valve closing timing [m].

This equation (125) is identical to the equation (2) of the first embodiment.

Next, in a step S361 of FIG. 64, the gap volume Vc [m³] is calculated using the above equation (124), and in a step S362, the volume V0 of the combustion chamber 5 at the combustion start timing (MBTCYCL) is calculated using the gap volume Vc, according to the following equation.

$$V0 = Vc + (\pi/4) D^2 \cdot Hmbtcycl \quad (126)$$

where D: cylinder bore diameter, and

Hmbtcycl: distance of piston pin 76 from TDC at combustion start timing (MBTCYCL) [m].

According to the sixth embodiment, when fuel with a predetermined octane number, the octane number 80 here, is used, the knocking detection result of the knocking sensor 47 is fed back to the compression ratio rather than the ignition timing (FIG. 60). Accordingly, the movement of the estimated compression ratio value CMPEST is similar to the movement of the estimated alcohol concentration value ALCTEST shown by the dot-dash line in the bottom section of FIG. 58. More specifically, when knocking occurs, it is determined that the estimated compression ratio value CMPEST is lower than the actual compression ratio, and hence the estimated compression ratio value CMPEST is increased in a step. If, as a result, knocking no longer occurs, the estimated compression ratio value CMPEST is reduced, according to a fixed cycle, in variations of the second predetermined value const25 every time the counter value count reaches the predetermined value const24. Then, once the minimum ignition timing value PADV has matched MBTCAL, updating of the estimated compression ratio value CMPEST is halted, and the value at that time is retained. The volume VIVC of the combustion chamber 5 at the intake value closing timing and the volume V0 of the combustion chamber 5 at the combustion start timing (MBTCYCL) are calculated on the basis of the fluctuating estimated compression ratio value CMPEST.

Hence according to the sixth embodiment, the estimated compression ratio value CMPEST is calculated on the basis of the knocking detection result produced by the knocking sensor 47 (steps S461, S531, S534 of FIG. 60), and the volume V0 of the combustion chamber 5 at the combustion start timing, which is used to calculate the initial combustion period BURN1, is calculated on the basis of the estimated compression ratio value CMPEST (steps S361, S362 of FIG. 64). As a result, an operation to retard and then advance the ignition timing in order to avoid knocking, such as that performed in a conventional device in which the knocking detection result is fed back to the ignition timing, need not be performed repeatedly, regardless of the operating conditions and even when fuel having the octane number 80 (fuel having a predetermined octane number) is used and, for some reason, the actual compression ratio increases beyond the compression ratio of the engine specifications. The knocking limit ignition timing can be followed even during transitions such as acceleration and deceleration, and hence the fuel economy and output can be prevented from deteriorating.

Moreover, according to the sixth embodiment, a determination is made as to whether or not knocking is actually occurring in the combustion chamber, the knocking occurrence timing in the combustion chamber is detected, the knocking occurrence timing detected value θknkreal is compared to the knocking occurrence timing predicted value θknkest, the estimated compression ratio value CMPEST is calculated on the basis of the comparison result and knocking detection result, the volume V0 of the combustion chamber at the combustion start timing is calculated on the basis of the estimated compression ratio value CMPEST, the combustion period (BURN1, BURN2) from the beginning of combustion to a predetermined crank angle is calculated on the basis of the volume V0 at the combustion start timing, the basic ignition timing MBTCAL for obtaining MBT is calculated on the basis of the combustion period (BURN1, BURN2), and spark ignition is performed at the basic ignition timing MBTCAL. In so doing, the basic ignition timing for obtaining MBT can be applied with a high degree of precision, while converging the estimated compression ratio value CMPEST quickly, even when fuel having a predetermined octane number or composite fuel having a fixed alcohol concentration is used and, for some reason, the actual compression ratio is higher than the compression ratio of the engine specifications.

Further, as indicated by the equation (124) above, when updating (calculating) the estimated compression ratio value CMPEST, the ignition timing differential $\Delta\theta$ (=θknkreal−θknkest) between the auto-ignition timing detected value θknkreal (the knocking occurrence timing detected value) and the auto-ignition timing predicted value θknkest (the knocking occurrence timing predicted value) is also taken into account. More specifically, when the auto-ignition timing predicted value θknkest deviates greatly to the retarded side of the auto-ignition timing detected value θknkreal ($\Delta\theta$ is large), the update amount of the estimated compression ratio value each time is greater than when the auto-ignition timing predicted value θknkest deviates to the retarded side of the auto-ignition timing detected value θknkreal only slightly ($\Delta\theta$ is small). Hence the estimated compression ratio value CMPEST converges more quickly when the auto-ignition timing predicted value θknkest deviates greatly to the retarded side of the auto-ignition timing detected value θknkreal than when the auto-ignition timing predicted value θknkest deviates to the retarded side of the auto-ignition timing detected value θknkreal only slightly.

Thus according to the sixth embodiment, the estimated compression ratio value CMPEST (the estimated value of the knocking-correlated parameter) is also calculated on the basis of the ignition timing differential $\Delta\theta$ (the result of a comparison of the auto-ignition timing detected value θknkreal and the auto-ignition timing predicted value θknkest) (step S531 in FIG. 60). As a result, convergence of the estimated compression ratio value CMPEST can be performed more quickly, thereby improving the operability of the engine correspondingly.

According to the sixth embodiment, when knocking is detected, the estimated compression ratio value CMPEST is updated to the larger side during the combustion cycle in which the knocking occurs until the ignition timing differential $\Delta\theta$ (occurrence timing differential) between the auto-ignition timing detected value θknkreal (knocking occurrence timing detected value) and the auto-ignition timing predicted value θknkest (knocking occurrence timing predicted value) is held within the allowable range (the loop operation of the steps S463, S464, S531, S532 in FIG. 60). The estimated compression ratio value CMPEST is then updated, according to a fixed cycle, toward the smaller side in variations of the second predetermined value const25 (step S461, S467, S533, S469, S534, S471 of FIG. 60). In so doing, the estimated compression ratio value CMPEST can be converged during the combustion cycle in which the knocking occurs.

According to the sixth embodiment, the estimated compression ratio value CMPEST is updated to the smaller side (the side at which knocking occurs) in variations of the second predetermined value const25 (step S534 of FIG. 60) under conditions in which knocking occurs at the basic ignition timing MBTCAL (step S467 of FIG. 60). In so doing, the estimated compression ratio value CMPEST is not updated mistakenly.

According to the sixth embodiment, as shown in FIG. 64, when the effective compression ratio Ec from the intake valve closing timing IVC to the combustion start timing is calculated on the basis of the volume VIVC of the combustion chamber 5 at the intake value closing timing and the volume V0 of the combustion chamber 5 at the combustion start timing (S163 of FIG. 64), the temperature T0 of the combustion chamber 5 at the combustion start timing and the pressure P0 of the combustion chamber 5 at the combustion start timing are calculated from the temperature TINI of the combustion chamber 5 at the intake valve closing timing and the effective compression ratio Ec, and the pressure PINI of the combustion chamber 5 at the intake valve closing timing and the effective compression ratio Ec, respectively (steps S164 to S167 in FIG. 64), and the stratified flow combustion speed SL1, used to calculate the initial combustion period BURN1, is calculated on the basis of the temperature T0 and pressure P0 of the combustion chamber 5 at the combustion start timing (step S168 of FIG. 64), the volume VIVC of the combustion chamber 5 at the intake valve closing timing is calculated on the basis of the estimated compression ratio value CMPEST (steps S351, S352 of FIG. 63). In so doing, the volume VIVC of the combustion chamber 5 at the intake valve closing timing can be calculated with a high degree of precision even when fuel having a predetermined octane number is used and, for some reason, the actual compression ratio is higher than the expected compression ratio.

In the sixth embodiment, a case was described in which the auto-ignition timing predicted value θknkest (knocking occurrence timing predicted value) is calculated on the basis of a characteristic expressing the distribution of an inverse of the time required for the fuel in the combustion chamber to auto-ignite. However, the auto-ignition timing detected value θknkreal (knocking occurrence timing detected value) may be used instead of the auto-ignition timing predicted value θknkest.

Seventh, Eighth, and Ninth Embodiments

Figure 65:
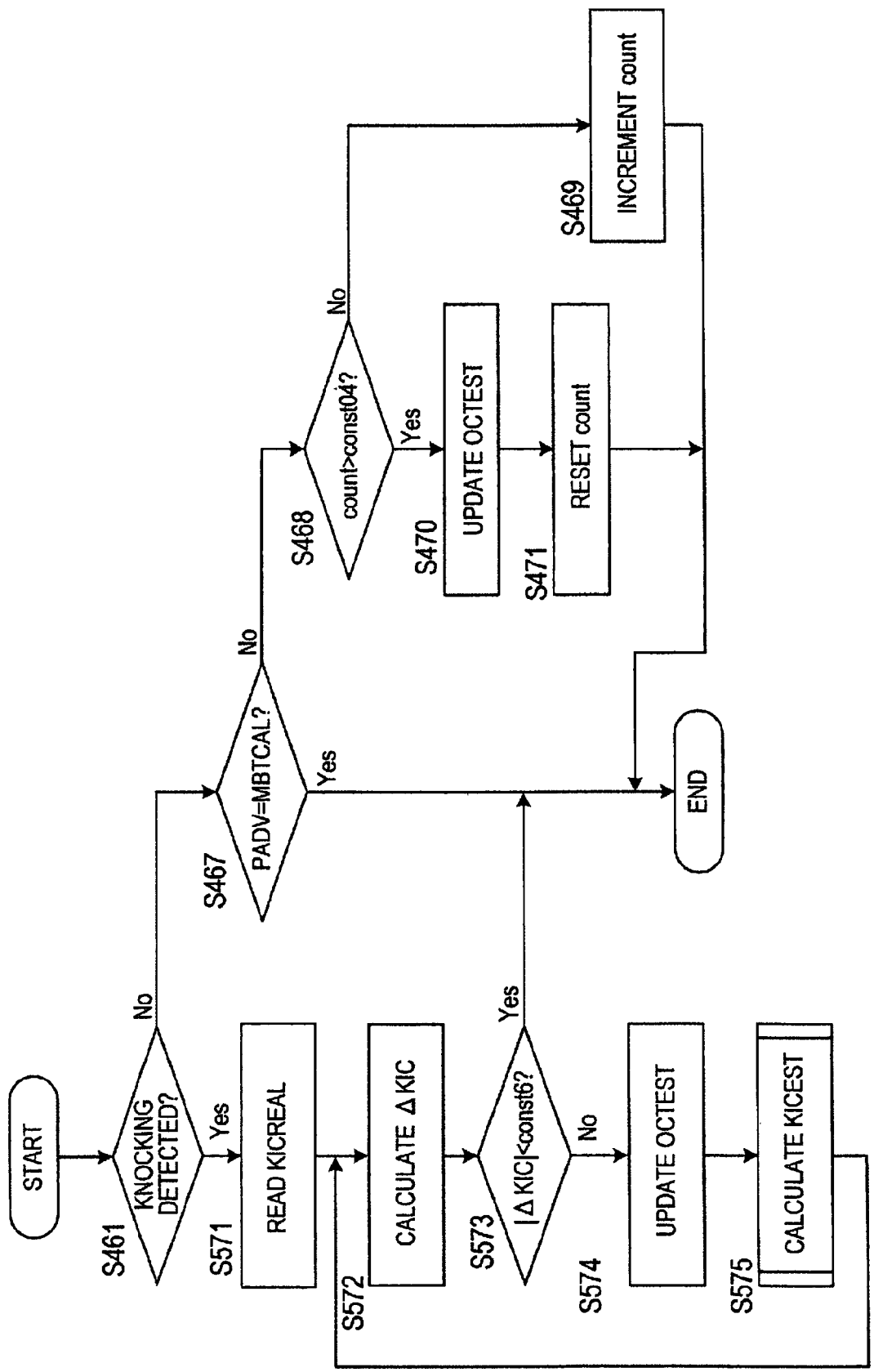
FIG. 65 is a flowchart for calculating the estimated octane number value in a seventh embodiment.
Figure 69:
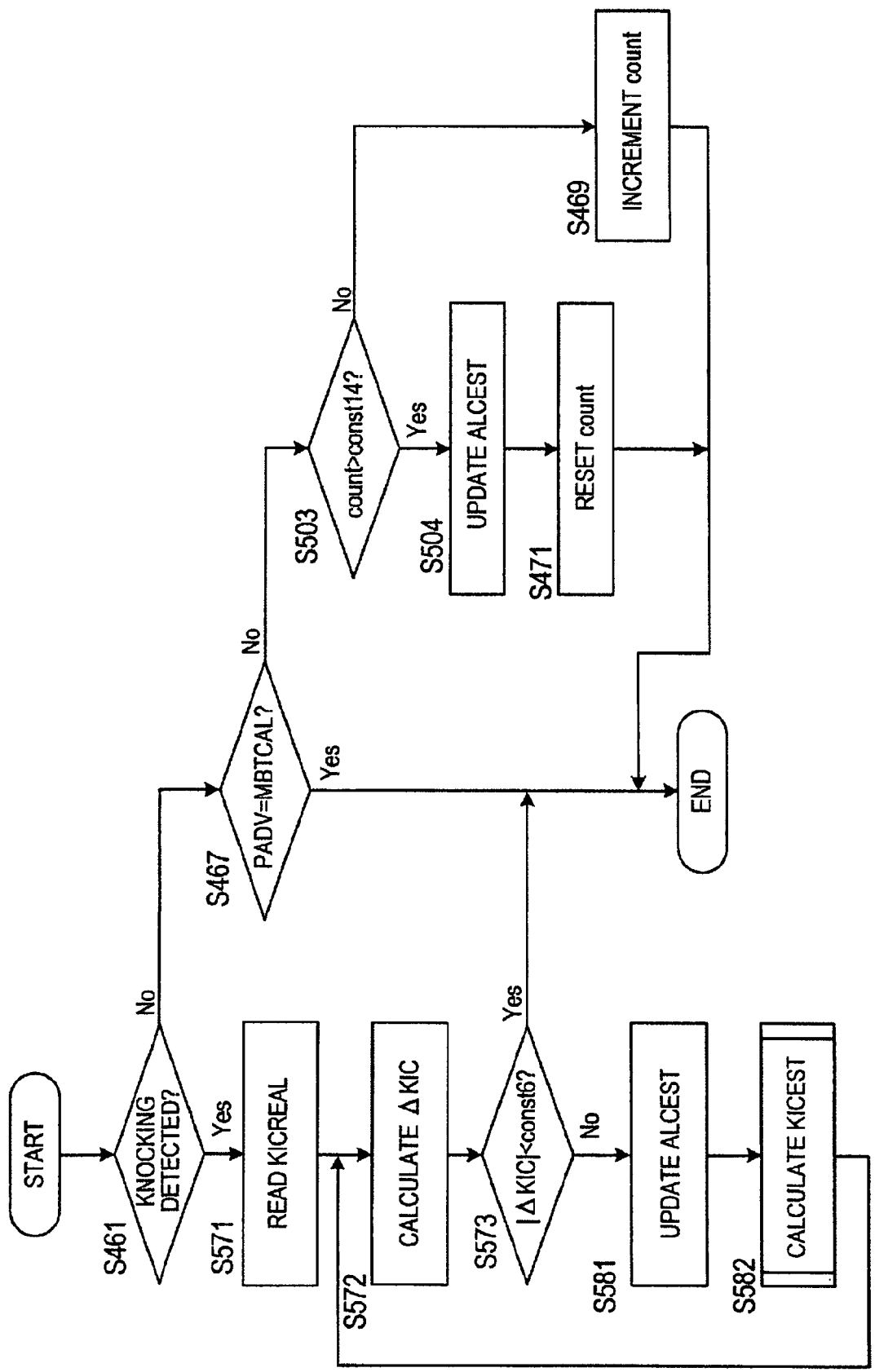
FIG. 69 is a flowchart for calculating the estimated alcohol concentration value in the eighth embodiment.
Figure 71:
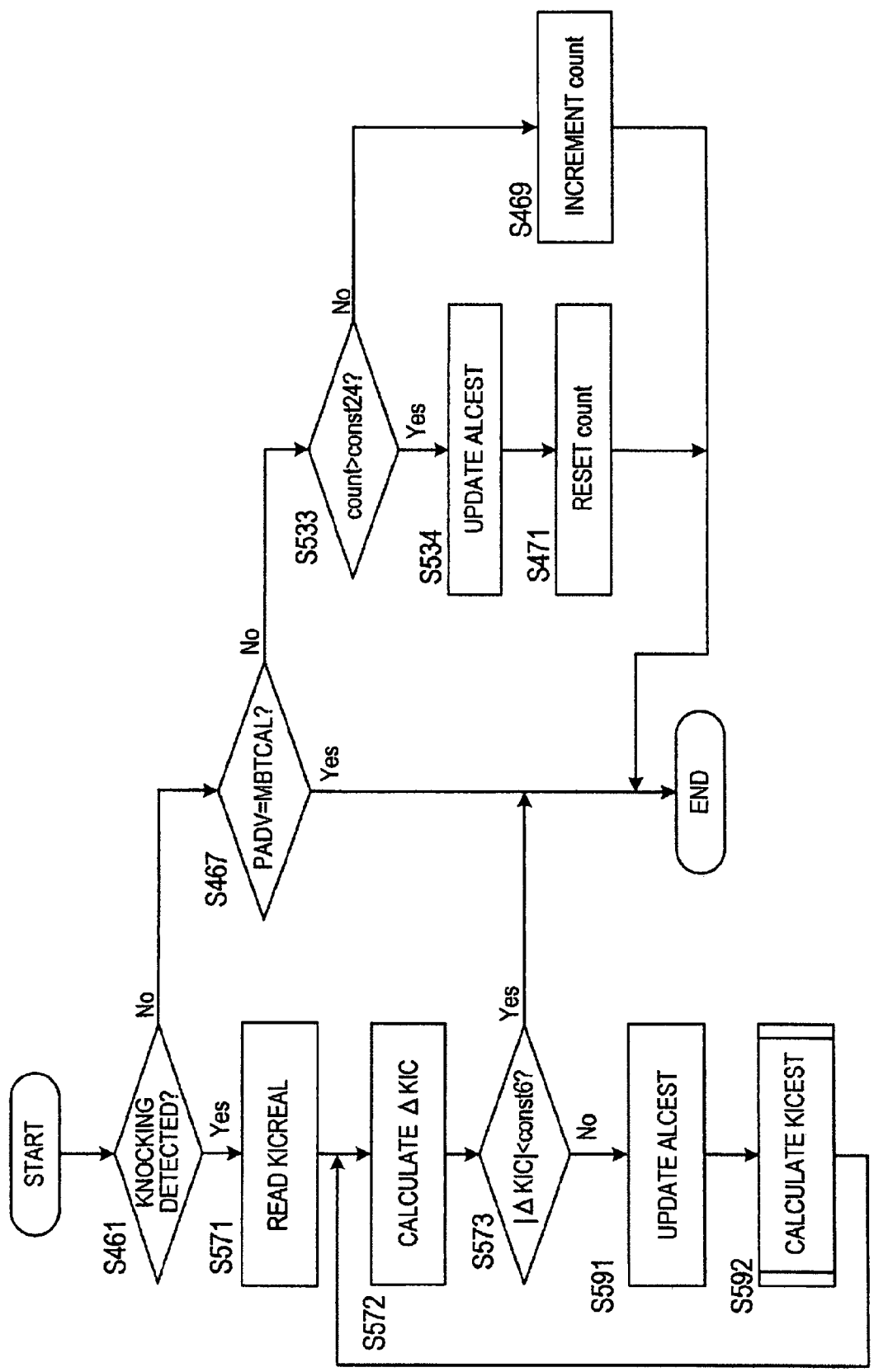
FIG. 71 is a flowchart for calculating the estimated compression ratio value in the ninth embodiment.

The flowcharts in FIGS. 65, 69, and 71 illustrate seventh, eighth, and ninth embodiments respectively. FIG. 65 replaces FIG. 48 of the fourth embodiment, FIG. 69 replaces FIG. 55 of the fifth embodiment, and FIG. 71 replaces FIG. 60 of the sixth embodiment. In FIG. 65, identical parts to FIG. 48 are allocated identical step numbers, in FIG. 69, identical parts to FIG. 55 are allocated identical step numbers, and in FIG. 71, identical parts to FIG. 60 are allocated identical step numbers.

When knocking is detected in the fourth through sixth embodiments, the knocking-correlated parameter is modified (in the fourth embodiment, the estimated octane number value OCTEST is reduced, in the fifth embodiment the estimated alcohol concentration value ALCEST is increased, and in the sixth embodiment the estimated compression ratio value CMPEST is increased) during the combustion cycle in which the knocking is detected until the ignition timing differential $\Delta\theta$, which is the difference between the auto-ignition timing detected value $\theta$knkreal and the auto-ignition timing predicted value $\theta$knkest, is held within an allowable range. When knocking is detected in the seventh through ninth embodiments, on the other hand, the knocking-correlated parameter (the estimated octane number value in the fourth embodiment, the estimated alcohol concentration value in the fifth embodiment, and the estimated compression ratio value in the sixth embodiment) is modified during the combustion cycle in which the knocking is detected until a knocking intensity differential $\Delta$KIC, which is the difference between an estimated knocking intensity value KICEST and a detected knocking intensity value KICREAL, is held within an allowable range.

Figure 66:
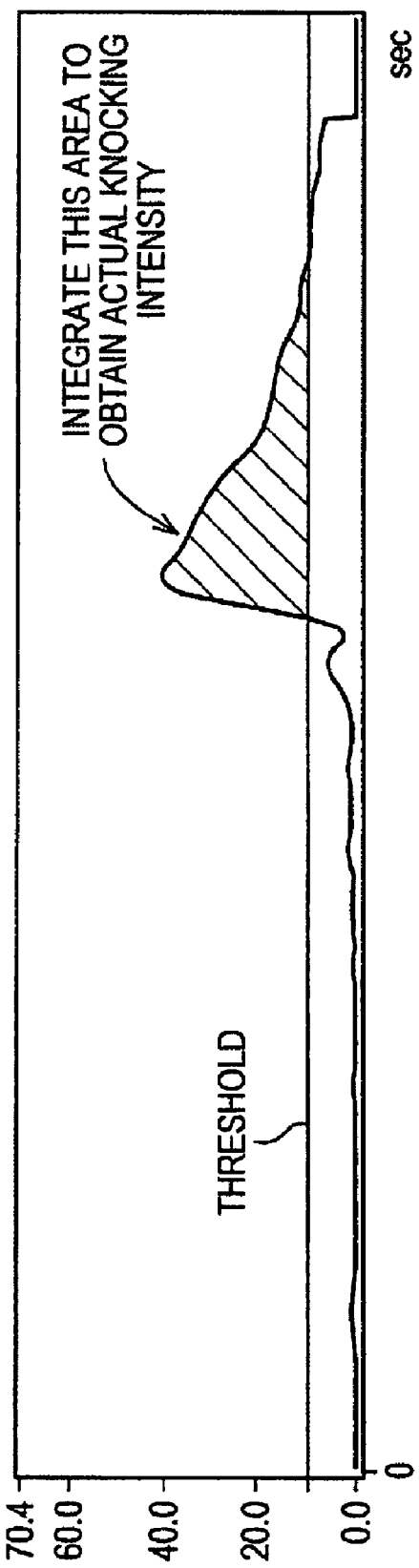
FIG. 66 is a characteristic diagram of the frequency component of knocking in the seventh, eighth, ninth, tenth, and eleventh embodiments.

In the seventh embodiment shown in FIG. 65, steps S571 to S575 differ from the fourth embodiment shown in FIG. 48. In the eighth embodiment shown in FIG. 69, steps S571 to S573, S581, and S582 differ from the fifth embodiment shown in FIG. 55. In the ninth embodiment shown in FIG. 71, steps S571 to S573, S591, and S592 differ from the sixth embodiment shown in FIG. 60. Hence, in the step S571 which is shared by all of the seventh, eighth, and ninth embodiments, the actual knocking intensity is read. To obtain the actual knocking intensity, the surface area above a threshold in FIG. 66, which shows the characteristic of the frequency component of the knocking, may be integrated. The integrated value determined in this manner is multiplied by a correlation coefficient 2 and thus converted into the knocking intensity, and the converted value is read as the detected knocking intensity value KICREAL. It should be noted that the characteristic diagram in FIG. 66 is identical to that of FIG. 49.

In the seventh embodiment, the loop operation of the steps S572 to S575 of FIG. 65 is performed to converge the estimated octane number value OCTEST without generating knocking such that the knocking intensity differential $\Delta$KIC is held within the allowable range. In the eighth embodiment, the loop operation of the steps S572, S573, S581, and S582 of FIG. 69 is performed to converge the estimated alcohol concentration value ALCEST without generating knocking such that the knocking intensity differential $\Delta$KIC is held within the allowable range. In the ninth embodiment, the loop operation of the steps S572, S573, S591, and S592 of FIG. 71 is performed to converge the estimated compression ratio value CMPEST without generating knocking such that the knocking intensity differential $\Delta$KIC is held within the allowable range. First, in the step S572 which is shared by all of the seventh, eighth, and ninth embodiments, the knocking intensity differential $\Delta$KIC is calculated using the following equation.

$$\Delta KIC = KICEST - KICREAL \tag{127}$$

In the step S573, which is also shared by all of the seventh, eighth, and ninth embodiments, the absolute value of the knocking intensity differential $\Delta$KIC is compared to a predetermined value const6. The predetermined value const6 defines the allowable range, and hence if the absolute value of the knocking intensity differential $\Delta$KIC is less than the predetermined value const6, the knocking intensity differential $\Delta$KIC is within the allowable range. In this case, it is determined that the knocking has been caused by something other than an error in the estimated octane number value, estimated alcohol concentration value, or estimated compression ratio value, and therefore the current processing ends as is.

When the absolute value of the knocking intensity differential $\Delta$KIC is equal to or greater than the predetermined value, the routine advances to the step S574 of FIG. 65 in the seventh embodiment, the step S581 of FIG. 69 in the eighth embodiment, and the step S591 of FIG. 71 in the ninth embodiment. In other words, when the estimated knocking intensity value KICEST is larger than the detected knocking intensity value KICREAL, this indicates that the estimated knocking intensity value is excessively large, and therefore, in the seventh embodiment, the estimated octane number value OCTEST is reduced by a value obtained by multiplying the knocking intensity differential $\Delta$KIC by the first predetermined value const03 in the step S574 of FIG. 65. In other words, the estimated octane number value OCTEST is updated using the following equation.

$$OCTEST(\text{new}) = OCTEST(\text{old}) - const03 \times \Delta KIC \tag{128}$$

where OCTEST(new): updated estimated octane number value,

OCTEST(old): pre-update estimated octane number value, and const03: update proportion to smaller side (positive absolute number).

Likewise in the eighth embodiment, the estimated alcohol concentration value ALCEST is increased by a value obtained by multiplying the knocking intensity differential $\Delta$KIC by the first predetermined value const13 in the step S581 of FIG. 69. In other words, the estimated alcohol concentration value ALCEST is updated using the following equation.

$$ALCEST(\text{new}) = ALCEST(\text{old}) + const13 \times \Delta KIC \tag{129}$$

where ALCEST(new): updated estimated alcohol concentration value,

ALCEST(old): pre-update estimated alcohol concentration value, and const13: update proportion to larger side (positive absolute number).

Likewise in the ninth embodiment, the estimated compression ratio value CMPEST is increased by a value obtained by multiplying the knocking intensity differential $\Delta$KIC by the first predetermined value const23 in the step S591 of FIG. 71. In other words, the estimated compression ratio value CMPEST is updated using the following equation.

$$CMPEST(\text{new}) = CMPEST(\text{old}) + const23 \times \Delta KIC \tag{130}$$

where CMPEST(new): updated estimated compression ratio value,

CMPEST(old): pre-update estimated compression ratio value, and const23: update proportion to larger side (positive absolute number).

Here, the second item on the right side of the equation (128) determines the amount by which the estimated octane number value is updated each time. By introducing the knocking intensity differential $\Delta$KIC into the update amount each time, convergence of the estimated octane number value OCTEST can be performed more quickly. In other words, when the estimated octane number value OCTEST is larger than the actual octane number but in the vicinity of the actual octane number, the estimated knocking intensity value KICEST does not deviate greatly to the large side of the detected knocking intensity value KICREAL, but when the estimated octane number value OCTEST is larger than the actual octane number by a large degree, the estimated knocking intensity value KICEST deviates greatly to the large side of the detected knocking intensity value KICREAL. When the estimated knocking intensity value KICEST deviates greatly to the large side of the detected knocking intensity value KICREAL (that is, when ΔKIC is large), the update amount each time is increased correspondingly, and in so doing, convergence of the estimated octane number value OCTEST is performed more quickly. For the same reason, the knocking intensity differential ΔKIC is multiplied by the first predetermined value const13 in the equation (129) and the first predetermined value const23 in the equation (130).

In the seventh embodiment, the estimated knocking intensity value KICEST is recalculated in the step S575 of FIG. 65 using the estimated octane number value OCTEST updated immediately beforehand in the step S574. In the eighth embodiment, the estimated knocking intensity value KICEST is recalculated in the step S582 of FIG. 69 using the estimated alcohol concentration value ALCEST updated immediately beforehand in the step S581. In the ninth embodiment, the estimated knocking intensity value KICEST is recalculated in the step S592 of FIG. 71 using the estimated compression ratio value CMPEST updated immediately beforehand in the step S591. Each of these calculations is the second calculation of the estimated knocking intensity value KICEST (the step S229 of FIG. 33 being the first calculation of the estimated knocking intensity value KICEST), and the resulting second estimated knocking intensity value KICEST is written over the first estimated knocking intensity value KICEST.

Calculation of the second estimated knocking intensity value KICEST onward will now be described using the flowcharts in FIGS. 67 and 68 (subroutines of the step S575 of FIG. 65) for the seventh embodiment, the flowcharts in FIGS. 70 and 68 (subroutines of the step S582 of FIG. 69) for the eighth embodiment, and the flowcharts in FIGS. 72 and 68 (subroutines of the step S592 of FIG. 71) for the ninth embodiment. In the seventh embodiment, the calculation processing of the second estimated knocking intensity value KICEST onward adopts the calculation processing of the estimated knocking intensity value in FIGS. 32 and 33 of the fourth embodiment. In the eighth embodiment, the calculation processing of the second estimated knocking intensity value KICEST onward adopts the calculation processing of the estimated knocking intensity value in FIGS. 53 and 33 of the fifth embodiment. In the ninth embodiment, the calculation processing of the second estimated knocking intensity value KICEST onward adopts the calculation processing of the estimated knocking intensity value in FIGS. 59 and 33 of the sixth embodiment. Hence, in FIGS. 67 and 68 of the seventh embodiment, identical parts to FIGS. 32 and 33 of the fourth embodiment are allocated identical step numbers, in FIGS. 70 and 68 of the eighth embodiment, identical parts to FIGS. 53 and 33 of the fifth embodiment are allocated identical step numbers, and in FIGS. 72 and 68 of the ninth embodiment, identical parts to FIGS. 59 and 33 of the sixth embodiment are allocated identical step numbers.

Figure 67:
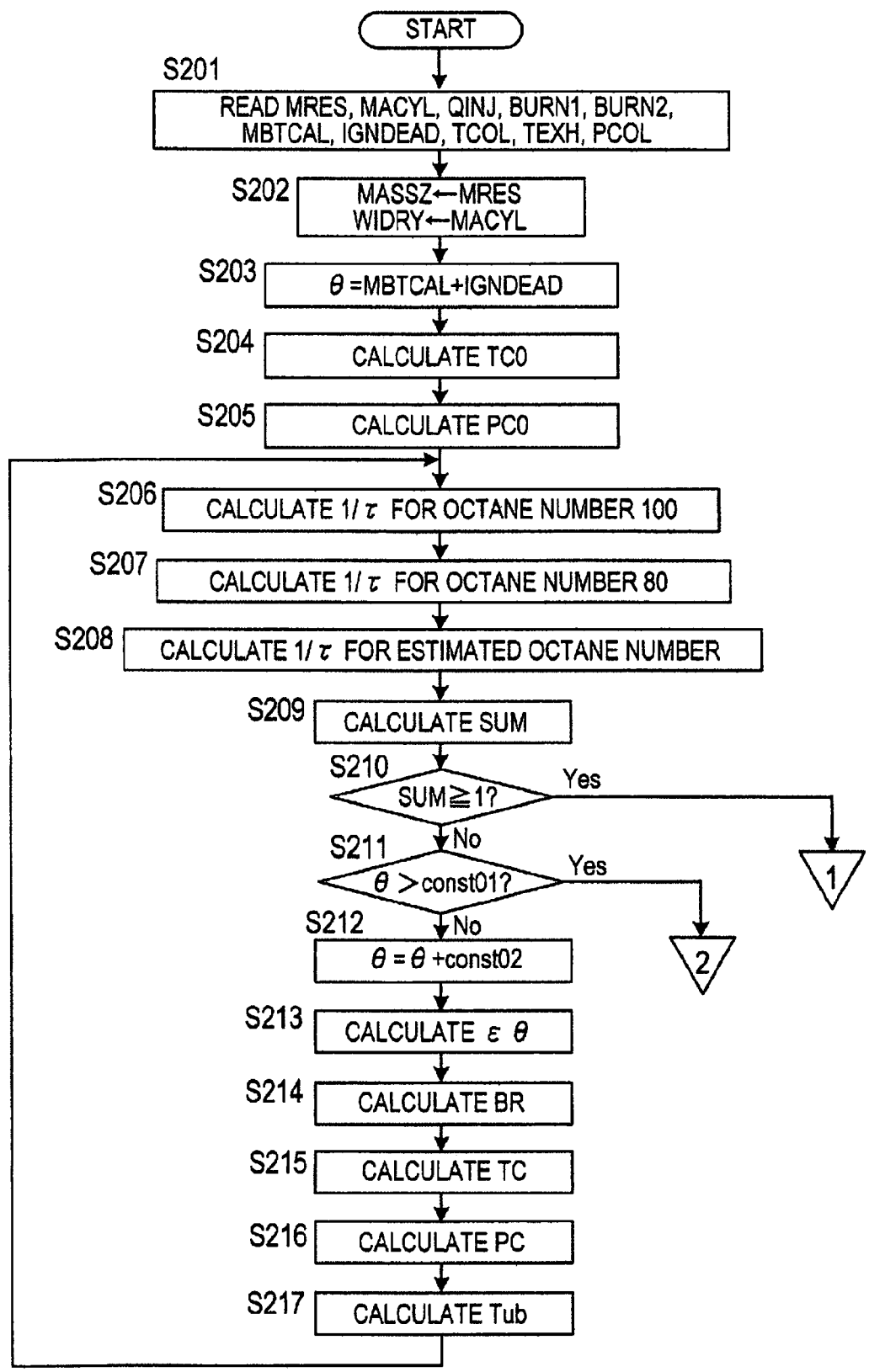
FIG. 67 is a flowchart for calculating an estimated knocking intensity value in the seventh embodiment.
Figure 68:
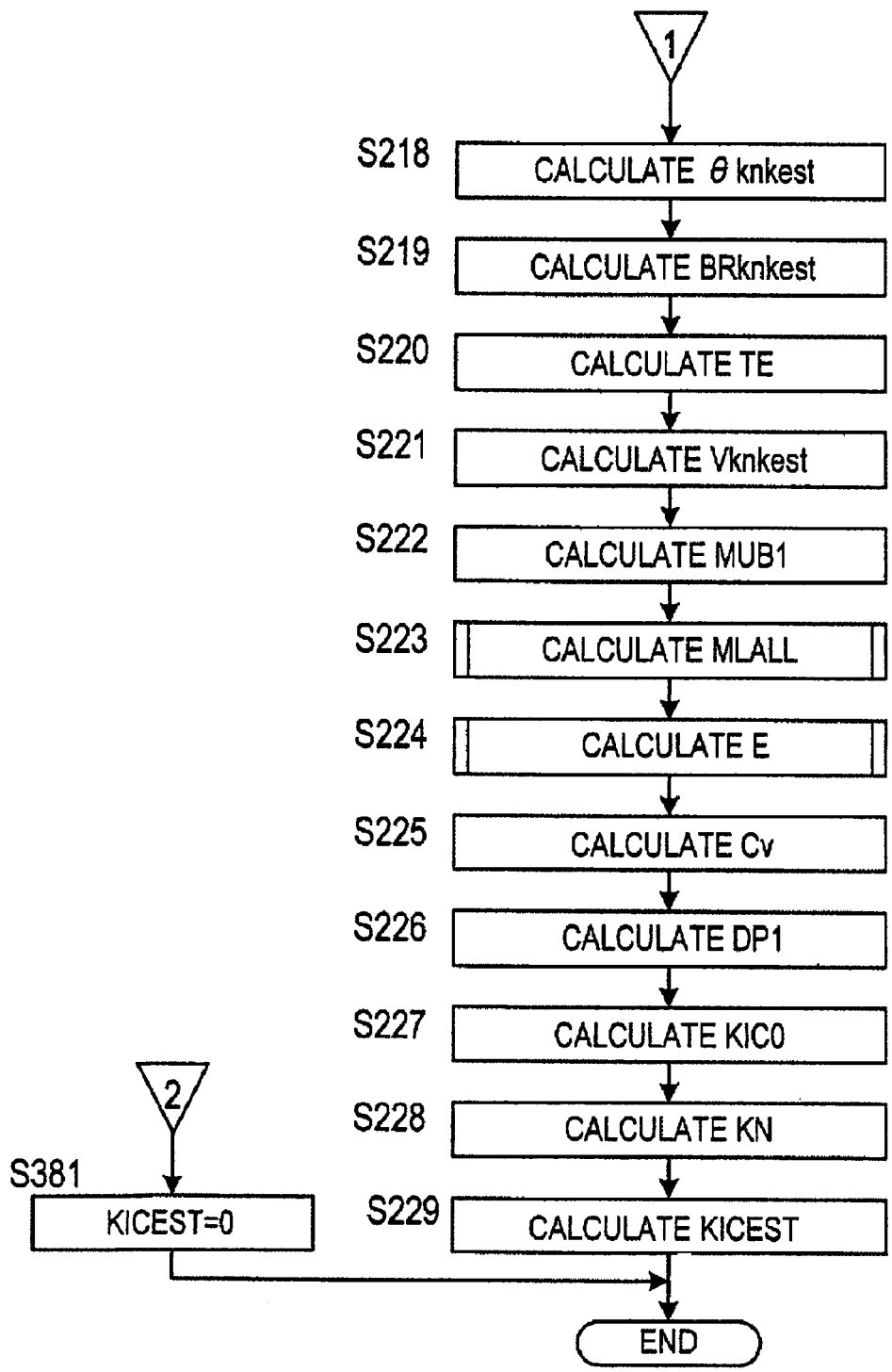
FIG. 68 is a flowchart for calculating the estimated knocking intensity value in the seventh, eighth, and ninth embodiments.

The calculation processing of the estimated knocking intensity value KICEST in the seventh through ninth embodiments differs from the calculation processing of the estimated knocking intensity value KICEST in the fourth through sixth embodiments in that the steps S230, S231, S232 shown in FIG. 33, which are shared by all of the fourth through sixth embodiments, are omitted from FIG. 68, which is shared by each of the seventh through ninth embodiments, and in that a new step S381 is added to FIG. 68, which is shared by all of the seventh through ninth embodiments. Hence in the seventh embodiment, when the integrated value SUM of 1/τ is equal to or greater than one in the step S210 of FIG. 67 in a case where the estimated octane number value OCTEST, updated in the step S574 of FIG. 65, is used in the step S208 of FIG. 67, and in the eighth embodiment, when the integrated value SUM of 1/τ is equal to or greater than one in the step S210 of FIG. 70 in a case where the estimated alcohol concentration value ALCEST, updated in the step S581 of FIG. 69, is used in the step S293 of FIG. 70, and in the ninth embodiment, when the integrated value SUM of 1/τ is equal to or greater than one in the step S210 of FIG. 72, the routine advances to the step S229 of FIG. 68, which is shared by all of the seventh through ninth embodiments, where the estimated knocking intensity value KICEST is calculated.

The second estimated knocking intensity value KICEST calculated in this manner is closer to the detected knocking intensity value KICREAL than the first estimated knocking intensity value KICEST calculated in the step S229 of FIG. 33. Hence, the routine returns to the step S572 of FIG. 65 in the seventh embodiment, the step S572 of FIG. 69 in the eighth embodiment, and the step S572 of FIG. 71 in the ninth embodiment, where the second estimated knocking intensity value KICEST is used to recalculate the knocking intensity differential ΔKIC. In the step S573 of FIGS. 65, 69, and 71, the knocking intensity differential ΔKIC is compared to a predetermined value. When the knocking intensity differential ΔKIC is equal to or greater than the predetermined value, the steps S574, S575, S572, and S573 of FIG. 65 are repeated in the seventh embodiment, the steps S581, S582, S572, and S573 of FIG. 69 are repeated in the eighth embodiment, and the steps S591, S592, S572, and S573 of FIG. 71 are repeated in the ninth embodiment. As a result of this repetition, the knocking intensity differential ΔKIC, calculated using the estimated knocking intensity value KICEST that has been calculated several times, is eventually held below the predetermined value, and at this time, the routine jumps from the step S573 of FIGS. 65, 69, and 71 to END, thus terminating the current processing.

The operation of the seventh embodiment (the loop operation of the steps S572 to S575 in FIG. 65) to update the estimated octane number value OCTEST repeatedly when knocking is detected until the knocking intensity differential ΔKIC is held below the predetermined value, the operation of the eighth embodiment (the loop operation of the steps S572, S573, S581, and S582 in FIG. 69) to update the estimated alcohol concentration value ALCEST repeatedly when knocking is detected until the knocking intensity differential ΔKIC is held below the predetermined value, and the operation of the ninth embodiment (the loop operation of the steps S572, S573, S591, and S592 in FIG. 71) to update the estimated compression ratio value CMPEST repeatedly when knocking is detected until the knocking intensity differential ΔKIC is held below the predetermined value, all end well in advance of the beginning of the next combustion cycle. Hence, when the combustion cycle in which knocking occurs is complete, the estimated octane number value OCTEST has been converged in the seventh embodiment, the estimated alcohol concentration number value ALCEST has been converged in the eighth embodiment, and the estimated compression ratio value CMPEST has been converged in the ninth embodiment.

Figure 70:
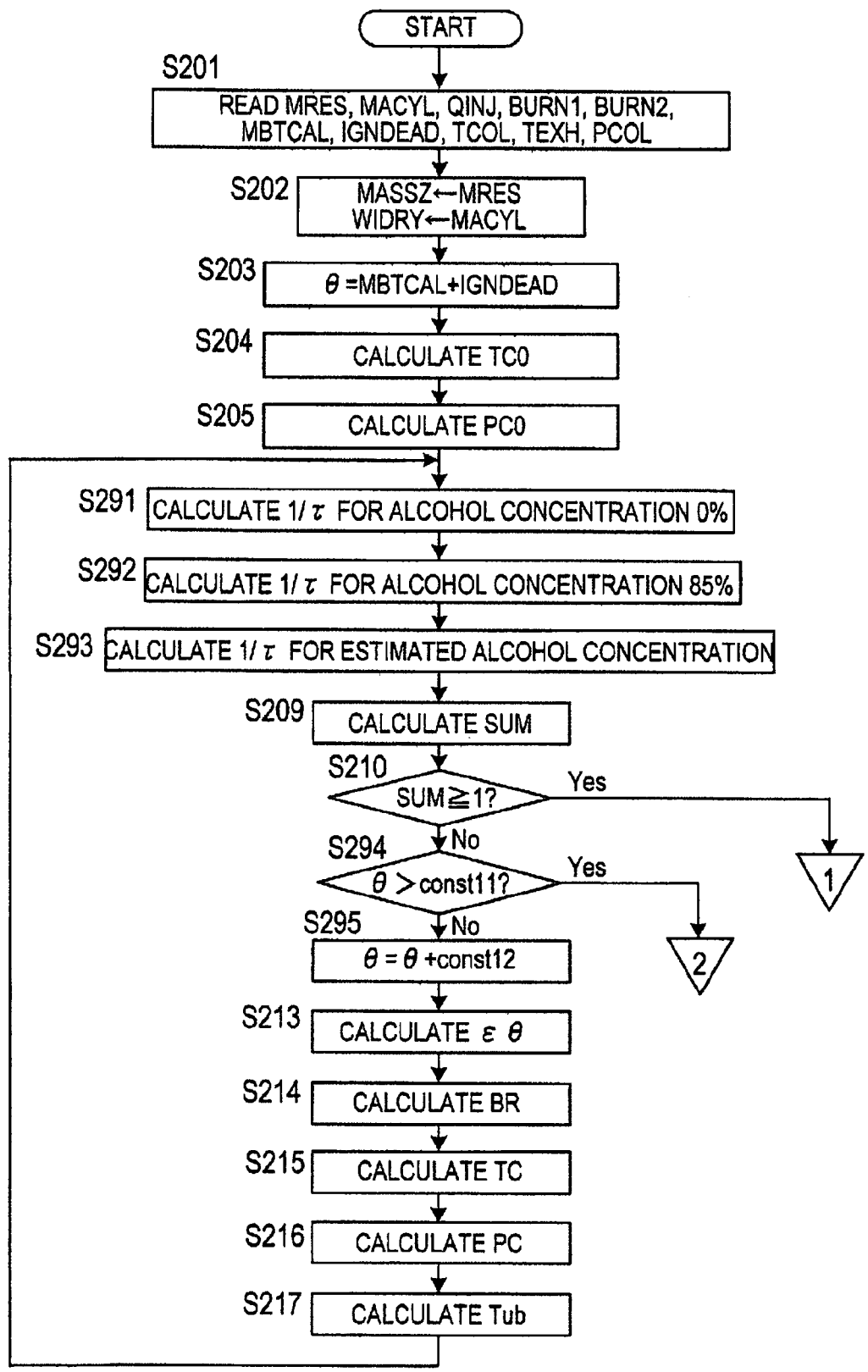
FIG. 70 is a flowchart for calculating the estimated knocking intensity value in the eighth embodiment.
Figure 72:
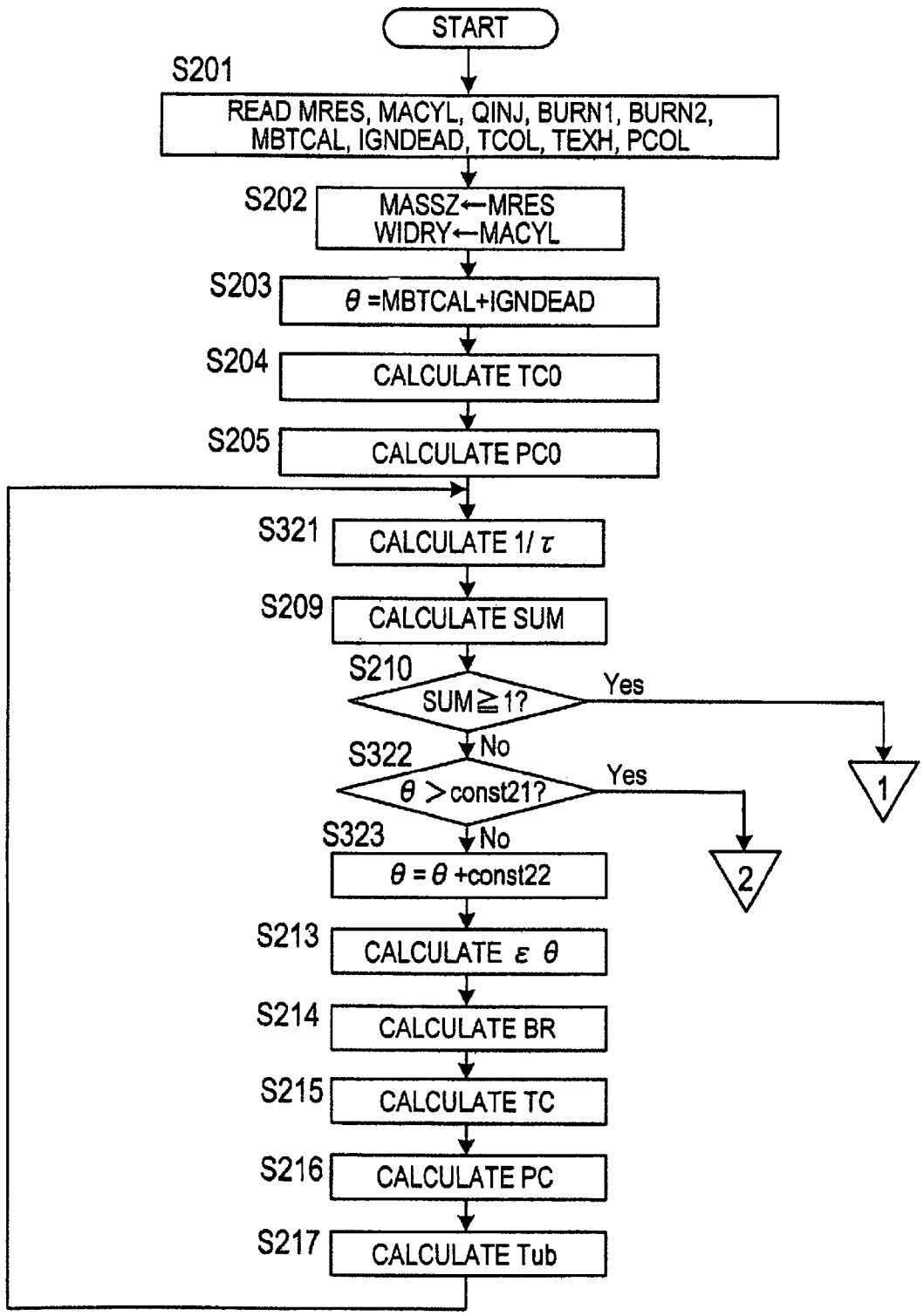
FIG. 72 is a flowchart for calculating the estimated knocking intensity value in the ninth embodiment.

On the other hand, when the crank angle θ exceeds the predetermined value const01 without the integrated value SUM of 1/τ reaching one in FIG. 67 of the seventh embodiment, when the crank angle θ exceeds the predetermined value const11 without the integrated value SUM of 1/τ reaching one in FIG. 70 of the eighth embodiment, and when the crank angle θ exceeds the predetermined value const21 without the integrated value SUM of 1/τ reaching one in FIG. 72 of the ninth embodiment, the routine advances from the step S211 of FIG. 67, the step S294 of FIG. 70, and the step S322 of FIG. 72 respectively to the step S381 of FIG. 68, which is shared by the seventh through ninth embodiments, where the estimated knocking intensity value KICEST is set to zero. The current processing is then terminated.

Thus, when knocking is detected, the estimated octane number value OCTEST is reduced in the seventh embodiment, the estimated alcohol concentration value ALCEST is increased in the eighth embodiment, and the estimated compression ratio value CMPEST is increased in the ninth embodiment during the combustion cycle in which the knocking is detected until the knocking intensity differential ΔKIC is held within the allowable range.

According to the seventh, eighth, and ninth embodiments, an estimated value of the knocking-correlated parameter, i.e. the octane number, alcohol concentration, and compression ratio, is calculated on the basis of the knocking detection result (the knocking detection result is fed back to the knocking-correlated parameter) (steps S461, S574, S470 of FIG. 65 in the seventh embodiment, steps S461, S581, and S504 of FIG. 69 in the eighth embodiment, and steps S461, S591, S534 of FIG. 71 in the ninth embodiment), the auto-ignition timing predicted value θknkest (the knocking occurrence timing predicted value) in the combustion chamber 5 is calculated on the basis of the estimated value of the knocking-correlated parameter (steps S206 to S210 of FIG. 32 and step S218 of FIG. 33 in the seventh embodiment; steps S291 to S293, S209, S210 of FIG. 53 and step S218 of FIG. 33 in the eighth embodiment; and steps S321, S209, S210 of FIG. 59 and step S218 of FIG. 33 in the ninth embodiment), and the knocking limit ignition timing KNOCKcal is calculated on the basis of the auto-ignition timing predicted value θknkest (steps S219 to S231 of FIG. 33). As a result, an operation to retard and then advance the ignition timing in order to avoid knocking, such as that performed in a conventional device in which the knocking detection result is fed back to the ignition timing, need not be performed repeatedly, regardless of the operating conditions. This applies even when a commercially available fuel whose octane number cannot be learned in advance or a commercially available composite fuel whose alcohol concentration cannot be learned in advance is used, or when fuel having a predetermined octane number is used and, for some reason, the actual compression ratio increases beyond the compression ratio of the engine specifications. The knocking limit ignition timing can be followed even during transitions such as acceleration and deceleration, and hence the fuel economy and output can be prevented from deteriorating.

Further, as indicated by the equations (128), (129), and (130) above, when updating (calculating) the estimated octane number value OCTEST, the estimated alcohol concentration value ALCEST, and the estimated compression ratio value CMPEST after knocking has been detected, the knocking intensity differential ΔKIC(=KICEST−KICREAL) between the estimated knocking intensity value KICEST and detected knocking intensity value KICREAL is also taken into account. More specifically, in the seventh embodiment, when the estimated octane number value OCTEST is greater than the actual octane number and deviates greatly from the actual octane number (i.e. when the estimated knocking intensity value KICEST deviates greatly to the larger side of the detected knocking intensity value KICREAL), the update amount of the estimated octane number value each time is greater than when the estimated octane number value OCTEST is greater than the actual octane number but in the vicinity of the actual octane number (i.e. the estimated knocking intensity value KICEST deviates to the larger side of the detected knocking intensity value KICREAL only slightly). Hence the estimated octane number value OCTEST converges more quickly when the estimated octane number value OCTEST is greater than the actual octane number and deviates greatly from the actual octane number than when the estimated octane number value OCTEST is greater than the actual octane number but in the vicinity of the actual octane number. In the eighth embodiment, when the estimated alcohol concentration value ALCEST is lower than the actual alcohol concentration and deviates greatly from the actual alcohol concentration (i.e. when the estimated knocking intensity value KICEST deviates greatly to the larger side of the detected knocking intensity value KICREAL), the update amount of the estimated alcohol concentration value each time is greater than when the estimated alcohol concentration value ALCEST is lower than the actual alcohol concentration but in the vicinity of the actual alcohol concentration (i.e. the estimated knocking intensity value KICEST deviates to the larger side of the detected knocking intensity value KICREAL only slightly). Hence the estimated alcohol concentration value ALCEST converges more quickly when the estimated alcohol concentration value ALCEST is lower than the actual alcohol concentration and deviates greatly from the actual alcohol concentration than when the estimated alcohol concentration value ALCEST is lower than the actual alcohol concentration but in the vicinity of the actual alcohol concentration. In the ninth embodiment, when the estimated knocking intensity value KICEST deviates greatly to the larger side of the detected knocking intensity value KICREAL (ΔKIC is large), the update amount of the estimated compression ratio value each time is greater than when the estimated knocking intensity value KICEST deviates to the larger side of the detected knocking intensity value KICREAL only slightly (ΔKIC is small). Hence the estimated compression ratio value CMPEST converges more quickly when the estimated knocking intensity value KICEST deviates greatly to the larger side of the detected knocking intensity value KICREAL than when the estimated knocking intensity value KICEST deviates to the larger side of the detected knocking intensity value KICREAL only slightly.

Thus according to the seventh through ninth embodiments, the estimated value of the knocking-correlated parameter i.e. the estimated octane number value OCTEST, the estimated alcohol concentration value ALCEST, and the estimated compression ratio value CMPEST, is also calculated on the basis of the knocking intensity differential ΔKIC (the result of a comparison of the estimated knocking intensity value KICEST and the detected knocking intensity value KICREAL) (step S574 in FIG. 65, step S581 in FIG. 69, and step S591 in FIG. 71). As a result, convergence of the estimated value of the knocking-correlated parameter can be performed more quickly, thereby improving the operability of the engine correspondingly.

Further, a sampling cycle must be shortened to improve the detection precision of the auto-ignition timing (knocking occurrence timing) using the knocking sensor 47, but when the knocking intensity is used, the sampling frequency of the knocking sensor 47 can be reduced, and therefore, according to the seventh, eighth, and ninth embodiments which use the knocking intensity, the system can be constituted at a reasonable cost with no deterioration in performance.

In the seventh embodiment, a case was described in which the combustion period (BURN1, BURN2) from the beginning of combustion to a predetermined crank angle is calculated on the basis of the stratified flow combustion speed (SL1, SL2), the volume (V0, VTDC) corresponding to the combustion gas volume, the combustion mass proportion (BR1, BR2), and the reaction probability RPROBA, and the basic ignition timing MBTCAL is calculated on the basis of the combustion period (BURN1, BURN2), as shown in FIGS. 5, 10, 12, 13. However, a base ignition timing map may be provided instead of calculating the basic ignition timing MBTCAL. In this case, the pressure increase amount DP1 produced by knocking in the combustion chamber 5 is estimated on the basis of the auto-ignition timing predicted value θknkest (knocking occurrence timing predicted value) and the operating conditions (steps S219 to S226 in FIG. 33), the estimated knocking intensity value KIC is calculated on the basis of the pressure increase amount DP1 (steps S227 to S229 in FIG. 33), the knocking retardation amount KNRT is calculated on the basis of the estimated knocking intensity value KIC (step S230 in FIG. 33), and a value obtained by correcting the basic ignition timing MBTCAL to the retarded side by the knocking retardation amount KNRT is set as the knocking limit ignition timing KNOCKcal (step S231 in FIG. 33). In so doing, although a base ignition timing serving as the basic ignition timing can be provided as a map, the ROM capacity need not be increased, since there is no need to provide base ignition timing maps for each of a plurality of difference octane numbers from the maximum octane number to the minimum octane number.

According to the seventh embodiment, the estimated octane number value OCTEST is calculated on the basis of the knocking detection result and the knocking intensity differential ΔKIC (the result of a comparison of the detected knocking intensity value KICREAL and the estimated knocking intensity value KICEST) (steps S461, S571, S572, S574 in FIG. 65) in response to the fact that the octane number has the greatest influence on knocking when gasoline is used as a fuel. Hence, even when gasoline with an initially unknown octane number is used as the fuel, the auto-ignition timing predicted value θknkest (knocking occurrence timing predicted value) can be predicted with a high degree of precision.

Also according to the seventh embodiment, when knocking is detected, the estimated octane number value OCTEST is updated to the smaller side during the combustion cycle in which the knocking occurs until the knocking intensity differential ΔKIC between the estimated knocking intensity value KICEST and the detected knocking intensity value KICREAL is held within the allowable range (in particular, the loop operation of the steps S572 to S575 in FIG. 65). The estimated octane number value OCTEST is then updated, according to a fixed cycle, toward the larger side in variations of the second predetermined value const05 (step S461 and steps S467 to S471 of FIG. 65). In so doing, the estimated octane number value OCTEST can be converged during the combustion cycle in which the knocking occurs.

According to the seventh embodiment, the estimated octane number value OCTEST is updated to the larger side (the side at which knocking occurs) in variations of the second predetermined value const05 (step S470 of FIG. 65) only under conditions in which knocking occurs at the basic ignition timing MBTCAL, or in other words only when the minimum ignition timing value PADV is further retarded than the basic ignition timing MBTCAL (step S467 of FIG. 48). In so doing, the estimated octane number value OCTEST is not updated mistakenly.

According to the seventh embodiment, the stratified flow combustion speed (SL1, SL2), which is the combustion speed of combustion gas in a stratified flow state, is calculated (step S168 in FIG. 10 and step S188 in FIG. 12), the volume (V0, VTDC) of the combustion chamber 5 corresponding to the combustion gas volume is calculated (step S162 in FIG. 10 and step S182 in FIG. 12), the combustion mass proportion (BR1, BR2) of the gas that burns in the combustion chamber 5 up to a predetermined crank angle is calculated (step S171 in FIG. 10, step S191 in FIG. 12), the reaction probability RPROBA, indicating the combustibility of the combustion gas under predetermined operating conditions, is calculated (step S15 in FIG. 5), the combustion period (BURN1, BURN2) from the beginning of combustion to a predetermined crank angle is calculated on the basis of the stratified flow combustion speed (SL1, SL2), the volume (V0, VTDC) corresponding to the combustion gas volume, the combustion mass proportion (BR1, BR2), and the reaction probability RPROBA (step S171 in FIG. 10 and step S191 in FIG. 12), and the basic ignition timing MBTCAL for obtaining MBT is calculated on the basis of the combustion period (BURN1, BURN2) (steps S41 to S43 in FIG. 13). Hence, the knocking limit ignition timing KNOCKcal, which is a value obtained by correcting the basic ignition timing MBTCAL to the retarded side, is calculated on the basis of combustion analysis, and therefore an optimum knocking limit ignition timing KNOCKcal can be calculated regardless of the operating conditions.

According to the eighth embodiment, the estimated alcohol concentration value ALCEST is calculated on the basis of the knocking detection result and the knocking intensity differential ΔKIC (the result of a comparison of the estimated knocking intensity value KICEST and detected knocking intensity value KICREAL) (steps S461, S571, S572, S581 in FIG. 69) in response to the fact that when a composite fuel of gasoline and alcohol is used, the alcohol concentration of the composite fuel influences knocking. Hence, even when fuel containing alcohol with an initially unknown alcohol concentration is used as the fuel, the auto-ignition timing predicted value θknkest (knocking occurrence timing predicted value) can be predicted with a high degree of precision.

According to the eighth embodiment, when knocking is detected, the estimated alcohol concentration value ALCEST is updated to the higher side during the combustion cycle in which the knocking occurs until the knocking intensity differential ΔKIC between the estimated knocking intensity value KICEST and the detected knocking intensity value KICREAL is held within the allowable range (in particular, the loop operation of the steps S572, S573, S581, S582 in FIG. 69). The estimated alcohol concentration value ALCEST is then updated, according to a fixed cycle, toward the lower side in variations of the second predetermined value const15 (step S461, S467, S503, S469, S504, S471 of FIG. 69). In so doing, the estimated alcohol concentration value ALCEST can be converged during the combustion cycle in which the knocking occurs.

According to the eighth embodiment, the estimated alcohol concentration value ALCEST is updated to the lower side (the side at which knocking occurs) in variations of the second predetermined value const15 (step S504 of FIG. 69) under conditions in which knocking occurs at the basic ignition timing MBTCAL (step S467 of FIG. 69). In so doing, the estimated alcohol concentration value ALCEST is not updated mistakenly.

According to the ninth embodiment, a determination is made as to whether or not knocking is actually occurring in the combustion chamber, the knocking intensity in the combustion chamber is detected, the detected knocking intensity value KICREAL is compared to the estimated knocking intensity value KICEST, the estimated compression ratio value CMPEST is calculated on the basis of the comparison result and knocking detection result, the volume V0 of the combustion chamber at the combustion start timing is calculated on the basis of the estimated compression ratio value CMPEST, the combustion period (BURN1, BURN2) from the beginning of combustion to a predetermined crank angle is calculated on the basis of the volume V0 at the combustion start timing, the basic ignition timing MBTCAL for obtaining MBT is calculated on the basis of the combustion period (BURN1, BURN2), and spark ignition is performed at the basic ignition timing MBTCAL. In so doing, the basic ignition timing for obtaining MBT can be applied with a high degree of precision, while converging the estimated compression ratio value CMPEST quickly, even when fuel having a predetermined octane number or composite fuel having a fixed alcohol concentration is used and, for some reason, the actual compression ratio is higher than the compression ratio of the engine specifications.

According to the ninth embodiment, when knocking is detected, the estimated compression ratio value CMPEST is updated to the larger side during the combustion cycle in which the knocking occurs until the knocking intensity differential $\Delta KIC$ between the detected knocking intensity value KICREAL and estimated knocking intensity value KICEST is held within the allowable range (in particular, the loop operation of the steps S572, S573, S591, S592 in FIG. 71). The estimated compression ratio value CMPEST is then updated, according to a fixed cycle, toward the smaller side in variations of the second predetermined value const25 (step S461, S467, S533, S469, S534, S471 of FIG. 71). In so doing, the estimated compression ratio value CMPEST can be converged during the combustion cycle in which the knocking occurs.

According to the ninth embodiment, the estimated compression ratio value CMPEST is updated to the smaller side (the side at which knocking occurs) in variations of the second predetermined value const25 (step S534 of FIG. 71) under conditions in which knocking occurs at the basic ignition timing MBTCAL (step S467 of FIG. 71). In so doing, the estimated compression ratio value CMPEST is not updated mistakenly.

According to the ninth embodiment, as shown in FIG. 64, when the effective compression ratio Ec from the intake valve closing timing IVC to the combustion start timing is calculated on the basis of the volume VIVC of the combustion chamber 5 at the intake value closing timing and the volume V0 of the combustion chamber 5 at the combustion start timing (S163 of FIG. 64), the temperature T0 of the combustion chamber 5 at the combustion start timing and the pressure P0 of the combustion chamber 5 at the combustion start timing are calculated from the temperature TINI of the combustion chamber 5 at the intake valve closing timing and the effective compression ratio Ec, and the pressure PINI of the combustion chamber 5 at the intake valve closing timing and the effective compression ratio Ec, respectively (steps S164 to S167 in FIG. 64), and the stratified flow combustion speed SL1, used to calculate the initial combustion period BURN1, is calculated on the basis of the temperature T0 and pressure P0 of the combustion chamber 5 at the combustion start timing (step S168 of FIG. 64), the volume VIVC of the combustion chamber 5 at the intake valve closing timing is calculated on the basis of the estimated compression ratio value CMPEST (steps S351, S352 of FIG. 63). In so doing, the volume VIVC of the combustion chamber 5 at the intake valve closing timing can be calculated with a high degree of precision even when fuel having a predetermined octane number is used and, for some reason, the actual compression ratio is higher than the expected compression ratio.

In the ninth embodiment, a case was described in which the auto-ignition timing predicted value $\theta$knkest (knocking occurrence timing predicted value) is calculated on the basis of a characteristic expressing the distribution of an inverse of the time required for the fuel in the combustion chamber to auto-ignite. However, the auto-ignition timing detected value $\theta$knkreal (knocking occurrence timing detected value) may be used instead of the auto-ignition timing predicted value $\theta$knkest.

Thus similar actions and effects to those of the fourth through sixth embodiments can be exhibited in the seventh through ninth embodiments.

Tenth and Eleventh Embodiments

Figure 73:
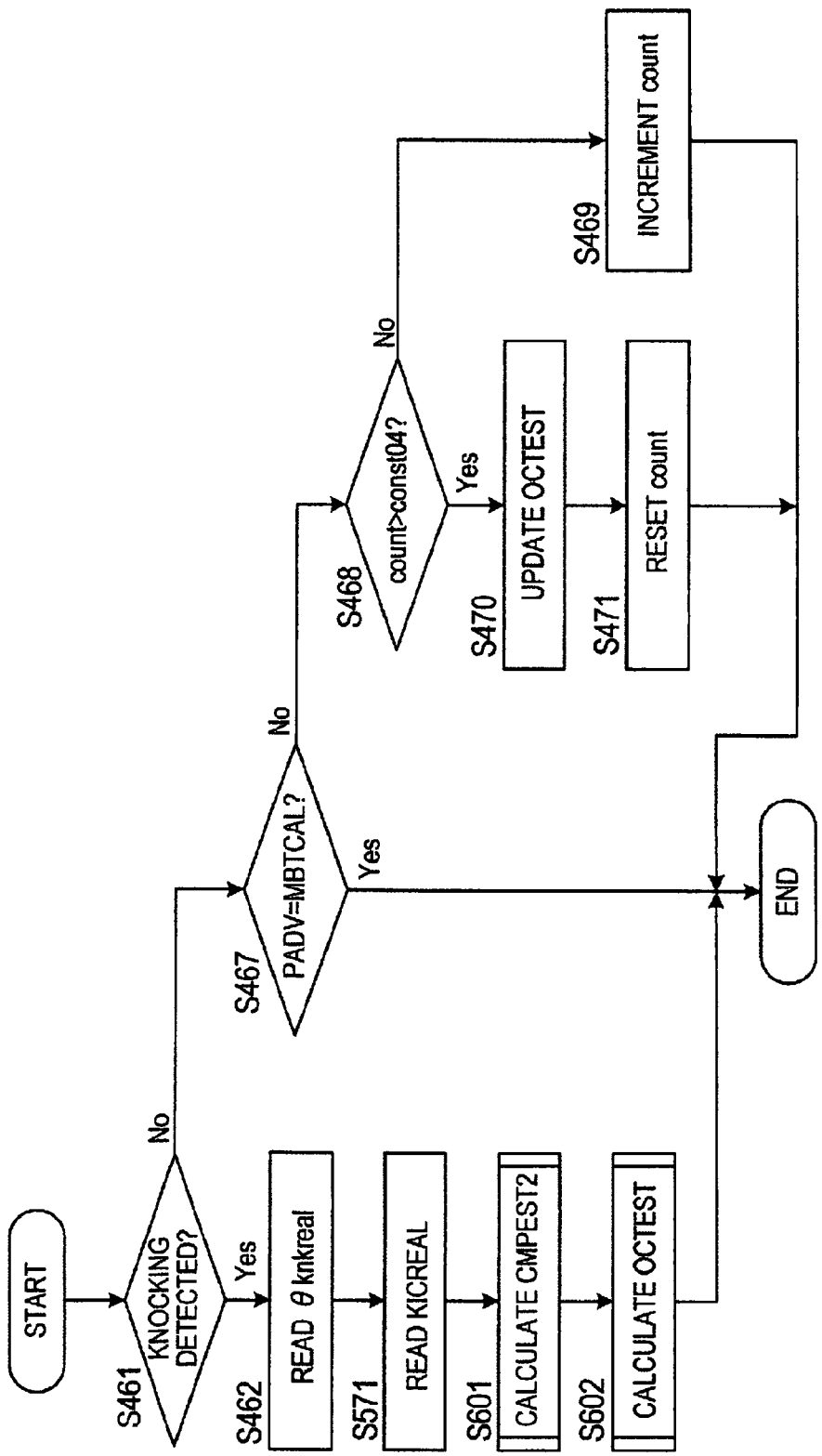
FIG. 73 is a flowchart for calculating the estimated compression ratio value and estimated octane number value in the tenth embodiment.
Figure 78:
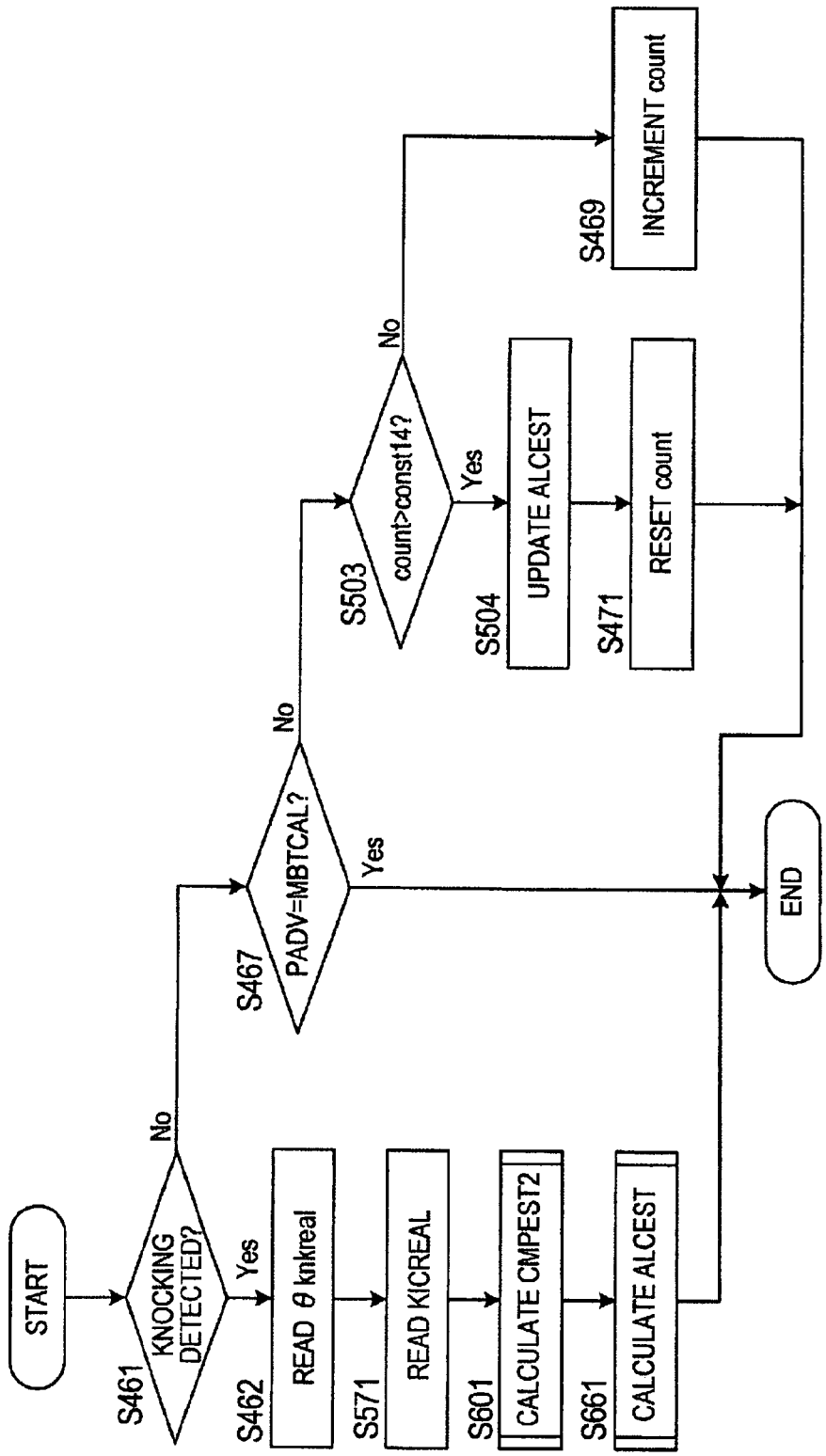
FIG. 78 is a flowchart for calculating the estimated compression ratio value and estimated alcohol concentration value in the eleventh embodiment.

The flowchart in FIG. 73 illustrates a tenth embodiment, and the flowchart in FIG. 78 illustrates an eleventh embodiment. FIG. 73 replaces FIG. 48 of the fourth embodiment or FIG. 65 of the seventh embodiment, and FIG. 78 replaces FIG. 55 of the fifth embodiment or FIG. 69 of the eighth embodiment. In FIG. 73, identical parts to FIGS. 48 and 65 are allocated identical step numbers, and in FIG. 78, identical parts to FIGS. 55 and 69 are allocated identical step numbers.

When knocking is detected in the fourth embodiment, the estimated octane number value OCTEST is reduced during the combustion cycle in which the knocking is detected until the ignition timing differential $\Delta\theta$, which is the difference between the auto-ignition timing detected value $\theta$knkreal and the auto-ignition timing predicted value $\theta$knkest, is held within the allowable range. In contrast, when knocking is detected in the tenth embodiment, the estimated compression ratio value is also calculated during the combustion cycle in which the knocking is detected. Likewise, when knocking is detected in the fifth embodiment, the estimated alcohol concentration value ALCEST is increased during the combustion cycle in which the knocking is detected until the ignition timing differential $\Delta\theta$, which is the difference between the auto-ignition timing detected value $\theta$knkreal and the auto-ignition timing predicted value $\theta$knkest, is held within the allowable range. In contrast, when knocking is detected in the eleventh embodiment, the estimated compression ratio value is also calculated during the combustion cycle in which the knocking is detected.

The tenth embodiment shown in FIG. 73 differs mainly from the fourth embodiment shown in FIG. 48 or the seventh embodiment shown in FIG. 65 in comprising steps S601, S602. The eleventh embodiment shown in FIG. 78 differs mainly from the fifth embodiment shown in FIG. 55 or the eighth embodiment shown in FIG. 69 in comprising steps S601, S661. In the step S601, which is shared by the tenth and eleventh embodiments, an estimated compression ratio value CMPEST2 is calculated. Calculation of the estimated compression ratio value CMPEST2 will now be described using the flowchart in FIG. 74, which is shared by the tenth and eleventh embodiments.

Here, the method of calculating the estimated compression ratio value in the tenth and eleventh embodiments differs from the method of calculating the estimated compression ratio value in the seventh embodiment, and therefore the estimated compression ratio value calculated in the tenth and eleventh embodiments is distinguished from the estimated compression ratio value calculated in the seventh embodiment by denoting the former CMPEST2 and the latter CMPEST.

Figure 74:
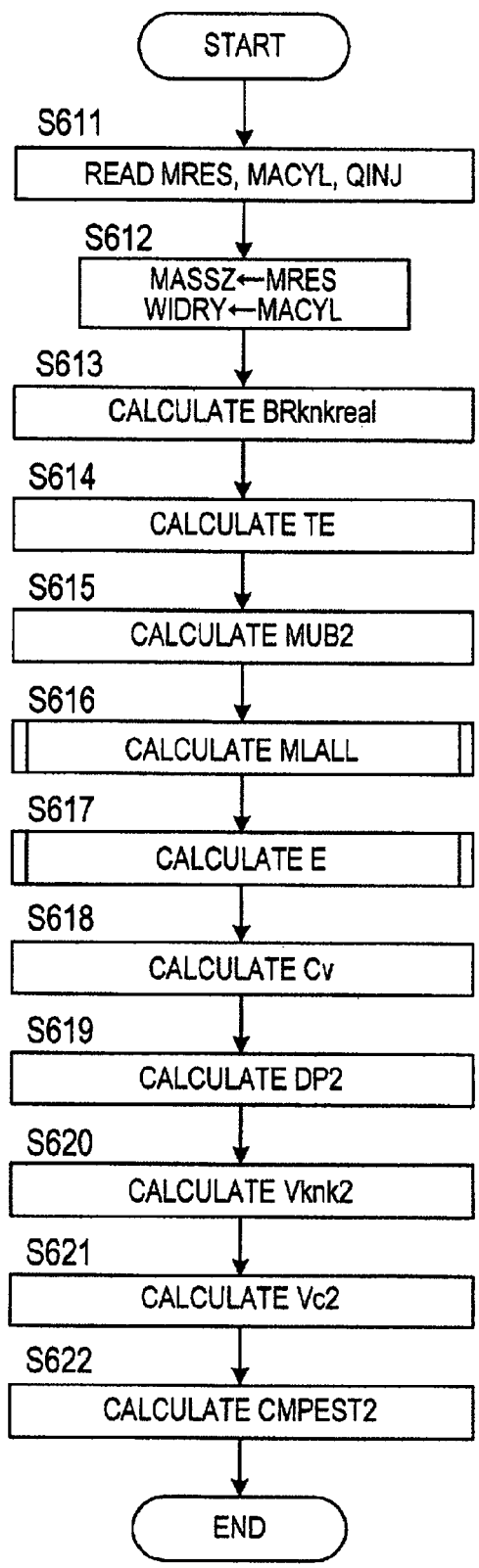
FIG. 74 is a flowchart for calculating the estimated compression ratio value in the tenth and eleventh embodiments.

In a step S611 of FIG. 74 (a subroutine of the step S601 in FIGS. 73, 78), which is shared by the tenth and eleventh embodiments, the cylinder fresh air amount MACYL [g] and the internal inert gas amount MRES [g], calculated in the steps S52, S53 of FIG. 14, are read together with the fuel amount QINJ [g]. It should be noted that the fuel amount QINJ [g] may be determined in proportion to the fuel injection pulse width TI [ms].

In a step S612, the cylinder fresh air amount MACYL [g] is set as WIDRY [g], and the internal inert gas amount MRES [g] is set as MASSZ [g]. WIDRY and MASSZ are adopted for use only in the calculation of the knocking intensity index KNKI, WIDRY denoting the cylinder fresh air amount, and MASSZ denoting the internal inert gas amount.

In a step S613, the auto-ignition timing detected value θknkreal, obtained in the step S462 of FIGS. 73, 78, is used to calculate a combustion mass proportion BRknkreal at the auto-ignition timing detected value θknkreal. This calculation may be performed in the following manner: when the auto-ignition timing detected value θknkreal is within the initial combustion period, the auto-ignition timing detected value θknkreal is converted into the aforementioned crank angle Θ using compression top dead center TDC as a reference, and the converted crank angle Θ is substituted into the above equation (68); and when the auto-ignition timing detected value θknkreal is within the main combustion period, the auto-ignition timing detected value θknkreal is converted into the aforementioned crank angle Θ using compression top dead center TDC as a reference, and the converted crank angle Θ is substituted into the above equation (69).

In a step S614, the average temperature TE of the combustion chamber 5 at the auto-ignition timing is calculated. Here, the average temperature TC of the combustion chamber 5 obtained by inserting 1.0 as the combustion mass proportion BR on the right side of the above equation (70) may be determined as the auto-ignition average temperature TE of the combustion chamber 5.

In a step S615, an unburned fuel amount MUB2 [g] at the auto-ignition timing is calculated from the fuel amount QINJ [g] and the combustion mass proportion BRknkreal at the auto-ignition timing detected value θknkreal using the following equation.

$$MUB2 = QINJ \times (1 - BRknkreal) \tag{131}$$

The equation (131) is obtained by replacing MUB with MUB2 and BRknk with BRknkreal in the above equation (59).

The total gas mole number MLALL, the gas enthalpy E, and the specific heat Cv of the burned gas are calculated in steps S616 to S618 respectively. These calculations are identical to those of the steps S223, S224, and S225 of FIG. 33, and hence description thereof has been omitted.

In a step S619, the detected knocking intensity value KICREAL, obtained in the step S571 of FIGS. 73, 78 is used to calculate the pressure increase produced by auto-ignition, or in other words a pressure increase DP2 [Pa] produced by knocking, according to the following equation.

$$DP2 = KICREAL/\text{correlation coefficient 3} \tag{132}$$

The equation (132) is identical to the equation (101). More specifically, in the equation (101), the pressure increase is converted into knocking intensity, whereas in the equation (132), the knocking intensity is converted into pressure increase. Accordingly, the correlation coefficient 3 on the right side of the equation (132) is a coefficient expressing the correlation with the knocking intensity. More simply, the correlation coefficient 3 may be the same as the correlation coefficient 1 used in the step S227 of FIG. 33.

In a step S620, a volume Vknk2 of the combustion chamber 5 at the auto-ignition timing detected value θknkreal is calculated using the following equation.

$$Vknk2 = (MLALL \times R\# \times CF\# \times MUB2)/\{DP2 \times Cv \times (MASSZ + QINJ + WIDRY)\} \tag{133}$$

where CF#: lower calorific value of fuel.

The equation (133) is identical to the above equation (100). More specifically, the equation (100) is for determining the pressure increase, whereas the equation (133) is for determining the combustion chamber volume.

In a step S621, the volume Vknk2 of the combustion chamber 5 at the auto-ignition timing detected value θknkreal is used to calculate a gap volume Vc2 according to the following equation.

$$Vc2 = Vknk2 - (\pi/4)D^2 \cdot Hknkreal \tag{134}$$

where D: cylinder bore diameter [m], and
Hknkreal: distance of piston pin 76 from TDC at auto-ignition timing detected value [m].

The equation (134) is identical to the equation (2). More specifically, the second item on the right side of the equation (134) is the volume (not including the gap area) of the combustion chamber 5 at the auto-ignition timing detected value θknkreal, and therefore the gap volume can be obtained by subtracting this volume from Vknk2, which includes the gap volume. The terms D and Hknkreal are known from the engine specifications.

In a step S622, the gap volume Vc2 is used to calculate the estimated compression ratio value CMPEST2 according to the following equation.

$$CMPEST2 = (\pi/4)D^2 \cdot Hx/Vc2 + 1 \tag{135}$$

where D: cylinder bore diameter [m], and
Hx: difference between maximum value and minimum value of distance of piston pin 76 from TDC [m].

The equation (135) is identical to the above equation (124). More specifically, the equation (124) is for determining the gap volume, whereas the equation (135) is for determining the compression ratio. The terms D and Hx are known from the engine specifications.

When calculation of the estimated compression ratio value CMPEST2 is complete, in the tenth embodiment the routine returns to FIG. 73, where the estimated octane number value OCTEST is calculated in the step S602, and in the eleventh embodiment the routine returns to FIG. 78, where the estimated alcohol concentration value ALCEST is calculated in the step S661. Calculation of the estimated octane number value OCTEST in the tenth embodiment and calculation of the estimated alcohol concentration value ALCEST in the eleventh embodiment will now be described using the flowcharts in FIGS. 75 and 79, respectively.

When knocking is detected in the fourth and seventh embodiments, the estimated octane number value OCTEST is converged by being updated repeatedly during the combustion cycle in which the knocking is detected until the ignition timing differential Δθ is held below a predetermined value in the fourth embodiment, and until the knocking intensity differential ΔKIC is held below a predetermined value in the seventh embodiment. When knocking is detected in the tenth embodiment, the inverse (1/τ) of a time τ required for the fuel in the combustion chamber 5 to auto-ignite, which is a time that differs according to the pressure and temperature in the combustion chamber 5, is calculated at intervals of a predetermined crank angle during the combustion cycle in which the knocking is detected from the combustion start timing to the knocking occurrence timing detected value θknkreal, and the estimated octane number value OCTEST is converged by being updated repeatedly until the absolute value of the difference between the integrated value SUM of $1/\tau$ and one is held within an allowable range.

Similarly, when knocking is detected in the fifth and eighth embodiments, the estimated alcohol concentration value ALCEST is converged by being updated repeatedly during the combustion cycle in which the knocking is detected until the ignition timing differential $\Delta\theta$ is held below a predetermined value in the fifth embodiment, and until the knocking intensity differential $\Delta KIC$ is held below a predetermined value in the eighth embodiment. When knocking is detected in the eleventh embodiment, the inverse $(1/\tau)$ of the time required for the fuel in the combustion chamber 5 to auto-ignite, which is a time that differs according to the pressure and temperature in the combustion chamber 5, is calculated at intervals of a predetermined crank angle during the combustion cycle in which the knocking is detected from the combustion start timing to the knocking occurrence timing detected value $\theta$knkreal, and the estimated alcohol concentration value ALCEST is converged by being updated repeatedly until the absolute value of the difference between the integrated value SUM of $1/\tau$ and one is held within the allowable range.

Here, the calculation method of the auto-ignition timing predicted value in FIGS. 50 and 51 of the fourth embodiment or the calculation method of the auto-ignition timing predicted value in FIGS. 67 and 68 of the seventh embodiment may be adopted as the calculation method for the estimated octane number value OCTEST in the tenth embodiment, and the calculation method of the auto-ignition timing predicted value in FIGS. 56 and 57 of the fifth embodiment or the calculation method of the auto-ignition timing predicted value in FIGS. 70 and 68 of the eighth embodiment may be adopted as the calculation method for the estimated alcohol concentration value ALCEST in the eleventh embodiment.

Figure 75:
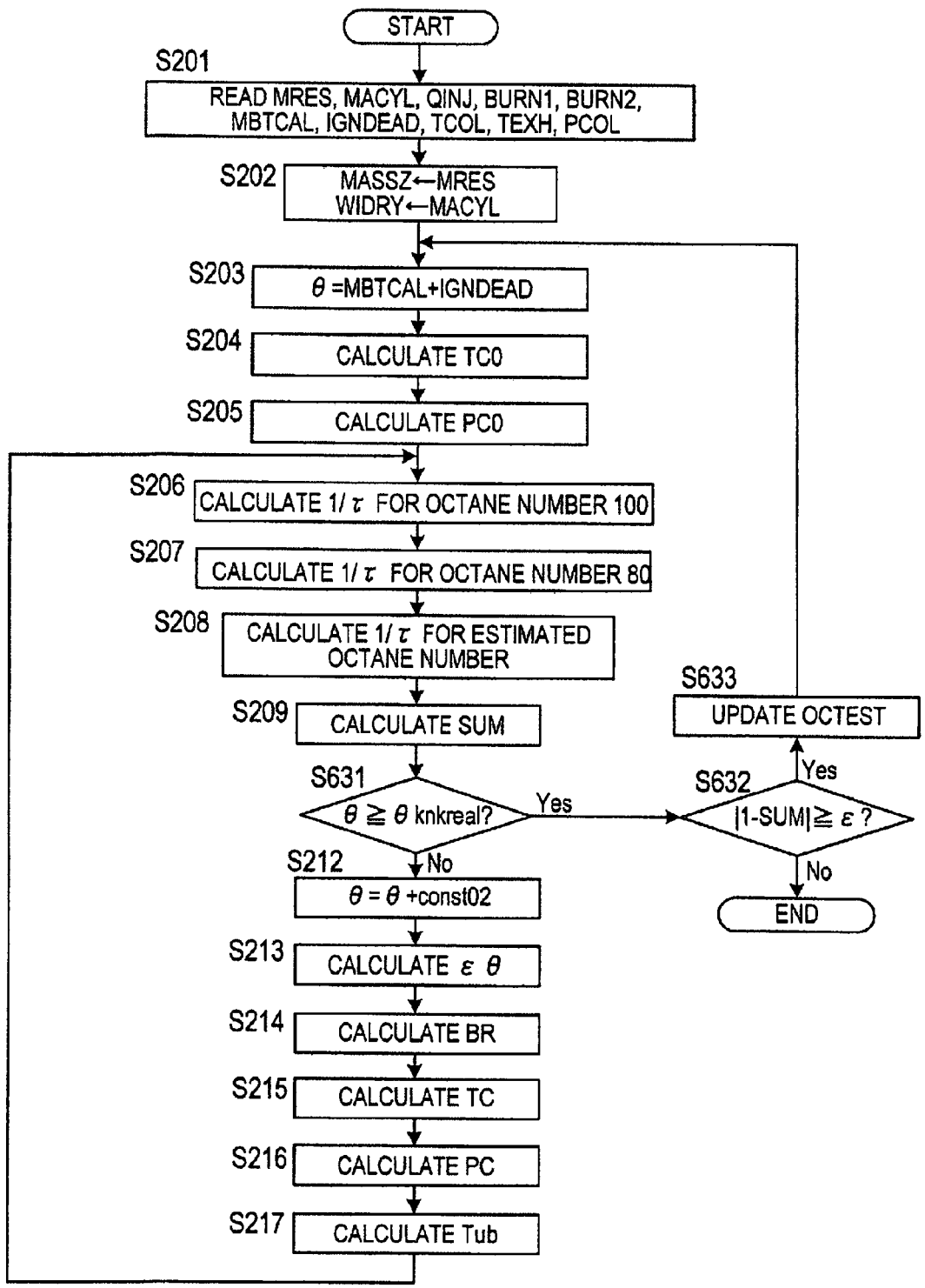
FIG. 75 is a flowchart for calculating the estimated octane number value in the tenth embodiment.
Figure 79:
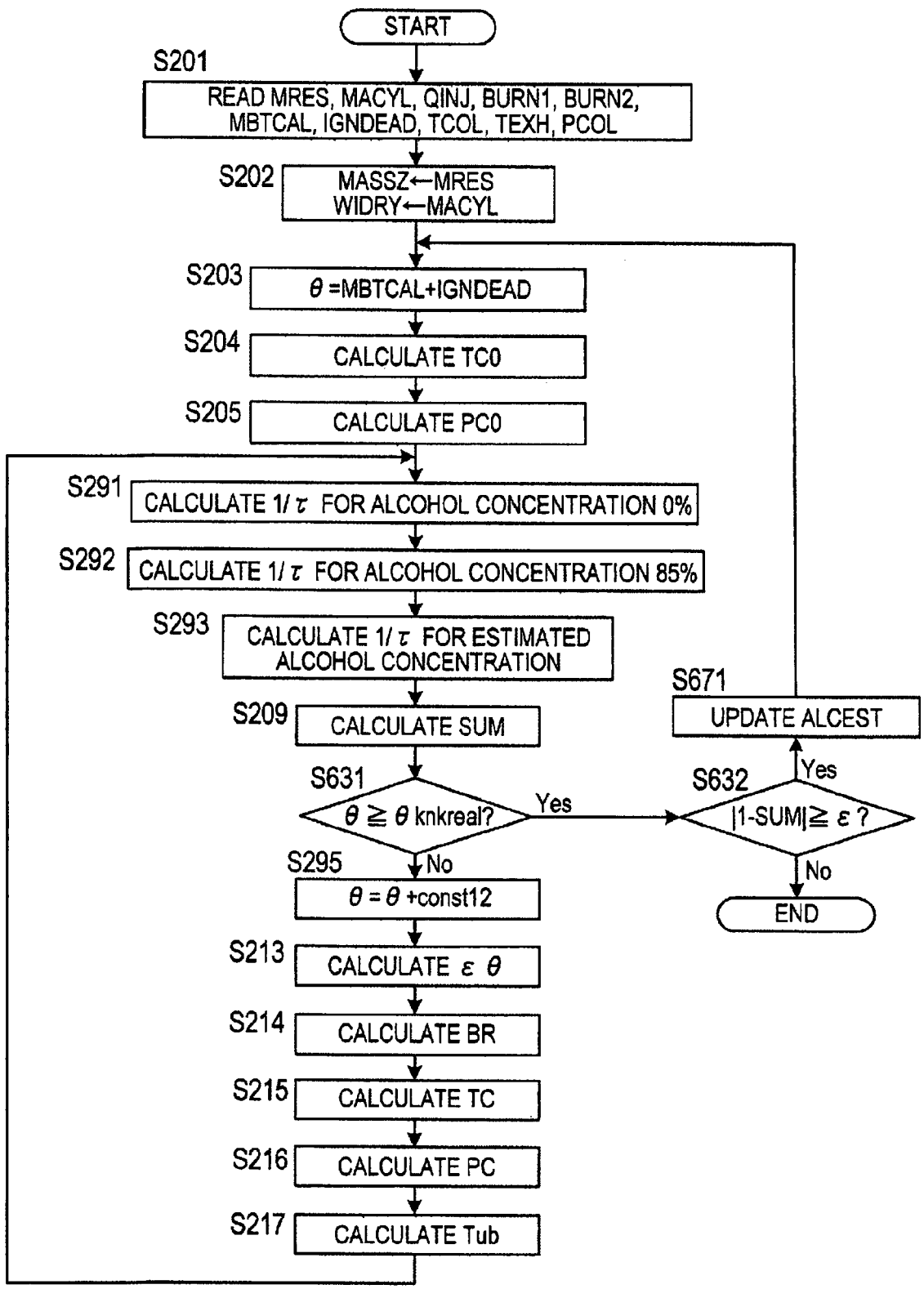
FIG. 79 is a flowchart for calculating the estimated alcohol concentration value in the eleventh embodiment.

More specifically, parts of FIG. 75 in the tenth embodiment (a subroutine of the step S602 in FIG. 73) which are identical to those of FIG. 50 in the fourth embodiment or FIG. 67 in the seventh embodiment have been allocated identical step numbers, and parts of FIG. 79 in the eleventh embodiment (a subroutine of the step S661 in FIG. 78) which are identical to those of FIG. 56 in the fifth embodiment or FIG. 70 in the eighth embodiment have been allocated identical step numbers.

FIG. 75 of the tenth embodiment differs from FIG. 50 of the fourth embodiment or FIG. 67 of the seventh embodiment in comprising steps S631, S632, S633, and FIG. 79 of the eleventh embodiment differs from FIG. 56 of the fifth embodiment or FIG. 70 of the eighth embodiment in comprising steps S631, S632, S671.

To describe the main differences between the tenth embodiment and the fourth and seventh embodiments, first, in the step S631 of FIG. 75, the crank angle $\theta$ and the auto-ignition timing detected value $\theta$knkreal, obtained in the step S462 of FIG. 73, are compared. When the crank angle $\theta$ is less than the auto-ignition timing detected value $\theta$knkreal, the routine advances to the step S212 of FIG. 75, where the operations of the steps S213 to S217, S206 to S209, and S631 in FIG. 75 are performed repeatedly while advancing the crank angle $\theta$ in variations of a predetermined angle const02. When the crank angle $\theta$ eventually reaches the auto-ignition timing detected value $\theta$knkreal, the routine advances from the step S631 to the step S632 in FIG. 75, where the absolute value of the difference between the integrated value SUM of $1/\tau$ for fuel having the estimated octane number value OCTEST and one is compared to a predetermined value $\epsilon$ (a positive value). The predetermined value $\epsilon$ defines the allowable range, and therefore, if the absolute value of the difference between the integrated value SUM of $1/\tau$ and one is less than the predetermined value $\epsilon$, the routine advances to END, where the current processing is terminated.

If, on the other hand, the absolute value of the difference between the integrated value SUM of $1/\tau$ and one is equal to or greater than the predetermined value $\epsilon$, it is determined that the estimated octane number value OCTEST is too large, and hence the routine advances to the step S633, where the estimated octane number value OCTEST is reduced. In other words, the estimated octane number value OCTEST is updated using the following equation.

$$OCTEST(\text{new}) = OCTEST(\text{old}) - const03 \times (1 - SUM) \qquad (136)$$

where OCTEST(new): updated estimated octane number value,

OCTEST(old): pre-update estimated octane number value, and const03: update proportion to smaller side (positive absolute number).

Here, the second item on the right side of the equation (136) determines the amount by which the estimated octane number value is updated each time. By introducing a value obtained by subtracting the integrated value SUM of $1/\tau$ from one into the update amount each time, convergence of the estimated octane number value OCTEST can be performed more quickly. In other words, when the estimated octane number value OCTEST is larger than the actual octane number but in the vicinity of the actual octane number, the value obtained by subtracting the integrated value SUM of $1/\tau$ from one is relatively small, but when the estimated octane number value OCTEST is larger than the actual octane number and deviates greatly from the actual octane number, the value obtained by subtracting the integrated value SUM of $1/\tau$ from one is relatively large. When the value obtained by subtracting the integrated value SUM of $1/\tau$ from one is relatively large, the update amount of the estimated octane number value each time is increased correspondingly, and in so doing, convergence of the estimated octane number value OCTEST is performed more quickly.

Next, the routine returns to the step S203 of FIG. 75, where the operation beginning at the step S203 is executed repeatedly. When the crank angle $\theta$ reaches the auto-ignition timing detected value $\theta$knkreal, the routine advances from the step S631 to the step S632 in FIG. 75, where, if the absolute value of the difference between the integrated value SUM of $1/\tau$ and one is equal to or greater than the predetermined value $\epsilon$, the estimated octane number value OCTEST is determined to be still too large. The estimated octane number value OCTEST is then reduced again in the step S633, whereupon the routine returns to the step S203 of FIG. 75. By continuing to repeat this operation, the absolute value of the difference between the integrated value SUM of $1/\tau$ and one eventually falls below the predetermined value $\epsilon$, and at this time, the routine advances to END, where the processing of FIG. 75 is terminated. As a result, the estimated octane number value when the absolute value of the difference between the integrated value SUM of $1/\tau$ and one falls below the predetermined value $\epsilon$ becomes the converged value of the estimated octane number value.

Thus when knocking is detected, the estimated octane number value OCTEST is converged by being updated repeatedly during the combustion cycle in which the knocking is detected until the absolute value of the difference between one and the integrated value SUM of $1/\tau$ from the combustion start timing (MBTCAL+IGNDEAD) to the auto-ignition timing detected value θknkreal is held within the allowable range.

Next, to describe the main differences between the eleventh embodiment and the fifth and eighth embodiments, first, in the step S631 of FIG. 79, the crank angle θ and the auto-ignition timing detected value θknkreal, obtained in the step S462 of FIG. 78, are compared. When the crank angle θ is less than the auto-ignition timing detected value θknkreal, the routine advances to a step S295 of FIG. 79, where the operations of the steps S213 to S217, S291, S292, S293, S209, and S631 in FIG. 79 are performed repeatedly while advancing the crank angle θ in variations of a predetermined angle const12. When the crank angle θ eventually reaches the auto-ignition timing detected value θknkreal, the routine advances from the step S631 to the step S632 in FIG. 79, where the absolute value of the difference between the integrated value SUM of 1/τ for a composite fuel having the estimated alcohol concentration value ALCEST and one is compared to the predetermined value ε (a positive value). If the absolute value of the difference between the integrated value SUM of 1/τ and one is less than the predetermined value ε, the routine advances to END, where the current processing is terminated.

If, on the other hand, the absolute value of the difference between the integrated value SUM of 1/τ and one is equal to or greater than the predetermined value ε, it is determined that the estimated alcohol concentration value ALCEST is too small, and hence the routine advances to the step S671, where the estimated alcohol concentration value ALCEST is increased. In other words, the estimated alcohol concentration value ALCEST is updated using the following equation.

$$ALCEST(\text{new})=ALCEST(\text{old})+const13\times(1-SUM) \quad (137)$$

where ALCEST (new): updated estimated alcohol concentration value,

ALCEST (old): pre-update estimated alcohol concentration value, and const13: update proportion to larger side (positive absolute number).

Here, the second item on the right side of the equation (137) determines the amount by which the estimated alcohol concentration value is updated each time. By introducing a value obtained by subtracting the integrated value SUM of 1/τ from one into the update amount each time, convergence of the estimated alcohol concentration value ALCEST can be performed more quickly. In other words, when the estimated alcohol concentration value ALCEST is lower than the actual alcohol concentration but in the vicinity of the actual alcohol concentration, the value obtained by subtracting the integrated value SUM of 1/τ from one is relatively small, but when the estimated alcohol concentration value ALCEST is lower than the actual alcohol concentration and deviates greatly from the actual alcohol concentration, the value obtained by subtracting the integrated value SUM of 1/τ from one is relatively large. When the value obtained by subtracting the integrated value SUM of 1/τ from one is relatively large, the update amount of the estimated alcohol concentration value each time is increased correspondingly, and in so doing, convergence of the estimated alcohol concentration value ALCEST is performed more quickly.

Next, the routine returns to the step S203 of FIG. 79, where the operation beginning at the step S203 is executed repeatedly. When the crank angle θ reaches the auto-ignition timing detected value θknkreal, the routine advances from the step S631 to the step S632 in FIG. 79, where, if the absolute value of the difference between the integrated value SUM of 1/τ and one is equal to or greater than the predetermined value ε, the estimated alcohol concentration value ALCEST is determined to be still too small. The estimated alcohol concentration value ALCEST is then increased again in the step S671, whereupon the routine returns to the step S203. By continuing to repeat this operation, the absolute value of the difference between the integrated value SUM of 1/τ and one eventually falls below the predetermined value ε, and at this time, the routine advances to END, where the processing of FIG. 79 is terminated. As a result, the estimated alcohol concentration value when the absolute value of the difference between the integrated value SUM of 1/τ and one falls below the predetermined value ε becomes the converged value of the estimated alcohol concentration value.

Thus when knocking is detected, the estimated alcohol concentration value ALCEST is converged by being updated repeatedly during the combustion cycle in which the knocking is detected until the absolute value of the difference between one and the integrated value SUM of 1/τ from the combustion start timing (MBTCAL+IGNDEAD) to the auto-ignition timing detected value θknkreal is held within the allowable range.

Figure 76:
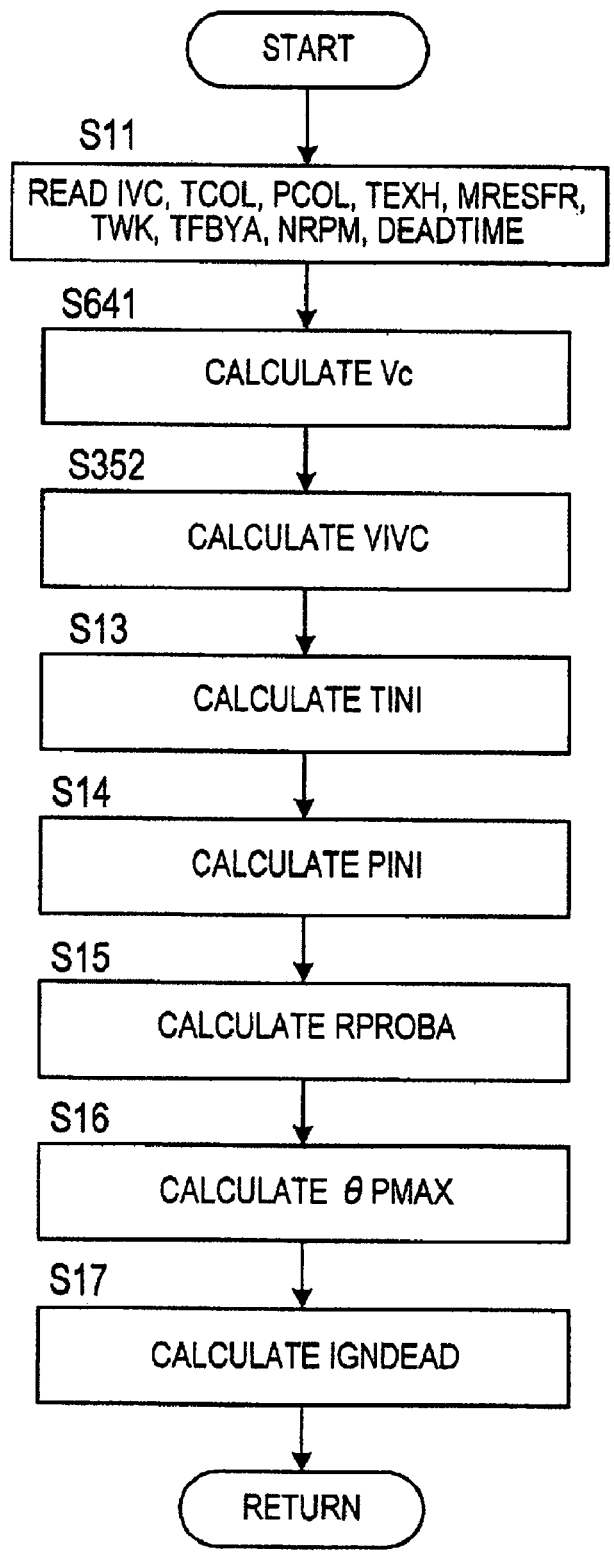
FIG. 76 is a flowchart for calculating physical quantities in the tenth and eleventh embodiments.
Figure 77:
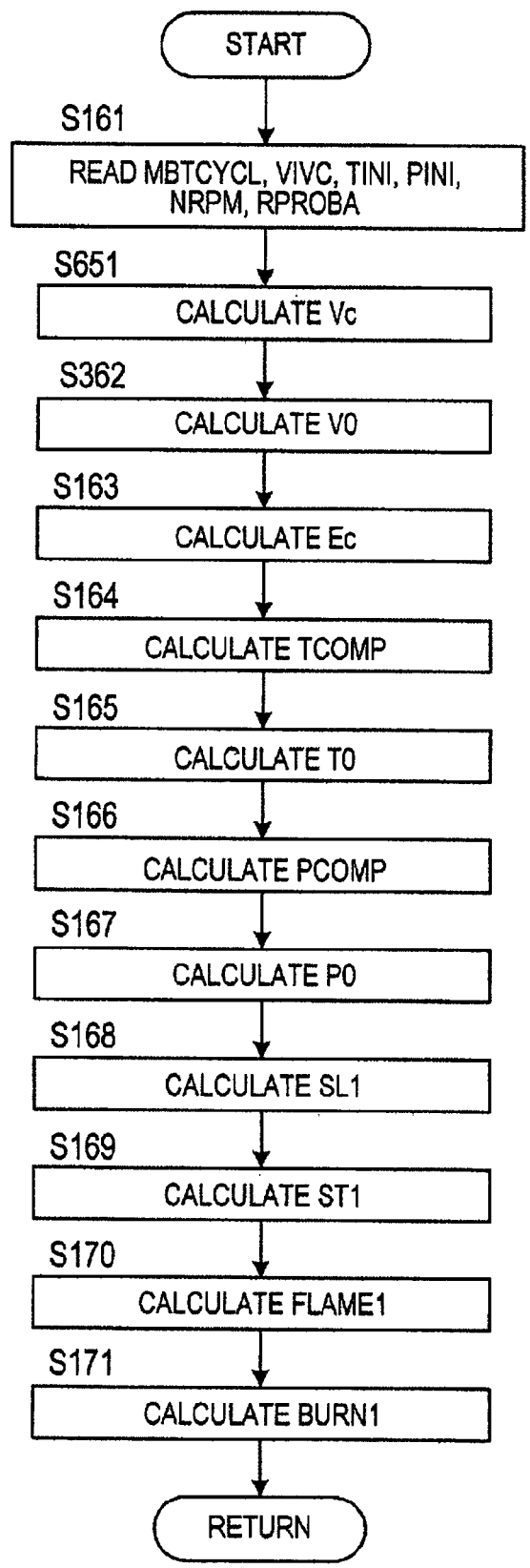
FIG. 77 is a flowchart for calculating the initial combustion period in the tenth and eleventh embodiments.

The estimated compression ratio value CMPEST2 calculated in the manner described above in FIG. 74, which is shared by the tenth and eleventh embodiments, is used in the tenth and eleventh embodiments to calculate the volume VIVC of the combustion chamber 5 at the intake valve closing timing and the volume V0 of the combustion chamber 5 at the combustion start timing (MBTCYCL) similarly to the seventh embodiment, as shown in FIGS. 76 and 77 (steps S641, S352 of FIG. 76, and steps S651, S362 of FIG. 77).

It should be noted that in FIGS. 76 and 77, shared by the tenth and eleventh embodiments, identical parts to FIGS. 63 and 64 of the fourth embodiment have been allocated identical step numbers, and description thereof has been omitted.

According to the tenth and eleventh embodiments, an estimated value of a knocking-correlated parameter other than the compression ratio (the estimated octane number value OCTEST in the tenth embodiment and the estimated alcohol concentration value ALCEST in the eleventh embodiment) is calculated on the basis of the knocking detection result (the knocking detection result is fed back to the knocking-correlated parameter) (steps S461, S602, S470 of FIG. 73 in the tenth embodiment, and steps S461, S661, S504 of FIG. 78 in the eleventh embodiment), the auto-ignition timing predicted value θknkest (the knocking occurrence timing predicted value) in the combustion chamber 5 is calculated on the basis of the estimated value of the knocking-correlated parameter (steps S206 to S210 of FIG. 32 and step S218 of FIG. 33 in the tenth embodiment, and steps S291 to S293, S209, S210 of FIG. 53 and step S218 of FIG. 33 in the eleventh embodiment), and the knocking limit ignition timing KNOCKcal is calculated on the basis of the auto-ignition timing predicted value θknkest (steps S219 to S231 of FIG. 33 in both the tenth and eleventh embodiments). As a result, an operation to retard and then advance the ignition timing in order to avoid knocking, such as that performed in a conventional device in which the knocking detection result is fed back to the ignition timing, need not be performed repeatedly, regardless of the operating conditions, and even when a commercially available fuel whose octane number cannot be learned in advance or a commercially available composite fuel whose alcohol concentration cannot be learned in advance is used. The knocking limit ignition timing can be followed even during transitions such as acceleration and deceleration, and hence the fuel economy and output can be prevented from deteriorating.

Further, as indicated by the equations (136) and (137) above, when updating (calculating) the estimated value of the knocking-correlated parameter other than the compression ratio (the estimated octane number value OCTEST in the tenth embodiment and the estimated alcohol concentration value ALCEST in the eleventh embodiment) after knocking has been detected, the value obtained by subtracting the integrated value SUM of $1/\tau$ from one is also taken into account. More specifically, in the tenth embodiment, when the estimated octane number value OCTEST is greater than the actual octane number and deviates greatly from the actual octane number (i.e. the value obtained by subtracting the integrated value SUM of $1/\tau$ from one is relatively large), the update amount of the estimated octane number value each time is greater than when the estimated octane number value OCTEST is greater than the actual octane number but in the vicinity of the actual octane number (i.e. the value obtained by subtracting the integrated value SUM of $1/\tau$ from one is relatively small). Hence the estimated octane number value OCTEST converges more quickly when the estimated octane number value OCTEST is greater than the actual octane number and deviates greatly from the actual octane number than when the estimated octane number value OCTEST is greater than the actual octane number but in the vicinity of the actual octane number. In the eleventh embodiment, when the estimated alcohol concentration value ALCEST is lower than the actual alcohol concentration and deviates greatly from the actual alcohol concentration (i.e. the value obtained by subtracting the integrated value SUM of $1/\tau$ from one is relatively large), the update amount of the estimated alcohol concentration value each time is greater than when the estimated alcohol concentration value ALCEST is lower than the actual alcohol concentration but in the vicinity of the actual alcohol concentration (i.e. the value obtained by subtracting the integrated value SUM of $1/\tau$ from one is relatively small). Hence the estimated alcohol concentration value ALCEST converges more quickly when the estimated alcohol concentration value ALCEST is lower than the actual alcohol concentration and deviates greatly from the actual alcohol concentration than when the estimated alcohol concentration value ALCEST is lower than the actual alcohol concentration but in the vicinity of the actual alcohol concentration.

Thus according to the tenth and eleventh embodiments, the estimated value of the knocking-correlated parameter other than the compression ratio (the estimated octane number value OCTEST in the tenth embodiment and the estimated alcohol concentration value ALCEST in the eleventh embodiment) is also calculated on the basis of the auto-ignition timing detected value θknkreal (knocking occurrence timing detected value) (step S633 of FIG. 75 in the tenth embodiment, and step S671 of FIG. 79 in the eleventh embodiment). As a result, convergence of the estimated value of the knocking-correlated parameter other than the compression ratio can be performed more quickly, thereby improving the operability of the engine correspondingly.

In the tenth and eleventh embodiments, a case was described in which the combustion period (BURN1, BURN2) from the beginning of combustion to a predetermined crank angle is calculated on the basis of the stratified flow combustion speed (SL1, SL2), the volume (V0, VTDC) corresponding to the combustion gas volume, the combustion mass proportion (BR1, BR2), and the reaction probability RPROBA, and the basic ignition timing MBTCAL is calculated on the basis of the combustion period (BURN1, BURN2), as shown in FIGS. 76, 77, 12, and 13. However, a base ignition timing map may be provided instead of calculating the basic ignition timing MBTCAL. In this case, the pressure increase amount DP1 produced by knocking in the combustion chamber 5 is estimated on the basis of the auto-ignition timing predicted value θknkest (knocking occurrence timing predicted value) and the operating conditions (steps S219 to S226 in FIG. 33), the estimated knocking intensity value KIC is calculated on the basis of the pressure increase amount DP1 (steps S227 to S229 in FIG. 33), the knocking retardation amount KNRT is calculated on the basis of the estimated knocking intensity value KIC (step S230 in FIG. 33), and a value obtained by correcting the basic ignition timing MBTCAL to the retarded side by the knocking retardation amount KNRT is set as the knocking limit ignition timing KNOCKcal (step S231 in FIG. 33). In so doing, although a base ignition timing serving as the basic ignition timing can be provided as a map, the ROM capacity need not be increased, since there is no need to provide base ignition timing maps for each of a plurality of difference octane numbers from the maximum octane number to the minimum octane number.

According to the tenth embodiment, the estimated octane number value OCTEST is calculated on the basis of the knocking detection result and the auto-ignition timing detected value θknkreal (knocking occurrence timing detected value) (steps S461, S462, S602 in FIG. 73, and FIG. 75) in response to the fact that the octane number has the greatest influence on knocking when gasoline is used as a fuel. Hence, even when gasoline with an initially unknown octane number is used as the fuel, the auto-ignition timing predicted value θknkest (knocking occurrence timing predicted value) can be calculated with a high degree of precision.

According to the tenth embodiment, when knocking is detected, the inverse ($1/\tau$) of the time required for the fuel in the combustion chamber 5 to auto-ignite, which is a time that differs according to the pressure and temperature of the combustion chamber 5, is calculated at intervals of the predetermined crank angle const02 during the combustion cycle in which the knocking is detected from the combustion start timing (MBTCAL+IGNDEAD) to the knocking occurrence timing detected value θknkreal, and the estimated octane number value OCTEST is updated to the smaller side until the absolute value of the difference between the integrated value SUM of $1/\tau$ and one is held within the allowable range (in particular, the loop operation of steps S203 to S209 and S631 to S633 in FIG. 75). The estimated octane number value is then updated, according to a fixed cycle, to the larger side in variations of the second predetermined value const05 (steps S461 and S467 to S471 in FIG. 73). In so doing, the estimated octane number value OCTEST can be converged during the combustion cycle in which the knocking is detected.

According to the tenth embodiment, the estimated octane number value OCTEST is updated to the larger side (the side at which knocking occurs) in variations of the second predetermined value const05 (step S470 of FIG. 73) only under conditions in which knocking occurs at the basic ignition timing MBTCAL, or in other words only when the minimum ignition timing value PADV is further retarded than the basic ignition timing MBTCAL (step S467 of FIG. 73). In so doing, the estimated octane number value OCTEST is not updated mistakenly.

According to the eleventh embodiment, the estimated alcohol concentration value ALCEST is calculated on the basis of the knocking detection result and the auto-ignition timing detected value θknkreal (knocking occurrence timing detected value) (steps S461, S462, S661 in FIG. 78) in response to the fact that when a composite fuel of gasoline and alcohol is used, the alcohol concentration of the composite fuel influences knocking. Hence, even when fuel containing alcohol with an initially unknown alcohol concentration is used as the fuel, the auto-ignition timing predicted value θknkest (knocking occurrence timing predicted value) can be predicted with a high degree of precision.

According to the eleventh embodiment, when knocking is detected, the inverse (1/τ) of the time required for the fuel in the combustion chamber 5 to auto-ignite, which is a time that differs according to the pressure and temperature of the combustion chamber 5, is calculated at intervals of the predetermined crank angle const02 during the combustion cycle in which the knocking is detected from the combustion start timing (MBTCAL+IGNDEAD) to the knocking occurrence timing detected value θknkreal, and the estimated alcohol concentration value ALCEST is updated to the higher side until the absolute value of the difference between the integrated value SUM of 1/τ and one is held within the allowable range (in particular, the loop operation of steps S203 to S205, S291 to S293, S209, S631, S632, and S671 in FIG. 79). The estimated alcohol concentration value is then updated, according to a fixed cycle, toward the lower side in variations of the second predetermined value const15 (steps S461, S467, S503, S469, S504, S471 in FIG. 78). In so doing, the estimated alcohol concentration value ALCEST can be converged during the combustion cycle in which the knocking occurs.

According to the eleventh embodiment, the estimated alcohol concentration value ALCEST is updated to the lower side (the side at which knocking occurs) in variations of the second predetermined value const15 (step S504 of FIG. 78) under conditions in which knocking occurs at the basic ignition timing MBTCAL (step S467 of FIG. 78). In so doing, the estimated alcohol concentration value ALCEST is not updated mistakenly.

According to the tenth and eleventh embodiments, the stratified flow combustion speed (SL1, SL2), which is the combustion speed of combustion gas in a stratified flow state, is calculated (step S168 in FIG. 77 and step S188 in FIG. 12), the volume (V0, VTDC) of the combustion chamber 5 corresponding to the combustion gas volume is calculated (step S162 in FIG. 77 and step S182 in FIG. 12), the combustion mass proportion (BR1, BR2) of the gas that burns in the combustion chamber 5 up to a predetermined crank angle is calculated (step S171 in FIG. 77, step S191 in FIG. 12), the reaction probability RPROBA, indicating the combustibility of the combustion gas under predetermined operating conditions, is calculated (step S15 in FIG. 76), the combustion period (BURN1, BURN2) from the beginning of combustion to a predetermined crank angle is calculated on the basis of the stratified flow combustion speed (SL1, SL2), the volume (V0, VTDC) of the combustion chamber 5 corresponding to the combustion gas volume, the combustion mass proportion (BR1, BR2), and the reaction probability RPROBA (step S171 in FIG. 77 and step S191 in FIG. 12), and the basic ignition timing MBTCAL is calculated on the basis of the combustion period (BURN1, BURN2) (steps S41 to S43 in FIG. 13). Hence, the knocking limit ignition timing KNOCKcal, which is a value obtained by correcting the basic ignition timing MBTCAL to the retarded side, is calculated on the basis of combustion analysis, and therefore an optimum knocking limit ignition timing KNOCKcal can be calculated regardless of the operating conditions.

According to the tenth and eleventh embodiments, the estimated compression ratio value CMPEST2 is calculated on the basis of the knocking detection result from the knocking sensor 47 (steps S461, S601 of FIG. 73 in the tenth embodiment, and steps S461, S601 of FIG. 78, and FIG. 74 in the eleventh embodiment), and the volume V0 of the combustion chamber 5 at the compression start timing, which is used to calculate the initial combustion period BURN1, is calculated on the basis of the estimated compression ratio value CMPEST2 (steps S651, S362 of FIG. 77, shared by the tenth and eleventh embodiments). As a result, an operation to retard and then advance the ignition timing in order to avoid knocking, such as that performed in a conventional device in which the knocking detection result is fed back to the ignition timing, need not be performed repeatedly, regardless of the operating conditions and even when fuel having the octane number 80 (fuel having a predetermined octane number) is used and, for some reason, the actual compression ratio increases beyond the compression ratio of the engine specifications. The knocking limit ignition timing can be followed even during transitions such as acceleration and deceleration, and hence the fuel economy and output can be prevented from deteriorating.

According to the tenth and eleventh embodiments, as shown in FIG. 77, when the effective compression ratio Ec from the intake valve closing timing IVC to the combustion start timing is calculated on the basis of the volume VIVC of the combustion chamber 5 at the intake value closing timing and the volume V0 of the combustion chamber 5 at the combustion start timing (S163 of FIG. 77), the temperature T0 of the combustion chamber 5 at the combustion start timing and the pressure P0 of the combustion chamber 5 at the combustion start timing are calculated from the temperature TINI of the combustion chamber 5 at the intake valve closing timing and the effective compression ratio Ec, and the pressure PINI of the combustion chamber 5 at the intake valve closing timing and the effective compression ratio Ec, respectively (steps S164 to S167 in FIG. 77), and the stratified flow combustion speed SL1, used to calculate the initial combustion period BURN1, is calculated on the basis of the temperature T0 and pressure P0 of the combustion chamber 5 at the combustion start timing (step S168 of FIG. 77), the volume VIVC of the combustion chamber 5 at the intake valve closing timing is calculated on the basis of the estimated compression ratio value CMPEST2 (steps S641, S352 of FIG. 76). In so doing, the volume VIVC of the combustion chamber 5 at the intake valve closing timing can be calculated with a high degree of precision even when fuel having a predetermined octane number is used and, for some reason, the actual compression ratio is higher than the expected compression ratio.

The entire contents of Japanese Patent Applications JP2004-166986 (filed Jun. 4, 2004) and JP2004-167022 (filed Jun. 4, 2004) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A control device for an engine having an ignition device, comprising:
 a sensor which detects a knocking in a combustion chamber of the engine; and
 a controller which:
  estimates a compression ratio of the engine on a basis of a knocking detection result;
  calculates a volume of the combustion chamber at a combustion start timing on a basis of the estimated compression ratio;

calculates a combustion period from a combustion start to a predetermined crank angle on a basis of the volume of the combustion chamber at the combustion start timing;

calculates a basic ignition timing for obtaining MBT (minimum advance for best torque) on a basis of the calculated combustion period; and controls the ignition device to perform a spark ignition at the calculated basic ignition timing.

2. The control device as defined in claim 1, wherein a knocking occurrence timing inside the combustion chamber is detected by the sensor, and the controller:

calculates a knocking limit ignition timing, which is an ignition timing furthest toward an advanced side at which knocking does not occur, on the basis of a detected knocking occurrence timing; and performs the spark ignition at a value furthest on a retarded side from among the knocking limit ignition timing and the basic ignition timing.

3. The control device as defined in claim 2, wherein, when knocking is detected, the controller updates the estimated compression ratio to a larger side in a step by a first predetermined value, and then updates the estimated compression ratio to a smaller side, according to a fixed cycle, in variations of a second predetermined value.

4. The control device as defined in claim 3, wherein the controller executes the updating of the estimated compression ratio to the smaller side in variations of the second predetermined value when the knocking limit ignition timing is on the retarded side of the basic ignition timing.

5. The control device as defined in claim 2, wherein the controller predicts the knocking occurrence timing on a basis of a characteristic expressing a distribution of an inverse of a time required for a fuel in the combustion chamber to reach an auto-ignition.

6. The control device as defined in claim 1, wherein the controller:

calculates a stratified flow combustion speed, which is a combustion speed when a combustion gas flows in a stratified state;

calculates a volume corresponding to a volume of the combustion gas in the combustion chamber;

calculates a combustion mass proportion of gas burning in the combustion chamber up to a predetermined crank angle;

calculates a reaction probability indicating a combustibility of the combustion gas under a predetermined operating condition;

calculates a combustion period from the combustion start to a predetermined crank angle on a basis of the stratified flow combustion speed, the volume corresponding to the combustion gas volume, the combustion mass proportion, and the reaction probability; and calculates the basic ignition timing for obtaining MBT (minimum advance for best torque) on the basis of the calculated combustion period, the combustion period being divided into an initial combustion period and a main combustion period, and the initial combustion period being calculated using the volume of the combustion chamber at the combustion start timing as the volume corresponding to the combustion gas volume.

7. The control device as defined in claim 6, wherein the controller:

calculates a volume of the combustion chamber at an intake valve closing timing on the basis of the estimated compression ratio;

calculates an effective compression ratio from the intake valve closing timing to the combustion start timing on the basis of the volume of the combustion chamber at the intake valve closing timing and the volume of the combustion chamber at the combustion start timing;

calculates a temperature of the combustion chamber at the combustion start timing from a temperature of the combustion chamber at the intake valve closing timing and the effective compression ratio;

calculates a pressure of the combustion chamber at the combustion start timing from a pressure of the combustion chamber at the intake valve closing timing and the effective compression ratio; and calculates the stratified flow combustion speed on the basis of the temperature and pressure of the combustion chamber at the combustion start timing.

8. An engine assembly, comprising:
an engine including a fuel injector; and
the control device of claim 1, wherein
the fuel injector injects gasoline into the engine.

9. An engine assembly, comprising:
an engine including a fuel injector; and
the control device of claim 1, wherein
the engine is adapted to use a fuel that includes alcohol to generate an internal combustion.

10. A control method for an engine having an ignition device, comprising:

detecting a knocking in a combustion chamber of the engine;

estimating a compression ratio of the engine on a basis of a knocking detection result;

calculating a volume of the combustion chamber at a combustion start timing on a basis of the estimated compression ratio;

calculating a combustion period from a combustion start to a predetermined crank angle on a basis of the volume of the combustion chamber at the combustion start timing;

calculating a basic ignition timing thereby obtaining MBT (minimum advance for best torque) on a basis of the calculated combustion period; and controlling the ignition device to perform a spark ignition at the calculated basic ignition timing.

11. The method of claim 10, further comprising the action of injecting, utilizing a fuel injector, gasoline into an engine.

12. The method of claim 10, further comprising the action of generating an internal combustion inside an engine utilizing a fuel that includes alcohol.

13. A control device for an engine having an ignition device, comprising:

means for detecting a knocking in a combustion chamber of the engine;

means for estimating a compression ratio of the engine on a basis of a knocking detection result;

means for calculating a volume of the combustion chamber at a combustion start timing on a basis of the estimated compression ratio;

means for calculating a combustion period from a combustion start to a predetermined crank angle on a basis of the volume of the combustion chamber at the combustion start timing;

means for calculating a basic ignition timing for obtaining MBT (minimum advance for best torque) on a basis of the calculated combustion period; and means for controlling the ignition device to perform a spark ignition at the calculated basic ignition timing.

14. An engine assembly, comprising:
an engine including a fuel injector; and the control device of claim 13, wherein the fuel injector injects gasoline into the engine.

15. An engine assembly, comprising:

an engine including a fuel injector; and the control device of claim 13, wherein the engine is adapted to use a fuel that includes alcohol to generate an internal combustion.

* * * * *